US012379344B2

(12) United States Patent
Holden et al.

(10) Patent No.: US 12,379,344 B2
(45) Date of Patent: Aug. 5, 2025

(54) ELECTRONIC DEVICES FOR POLYMER SYNTHESIS AND ASSEMBLY

(71) Applicant: Avery Digital Data, Inc., San Diego, CA (US)

(72) Inventors: Matthew T. Holden, San Diego, CA (US); Barry Merriman, San Diego, CA (US); Ryan De Ridder, San Diego, CA (US); Kyle T. Gustafson, Glendale, CA (US); Michael Heller, Geneva, IL (US)

(73) Assignee: Avery Digital Data, Inc., San Diego, CA (US)

( * ) Notice: Subject to any disclaimer, the term of this patent is extended or adjusted under 35 U.S.C. 154(b) by 0 days.

(21) Appl. No.: 17/909,536

(22) PCT Filed: Jun. 9, 2022

(86) PCT No.: PCT/US2022/032894
§ 371 (c)(1),
(2) Date: Sep. 6, 2022

(87) PCT Pub. No.: WO2022/261366
PCT Pub. Date: Dec. 15, 2022

(65) Prior Publication Data

US 2024/0011941 A1 Jan. 11, 2024

Related U.S. Application Data

(60) Provisional application No. 63/208,669, filed on Jun. 9, 2021.

(51) Int. Cl.

| | |
|---|---|
| ***G01N 27/414*** | (2006.01) |
| ***B01J 19/00*** | (2006.01) |
| ***G01N 27/327*** | (2006.01) |

(52) U.S. Cl.
CPC ..... *G01N 27/4148* (2013.01); *G01N 27/3274* (2013.01); *G01N 27/3277* (2013.01); *G01N 27/4145* (2013.01)

(58) Field of Classification Search
None
See application file for complete search history.

(56) References Cited

U.S. PATENT DOCUMENTS

2003/0175750 A1 9/2003 Barany et al.
2012/0220497 A1* 8/2012 Jacobson ............... B82Y 30/00 506/30

(Continued)

FOREIGN PATENT DOCUMENTS

WO WO 2017/044100 A1 3/2017
WO WO 2023/114547 A2 6/2023

OTHER PUBLICATIONS

International Search Report and Written Opinion of related PCT application No. PCT/US22/32894, dated Oct. 18, 2022. 11 pages.

(Continued)

*Primary Examiner* — Elizabeth A Robinson
*Assistant Examiner* — Brittany I Fisher
(74) *Attorney, Agent, or Firm* — Haynes and Boone, LLP

(57) ABSTRACT

The present disclosure discloses a polymer synthesis and assembly chip that includes a semiconductor integrated circuit device that contains a plurality of pixels, wherein each pixel of the plurality of pixels contains an electrode; and wherein a set of pixels of the plurality of pixels is capable of synthesizing a polymer; and wherein a set of pixels of the plurality of pixels is capable of assembling a synthesized polymer, either independently or in concert with one or more pixels of the plurality of pixels; and control circuitry capable of applying voltages to the electrode. The present disclosure includes related methods of use, such as (Continued)

methods for error correction, for use with the described polymer synthesis and assembly chip.

17 Claims, 104 Drawing Sheets

(56) References Cited

U.S. PATENT DOCUMENTS

| | | | | |
|---|---|---|---|---|
| 2012/0231974 | A1 | 9/2012 | Kim et al. | |
| 2016/0326520 | A1* | 11/2016 | Ramu ................ | C12N 15/1058 |
| 2019/0241951 | A1 | 8/2019 | Esfandyarpour et al. | |
| 2020/0248254 | A1* | 8/2020 | Hayes ................ | C12N 15/1031 |
| 2020/0378919 | A1 | 12/2020 | Milgrew et al. | |

OTHER PUBLICATIONS

International Preliminary Report on Patentablility for PCT App No. PCT/US2022/032894 dated Dec. 21, 2023, 9 pgs.

Extended European Search Report received in Application No. 22821060.5, dated Mar. 24, 2025.

* cited by examiner $T_mCS$= Melting temperature of common spacer sequence

'S1' denotes 'Site 1'

T~1.04 s

T=0

Post synthesis detritylation

Chip sequence

3'-CCCCCCCCCCCCCCC-TTTTTTTTTTTTTTT-GCAATTTTAAGCTGA-[DMT removal cycles]

Hybridization sequences

5'-Cy5-AAAAAAAAAAAAAAA

5'-CGTTAAAATTCGACT-Cy3

Pattern of post-synthesis detritylation (15 steps)

Cy5 channel

Cy3-channel

Post-synthesis detritylation, pulse-width modulation

Design

Surface-3'-CCCCCCCCCCCCCCCTTTTTTTTTTTTTTTGCAATTTTAAGCTGACTCTCTT*T*[4 x PWM]-[T*T*]-[PWM]-Cy5

T*=T coupling and oxidation without deprotection

Hybridization sequence

5'-CGTTAAAATTCGACT-Cy3

Active pixels pattern within each duty cycle zone

⋮

A) Confinement with PWM
Design
TTTTTTTTTTTTTTTT*T*-[PWM]-Cy5-coupling
T*=T coupling and oxidation without deprotection
Confinement comparison
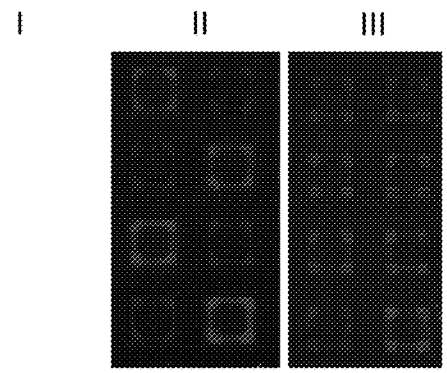
I: Intended deprotection sites (dark)
II: 3 min deprotection, 5 % duty cycle, 10 Hz
III: 6 s of deprotection, no PWM
B) Detritylation kinetics and partial removal
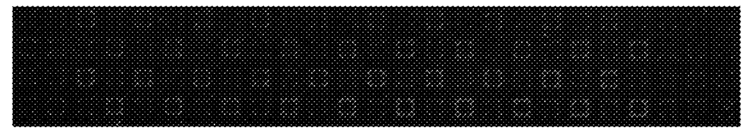
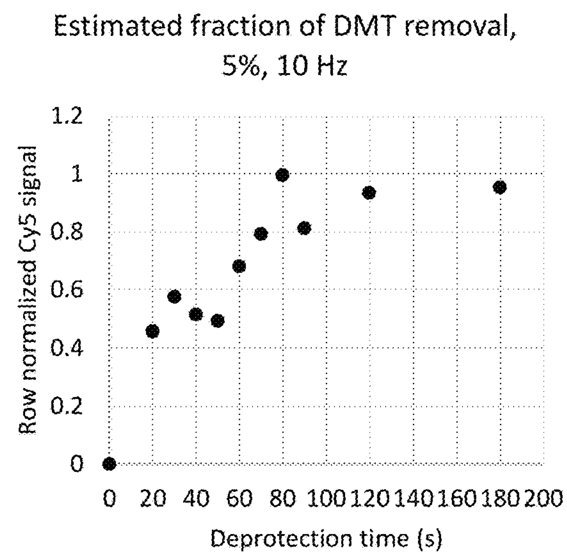
FIG. 72

4 oligonucleotide pool

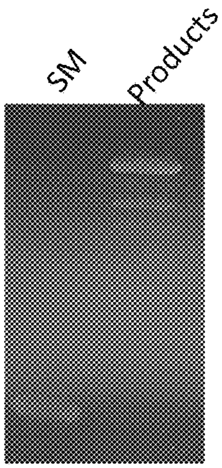

20 oligonucleotide pool

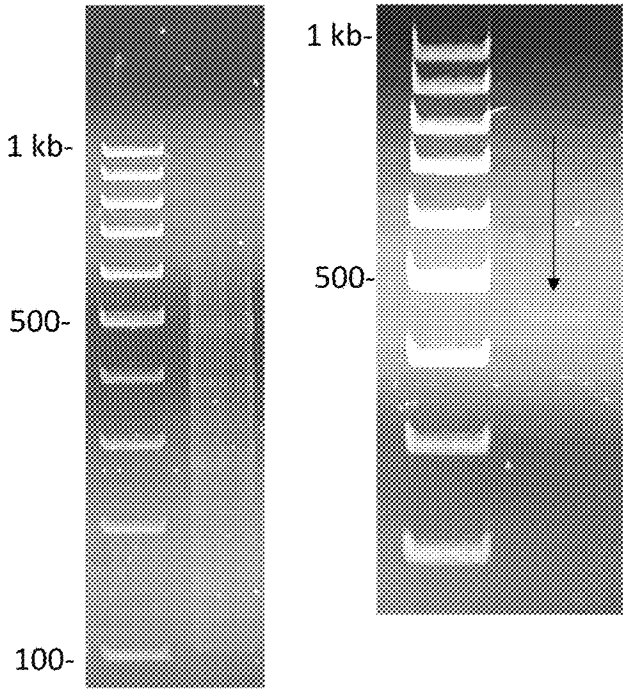

FIG. 78

Oligonucleotide sequences

| | |
|---|---|
| 1 | TAACGCTGCAGAGTTTTATCGCTTCCATGACGCAGAAGTTAA |
| 2 | CACTTTCGGATATTTCTGATGAGTCGAAAAATTATCTTGATA |
| 3 | AAGCAGGAATTACTACTGCTTGTTTACGAATTAAATCGAAGT |
| 4 | GGACTGCTGGCGGAAAATGAGAAAATTCGACCTATCCTTGC G |
| 5 | CAGCTCGAGAAGCTCTTACTTTGCGACCTTTCGCCATCAACT |
| | AACGATTCTGTCAAAAACTGACGCGTTGGATGAGGAGAAGT |
| 11 | CATCAGAAATATCCGAAAGTGTTAACTTCTGCGTCATGGAAG |
| 12 | AAGCAGTAGTAATTCCTGCTTTATCAAGATAATTTTTCGACT |
| 13 | CTCATTTTCCGCCAGCAGTCCACTTCGATTTAATTCGTAAAC |
| 14 | AAGTAAGAGCTTCTCGAGCTGCGCAAGGATAGGTCGAATTT T |
| 15 | TCAGTTTTTGACAGAATCGTTAGTTGATGGCGAAAGGTCGC A |
| 16 | AACGTGCCAAGCATATTAAGCCACTTCTCCTCATCCAACGCG |
| 17 | CCATGAACAAAATGTGACTCATATCTAAACCAGTCCTTGACG |
| 18 | AGTAATCCACGCTCTTTTAAAATGTCAACAAGAGAATCTCTA |
| 19 | GATTTCTTACCTATTAGTGGTTGAACAGCATCGGACTCAGAT |
| 20 | AGCGGTCTGGAAACGTACGGATTGTTCAGTAACTTGACTCAT |

ELECTRONIC DEVICES FOR POLYMER SYNTHESIS AND ASSEMBLY

CROSS-REFERENCE TO RELATED APPLICATIONS

This application claims priority to and the benefit of U.S. Provisional Patent Application Ser. No. 63/208,669, filed Jun. 9, 2021, and entitled "Semiconductor Chip Driven Gene Synthesis", the disclosure of which is incorporated herein by reference in its entirety.

FIELD

This disclosure is in the field of semiconductor chip electronic devices, and in particular in the field of Complementary Metal Oxide Semiconductor (CMOS) chip devices. This disclosure is also in the field of DNA synthesis and assembly. This disclosure is also in the field of gene synthesis. In particular, this disclosure describes CMOS chip devices for the synthesis and assembly of polymers (e.g., DNA) and methods for using these to assemble genes and complete genomes.

BACKGROUND

The ability to routinely synthesize entire genomes is one of the great remaining technical aspirations of the synthetic biology revolution. De novo synthesis efforts have ranged from Ghobind Khorana's synthesis of the first complete gene in 1979, to the production of the yeast genome in 2017. These are regarded as such milestones largely because of their inherent difficulty, which demands near perfection at scales spanning chemical DNA synthesis to cellular biology.

FIG. 1 provides a generic overview of a gene synthesis workflow as it is carried out in molecular biology laboratories using traditional manual or automated liquid handling techniques. Oligonucleotides are first generated using a primary DNA synthesis strategy, typically with phosphoramidite chemistry. Residual protecting groups are removed upon completion of the synthesis and the sequences are separated from their solid-support as a complex pool of sequences. The primary sequences are short (typically <200 nucleotides (nt)) relative to the intended target sequence due to inherent chemistry limits and are also single stranded. These then undergo a procedure, here termed an 'initial assembly', to transform the complex sequence pool into double stranded constructs typically over 1 kilobase (kb) in size. Methods for doing this include polymerase cycling assembly, and ligation-based approaches such as a ligation chain reaction. When the assembly targets exceed 1 kb in length, a different class of enzymatic assembly and processing approaches can be used, varying by the size of the desired construct and ultimate application. These standard methods include Gibson Assembly and Golden Gate assembly. In addition, other processes, described here as an 'intermediate assembly', are used to integrate the product into larger constructs such as a plasmid or other biological vector. Additional higher levels of assembly are used if the target approaches the Megabase (Mb) scale, as may be required to produce gene clusters or complete chromosomes or genomes. Various methods of error correction and amplification are also frequently employed throughout such workflows, the specifics again dependent upon the quantity, size, and fidelity of the material necessary.

Though oligonucleotide synthesis costs are a frequently cited barrier to genome-scale synthesis, the downstream processing steps required for assembly can be more challenging than the raw oligonucleotide production. For example, light-directed, and inkjet printing technologies are capable of fabricating DNA microarrays containing more than 1 million distinct sequences. If each sequence were 100 nt in length, the human genome primary oligonucleotide content could be generated using approximately 60 chip syntheses, providing 60 million oligonucleotides. One fundamental difficulty is the complexity of designing the annealing reactions used by many assembly workflows. Unintended hybridization events increase as the complexity of an oligonucleotide pool grows, imposing practical limits on the construct size that can be assembled in a single step. A second difficulty is reduced quality and scale of DNA microarray-derived oligonucleotides. Within a pool there may be very few molecules which are completely free of errors. This necessitates further steps of error correction and/or amplification to prevent errors from propagating downstream. Each of these processes from oligonucleotide synthesis to final construct assembly typically requires its own distinct infrastructure, making it difficult to multiplex such approaches or conduct large scale gene-synthesis efforts. Given that traditional assembly methods can have difficulty for even as few as tens or hundreds of pooled oligo nucleotides, while genome-scale content requires thousands to millions of oligonucleotides, there is an urgent need for new assembly technologies that can manage the assembly of much larger sets of primary sequences than is practical with traditional methods of manual or automated liquid handling.

SUMMARY

In an aspect of the present disclosure, a polymer synthesis and assembly chip is disclosed. The chip includes a semiconductor integrated circuit device that contains a plurality of pixels, wherein each pixel of the plurality of pixels contains an electrode; and wherein a set of pixels of the plurality of pixels is capable of synthesizing a polymer; and wherein a set of pixels of the plurality of pixels is capable of assembling a synthesized polymer, either independently or in concert with one or more pixels of the plurality of pixels; and control circuitry capable of applying voltages to the electrode. In certain embodiments, every pixel functions as a synthesis, assembly, motion, and confinement pixel. In other embodiments each pixel has a distinct function. In other preferred embodiments each pixel has a set of functions.

In embodiments, a set of pixels of the plurality of pixels is capable of electrically controlled motion of particles or molecules, either independently or in concert with one or more pixels of the plurality of pixels. In embodiments, a set of pixels of the plurality of pixels is capable of electrically controlling localization of particles or molecules, either independently or in concert with one or more pixels of the plurality of pixels. In embodiments, the plurality of pixels contains a pixel having a specific geometry or attribute that is specific for the functionality of the pixel. In embodiments, the chip contains zones of electrically addressable and controllable temperature regulation. In embodiments, the plurality of pixels contains underlying circuitry to monitor synthesis or assembly or both. In embodiments, the chip includes addressable sites containing multiple sequences immobilized by their 5'-termini and produced by in situ synthesis. In embodiments, the chip contains addressable buried electrodes neighbored by addressable exposed electrodes and wherein the distance between the electrodes is less than that of the distance to the next closest arrangement of buried and exposed electrodes. In embodiments, the chip includes electrically addressable sites that act as temporary holding sites for solution-phase particles or molecules. In embodiments, the chip includes electrically addressable sites with covalently attached oligonucleotides that act as temporary holding sites for particles or molecules. In embodiments, the electrically addressable sites comprise pixels. In embodiments, the particles or molecules comprises an oligonucleotide or protein. In embodiments, the chip includes a series of pixels operably configured to move particles or molecules over a defined distance. In embodiments, the movement over a defined distance comprises a series of smaller discrete movement steps. In embodiments, the chip is divided into electrically defined zones by pixels that apply a potential barrier to prevent unintended exchange of particles or molecules into or out of said zones. In embodiments, the semiconductor integrated circuit device is a CMOS chip. In embodiments, the chip contains at least 100, or at least 1000, or at least 10,000, or at least 100,000, or at least 1,000,0000, or at least 10,000,000, or at least 100,000,000, or at least 1,000,000,000, or at least 10,000,000,000 or more than 10,000,000,000 pixels.

In another aspect, a polymer synthesis system is disclosed that includes the chip as described herein and a fluidic system capable of programmed delivery of reagents for polymer synthesis and assembly. In embodiments, the chip is contained in a flow cell bearing at least one rooftop electrode to assist in particle or molecule confinement proximal to a site for polymer synthesis.

In another aspect, a method of error correction is disclosed. The method involves synthesizing a first sequence that is partially complementary to a second sequence generated at a distal site on a polymer synthesis and assembly chip as detailed herein; electrically moving the sequences to one another for hybridization; optionally changing the voltage or temperature to alter hybridization stringency between the first and second sequences; and removing any unbound sequence from the chip. In embodiments, the method further involves optionally treating the first sequence and the second sequence with a mis-match excision enzyme. In another aspect a polymer assembly chip is disclosed; the chip includes assembly pixels.

BRIEF DESCRIPTION OF THE DRAWING FIGURES

FIG. 2 shows local concentration of charged particles or molecules.

FIG. 33 shows orthogonally addressable linkers.

Figure 61:
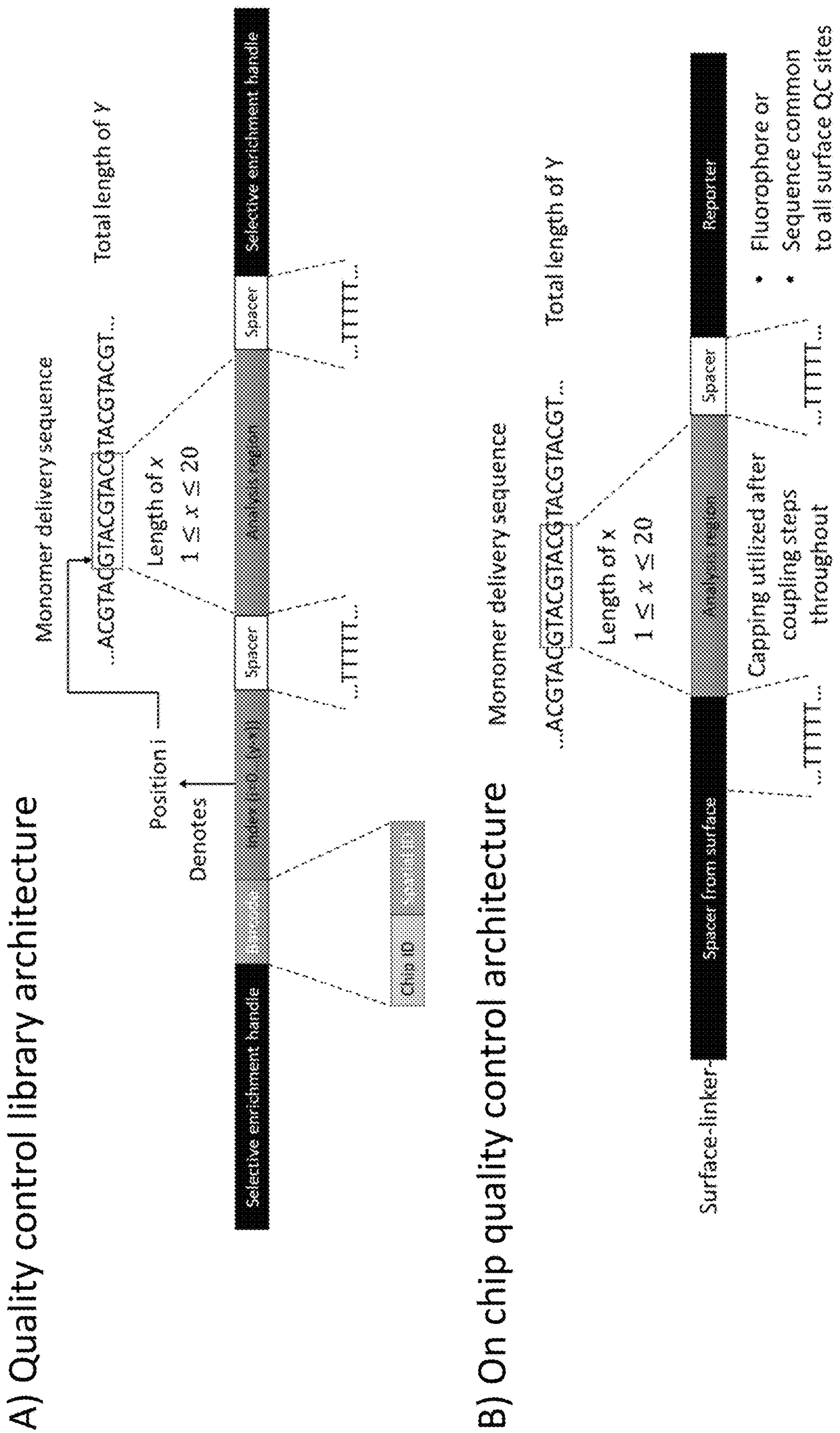

FIG. 61 illustrates the structure of various quality control sequences and features for analysis by sequencing or on-chip measurements. More specifically, FIG. 61A shows a quality control library architecture; FIG. 61B shows an on chip quality control architecture.

Figure 62:
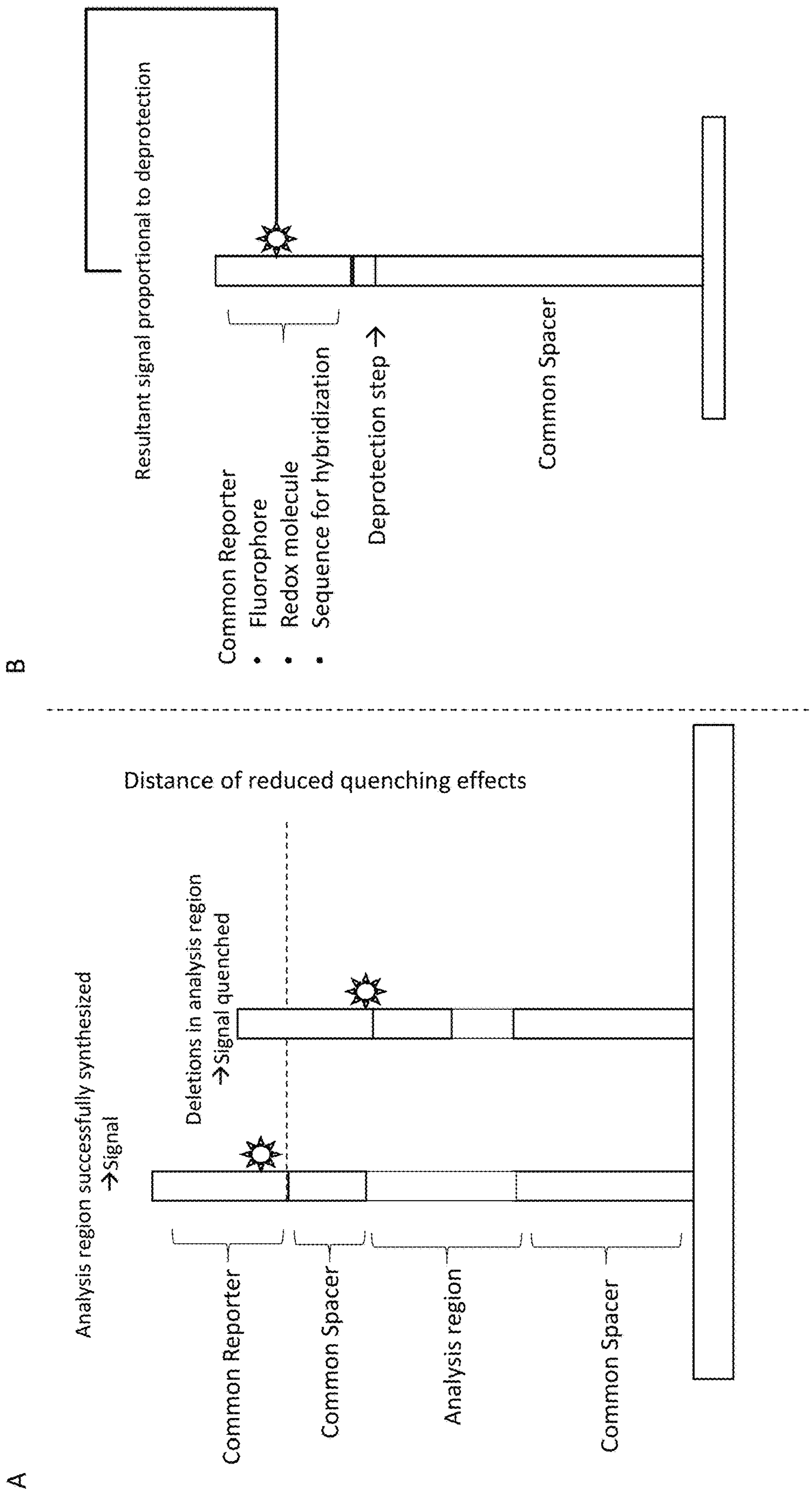

FIG. 62 shows two quality control features in FIGS. 62A and 62B, respectively.

Figure 63:
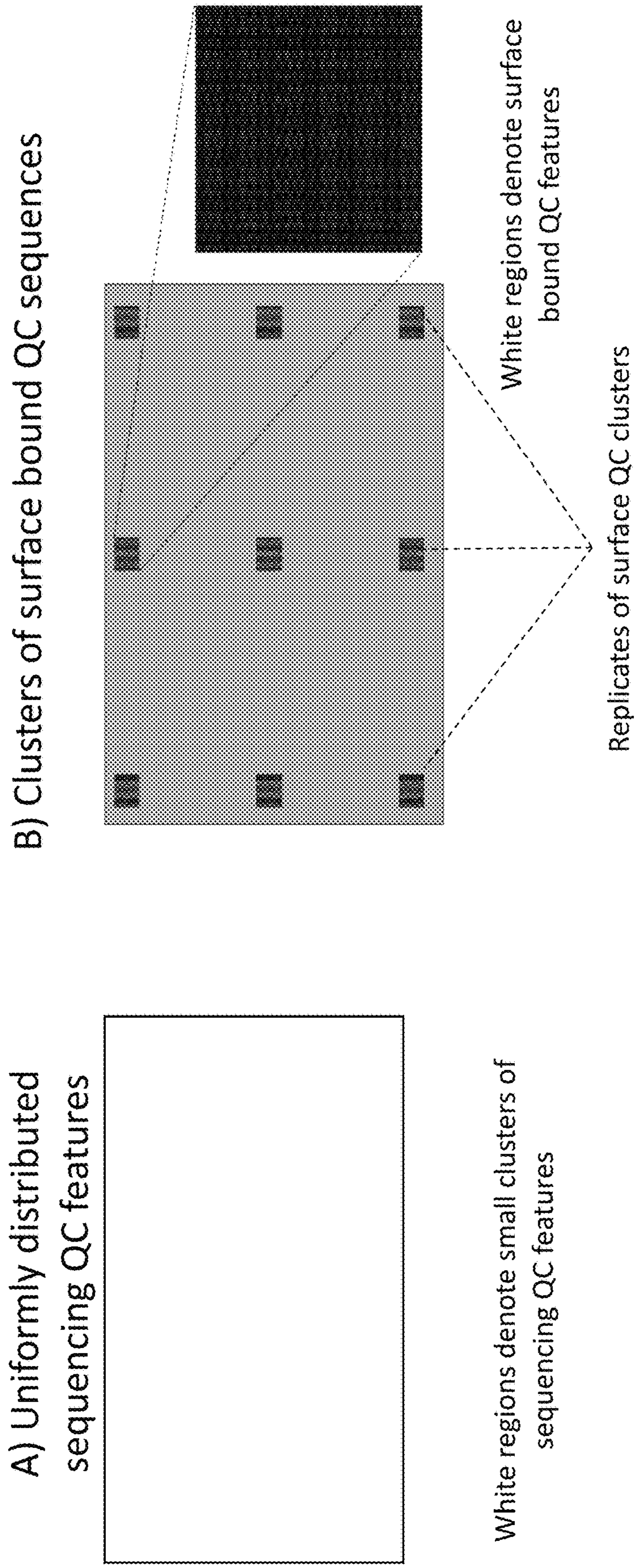

FIG. 63 shows methods of distributing the locations of the quality control features on a chip so that they are informative proxies for chip or synthesis performance, as shown in FIGS. 63A and 63B, respectively.

Figure 64:
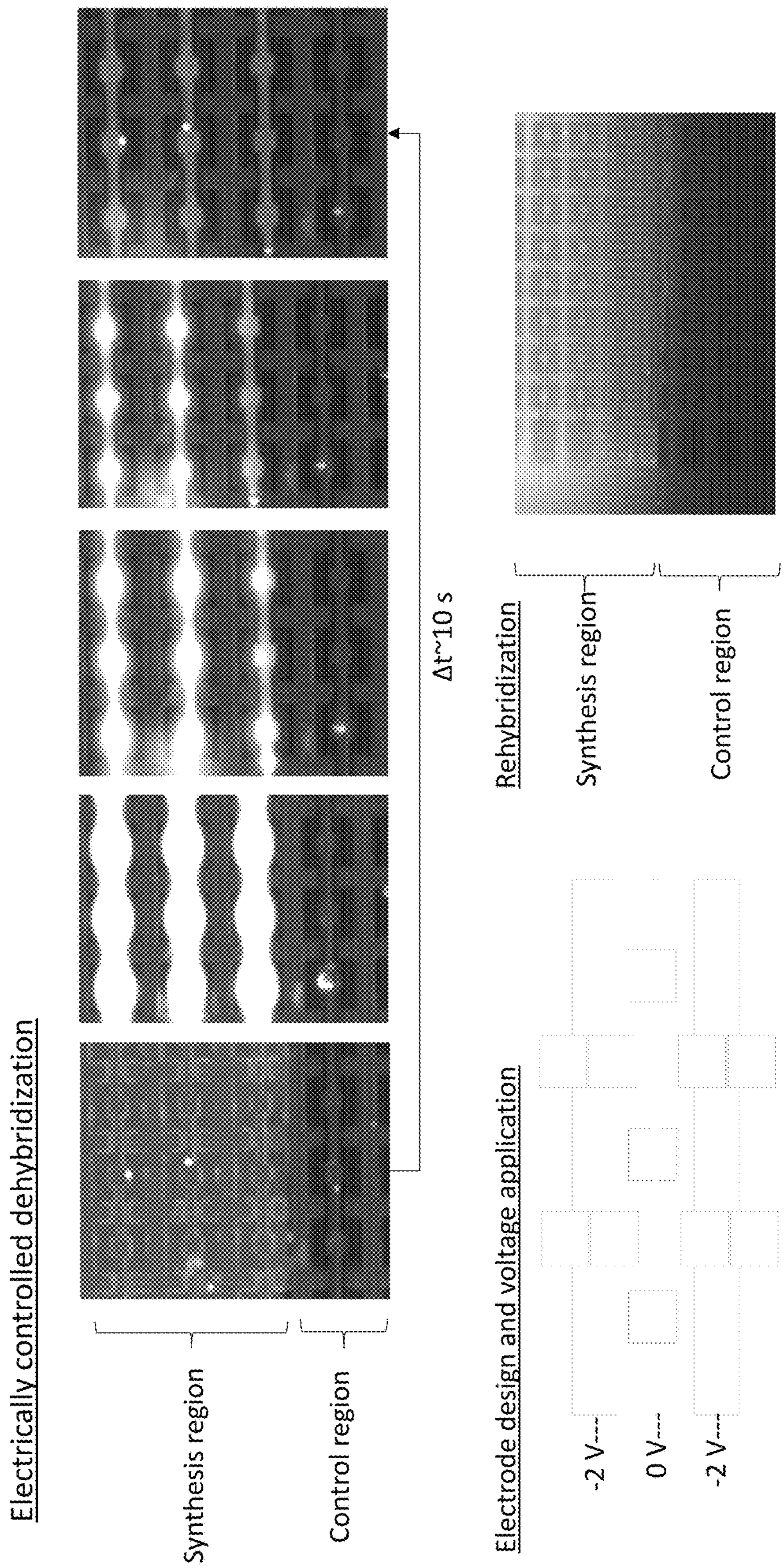

FIG. 64 shows an example of electrically controlled repulsion and dehybridization.

Figure 65:
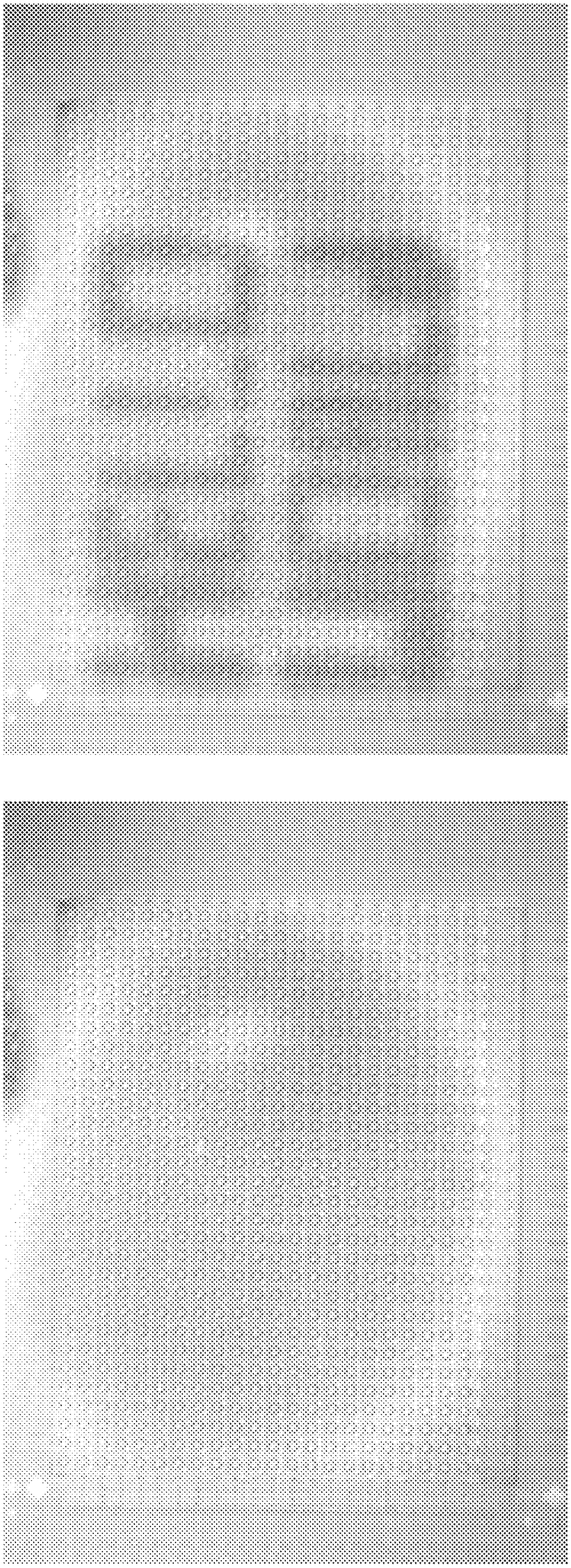

FIG. 65 shows an example of electrically controlled oligonucleotide attraction.

Figure 66:
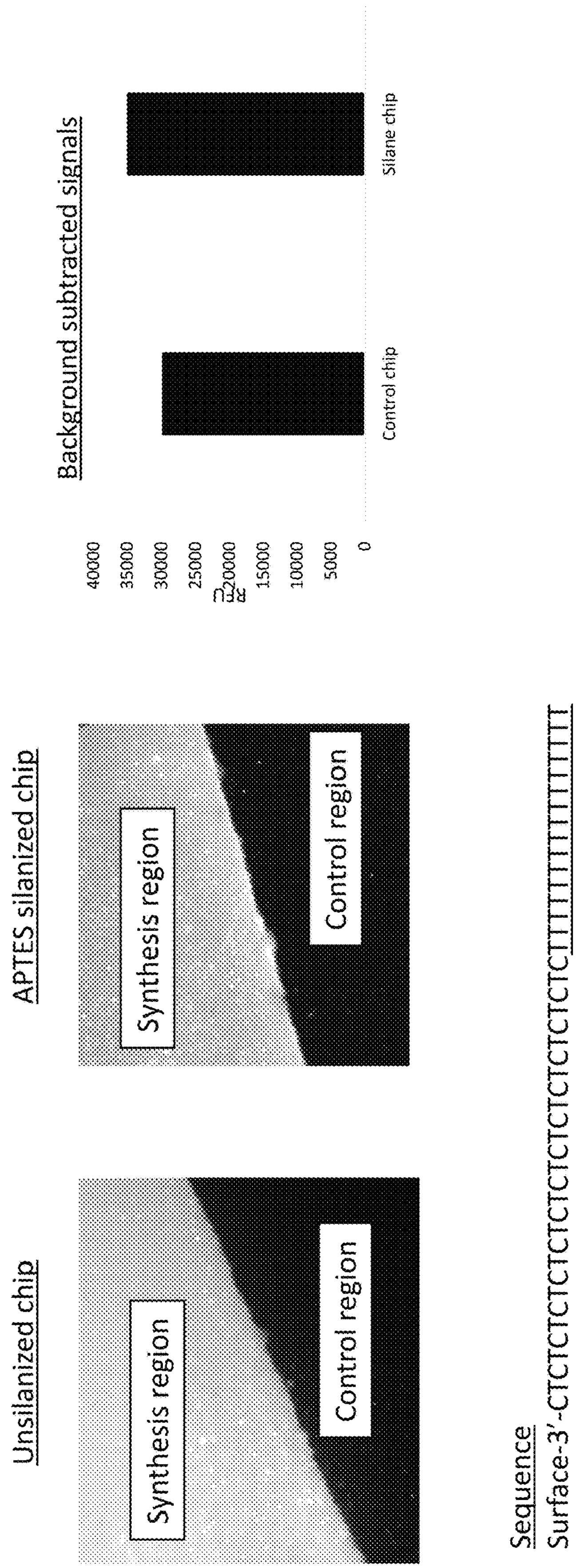

FIG. 66 shows an example of synthesis on a $SiO_2$ surface without silanization.

Figure 67:
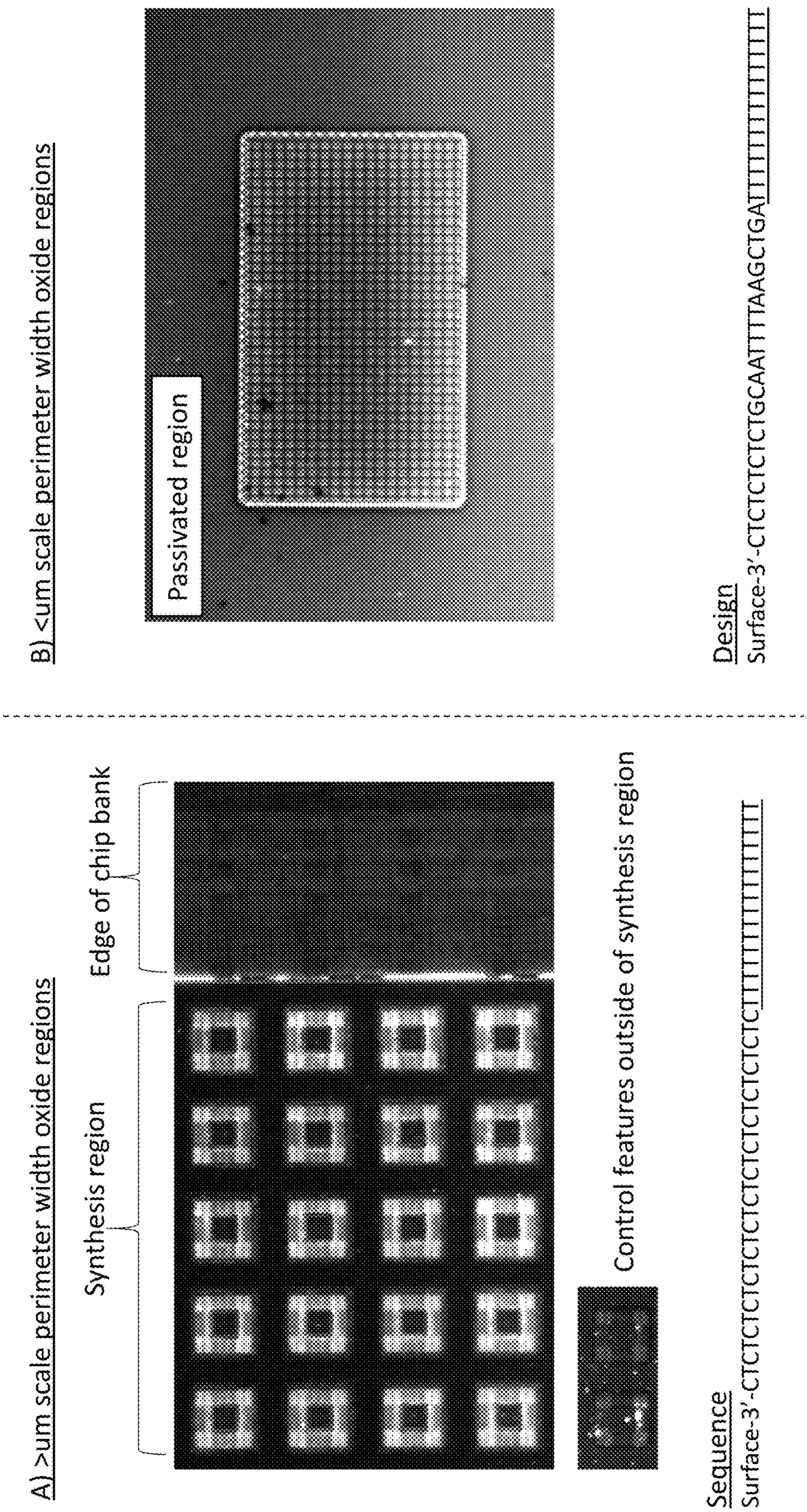

FIG. 67 shows an example of synthesis on the $SiO_2$ regions of a CMOS chip silanization, as shown in FIGS. 67A and 67B, respectively.

Figure 68:
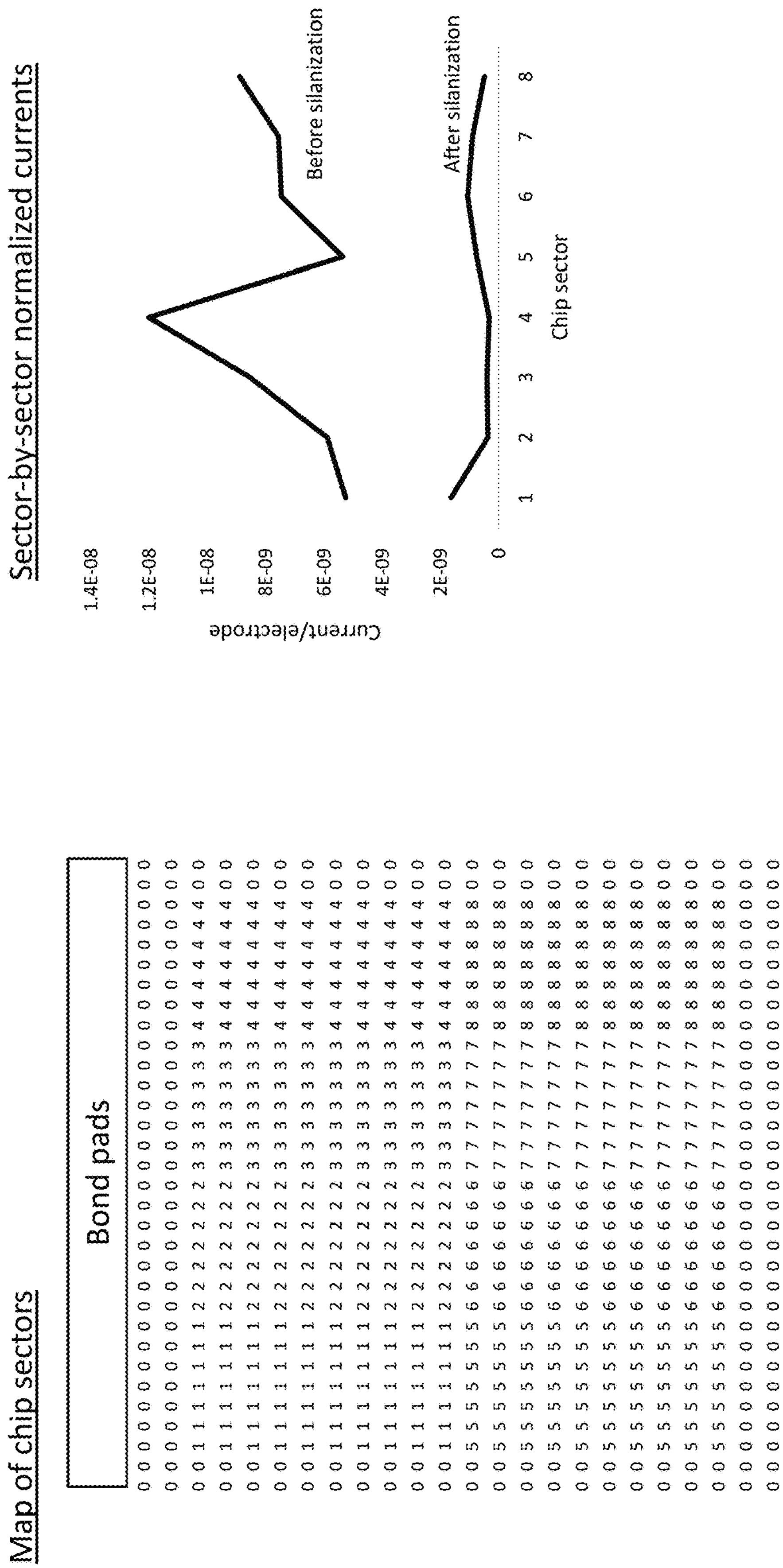

FIG. 68 shows the impact of one mode of silanization on electrochemical current generation on a CMOS device.

Figure 69:
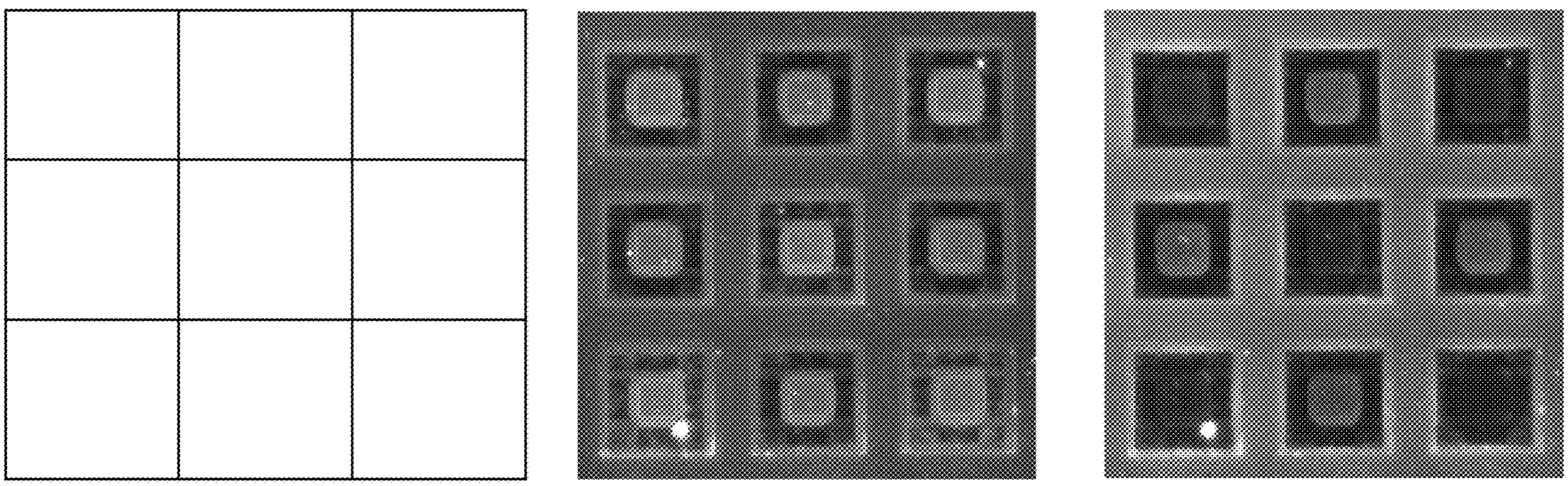

FIG. 69 illustrates the impact of excess acid exposure on oligonucleotide quality.

Figure 70:
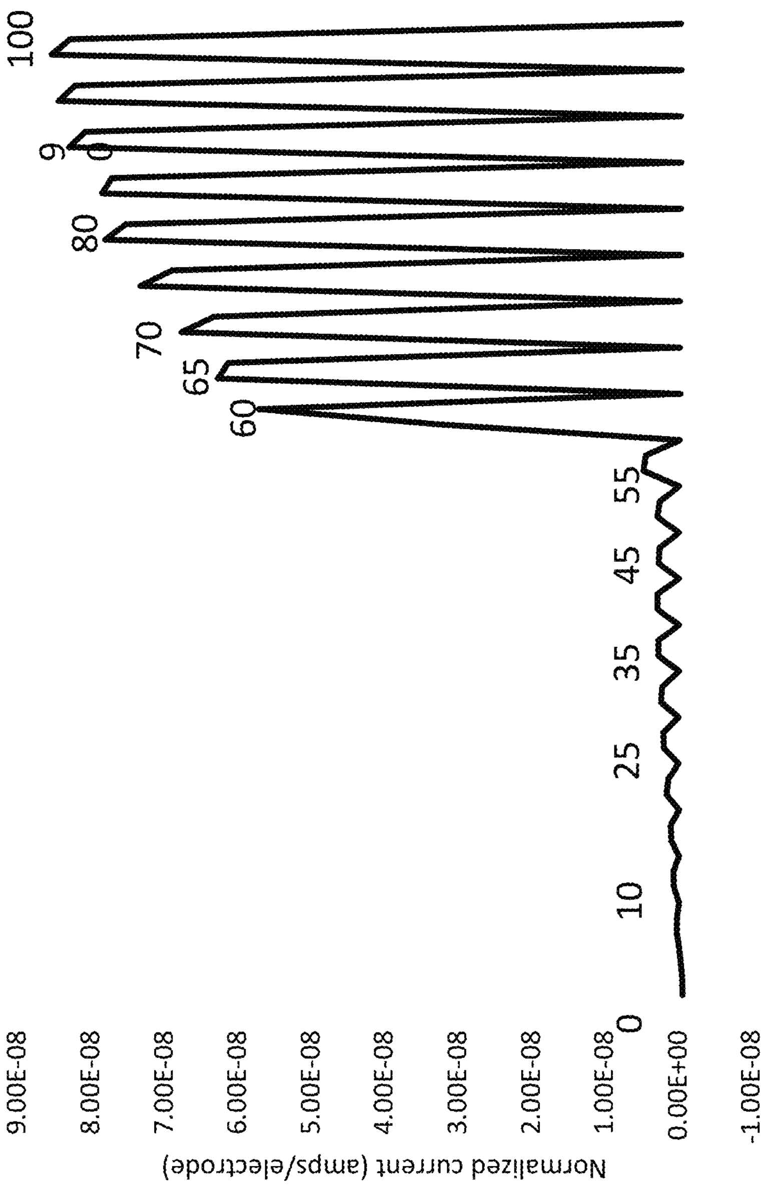

FIG. 70 shows use the alteration of current by changing the duty cycle of a pulse-width modulation program.

Figure 71:
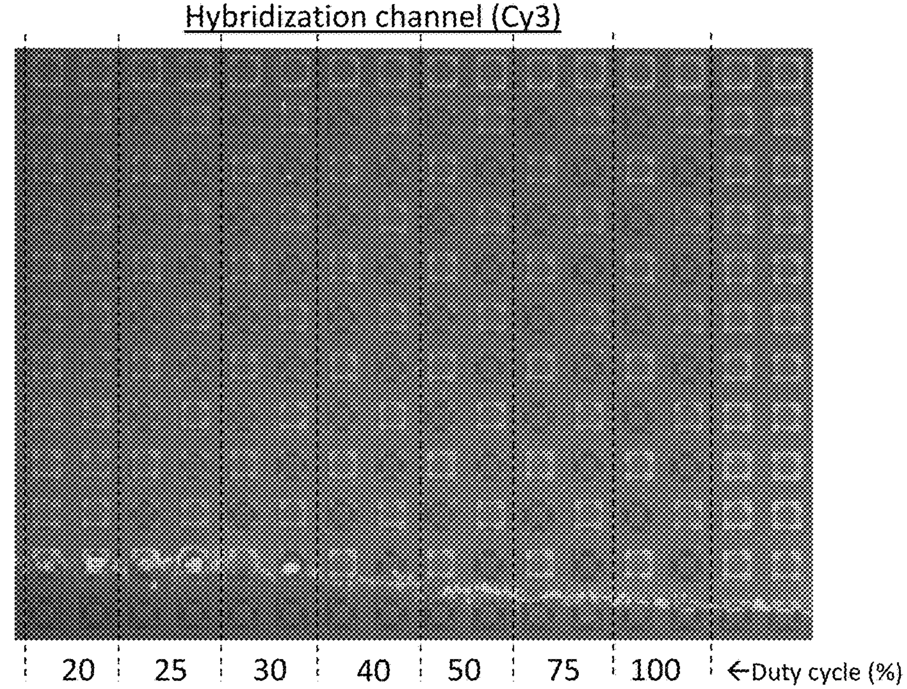

FIG. 71 shows the impact of post synthesis acid exposure with a pulse-width modulation program.

FIG. 72 illustrates the advantages of pulse-width modulation for acid confinement during oligonucleotide synthesis as well as fine-tuning the amount of detritylation, as shown in FIGS. 72A and 72B, respectively.

Figure 73:
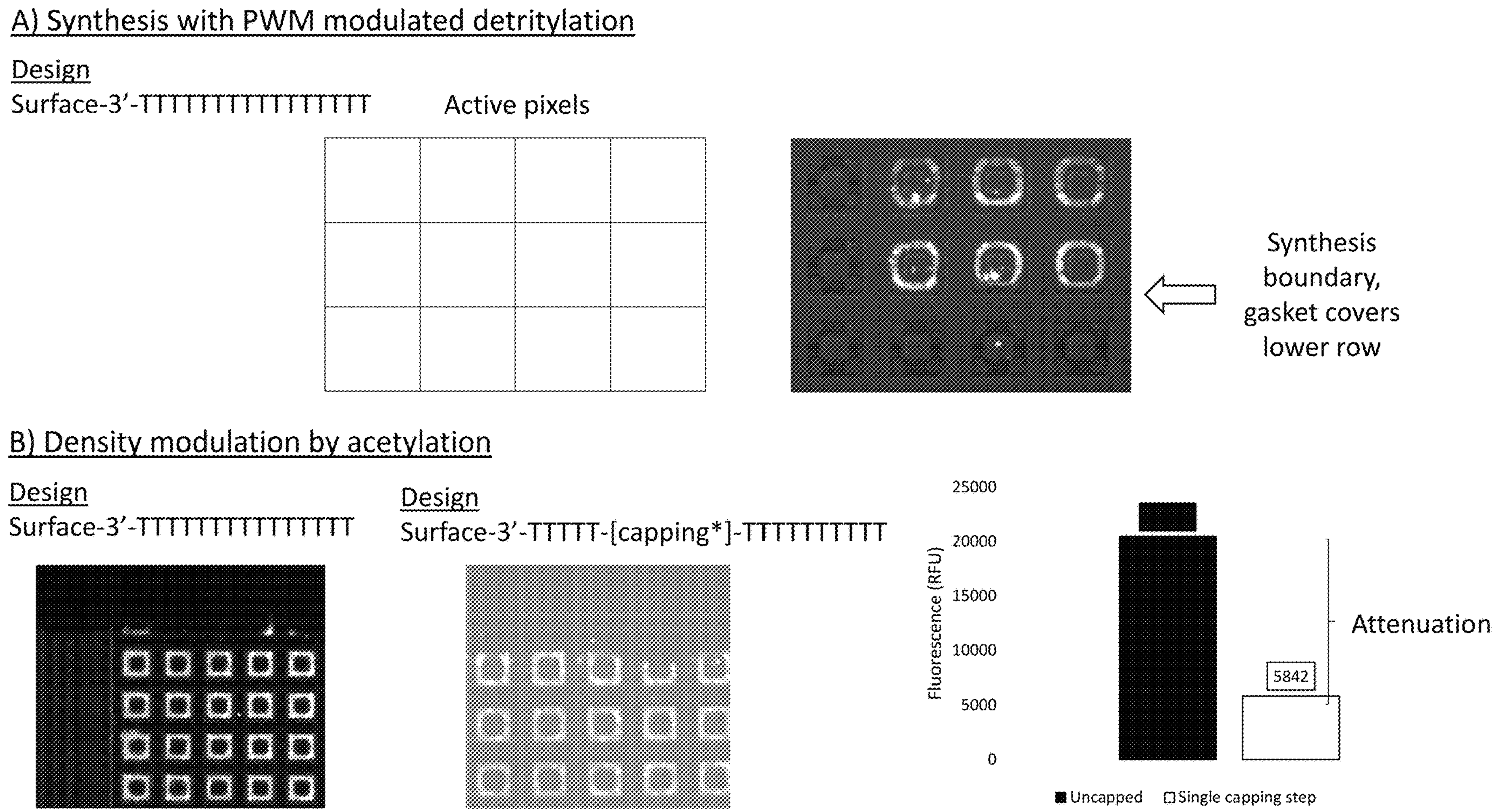

FIG. 73 shows an example of oligonucleotide synthesis using a pulse-width modulation program as well as the attenuation of oligonucleotide density using a step of acetylation during synthesis, as shown in FIGS. 73A and 73B, respectively.

Figure 74:
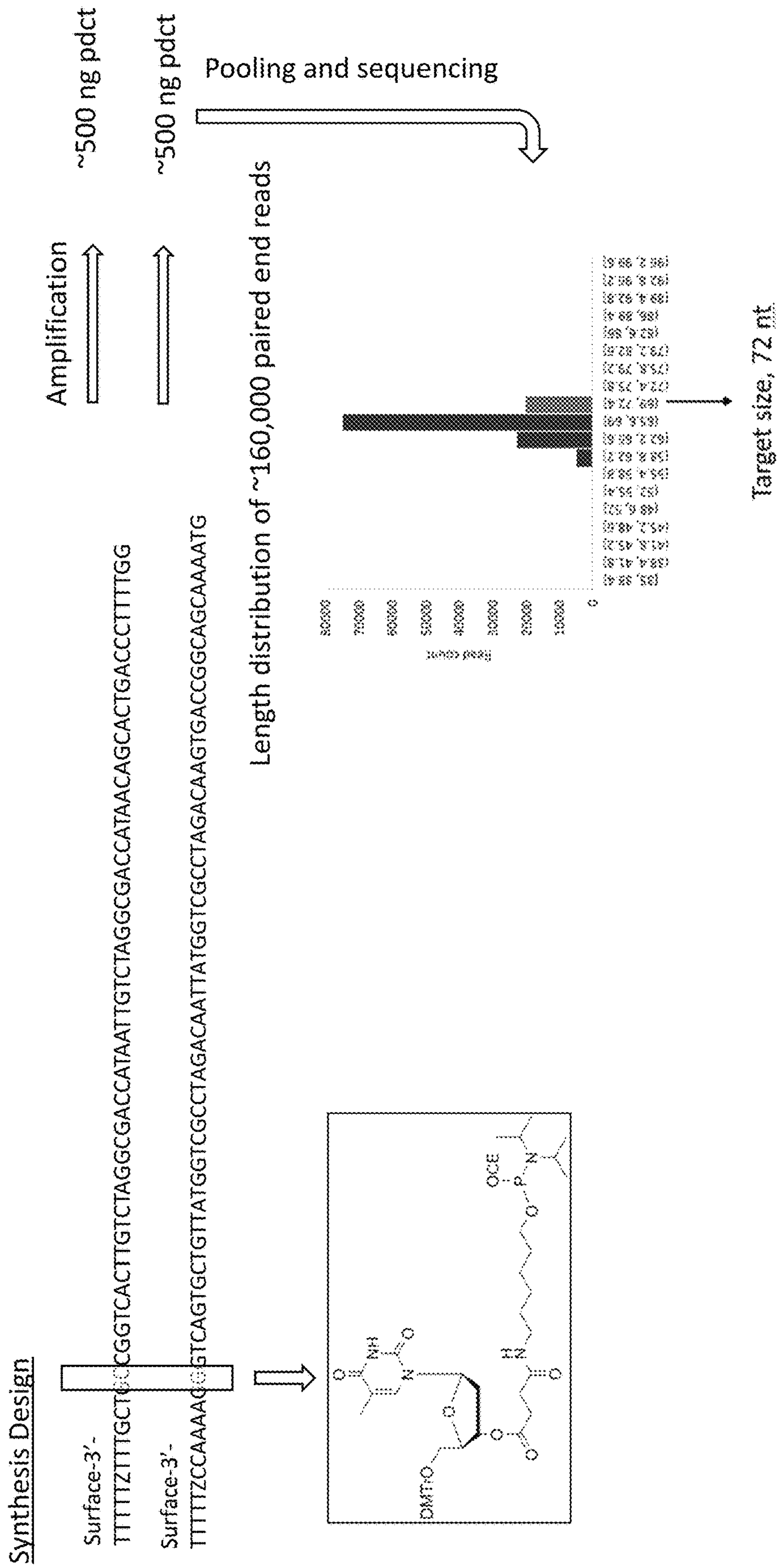

FIG. 74 shows the cleavage, amplification, and sequencing of chip derived oligonucleotides.

Figure 75:
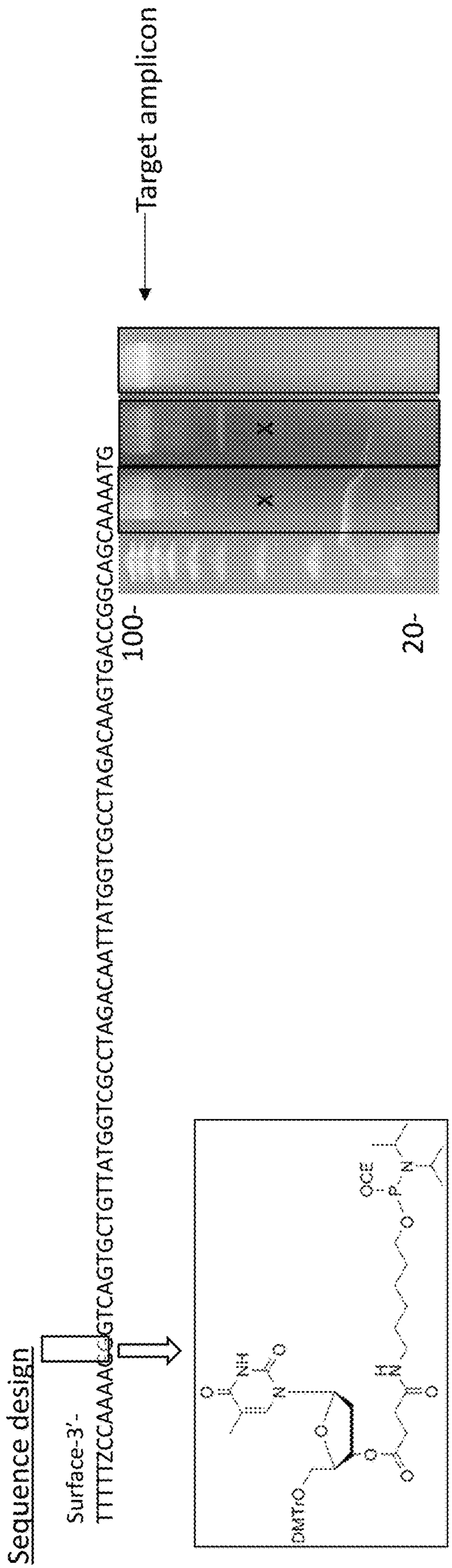

FIG. 75 shows the results of cleavage and amplification of CMOS chip derived oligonucleotides.

Figure 76:
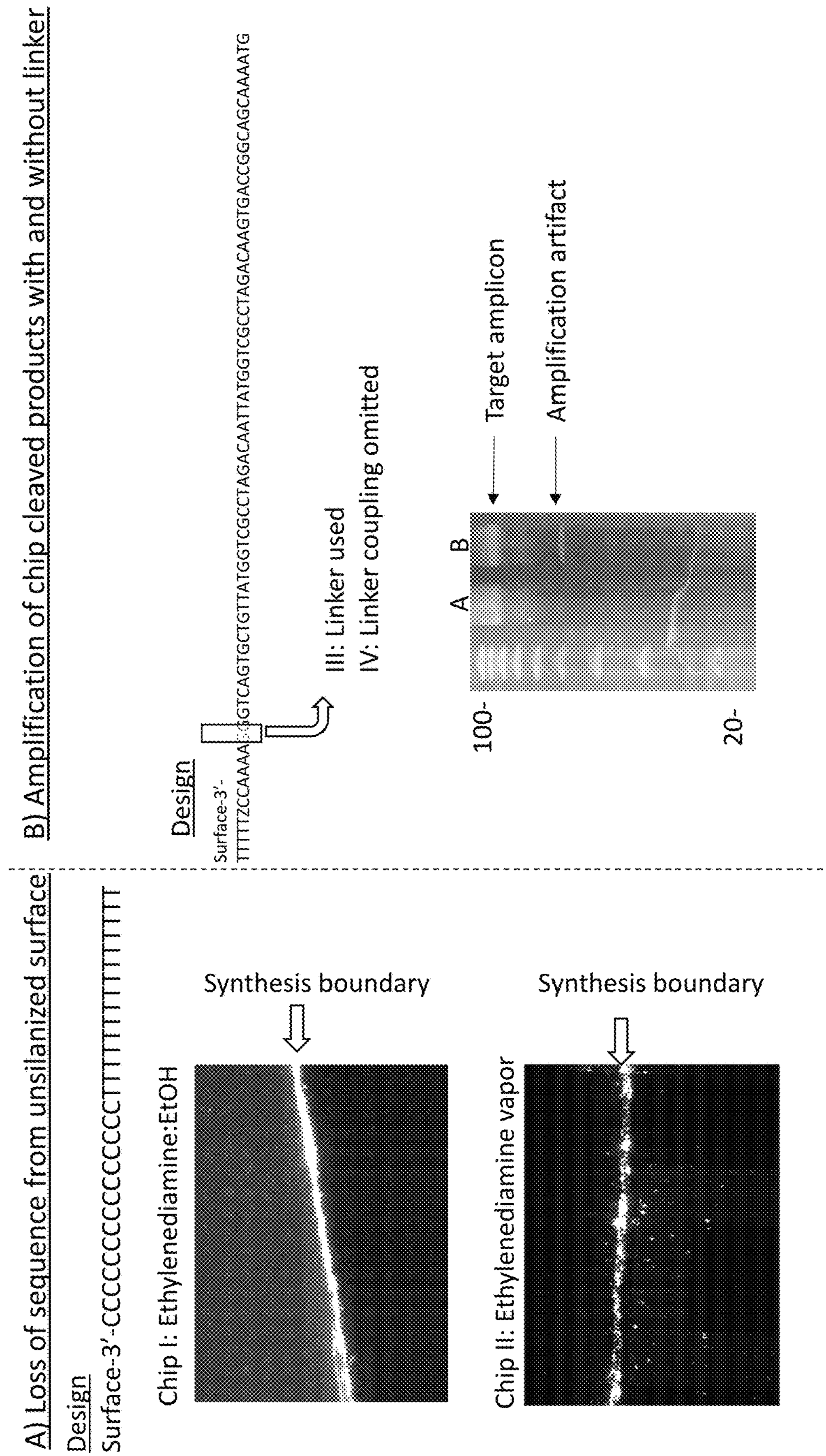
Figure 77:
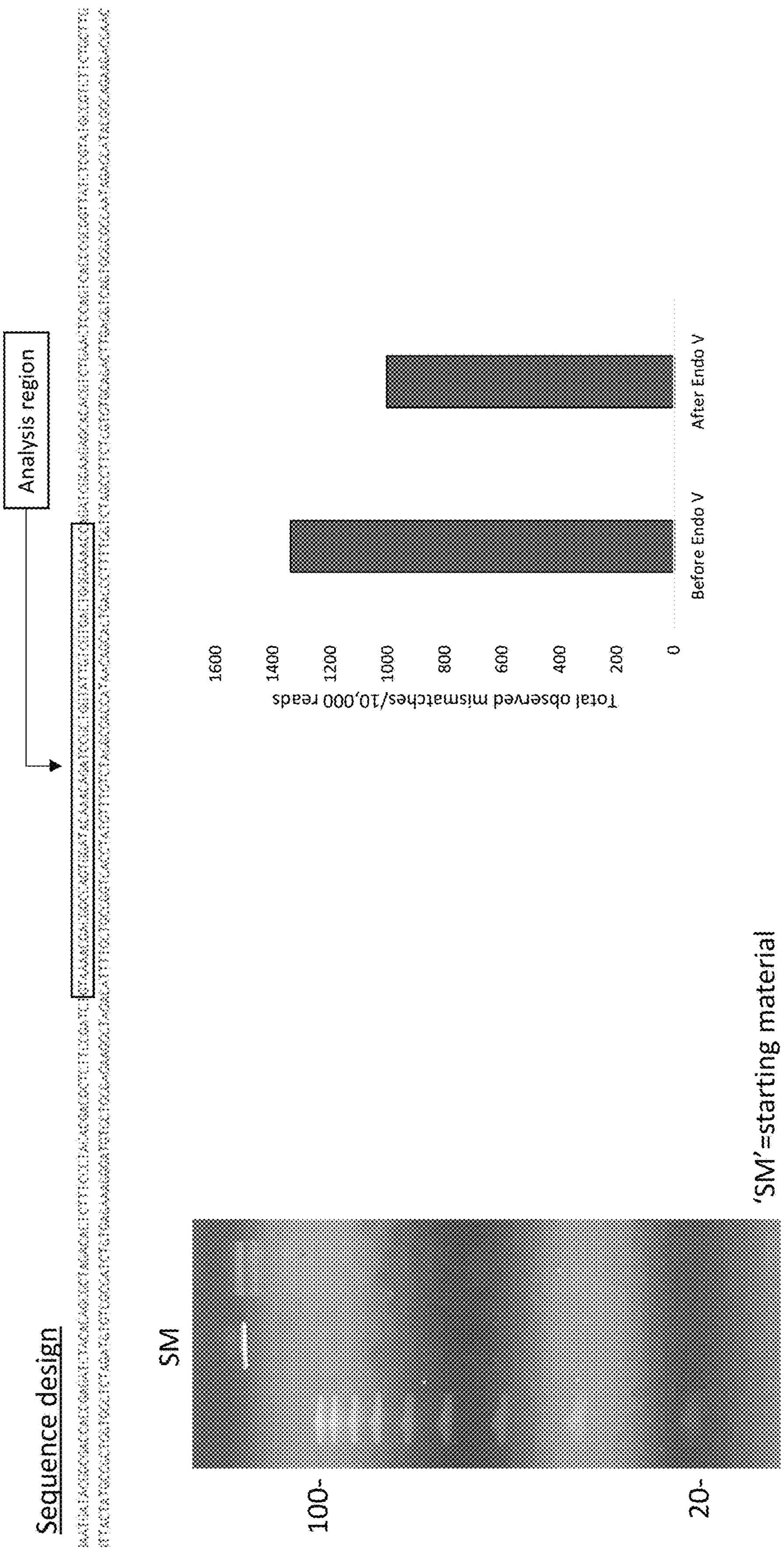

FIG. 76 shows the cleavage of oligonucleotides from unsilanized $SiO_2$ surfaces with ethylenediamine FIG. 77 shows enzymatic error depletion on synthetic oligonucleotides.

FIG. 78 shows oligonucleotide assembly by enzymatic ligation.

Figure 79:
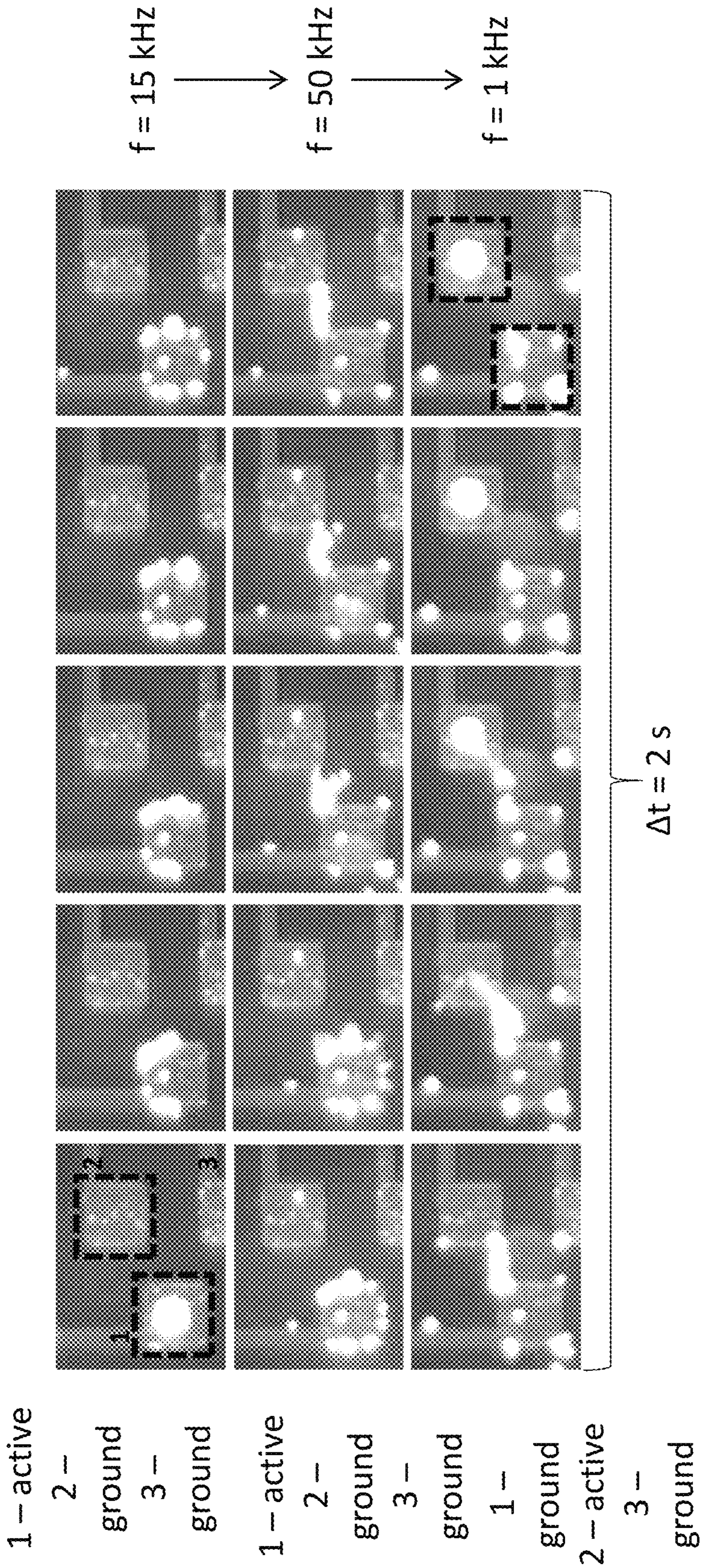

FIG. 79 shows electrically directed motion of particles or molecules between two electrically defined zones using a dynamic sequence of applied electrical signals.

Figure 80:
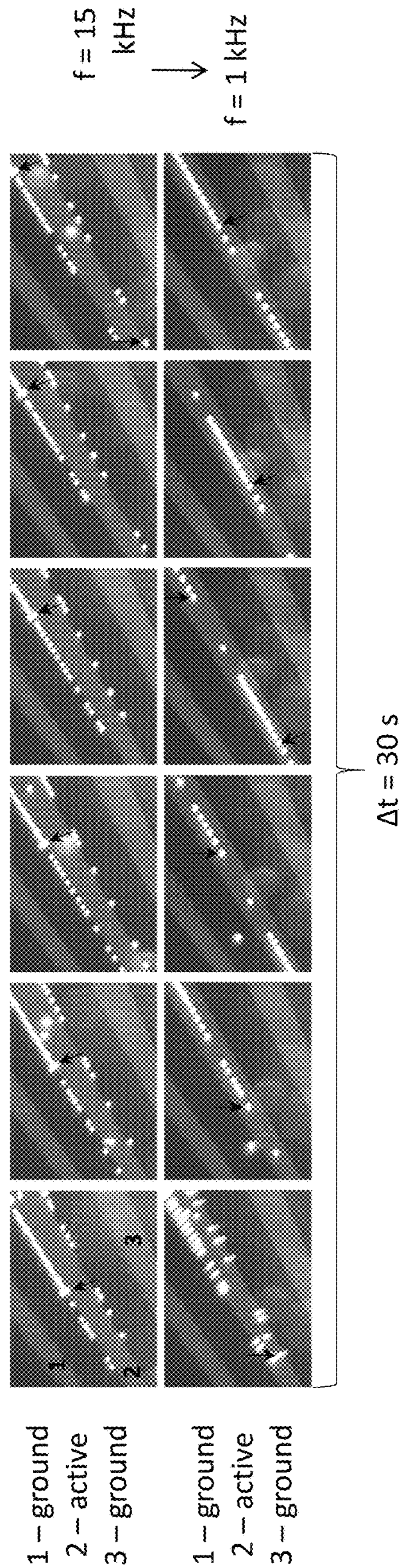

FIG. 80 shows electrically directed motion of particles or molecules along distinct regions of one electrically defined zone using a dynamic sequence of applied electrical signals.

Figure 81:
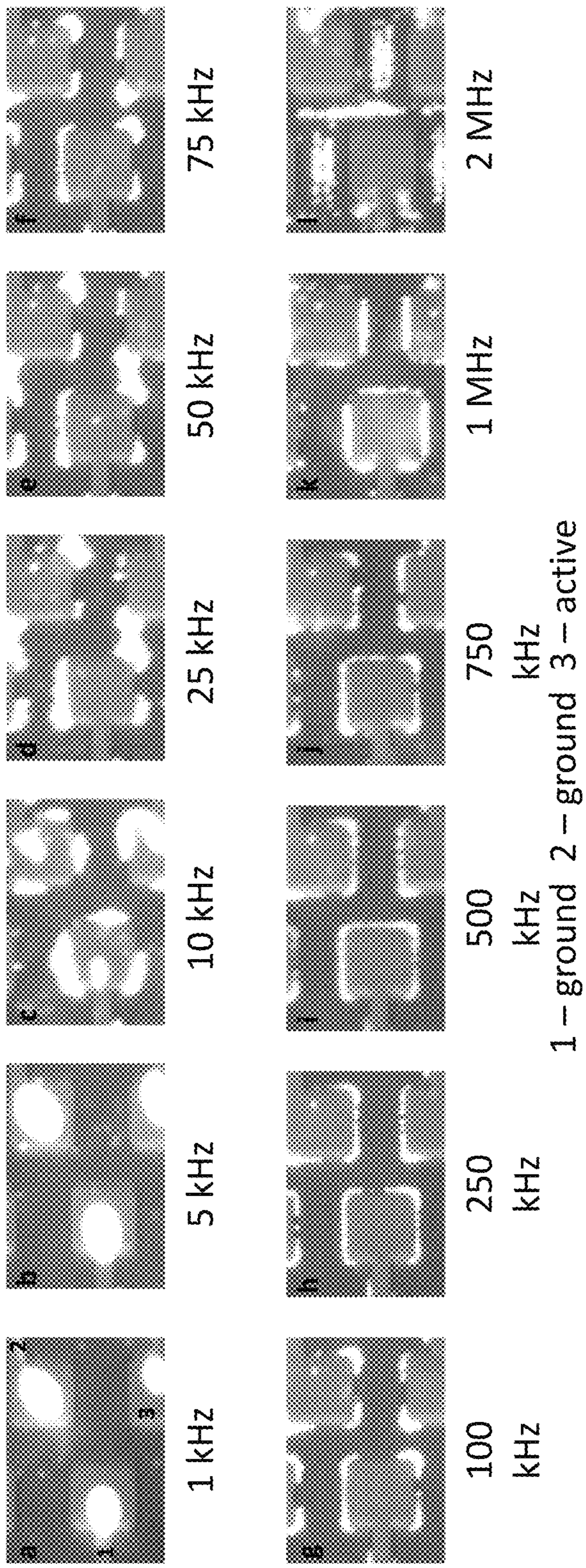

FIG. 81 shows electrically directed motion of particles or molecules between distinct regions of electrically defined zones using a dynamic sequence of applied electrical signals.

Figure 82:
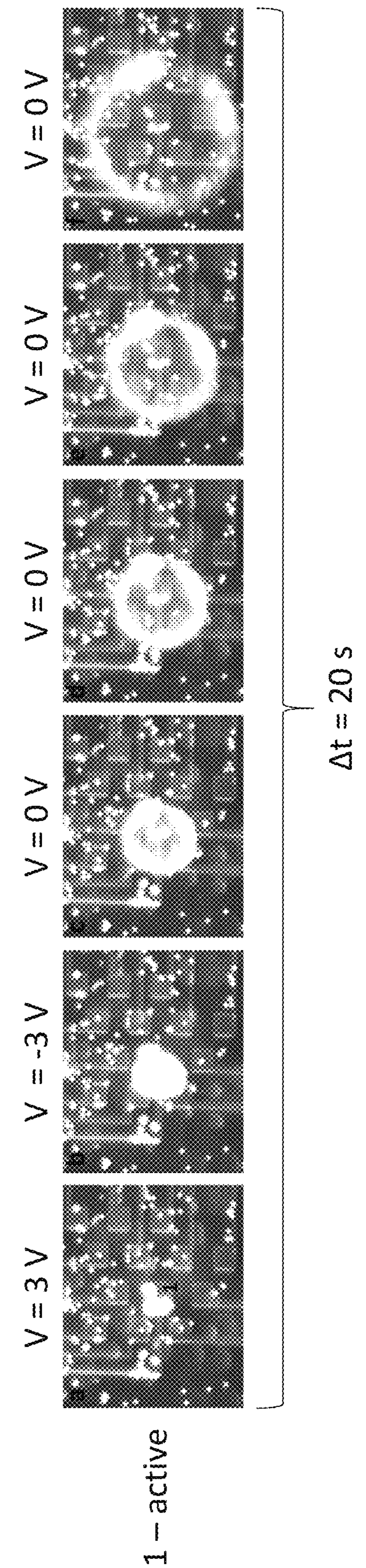

FIG. 82 shows electrically directed motion of particles or molecules away from an initial confinement zone using a dynamic sequence of applied electrical signals.

DETAILED DESCRIPTION

Overview of the Detailed Description

In embodiments of the present disclosure, semiconductor chip devices are disclosed that can use electronic control to drive the synthesis of independent DNA oligonucleotide sequences at an array of synthesis "pixels", and with an array architecture that is scalable to millions, tens of millions, hundreds of millions, or billions of pixels on a standard size chip, and which can furthermore carry out the assembly of these oligonucleotides, in parallel processes, into longer DNA constructs, which may be single or double stranded depending on the methods, and which may have lengths of up to 1 kb, 5 kb, 10 kb, 20 kb, 50 kb, 100 kb or more. This has the advantage of providing for major reductions in the cost of synthesizing a large and diverse set of specified long DNA sequences, through massive parallelism, complex control and device miniaturization provided by such chips, and the low-cost mass manufacturing of such devices provided by the semiconductor chip industry.

In embodiments of the present disclosure, pixels have been designed that provide for electrically controlled confinement of particles or molecules, including but not limited to DNA strands, and which can be embodied on semiconductor chip devices.

In embodiments of the present disclosure, pixels have been designed that provide for electrically directed motion of particles or molecules including but not limited to DNA strands, which can effectively move such molecules from one specific starting electrode site to another specific ending electrode site, and which can be embodied on semiconductor chip devices.

In embodiments of the present disclosure, designs for assembly pixels are disclosed that provide for electrical control of DNA assembly reactions, in parallel, and which can be embodied on semiconductor chip devices, and which can also provide for the assembly of oligonucleotides synthesized on the same or other CMOS chips.

In embodiments of the present disclosure, Complementary Metal Oxide Semiconductor (CMOS) chips are disclosed for DNA synthesis and assembly chips. This has the advantage that CMOS chips enjoy the greatest existing manufacturing base among all types of semiconductor chips, and the greatest capacity for production and low-cost mass manufacturing, thereby providing for both the fundamental cost reductions and the scale of device production needed to produce the DNA for genes and genomes in the field of synthetic biology research, which requires surveying a large number of trial constructs.

In embodiments of the present disclosure, the composition and design of such chips is disclosed, including their manufacture, and methods of use for synthesizing and assembling DNA, and including methods for error correction of the DNA oligonucleotides and longer strands that result from these synthesis and assembly processes, thereby providing the ability to produce oligonucleotides or DNA strands with lower error rates relative the desired target sequences. This has the advantage of reducing errors in the resulting product DNA fragments that would potentially result in reduced or impaired performance in various applications that make use of such DNA products.

In embodiments of the present disclosure, methods, systems and business applications are disclosed for using such chips to produce assemblies of DNA at the length scales needed for producing genes, multi-gene loci, chromosomes or entire genomes. Such length scales may be less than 1 kb, 1 kb, 10 kb, 100 kb, 1 Mb, or more.

Definitions and Interpretation

As used herein, "electrically defined zone" refers to a volume above a substrate for which the transport of molecules or particles out of the volume, or into the volume, or both, are reduced by the application of an electric field. Such field applications may include the use of electrophoresis, dielectrophoresis, or electrokinetic action.

As used herein, "electrically directed motion" refers to producing motion of molecules or particles from one site to another by the application of an electric field. Such field applications may include the use of electrophoresis, dielectrophoresis, or electrokinetic action.

As used herein, "electrically controlled confinement" refers attracting and retaining molecules or particles within or near to a specified volume or site or point, in space or on or near a substrate by the application of an electric field. Such field applications may include the use of electrophoresis, dielectrophoresis, or electrokinetic action.

As used herein, "electrically controlled concentration" refers attracting and increasing the local concentration of a molecule or particle, within or near a specific volume, or near a site or point by the application of an electric field. Such field applications may include the use of electrophoresis, dielectrophoresis, or electrokinetic action.

A "dynamic sequence" is an electrical signal or a programmable temporospatial progression of electrical signals applied to an electrode or any subset of an electrode array to generate electric fields and/or electric field gradients that induce electrokinetic forces in one or more particles or molecules.

A "static pattern" is any single state in a dynamic sequence.

As used herein, the term "DEP" refers to Dielectrophoresis or Dielectrophoretic.

As used herein, the term "EP" refers to Electrophoresis or Electrophoretic.

As used herein, the term "nDEP" refers to Negative DEP or Negative DEP Force.

As used herein, the term "pDEP" refers to Positive DEP or Positive DEP Force.

As used herein, the term "twDEP" refers to Travelling-Wave DEP.

As used herein, the term "AC" refers to Alternating Current.

As used herein, the term "DC" refers to Direct Current.

As used herein, the term "CM" refers to Clausius-Mossotti or Clausius-Mossotti Factor.

As used herein, the term "scaffold" refers to any particle or molecule that provides one or more surfaces for the phosphoramidite synthesis of oligonucleotides and which may be targeted for electrokinetic motion to assist or otherwise enable assembly processes.

As used herein, the term "dielectric contrast" refers to any difference in the dielectric properties of an object or particle relative to its suspending fluid medium that produces a non-zero value for the CM factor and a non-zero magnitude in the DEP force in the proximity of an electric field gradient.

As used herein, the term "crossover frequency" refers to the frequency or frequencies of an applied AC signal at which the DEP force experienced by an object suspended in a fluid medium changes sign from positive to negative or from negative to positive. The magnitude of the DEP force at a crossover frequency is zero.

As used herein, the term "Re" refers to the Real Component of a complex number or expression involving complex numbers.

As used herein, the term "Im" refers to the Imaginary Component of a complex number or expression involving complex numbers.

As used herein, the term "co-field" refers to the direction along a phase gradient for which an object may move under twDEP.

As used herein, the term "contra-field" refers to the direction against a phase gradient for which an object may move under twDEP.

As used herein, the term "DNA synthesis" refers not only to synthesis of DNA strands composed of the four bases A, C, G, T, but also other base analogues, such as U (uracil), I (Inosine), and other well-known universal bases or base analogues or modified or marked bases, including well-known epigenetics marks on bases, such as 5mC (5-methyl-C), as well as dye-labelled bases, or bases modified for future labelling or conjugation, such as biotinylated bases, or thiolated bases, and in general any other widely known modified forms of bases used in DNA oligonucleotides, or modified Phosphoramidites used in Phosphoramidite Synthesis reactions, and in general including synthesis with modifications in the sugar or backbone of DNA as well. In addition, where it makes sense in context, this also encompasses synthesis of other nucleic acid (NA) oligomers, such as the synthesis of RNA (Ribo-), PNA (Peptide-), LNA (Locked-), and diverse forms of XNA (Xeno-).

As used herein, the term "amidite", "Phosphoramidite" or "Phosphoramidite base" generally refers to any or all of the Phosphoramidite reagents or molecules that are used in the synthesis of DNA by the Phosphoramidite Method, unless the context explicitly indicates otherwise. This term may also be taken to generally mean, in contexts where it makes sense, any alternative reagents that can engage in such a synthesis cycle that includes acid-driven deprotection.

As used herein, the term "acid" may refer to a chemical acid, or may whenever it makes sense, refer directly to H+, or to solutions containing such. In particular, in referring to acid generation, this is meant to refer to the generation of H+, but can more generally refer to generation of a chemical acid that can donate an H+ to the deprotection reactions of interest. In referring to acid removal, this is meant to refer to the elimination of H+, but could more generally refer to elimination of a chemical acid.

As used here in, "Phosphoramidite Synthesis" or "the Phosphoramidite Method" or "Chemical synthesis" refer to any of the family of standard or well-known chemical cycles employed for synthesis using phosphoramidite bases, such as those used for commercial DNA oligo synthesis, or those deriving from the original methods such as put forth by Marvin Caruthers.

As used herein, the term "electrode" refers to sites that are capable of producing electric fields and/or electric field gradients necessary for the electrokinetic motion of particles or molecules during synthesis and assembly processes. Such electrodes are typically composed of metals, but could also be semiconductor materials such as doped semiconductors. Additionally, electrodes in the context of electrochemical acid generation or elimination may refer to any conducting material that can serve as a substrate or source for the electrochemical acid generation or elimination reactions disclosed.

As used herein, the terms "voltage" or "potential" are interpreted as relative to the solution potential, or relative to a reference electrode potential in a 2 or 3 electrode potentiostat system that regulates the solution potential. These terms are also used in the context of inducing electrokinetic motion of particles or molecules during synthesis and assembly processes.

As used herein, the term "chip" refers to a semiconductor integrated circuit chip. In certain contexts where this is clear, it may refer to a CMOS chip.

As used herein, the term "CMOS", which is an acronym for "Complementary Metal Oxide Semiconductor", and refers to chips that are made by the CMOS process.

As used herein, the term "electrochemical" refers to chemical reactions that are driven by the presence of an electrode in contract with a solution, at a suitable applied potential.

As used herein, "pixel" refers to a repeated element of a circuit array on a chip.

As used herein, the term "DNA", as makes sense in context, may refer to the physical material of deoxyribonucleic acid, oligomers of such, or pools of such material, or alternatively to the symbolic sequences for such, in contexts where this makes sense. For the physical material, DNA, where it makes sense, can also refer to common chemical analogues of DNA or nucleic acid oligomers, such as RNA, or such as may contain modified bases, or analogues such as PNA (Peptide-) or LNA (Locked-) or XNA (Xeno-).

As used herein, "DNA sequencing" refers to processes for reading the identities of the series of bases in a DNA strand or strands.

As used herein, the term "PCR", which is an acronym for Polymerase Chain Reaction, generally refers to any means of amplifying or copying DNA, including by thermo-cycling PCR, or isothermal PCR reactions, or generally any other processes that can be used to amplify or copy DNA.

As used herein, the term "error correction" refers to any procedure in which the fraction of sequences in a collection of DNA molecules matching an intended final sequence is increased in the final collection of DNA molecules resulting from the procedure.

As used herein, the term "oligonucleotide" or "oligo" refers to a single-stranded polymer of DNA which is the product of a chemical or enzymatic synthesis process. They may or may not bear at least some protecting groups. In contexts where it makes sense, this may also refer to the double-stranded form DNA.

As used herein, references to any form of DNA or DNA strand or nucleic acid sequence may, as makes sense in context, refer to either single-stranded DNA or double-stranded (or duplex) DNA, As used herein, the term "gene" refers generally to any nucleic acid sequence comprised of at least two oligonucleotides, regardless of whether the sequence corresponds to that with any known biological function or is intended for any biological application.

As used herein, the term "gene synthesis" refers to any process by which a gene or DNA strand is generated and may encompass steps of assembly and error correction. As used herein, and as makes sense in context, "gene synthesis" and "DNA assembly" may be used interchangeably.

As used herein, the term "assembly" or "DNA assembly" refers to any process by which oligonucleotides are combined into genes or longer DNA strands, or by which such a strand is joined with another oligo or another strand. Such processes may include, for example, hybridization, ligation, or polymerization reactions, or combinations of such reactions.

As used herein, the term "particle" refers to, where it makes sense in context, micro or nano sized pieces of material, or individual molecules.

As used herein, the term "mask" refers to any defined pattern of pixel activation, or voltage application, on the chip.

As used herein, the term "primer" refers to any DNA sequence or molecule which undergoes templated extension by a polymerase.

As used herein, the term "template" refers to any DNA sequence or molecule which assists in the generation of its own complementary sequence through the action of a primer and a polymerase.

As used herein, the term "ligase" refers to any enzyme capable of catalyzing the joining of the 3'-end of one DNA sequence or molecule to the 5'-end of another DNA sequence or molecule.

As used herein, the term "polymerase" refers to any enzyme which joins nucleotide triphosphates into a polymeric chain, generally in a sequence complementary to that of a templating DNA strand unless otherwise noted.

As used herein, the term "nuclease" refers to any enzyme capable of catalyzing a break in the phosphodiester backbone of a nucleic acid and may refer to exonucleases and endonucleases generally.

As used herein, the term "redox" refers to oxidation-reduction type chemical reactions.

As used herein, the term "linker" refers to a chemical structure joining a species of interest to another species or a solid support.

As used herein, the term "deprotection" refers to removal of functional group(s).

As used herein, the term "cleaving enzyme" refers to an endonuclease used to divide a DNA sequence into two or more parts.

As used herein, the term "pulse-width modulation" or "PWM" refers to the process of activating and deactivating an applied voltage at a desired frequency for a desired interval of time.

DETAILED DESCRIPTION OF EMBODIMENTS

Here we describe a series of inventive systems and methods designed to integrate the vast oligonucleotide synthesis capacity of CMOS chips with their ability to modulate the chemical and physical processes used throughout DNA assembly. The systems described allow for all aspects of gene synthesis, from the oligonucleotide generation to later stage assembly and error correction reactions to be performed on a solid-phase assembly device. The inventive aspects span chip design and fabrication, oligonucleotide chemistry, and the electrically driven control of biomolecules. The net effect is to circumvent many of the technical limitations inherent to the current practices of synthetic biology. The degree of spatial control, scalability, and multiplexing functionality are designed for the de novo construction of complete genomes.

Reaction Localization Approaches

The approaches derive from the capability of CMOS chips to apply voltages to electrodes of various sizes, even less than 1 $\mu m^2$ in size, as well as perform various sensing operations. The voltage application may cause an oxidation or reduction reaction or induce such a reaction which alters the local pH. These pH alterations may in turn induce transformations, such as the local removal of protecting groups, or instead modulate an enzymatic activity within that region. Applied potential may also be used to alter the behavior or local concentration of charged molecules, particularly DNA segments or enzymes which act upon DNA, such as polymerases, ligases, or nucleases. At the highest level of abstraction, any localized control of a reaction can be understood as being the product of a 'positive selection' where the local voltage application induces an event that may not otherwise occur, or a 'negative selection' where a voltage application prevents the occurrence of an event. Both such principles may be used throughout without limiting the scope.

One such class of operations is oxidation or reduction reactions which are induced directly at the site of an electrode. Such reactions include those conducted with a hydroquinone and benzonquinone redox pair (HQ/BQ), though many other similar transformations are possible. In the case of the HQ/BQ example, the application of potential drives the interconversion of these quinones at the site of the active electrodes. Crucially, the conversion reaction at each electrode occurs with the net release or sequestration of protons, thus modulating the pH of the region in the immediate vicinity of the active electrode. This pH change may directly induce some desired chemical transformation, such as the removal of protecting groups used in chemical synthesis. In other cases, the pH change indirectly produces a transformation by modulating an enzymatic reaction. The vast majority of enzymes have a clear pH dependent activity profile, meaning that nearly any enzymatic process can be similarly localized. In cases where selective enzyme activation is desired, the enzyme is formulated and/or delivered to a chip in a solution outside of the pH range in which it is optimally active. If this pH is higher than the optimum, the local enzyme activity can be induced by the local oxidation of hydroquinone. If this pH is lower than the optimum, the local enzyme activity can be induced by the local reduction of benzoquinone. In other cases, it may instead be desirable to selectively deactivate an enzyme. Here, the enzyme is formulated and/or delivered to a chip surface in a solution at a pH in which it is optimally active. The enzyme can then be locally deactivated the lowering the local pH through oxidation of hydroquinone, or instead by raising the local pH by the reduction of benzoquinone.

Figure 2:
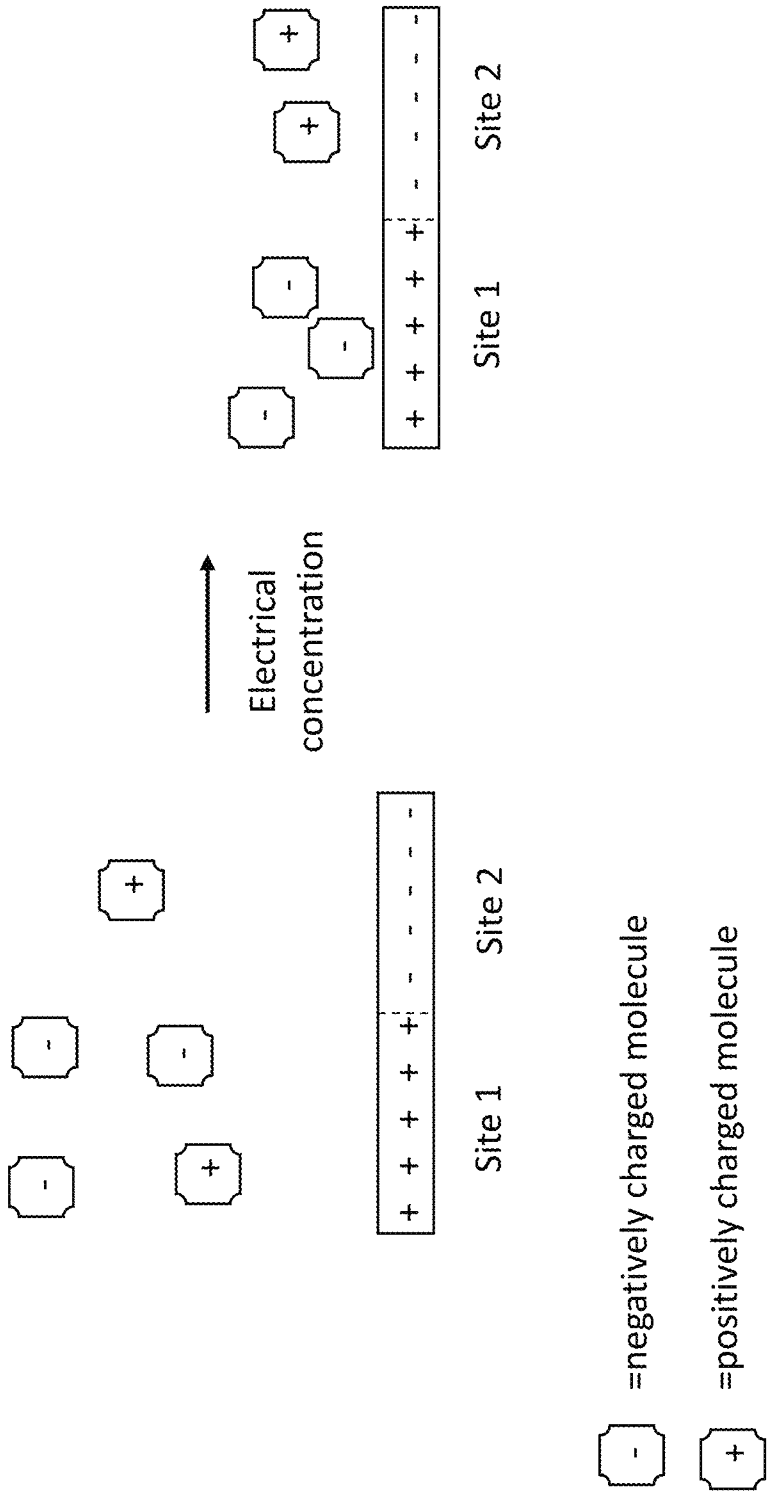
FIG. 2 shows electrically controlled concentration of charged particles or molecules. In particular.
Figure 3:
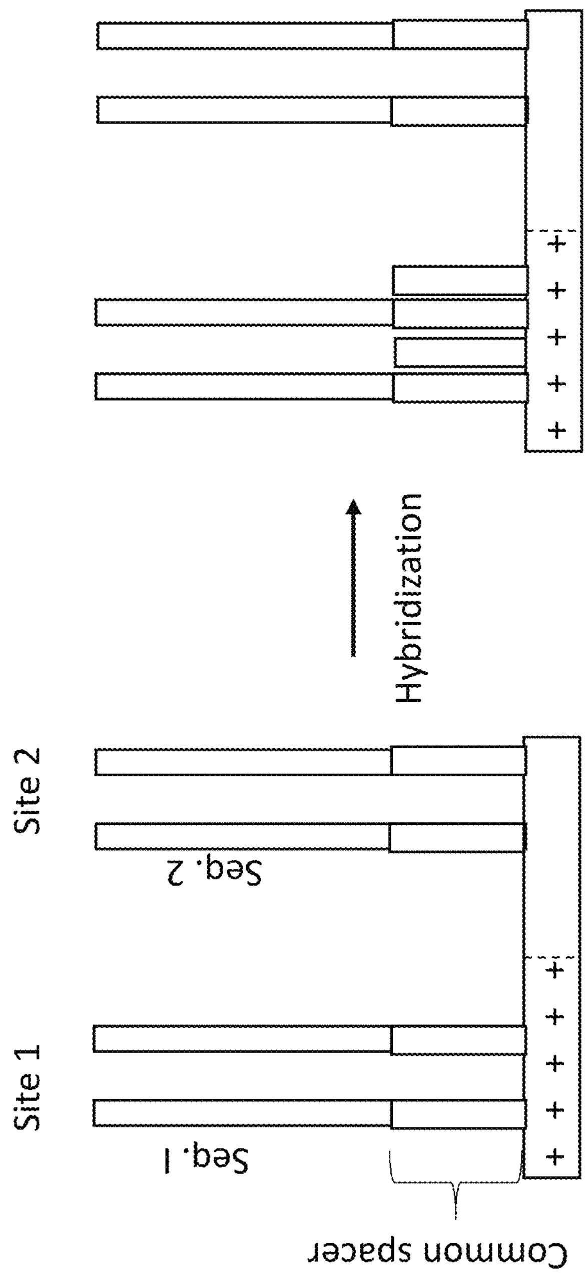
FIG. 3 shows positive selection of nucleic acid hybridization.
Figure 4:
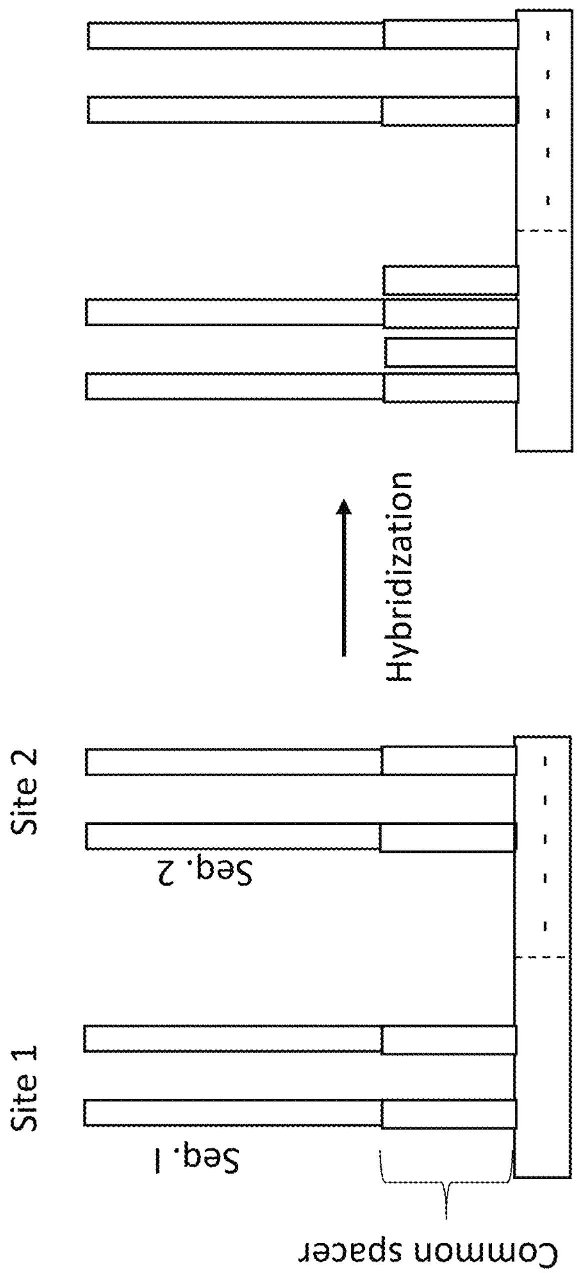
FIG. 4 shows negative selection of nucleic acid hybridization.
Figure 5:
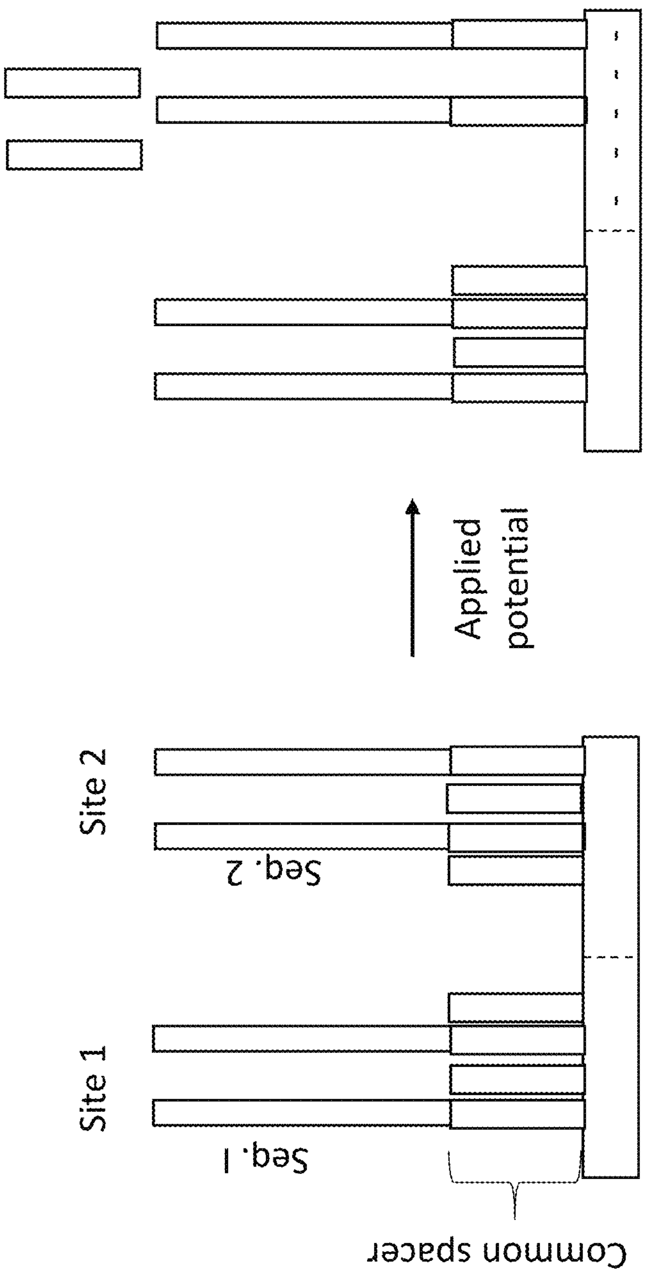
FIG. 5 shows selective electrical denaturation of a nucleic acid duplex.
Figure 6:
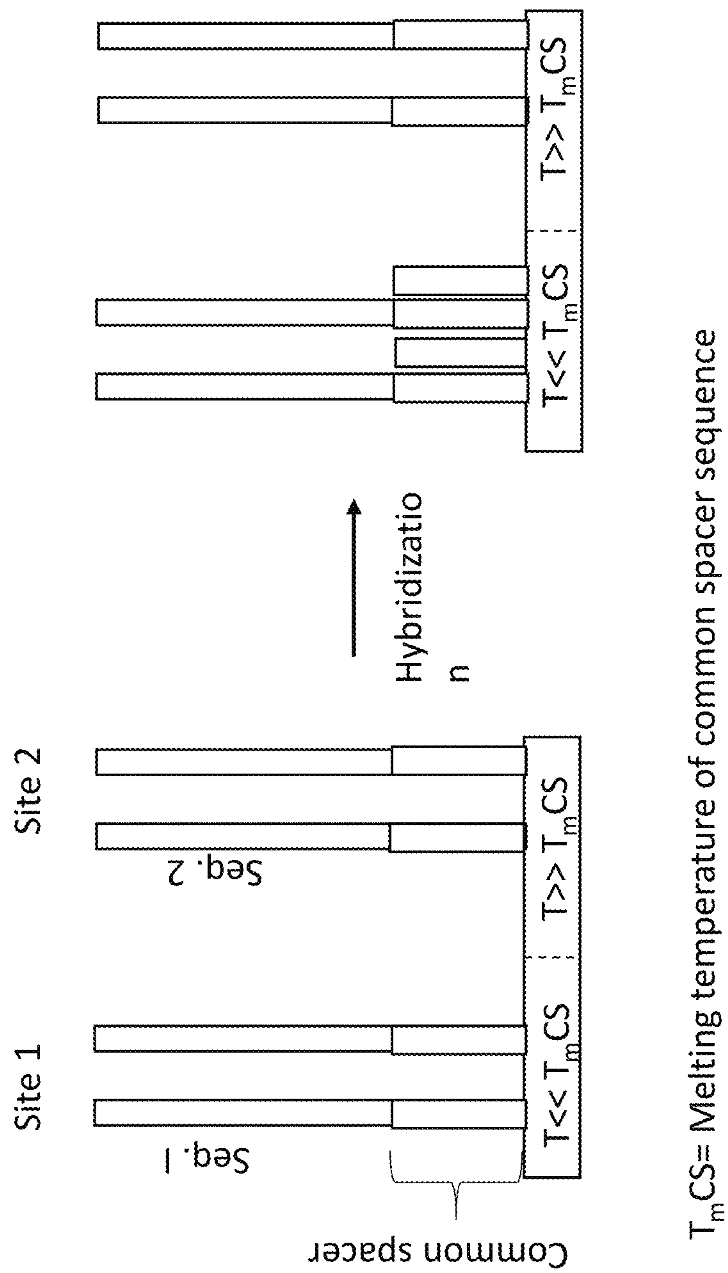
FIG. 6 shows thermal control of nucleic acid hybridization.
Figure 7:
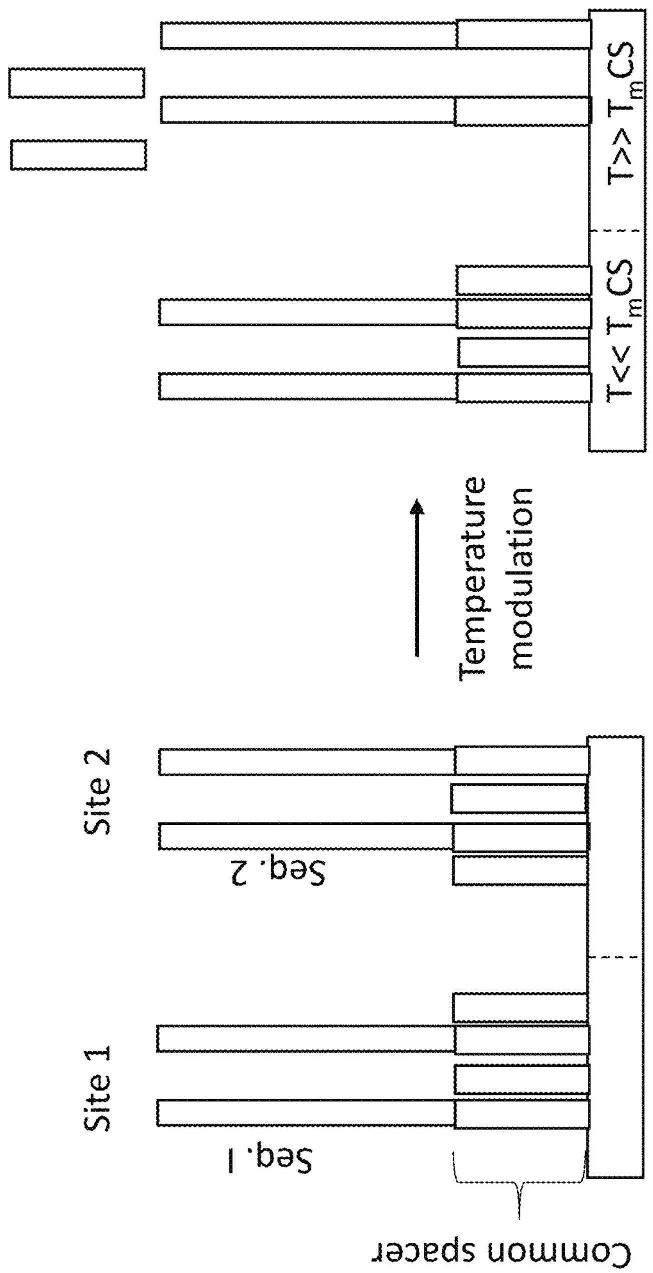
FIG. 7 shows thermal control of nucleic acid denaturation.

In some embodiments the applied voltage is instead used to concentrate charged particles or molecules in proximity of certain electrodes. FIG. 2 illustrates this principle, where electrode polarity is used to selectively attract ions of the desired charge. Many molecular species may be guided in this fashion, but the concept is uniquely relevant to controlling the hybridization and denaturation of DNA duplexes. Applied potential may be used to artificially concentrate oligonucleotides at a particular site, inducing a binding event to a covalently immobilized sequence which may not otherwise occur. This is shown in FIG. 3 as an instance of 'positive selection'. Alternatively, the polarity of the electrodes may be selected so that a hybridization event is prevented instead (FIG. 4; negative selection). In some instances, the voltage is applied after the binding event has already occurred (FIG. 5; selective electrical denaturation). This results in the selective denaturation at the active pixels, where the sequences which are not covalently attached to the surface are ejected from that region. Other embodiments can achieve similar control over binding by modulating the local temperature at a site. FIG. 6 shows how thermal control can guide the hybridization event itself, while FIG. 7 shows how it can be used to perform a selective denaturation, both intending for the same resultant pattern of binding events. The only distinction between these two processes is whether the local temperature differentials are present during or after the binding event.

Figure 35A:
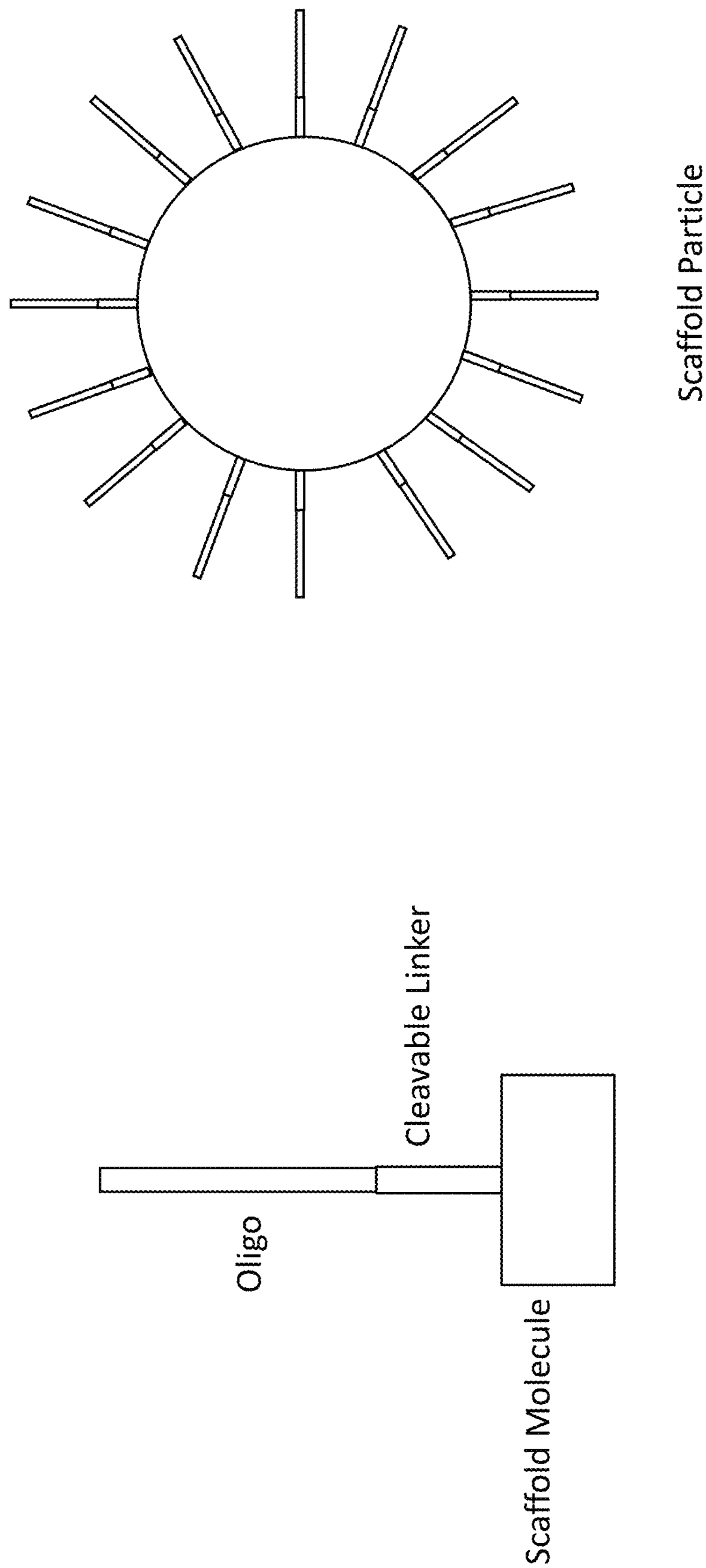
FIG. 35A shows molecular and particle scaffolds for oligonucleotide synthesis, electrically directed motion, and assembly.
Figure 35B:
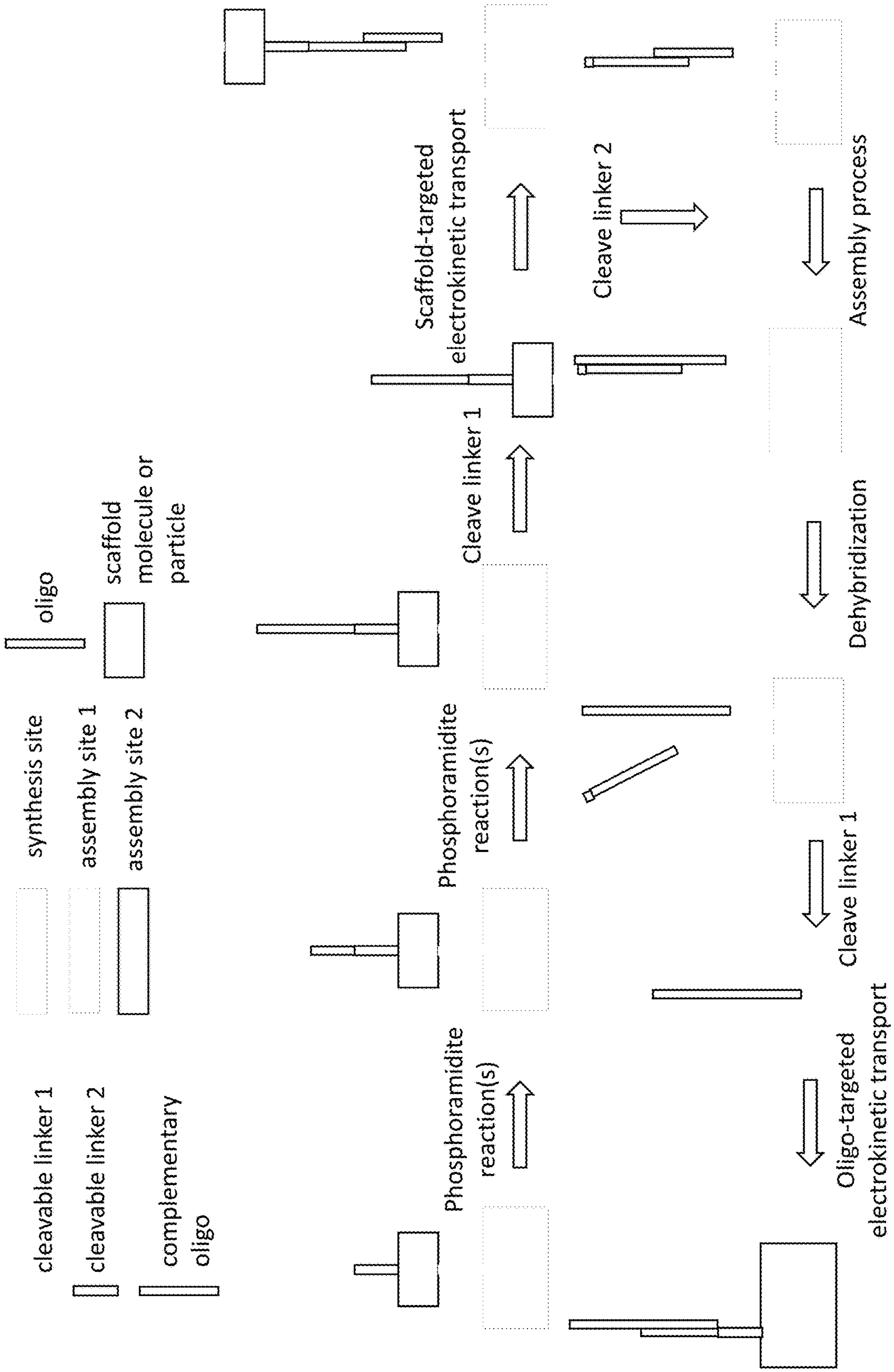
FIG. 35B shows the roles of a scaffold in the phosphoramidite synthesis of oligonucleotides, scaffold-targeted electrically directed motion of oligonucleotides from synthesis regions to assembly regions, the assembly of oligonucleotides, scaffold detachment, and oligo-targeted electrically directed motion.
Figure 35C:
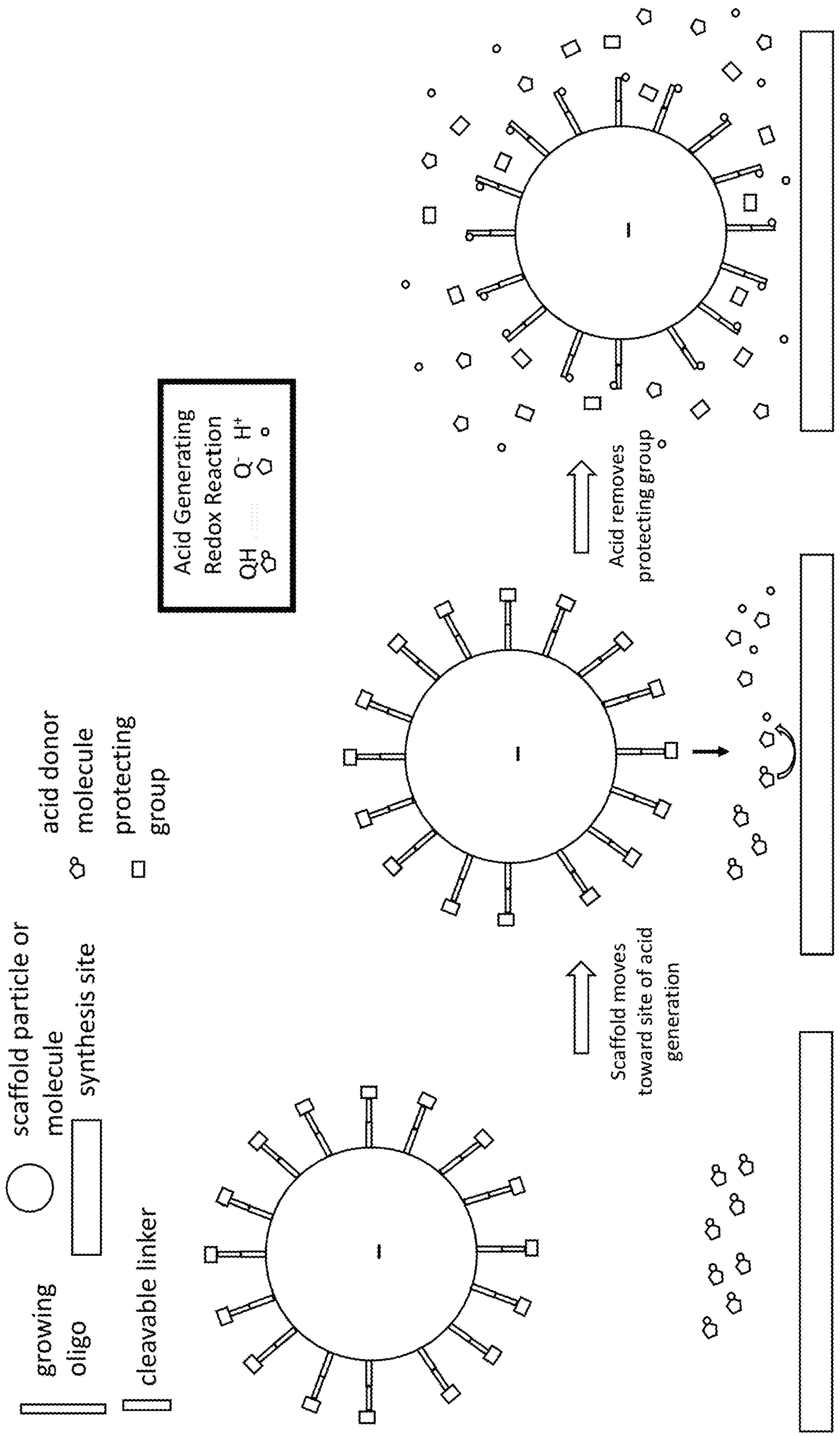
FIG. 35C shows the electrically directed motion of an electrically charged scaffold toward the site of acid generation for oligonucleotide deprotection.

In other embodiments, electrically charged or polarizable particles or molecules act as scaffolds for oligonucleotide synthesis, electrically controlled confinement, electrically directed motion, and assembly. FIGS. 35A and 35B illustrate the concept of electrically charged or polarizable molecules and/or particles used as scaffolds for oligonucleotide synthesis, electrically directed motion, and assembly. Scaffold molecules/particles may enhance electrically directed motion and/or electrically controlled confinement by providing additional electrical charge, volume, and/or dielectric contrast to yield higher-magnitude electrokinetic forces. Mechanisms for electrically directed motion may target the scaffold molecule/particle or the combination of the scaffold and the bound oligonucleotide(s). FIG. 35C highlights a particular embodiment of electrically controlled confinement of a charged scaffold molecule/particle during a deprotection step in the phosphoramidite synthesis of oligonucleotides at the surface of the scaffold.

The specific temperature or voltage used may also control the stringency of binding at a given site. For thermally controlled events, a temperature more than several degrees over the melting temperature ($T_m$) of a given duplex will yield a completely denaturated duplex, while at several degrees below the $T_m$ it will be unperturbed. At the intermediate levels within a few degrees of the $T_m$, the tolerance for mismatches decreases with increasing temperature. For voltage-controlled events, the concept is similar in that certain voltages will not perturb a duplex, while others will result in quantitative dehybridization. Intermediate between these two cases may be a '$V_m$' or a voltage where bound and unbound sequences exist in equal proportion, and small voltage adjustments can shift this proportion dramatically.

Figure 8:
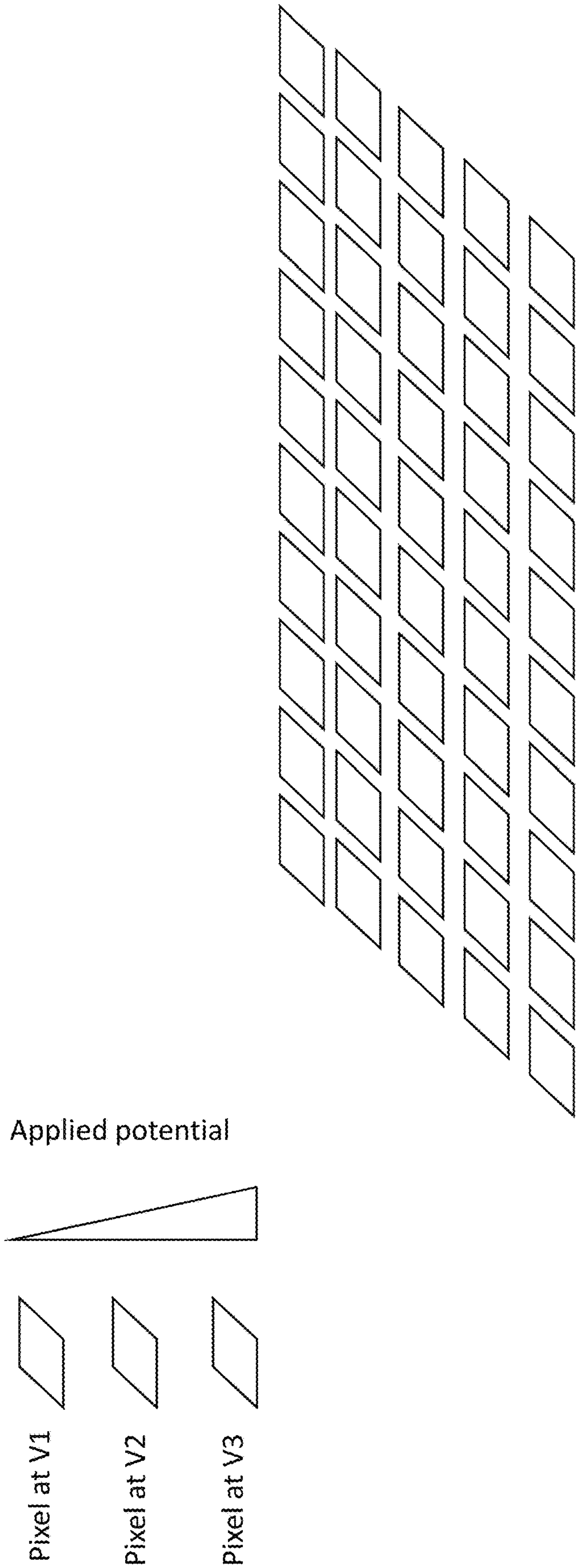
FIG. 8 shows parallel variation of binding stringency by applied potential.
Figure 9:
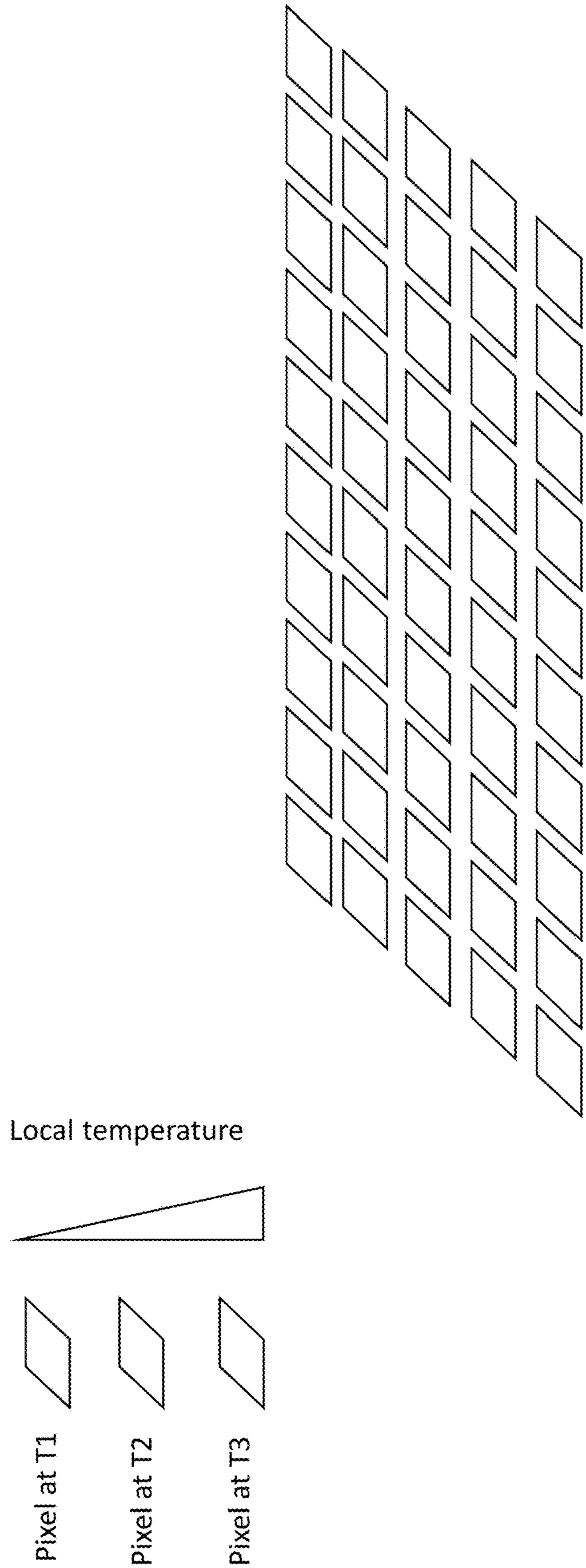
FIG. 9 shows parallel variation of binding stringency by applied temperature.
Figure 10:
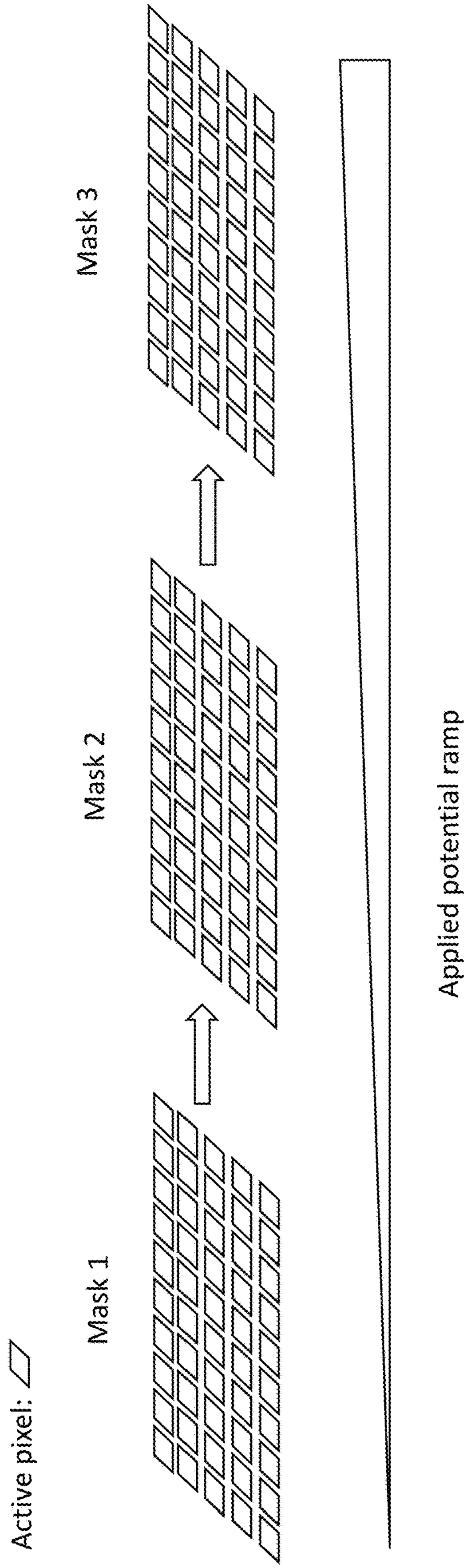
FIG. 10 shows serial variation of binding stringency by ramped potential.
Figure 11:
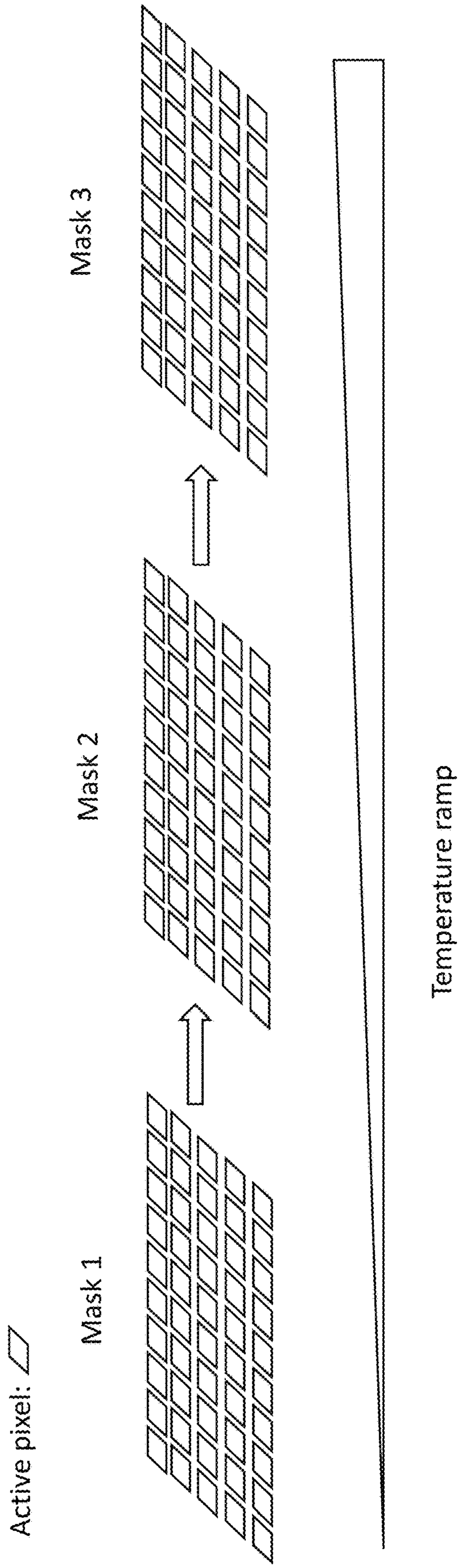
FIG. 11 shows serial variation of binding stringency by ramped temperature.

The thermodynamics of duplex formation are sequence dependent, and the desired stringency can vary by application. FIGS. 8 and 9 depict how voltages and temperatures respectively may be set to different levels throughout the surface of a chip. This may either vary the binding stringency for a given sequence or alternatively preserve a similar level of stringency for different sequences. Embodiments where different voltage levels may be set simultaneously are preferred, but some chip architectures may not be capable of this approach. FIG. 10 shows how a functionally similar effect may be realized using chip architectures that apply a uniform potential to all active sites. The voltage is either ramped or stepped to increasing degrees of stringency while the pattern of active pixels is changed in a serial fashion. In some instances, it may be desirable to couple this with active fluid flow over a surface so that eluted species cannot rebind when the local voltage is deactivated. FIG. 11 depicts the temperature analog of this scenario.

Figure 12A:
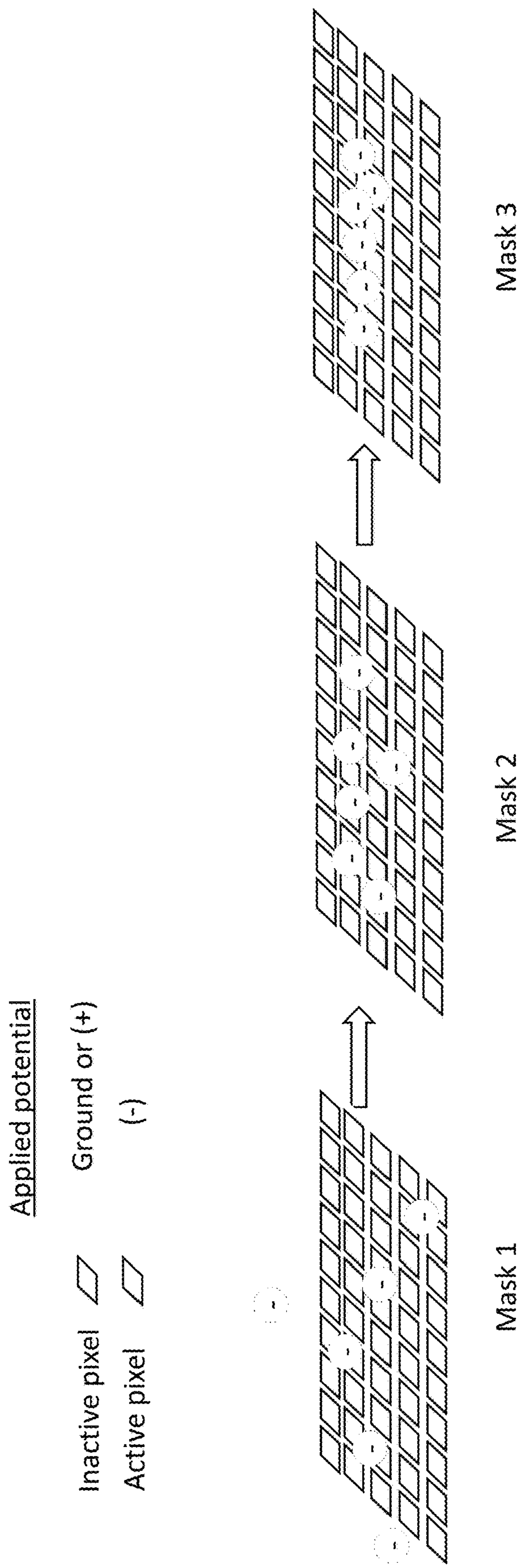
FIG. 12A shows applying multiple masks for electrically controlled concentration of charged particles or molecules in a small area.
Figure 13A:
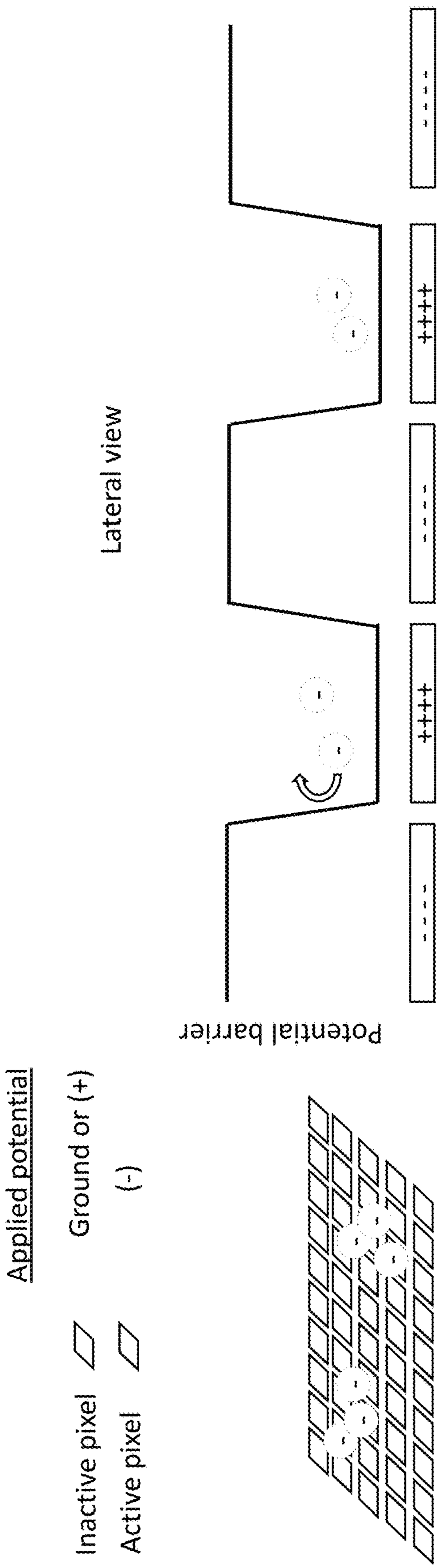
FIG. 13A shows electrically defined zones for electrically controlled confinement of particles or molecules in a space.
Figure 13B:
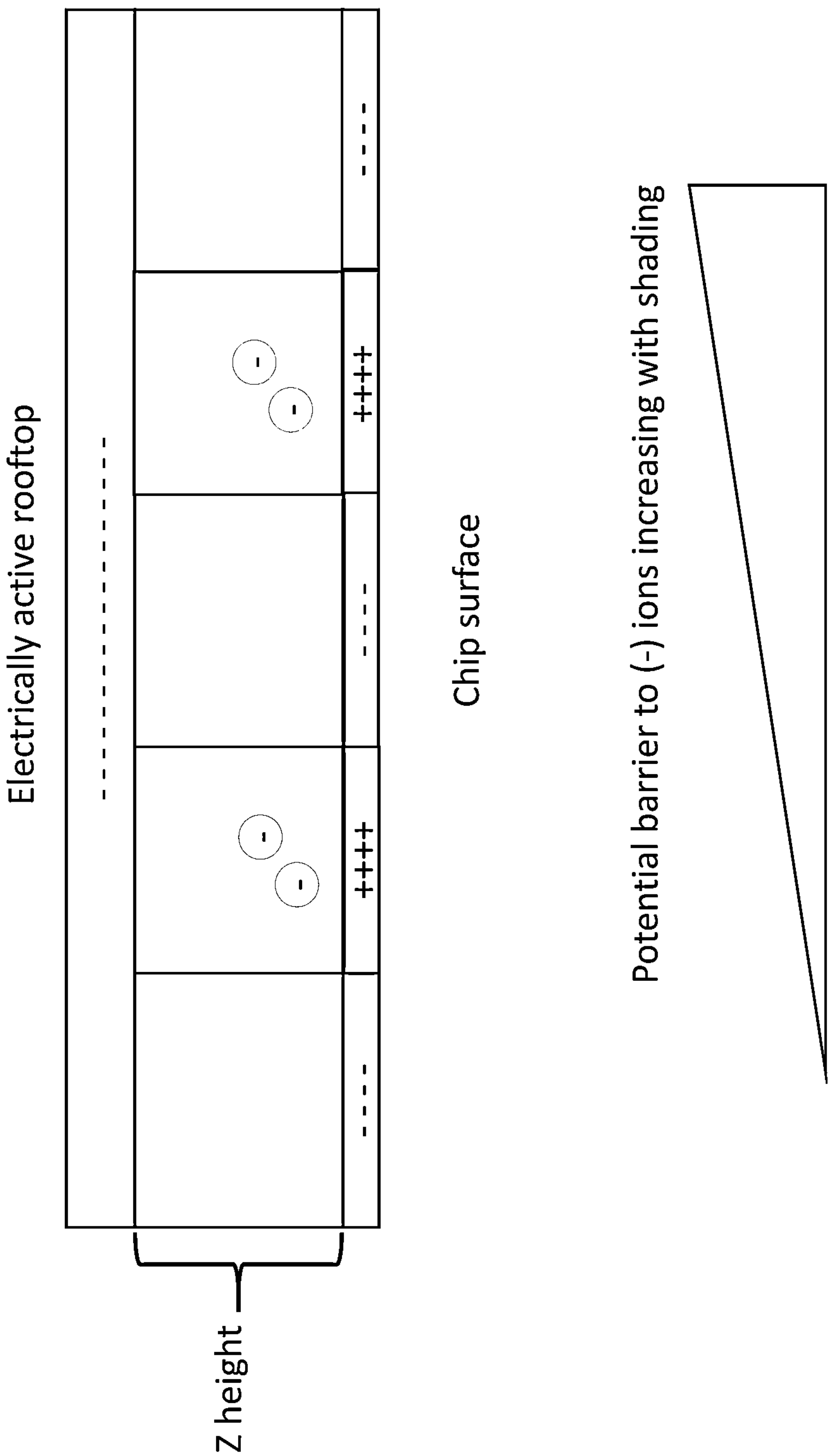
FIG. 13B shows electrically defined zones for electrically controlled confinement of particles or molecules in a space, aided by a rooftop electrode.
Figure 14:
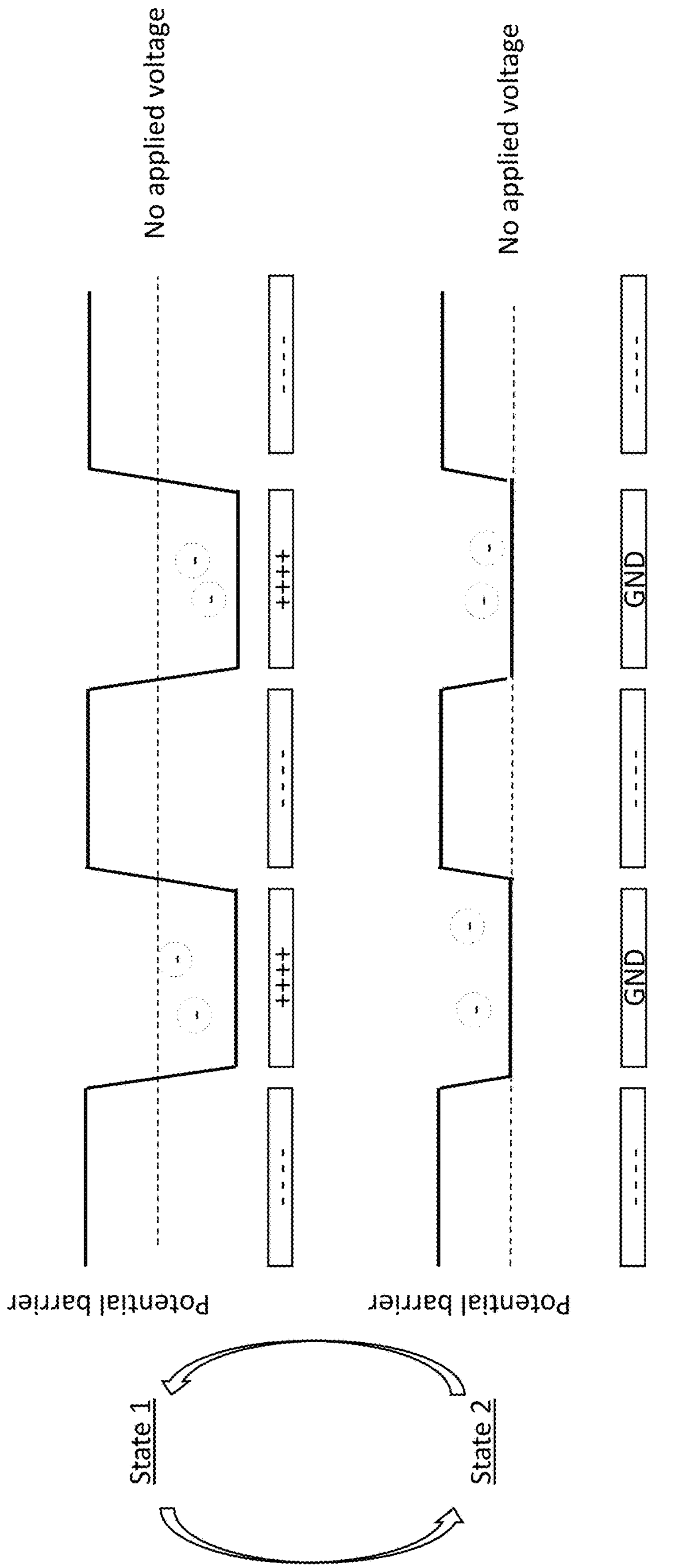
FIG. 14 shows suspending particles or molecules above an electrode within an electrically defined zone through pulse width modulation.
Figure 15:
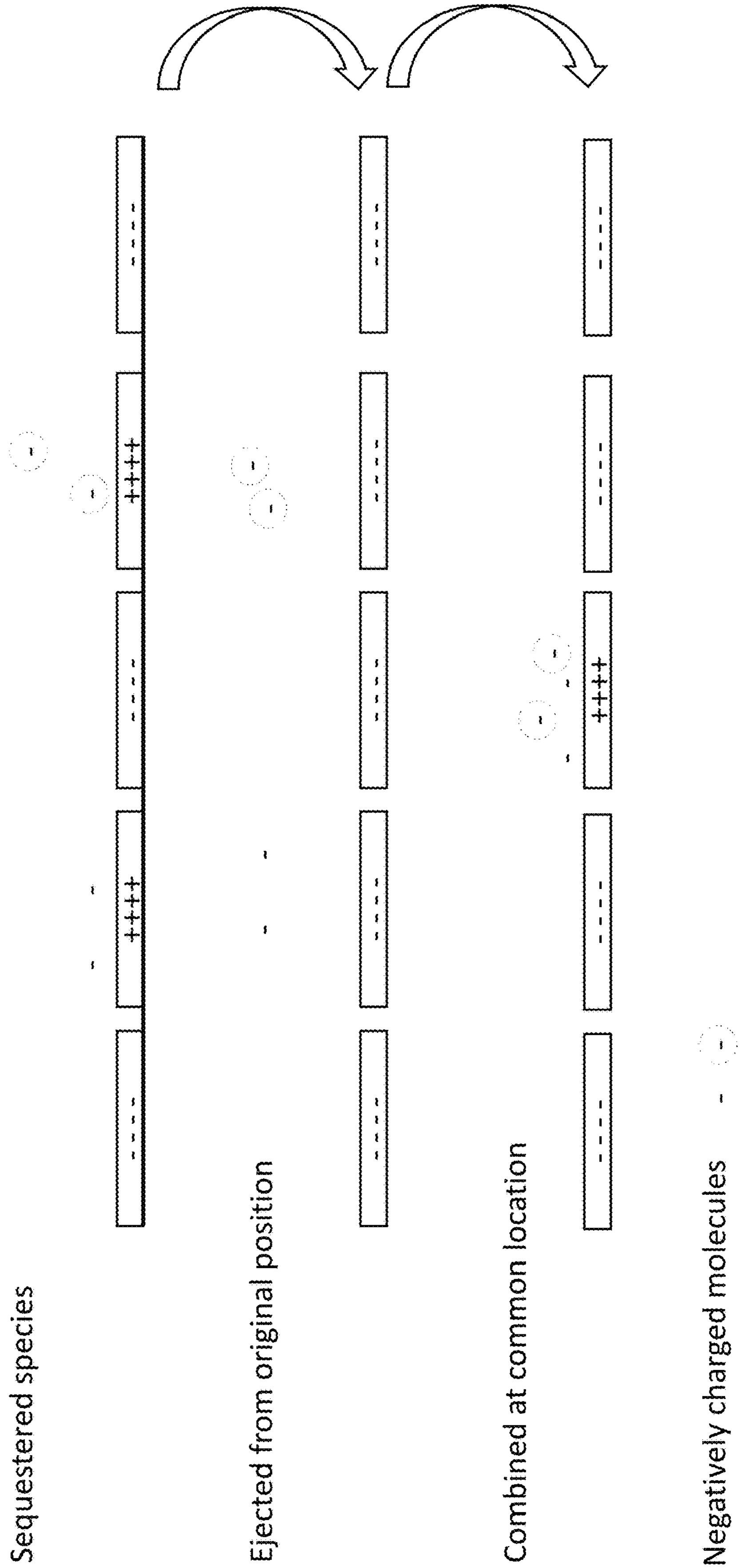
FIG. 15 shows mixing the contents of two different locations on a chip using electrically directed motion.

Various other complex processes can be composed from strategic voltage applications. In some instances, it may be desirable to concentrate or attract reagents from a large volume to relatively small region near a surface. FIG. 12A depicts how patterns of pixel activation or 'guide masks' may be used to enhance charged particle concentration over a large region greater than the Debye length associated with activation of only the electrodes at a target site under a given set of conditions. A voltage is applied so that particles or molecules are repelled from some regions of the surface, attracted to others, or both simultaneously, while the area of their destination zone is shrunk with each pattern change step. When charged molecules have been sequestered in place, they may be retained there by preserving at least the perimeter of pixels of a repelling polarity. FIG. 13A illustrates the concept of electrically defined zones which can serve as digital reservoirs for material on a CMOS chip. FIG. 13B illustrates that a rooftop electrode or surface of rooftop electrodes may be used to help aid in formation of electrically defined zones. In preferred embodiments, this is used in the formation of potential barriers, and reduces risks of escape from a well and inadvertent mixing at a Z-height above the active chip. The rooftop electrode may be spaced from the assembly chip by use of a gasket of the desired thickness, as determined by the other physical parameters of the system. The rooftop electrode system may be any suitable electrode ranging in complexity from a single monolithic electrode to an addressable CMOS chip mirroring the layout of the assembly chip. Though subsequent figures may not explicitly include the rooftop electrode, it may be understood that use of such a rooftop electrode system may be compatible, the preferred embodiment, or omitted entirely. FIG. 14 illustrates the embodiment of an electrically defined zone where the potential within the zone is attractive to the confined species, which may be necessary for some molecules to preserve the integrity of the zone. It may be desirable in some cases to pulse the potential in the zone between a given voltage and a ground at a frequency such that the charged species achieve an equilibrium between diffusion and their attraction to the electrode. This confines the molecules in the zone without non-specifically adsorbing them to the surface, allowing them to remain spatially arrayed across the CMOS chip yet optimally accessible for solution-phase reactions. In other instances, the charged molecules are held close to the surface so that they are less accessible to reactions at various steps of the assembly process, thus some regions acting as 'landing pads' to temporarily sequester certain populations of molecules. As FIG. 15 indicates, these principles also imply the ability to perform mixing operations either by removing the perimeter of an electrically defined zone and passively allowing the molecules to diffuse or instead actively recombining them as a mixed population at another site. The ability to shape the potential experience by charged molecules across a surface enables many electronic embodiments analogous to microfluidic operations, and thus many numerous other permutations and obvious constructions are implied by the disclosed capabilities.

While many of the electrically directed operations have been presented as electrophoresis for simplicity, it should be understood that electrically directed operations such as attraction, repulsion, concentration, mixing, and separation, can be achieved using dielectrophoresis, which is treated in more detail below.

Conventional Dielectrophoresis

Dielectrophoresis (DEP) is defined as the motion of an electrically polarizable object in a non-uniform electric field, or electric field gradient. DEP results from imposing a dielectrophoretic force on an object suspended in a fluid. The DEP force is defined as follows:

$$F_{DEP} \equiv p \cdot \nabla E$$

. . . where p is the induced dipole moment across the object and E is the applied electric field. Note that no DEP force arises under application of a uniform electric field in which the electric field gradient is zero. One way to conceive of the DEP force is to consider an object suspended in a fluid that is placed between a plate electrode and a smaller spherical electrode. A voltage applied across the two electrodes would generate an electric field. The applied electric field would induce a dipole moment across the suspended object. Partial or whole charges in the fluid would respond to the polarization of partial or whole charges in the object. If the object is more electrically polarizable than the fluid, the net induced dipole moment aligns with the direction of the electric field; if the object is less polarizable than the fluid, the net induced dipole moment aligns against the direction of the electric field. The net induced dipole moment then responds to the gradient of the electric field, generated by the selected electrode geometries. Objects that are more polarizable than the fluid will experience a positive DEP (pDEP) force that induces motion up the electric field gradient (i.e., toward the smaller spherical electrode). If the fluid is more polarizable than the object, the object will experience a negative DEP (nDEP) force that induces motion down the gradient. It should be noted that changing the polarity of the electrodes in this scenario does not change the direction that an object moves under DEP. Changing the electrode polarity switches the signs of the electric field and the induced dipole moment such that the directionality of the DEP force is unchanged. This highlights the fact that the directionality of the DEP force is a consequence of dielectric material properties.

DEP is often compared to electrophoresis (EP) as both types of motion arise from electrokinetic forces. Any object charged or not, that is suspended in fluid may experience DEP in the presence of an applied electric field, so long as the object is electrically polarizable and the field is non-uniform (i.e., varies spatially, or exhibits a gradient). A non-uniform electric field is not required for EP; however, EP requires that the suspended object carry an electrical charge. This comparison highlights a key experimental challenge for DEP applications. Many biomolecules like oligonucleotides carry a negative electrical charge and can experience DEP and EP simultaneously, which is problematic when EP forces outcompete DEP forces.

To overcome this challenge, the field utilizes alternating current (AC) to isolate DEP from EP. The net time-averaged EP force under AC is zero because switching electrode polarity in a symmetric manner over time also switches the direction of the Coulombic force acting on the object. For any motion in one direction over a given duration, there is equal motion in the opposite direction in the subsequent duration so that over time, there is effectively no EP. If we recall the definition of the DEP force, the direction of particle motion is a consequence of dielectric material properties rather than electrode polarity. Therefore, switching electrode polarity does not change the direction of DEP force, so AC can be applied to induce net DEP motion. The net time-averaged DEP force for a spherical particle under applied AC is as follows:

$$\langle F_{DEP} \rangle = 2\pi\varepsilon_0\varepsilon_m\{R^3\}_1\{\mathrm{Re}[CM(f)]\}_2\{\nabla|E_{rms}|^2\}_3$$

. . . where $\varepsilon_m$ is the relative permittivity of the medium (fluid), $\varepsilon_0$ is the vacuum permittivity, R is the radius of the suspended object, "Re" refers to the real component, CM is the frequency-dependent (f) Clausius-Mossotti factor, and $E_{rms}$ is the root-mean-square applied electric field.

It is worth separating the right-hand side of this equation into three categories, excluding constant terms, according to the subscripts for each pair of curly brackets in the equation above: (1) particle size; (2) dielectric contrast; and (3) applied voltage and electrode geometry.

(1) The DEP force on a spherical object exhibits a cubic dependence on the object's radius. Note that particle radius is the highest-order dependency in the DEP force equation. Larger objects will generally experience DEP forces of higher magnitude than smaller objects. Consequentially, larger particles or molecules are easier to move via DEP. This size-dependent term is important because smaller objects suspended in a fluid medium generally exhibit lower Reynolds numbers. As particle size decreases, so does the likelihood that the DEP force can outcompete other forces that affect the trajectory of an object with a low Reynolds number, like Brownian motion or thermal fluctuations. For this reason, overcoming diffusion is a notable challenge for DEP applications targeting relatively small oligonucleotides (<200 base pairs).

While DEP of oligonucleotides is theoretically possible, most existing commercial applications of DEP target cells, which are approximately three orders of magnitude larger than a 100-bp oligonucleotide. Holding all terms in the DEP force equation constant, the maximum DEP force experienced by a cell is on the order of one billion times larger than the maximum DEP force exerted on a 100-bp oligonucleotide. For early assembly processes, it is worth considering the utility of electrically polarizable or charged particles or large molecules as scaffolds for small oligo synthesis, electrically controlled confinement, electrically directed motion, and assembly.

Oligonucleotide scaffolds depicted in FIG. 35A offer several potential advantages. In the context of synthesis, it is feasible to envision that an ensemble of micro- or nanoparticles may provide a larger collective surface area for the local phosphoramidite reaction than a given electrode. The synthesized oligonucleotides would be covalently tethered to the surface(s) of the particle(s), minimizing the threat of oligo diffusion during transport, which may be particularly relevant for nDEP applications in which target objects are driven down the electric field gradient. Furthermore, due to the size of the scaffold relative to the size of the bound oligonucleotides, a larger DEP force may be relied upon to induce transport for assembly. As suggested by FIG. 35B, strategies for releasing oligonucleotides attached to the surface of an electrode may also be applied to detaching oligonucleotides bound to the scaffold(s). Electrically charged scaffolds may also be selected for the electrophoretic response they might exhibit during synthesis. For instance, it may be desirable for negatively charged scaffolds to be drawn to the electrode surface under a positive applied potential so that oligonucleotides are proximally close to the source of local acid generation, as shown in FIG. 35C.

(2) The term encompassing the degree of dielectric contrast between a particle and its suspending medium is the real component of the CM factor. Recall that when an object is more polarizable than its suspending medium, that object exhibits pDEP, which is denoted as a positive DEP force. Likewise, an object that is less polarizable than its suspending medium will experience nDEP, denoted as a negative DEP force. The only term in the DEP force equation that can be either positive or negative is the CM factor, which ranges from −0.5 to 1.0. It follows that the CM factor dictates whether the suspended object experiences motion up the gradient (pDEP) or down the gradient (nDEP). Therefore, it follows that the CM factor must express information about the relative polarizabilities of the object and the medium, which is otherwise referred to as “dielectric contrast”.

It is relevant to note that the expression for the CM factor implies that the dielectric contrast between the object and its medium may change in response to the frequency of the applied AC signal. This is because under AC the predominant dielectric property (permittivity) of the object and the medium must be expressed as a complex number involving electrical conductivity and frequency. Generally, the expression for the CM factor at low frequencies is dominated by the electrical conductivities of the object and the medium. At relatively high frequencies, the CM factor reduces to an expression involving the permittivities of the object and the medium. An important consequence of this frequency-dependence is that certain objects suspended in a medium may experience positive or negative DEP depending on the frequency of the applied signal. The DEP force changes sign whenever the CM factor equals zero for what are defined as crossover frequencies.

Different objects in a medium exhibit unique dielectric properties and CM factors. It follows that different objects may also exhibit unique crossover frequencies. Many applications of DEP utilize a frequency that induces pDEP in target objects and nDEP in non-target objects (or vice versa), separating a mixture into two or more object populations. It is unlikely that oligonucleotides of fixed size and varying base pair sequence will differ substantially enough in their dielectric response to induce separation of subpopulations based on frequency; however, characterization of oligonucleotide crossover frequencies remains useful in that DEP motion of oligonucleotides may ultimately require a mechanism that induces both pDEP and nDEP either simultaneously or in close sequence. Conception of such a mechanism relies on knowing the frequency ranges over which oligonucleotides exhibit pDEP and nDEP, which implies knowledge of at least one crossover frequency.

Some objects in a medium will yield no crossover frequencies, exhibiting either pDEP or nDEP regardless of the frequency of the applied AC signal. Other objects may experience one or more crossover frequencies. For instance, the maximum number of crossover frequencies exhibited by a solid spherical particle is generally one. A core-shell particle may generally experience two, one, or no crossover frequencies. Selecting a buffer that yields at least one crossover frequency in target oligo populations may allow for frequency-dependent push/pull operations involving DEP confinement.

The CM factor also reflects the morphology of the object in the medium. Generally, the more complicated the object’s morphology, the more intricate the expression for the CM factor. For example, the expression for the CM factor relating to a solid spherical particle is:

$$CM = \frac{\varepsilon_p^* - \varepsilon_m^*}{\varepsilon_p^* + 2\varepsilon_m^*}$$

where the p subscript refers to the target particle, the m subscript refers to the medium, and epsilon refers to the complex permittivity, which is expressed as a function of a dielectric constant, electrical conductivity, and applied frequency.

If that particle were to have of surface layer or coating, it would be modeled as a core-shell particle with a more intricate expression for the CM factor that accounts for the dielectric properties of the shell layer. The shell layer introduces an extra boundary condition when solving the Laplacian for electric potential, meaning that another set of dielectric properties specific to the shell layer must be taken into consideration when describing dielectric contrast within the system. Furthermore, the CM factor may reflect non-spherical morphologies, which also exhibit geometric terms that differ from (1).

Object size may impact one or more terms in the CM factor. Object radius, bulk conductivity, and surface conductivity all contribute to the total electrical conductivity of an object. Theory may predict, for example, that solid spherical polystyrene particles in higher-conductivity buffer exhibit no crossover frequencies due to the assumption that particle conductivity is lower than medium conductivity; however, a crossover frequency is often observed in practice, suggesting that theory may underestimate the value assigned to particle conductivity. Generally, object conductivity $\sigma_p$ should be expressed as a function of bulk conductivity $\sigma_b$, surface conductivity $K_s$, and particle radius R in such a way that object conductivity increases as its radius decreases:

$$\sigma_p = \sigma_b + \frac{2K_S}{R}$$

Another possible explanation is that surface conductivity is not properly represented in some theoretical models. As bulk polystyrene (macroscale) decreases to the size of a spherical nanoparticle, its surface-area-to-volume ratio increases proportionally to $R^{-1}$. It is therefore conceivable that as the percentage of constituent molecules that exist at the object's surface increases, surface effects may become more relevant. One such effect may be the formation of an electric double layer at the particle surface, which could ostensibly increase electrical polarizability of the object by raising its surface conductivity. It is therefore feasible that in practice, the electric double layer alters the interfacial induced dipole moment at the boundary between the object and its suspending medium, impacting the CM factor and DEP force in such a way that deviates from certain theoretical models that do not account for surface conductivity and particle radius.

The CM factor assumes that the object carries no electrical charge, that its constituent materials are perfect (lossless), homogeneous, isotropic dielectrics, and that the suspending medium is also homogeneous. The CM factor further assumes the application of a uniform electric field across the suspending medium. Furthermore, at distances far from the object, the CM factor relies on the assumption that the electric field generated by the induced dipole moment will not affect the applied electric field at distances far from the object. These assumptions may not be fair when considering molecular objects, many of which exhibit permanent dipole moments (and directional electrical polarizabilities) due to their structure, and which can interact with molecules constituting the buffer medium in the absence of an applied electric field. To rectify these assumptions, molecular objects like relatively small oligonucleotides may be more accurately described by the Clausius-Mossotti-Lorentz (CML) factor than the CM factor; however, CIVIL factors can be difficult to determine.

In its present form, the CM factor disregards contributions to the electric potential of an induced dipole that originate from higher order multipoles (e.g., quadrupoles, octupoles, etc.), which is only a fair assumption for objects of diameters approximately an order of magnitude smaller than the spacing between electrodes. Certain DEP levitation traps consisting of polynomial electrode configurations may ignore the first order dipole, instead targeting higher order multipoles. These applications therefore require an expression for the CM factor that accounts for higher-order multipoles. For instance, a quadrupolar levitation trap may correspond to the following depiction of the CM factor for which n=2:

$$CM_n = \frac{\varepsilon_p^* - \varepsilon_m^*}{n\varepsilon_p^* + (n+1)\varepsilon_m^*}$$

Likewise, an octupolar trap may excite higher order multipoles that correspond to n=3. Aside from unconventional DEP traps, there are practical implications for targeting higher order multipoles. Those familiar with the field may recognize that applying square waveforms in certain scenarios may generate stronger DEP forces on an object than sinusoidal waveforms. Some propose that as a superposition of constituent sine waves, the composite square wave outputted from a waveform generator may excite higher-order multipoles in addition to the first-order dipole. Excitation of multipoles may add to the net DEP force in such a way that cannot be achieved by applying a pure sinusoidal waveform. Relating experimental observations to the multipolar CM factor, strategic utilization of waveform superpositions and/or non-sinusoidal (e.g., square, sawtooth, etc.) waveforms may ultimately generate stronger DEP responses in target objects.

It is worth reiterating that the CM factor encompasses the degree of dielectric contrast between a target object and its suspending medium. Generally, the higher the degree of dielectric contrast (i.e., the greater the absolute value of the CM factor), the larger the magnitude of the DEP force and the likelier the object's trajectory will be driven by net DEP motion. While scaffolds offer size-related advantages for DEP transport and assembly of small oligonucleotides, scaffolds such as those in FIGS. 35A to 35C may also be constructed of materials and morphologies that maximize dielectric contrast at desired frequency ranges. The ultimate utility of scaffolds is therefore to turn a set of constants related to small oligonucleotides into experimental/design variables (e.g., object size, morphology, and material properties related to dielectric contrast) for tailoring the magnitude and directionality of the DEP response.

An often-overlooked set of design variables relevant to the CM factor are the dielectric properties of the suspending medium, which are generally aqueous buffers. It is common practice to optimize the conductivity of the buffer by adding salts like sodium chloride or potassium chloride. Unconventional additives like zwitterionic histidine and histidine derivative compounds are of particular interest in the electrically directed motion, electrically controlled confinement, hybridization, and assembly of oligonucleotides, especially when low buffer conductivities are necessary. Histidine buffers are of primary interest for applications involving CMOS architectures, which may be inherently voltage- and/or current-limited and can only accommodate permeation/passivation layers approximately 10, 1, or 0.1 micrometers or less in thickness.

(3) The third term of the force equation highlights the importance of generating a non-uniform electric field, or spatial electric field gradient. Like the term in (1), this term is a positive number regardless of electrode polarity. Large electric field gradients can be driven by increasing the voltage applied across two electrodes; however, in practice, the applied voltage may also drive electrochemical reactions that can damage the electrodes and/or the target objects, especially in the presence of high-conductivity buffers. The byproducts of these reactions may include gas bubbles that can also interfere with transport and assembly processes. Therefore, there is a practical limit to the voltage that can be applied to a buffered suspension; however, in the absence of using scaffolds, this term affords the likeliest solutions for overcoming the size limitations of relatively small oligonucleotides.

In practice, it is often necessary to coat the electrodes with a permeation (or passivation) layer to protect the electrodes and the sample from unwanted electrochemical effects. Common coatings include parylene, polyacrylamide, agarose, and poly-2-hydroxyethyl methacrylate, which may be cured at the surface of the electrode array. For a given CMOS architecture that performs synthesis, transport, and assembly operations, this permeation layer must allow for the inward diffusion of buffer medium to the surface of the electrode and the outward diffusion of acidic species generated at the electrode to drive the phosphoramidite reaction.

The permeation layer generally shields the applied electric field, which may reduce the contribution of (3) to the net inducible DEP force. Therefore, a porous permeation layer that permits ionic diffusion while minimizing or other otherwise propagating the applied electric field is desirable. For this reason, it is conceivable that block copolymers may be suitable materials for permeation layers. Preferred embodiments include, but are not limited to, diblock copolymers exhibiting cylindrical biocontinuous gyroid microdomains. Selective wet etching of the minority domain could ostensibly yield a porous structure that is compatible with ionic diffusion yet prevents direct contact between the oligonucleotides and the electrode surface.

Figure 35D:
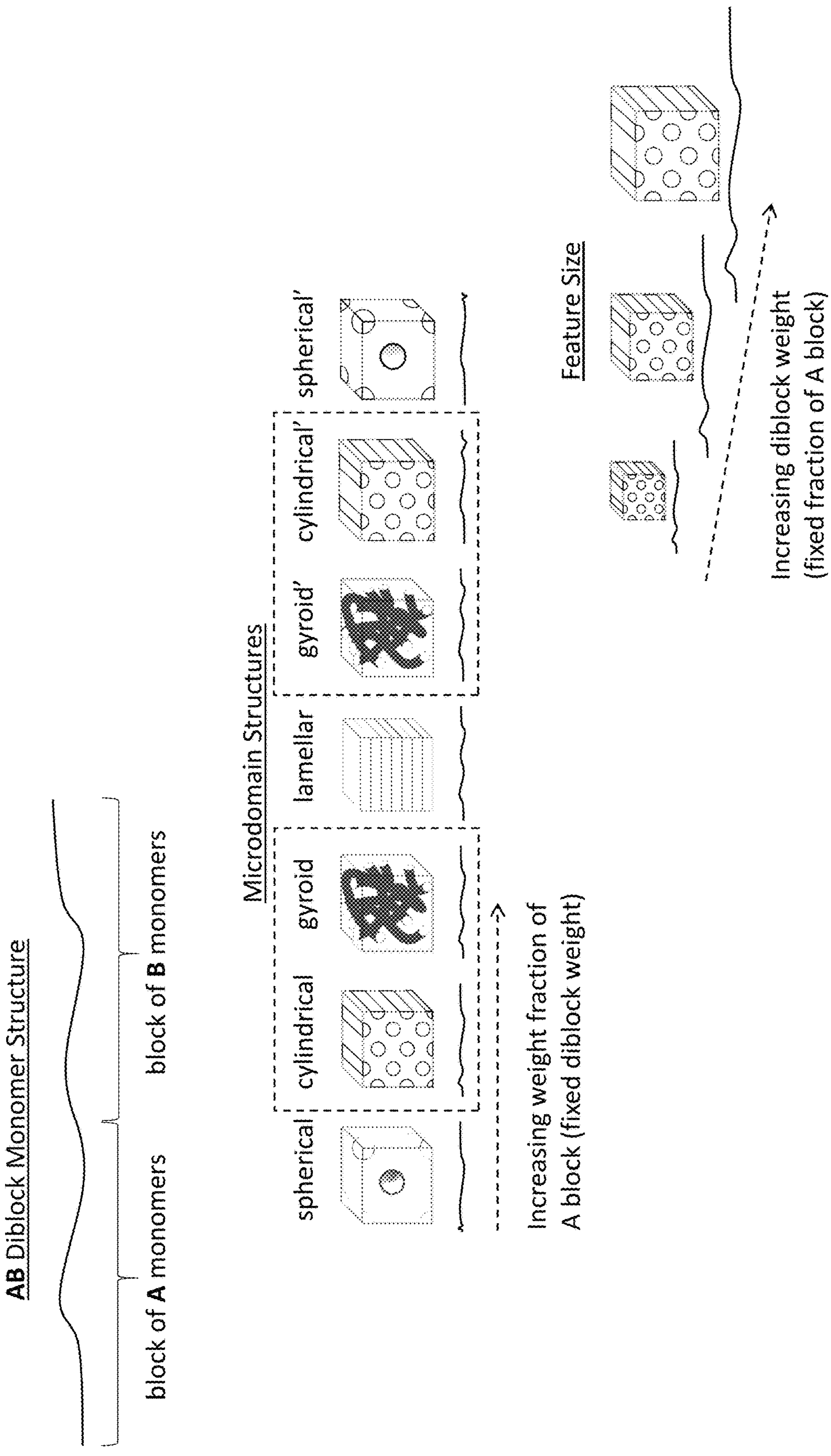
FIG. 35D shows the molecular and microdomain structures of a diblock copolymer.

From a practical standpoint, block copolymers offer a high degree of tunability over the morphology and characteristic size of the microdomain structure, as demonstrated in FIG. 35D. Generally, for a fixed diblock monomer comprised of an "A block" polymer that is covalently attached to a "B block" polymer, the ratio of the molecular weights of A and B (A/B) may dictate the type of microdomain that forms upon annealing. The overall molecular weight of diblock copolymer (A+B) may impact the size of the features of the microdomain. Furthermore, extensive literature describes the alignment of block copolymer microdomains using electric fields, suggesting that patterning of a block copolymer permeation layer on top of a planar electrode array may be feasible within the confines of a flow cell.

Figure 35E:
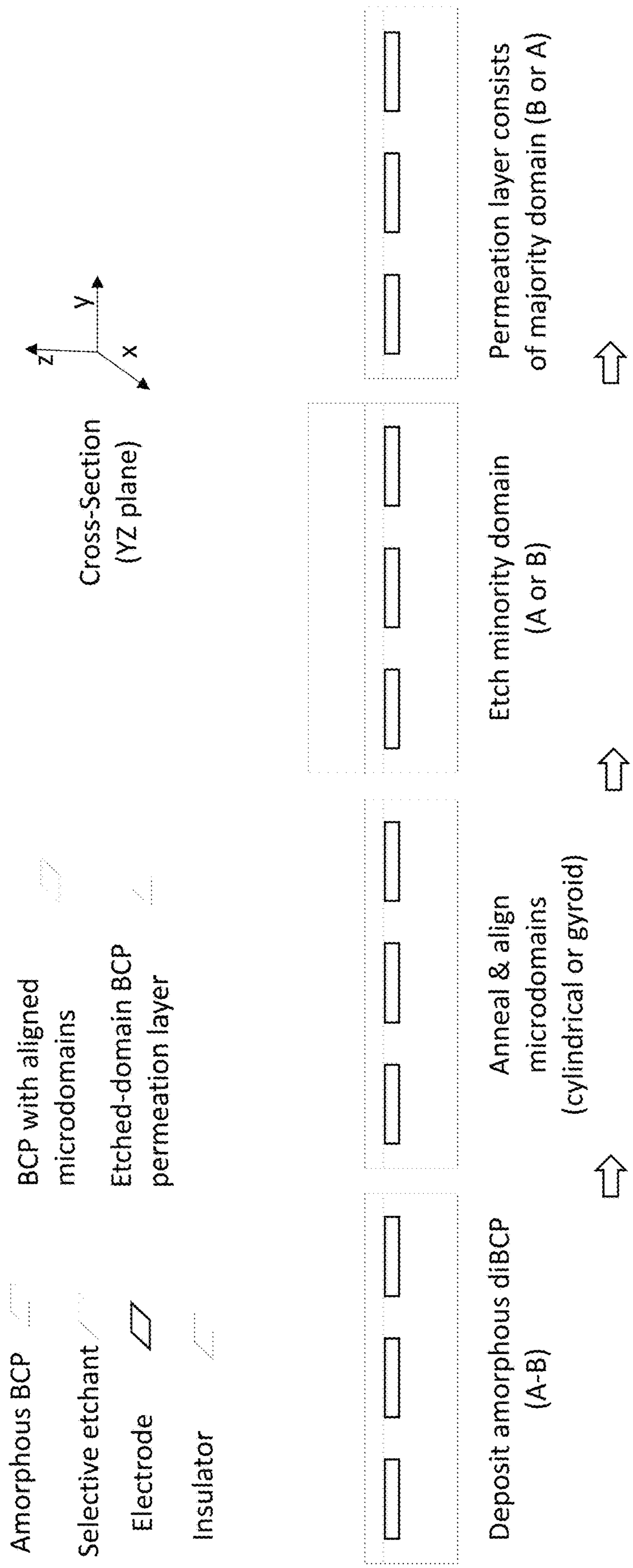
FIG. 35E shows the formation of a porous permeation layer using a diblock copolymer template.

FIG. 35E shows a preferred embodiment of a solid-phase amorphous diblock copolymer dissolved in a biocompatible liquid-phase organic solvent that is deposited onto the surface of an electrode array. Application of heat, shear stress, and/or electric potential for an extended duration may align the microdomains along a preferred axis during the annealing process. Exposure of the polymer layer to a different wet etchant may selectively etch the minority domain to yield a permeation layer with pores and/or channels. Plasmonic nanoparticles and/or other field-enhancing may be co-dissolved into the initial solvent prior to deposition of amorphous diblock copolymer onto the chip surface. After etching the minority domain, field-enhancing species may remain embedded in the majority domain, ostensibly propagating applied electric fields that are necessary for synthesis, electrically controlled confinement, electrically directed motion, and assembly.

Electrode material, size, spacing, geometry, configuration, morphology, and dimensionality can affect the magnitude of the electric field gradient imposed by application of a given electric potential. Therefore, each parameter must be optimally selected to maximize the DEP response of target objects. For instance, CMOS architectures generally assume planar electrode configurations; however, it is worth noting that electrodes may be fabricated to extend perpendicularly up into the vertical dimension (e.g., as pillars, columns, cones, needles, etc.) or down vertically (e.g., as part of a well structure). These three-dimensional electrode structures may help overcome a common limitation of planar electrodes, which is that upon application of voltage, electric fields often do not penetrate the fluid layer deeply enough to induce net DEP motion in objects relatively far from the surface of the electrode array. Nonplanar features may include, but are not limited to cylindrical pillars, cones, truncated cones, needles, partial spheres, pyramids, and truncated pyramids. Electrodes and/or permeation layers may be patterned with nonplanar features. For instance, a permeation layer on top of a planar microelectrode array may be patterned in the nonplanar dimension for applications of insulator-based DEP, in which an applied voltage generates local electric field gradients at certain morphological features of the patterned permeation layer. It should be noted that reducing the thickness of the fluid layer may also increase the initial collection yield and subsequent transport yield of oligonucleotides synthesized on-chip by minimizing diffusion, especially in conjunction with non-planar features.

A preferred embodiment highlights the importance of electrode configuration, geometry, and dimensionality. FIG. 80 shows motion of electrically polarizable particles or molecules along passivated electrodes that taper in the horizontal plane and extend into the vertical dimension. Upon application of an AC signal (15 kHz, 10 Vpp) to Zone 2 with Zones 1 and 3 set to ground, fluorescent particles or molecules move from along the edges of the electrode in Zone 2. Particles or molecules converge from the electrode edges to the center of the electrode when the frequency of the signal applied at Zone 2 decreases to 1 kHz. It is essential to note that particle accelerations, velocities and trajectories may also be influenced through the selection of appropriate electrical signals applied to this unique electrode geometry.

Unconventional Dielectrophoresis

Conventional DEP (e.g., pDEP and nDEP) considers the real component of the CM factor, a spatially non-uniform electric field. Unconventional DEP (e.g., travelling-wave DEP) involves the imaginary component of the CM factor and a phase-varying electric field. Unconventional DEP is best described through the following force equation:

$$F_{DEP}=2\pi\varepsilon_0\varepsilon_m R^3[\{\mathrm{Re}[CM(f)]\nabla E^2\}_1+\{lm[CM(f)]\Sigma E^2\nabla\phi\}_2]$$

. . . where Φ denotes the phase of the applied AC signal and "Im" refers to the imaginary component. Note that the first term encompassed in curly brackets was previously discussed in the context of conventional DEP of objects either up or down a spatial electric field gradient. This term remains relevant for most practical applications of unconventional DEP. The second term in curly brackets highlights another contribution to the net DEP force equation that can be induced through of a set of applied AC signals offset by phase. Under proper conditions, these phase-offset signals generate a traveling electric field that the object may respond to by translating along the direction of the phase gradient (co-field) or against the gradient (contra-field) depending on the frequency of the applied signal. The imaginary component of the CM factor spans values ranging from 0.75 to −0.75. When the imaginary component of the CM factor is negative, the object experiences co-field traveling-wave (tw) DEP. The object will experience contra-field twDEP when the imaginary component of the CM factor is positive.

In practice, the real component of the CM factor must be negative for twDEP to be observed. That means the object must be drawn away from the local maxima in the spatial electric field gradient by conventional nDEP to be translated along or against the traveling electric field by twDEP. Important design considerations include the electrode width, interelectrode spacing, wavelength of the applied AC signal, number of phases applied to the system.

One- and two-phase systems typically generate standing, rather than traveling, electric fields and are characteristic of conventional DEP. Three- and four-phase systems are arguably the most common implementations of twDEP. To induce twDEP using a three-phase system, a frequency corresponding to a negative value for the real-component of the CM factor and to a non-zero value for the imaginary component of the CM factor must first be selected. Electrodes must be patterned with appropriate dimensions, and the unit cell of the system can be considered three electrodes (i.e., one for each phase). An AC signal at the selected frequency would be applied to the first electrode, followed by a second signal with the same frequency and a 120-degree offset applied at the adjacent electrode and a third signal with a 240-degree offset at the third electrode. A latent fourth electrode with a 360-degree offset is conceptually equivalent to the first electrode with no phase offset and so would mark the beginning of a second unit cell adjacent to the first cell. Common implementations of twDEP systems utilize interdigitated electrode (IDE) arrays consisting of parallel rectangular electrodes. Other implementations may utilize other IDE geometries. Electrode configurations for twDEP are not limited to IDE geometries and may exhibit any geometry, morphology, or dimensionality that meet the design framework of the phase system. In practice, multiple DC and/or AC signals may be applied concurrently to the multi-phase system of travelling-wave AC signals as a superposition to alter the range of frequencies available for twDEP.

Electrically Directed Motion

Dynamic sequences of electrical signals that generate electrically defined zones to induce electrically directed motion and/or electrically controlled confinement/concentration may utilize, but are not limited to the use of AC, DC or DC offsets, pulse-width-modulation, diode clipping, non-sinusoidal waveforms, phase differences, harmonics, and/or signal superposition used sequentially, simultaneously, or differentially at unique locations in the array. Visible light or other forms of electromagnetic radiation may also be used in conjunction with a photoconductive permeation or passivation layer at the electrode array to modify electric fields generated by application of electrical signals.

An electrically defined zone may be generated at any electrode or combination of electrodes that induces or otherwise participates in electrically directed motion and/or electrically controlled confinement or concentration through application of electrical signals. Electrically controlled confinement/concentration may include the retention of electrically charged or polarizable particles or molecules through application of electrokinetic forces at one or more electrically defined zones. Electrically directed motion may refer to the movement of electrically charged or polarizable particles or molecules through electrokinetic forces and/or through a temporospatial progression of electrically defined zones generated through a dynamic sequence and operating under electrically controlled confinement/concentration.

Figure 12B:
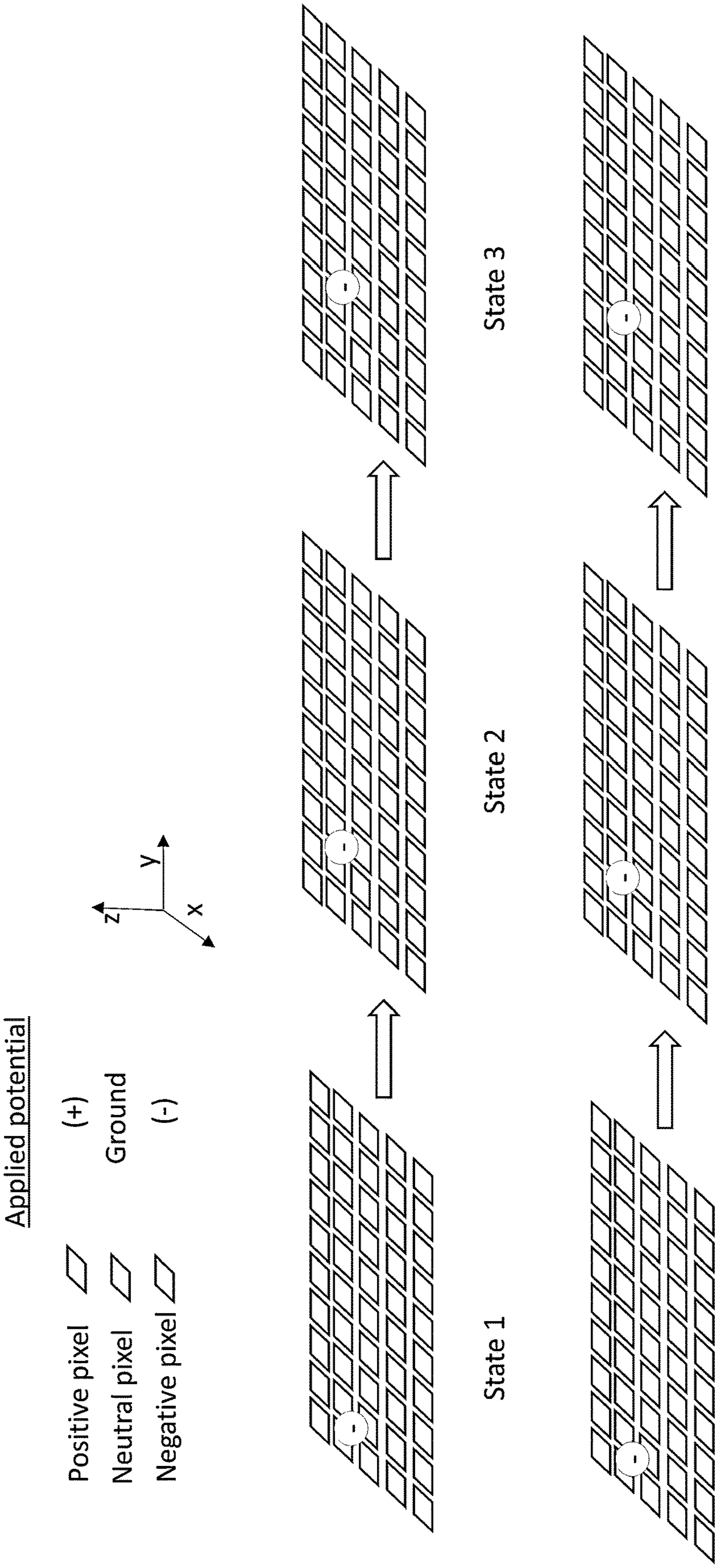
FIG. 12B shows electrically directed motion of particles or molecules using electrophoretic confinement on a planar microelectrode array.
Figure 12C:
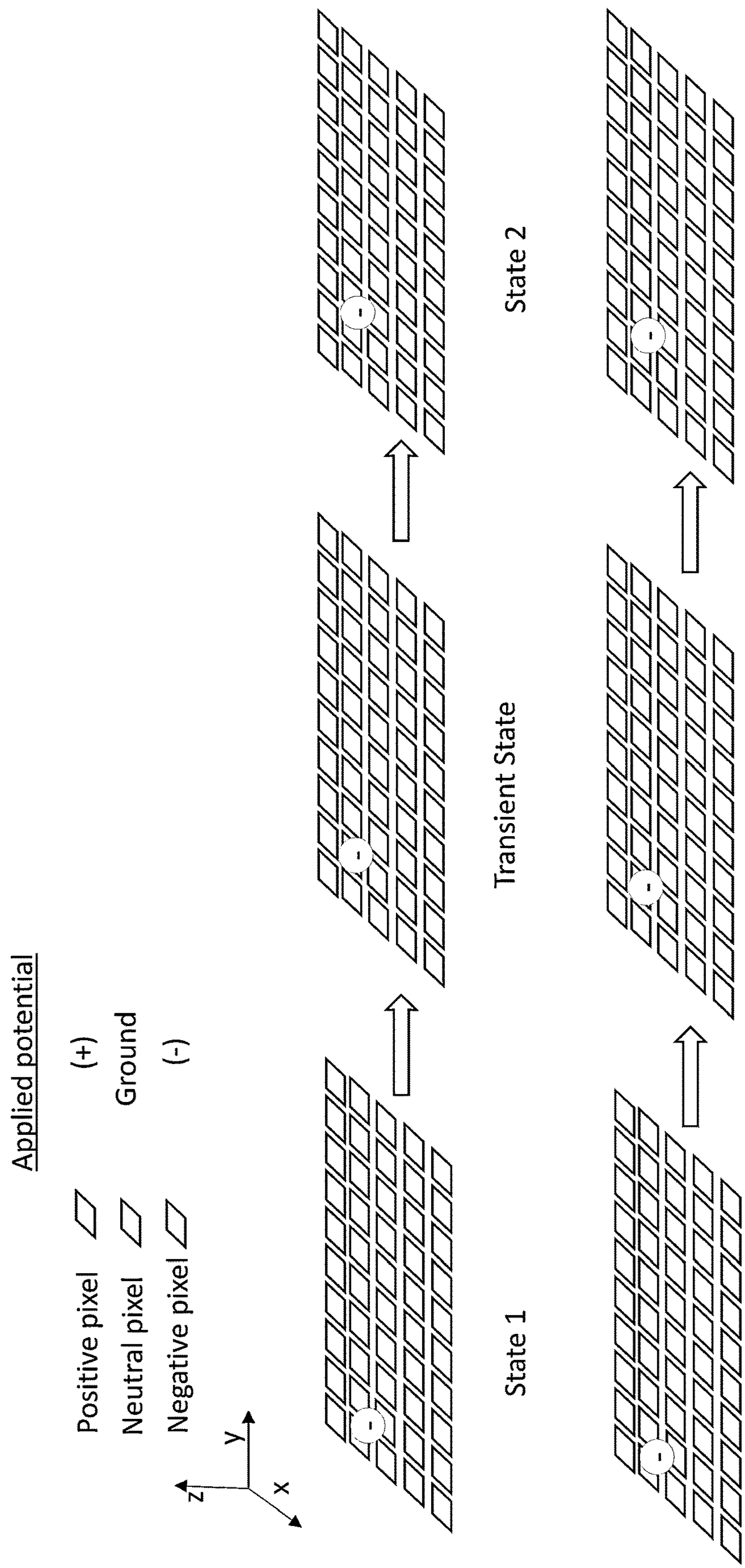
FIG. 12C shows electrically directed motion of particles or molecules using electrophoretic confinement on a planar microelectrode array using a transient state.
Figure 12D:
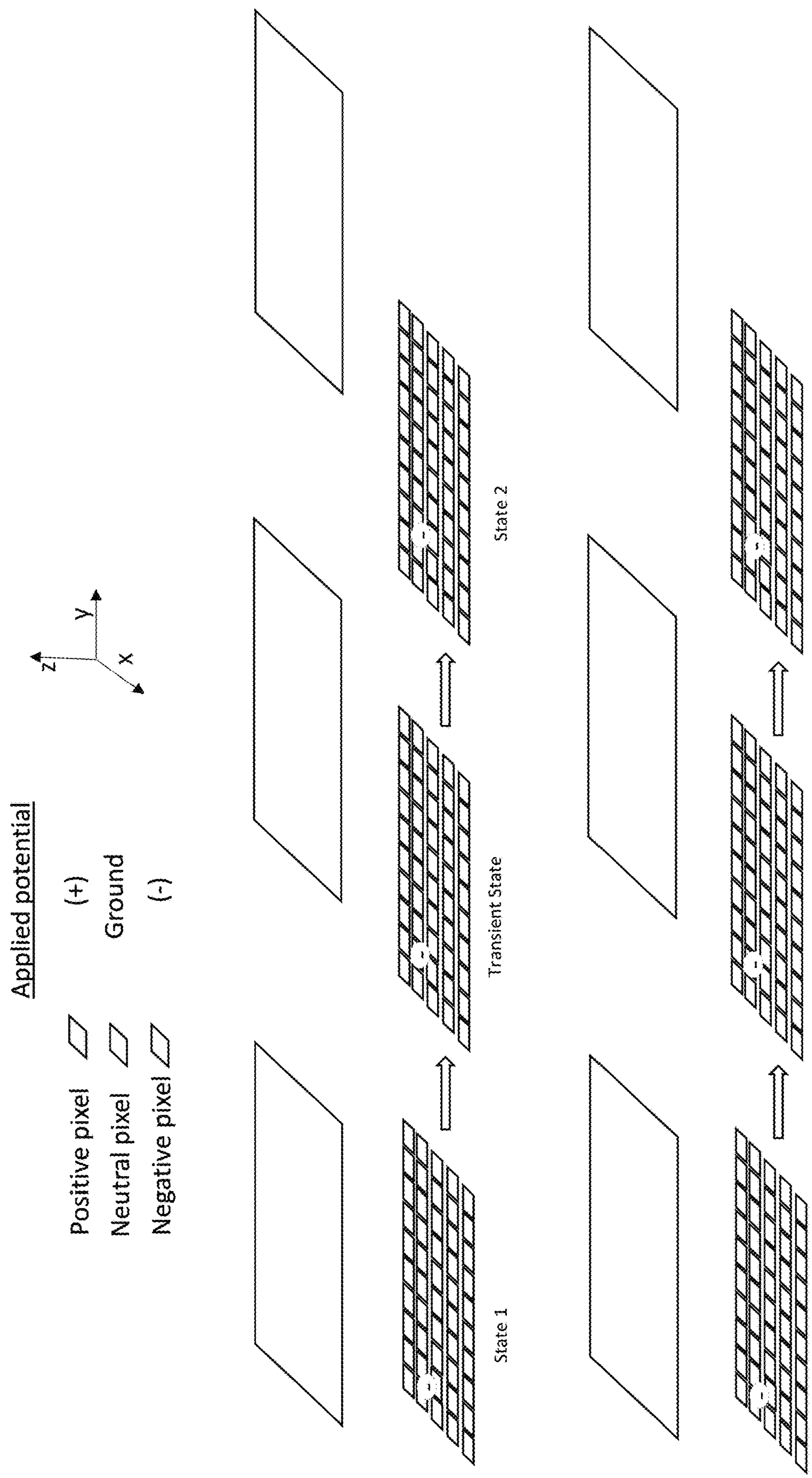
FIG. 12D shows electrically directed motion of particles or molecules using electrophoretic confinement on a planar microelectrode array using a transient state and a rooftop electrode set to ground.

FIG. 12B illustrates a preferred embodiment of electrically directed motion in which a dynamic sequence of DC signals applied to a microarray induces electrophoretic particle motion. State 1 shows the electrically controlled confinement of a single electrically charged particle by applying a positive voltage at a particular electrically defined zone in the microelectrode array. State 2 demonstrates displacement of the electrically defined zone from its initial location to an adjacent electrode, and State 3 illustrates another displacement in the y-direction. FIG. 12C shows variation of the previous embodiment in which the dynamic sequence includes a temporary expansion of the electrically defined zone during a Transient State, which facilitates the transition between State 1 and State 2. FIG. 12D demonstrates a variation of the previous embodiment that uses an electrically grounded rooftop electrode. A DC offset may instead be applied to the rooftop electrode for additional confinement in the z-direction. The rooftop electrode may also be used for electrically directed motion without use of transient states. Together, these embodiments illustrate electrically directed motion of a charged particle through a temporospatial progression of electrically defined zones operating under EP confinement.

Figure 12E:
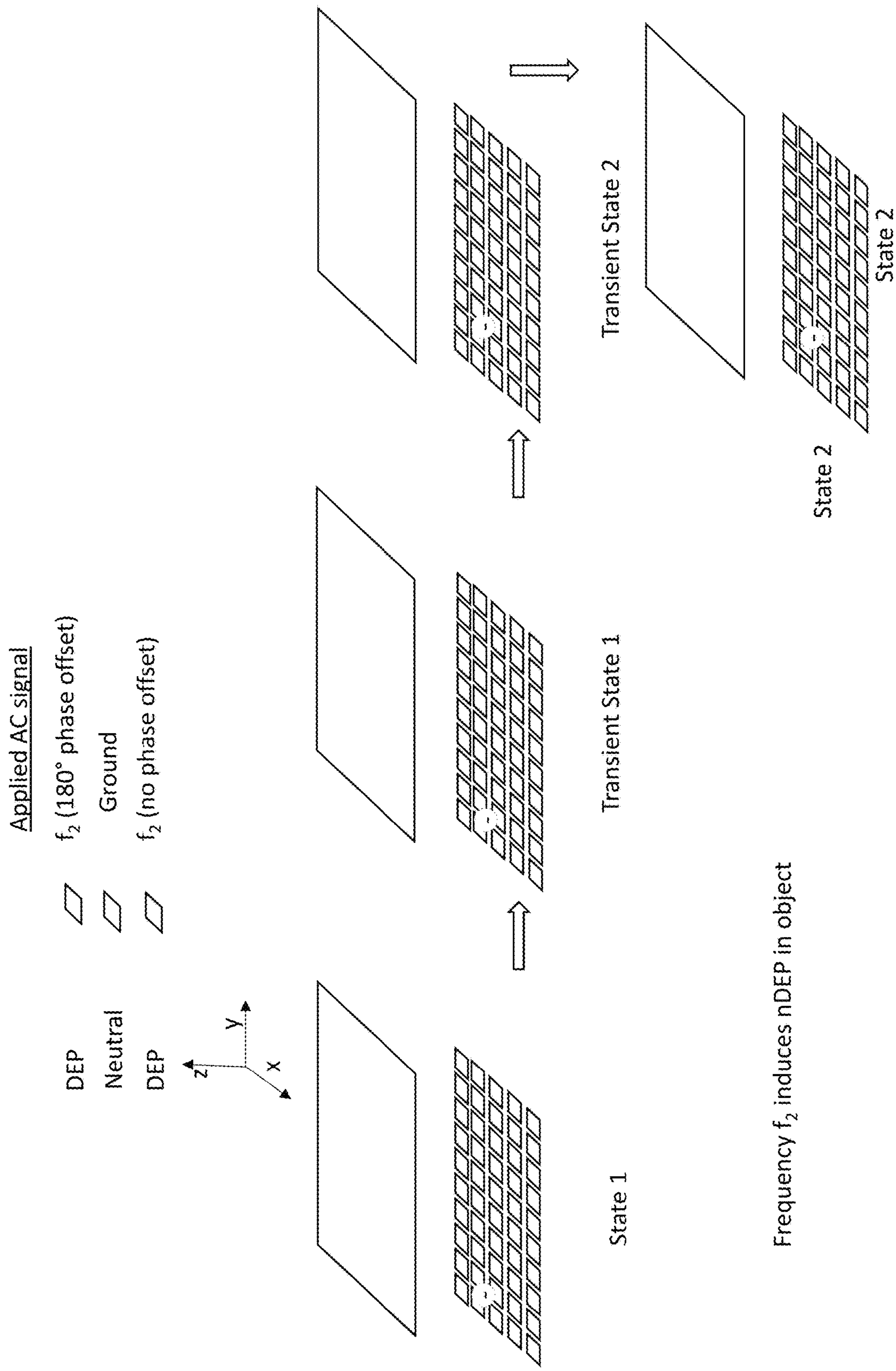
FIG. 12E shows electrically directed motion of a particle through electrically controlled confinement using negative dielectrophoretic traps and a rooftop electrode.

Several DEP confinement strategies may be used as a part of a dynamic sequence to induce electrically directed motion. FIG. 12E shows an initial state (State 1) in which a 3×3 subset of the microarray forms an electrically defined zone for nDEP confinement. An electrical signal with an appropriate voltage and frequency is applied across the center electrode in the subset array and the rooftop electrode. Another electrical signal at the same frequency and a 180-degree phase difference is applied between the rooftop electrode and the electrodes at the perimeter of the subset array. The frequency is selected to induce nDEP in the particle, which is electrically confined to the center electrode. In Transient State 1, the electrically defined zone expands and the center of the nDEP confinement zone increases in size by one electrode in the positive y-direction. The phase at the initial center of confinement changes by 180 degrees in Transient State 2, inducing particle motion along the positive y-direction. The trailing edge of the confinement zone along the y-direction is turned off in State 2, demonstrating electrically directed motion through a sequence of nDEP controlled confinement. Additional electrodes may be incorporated at the periphery and/or at the center of the nDEP confinement zone in other conceivable embodiments, and nDEP directed motion may be induced through a dynamic sequence of these larger zones. Application of a frequency that induces pDEP may also enable confinement strategies that permit electrically directed motion in a similar fashion.

Figure 12F:
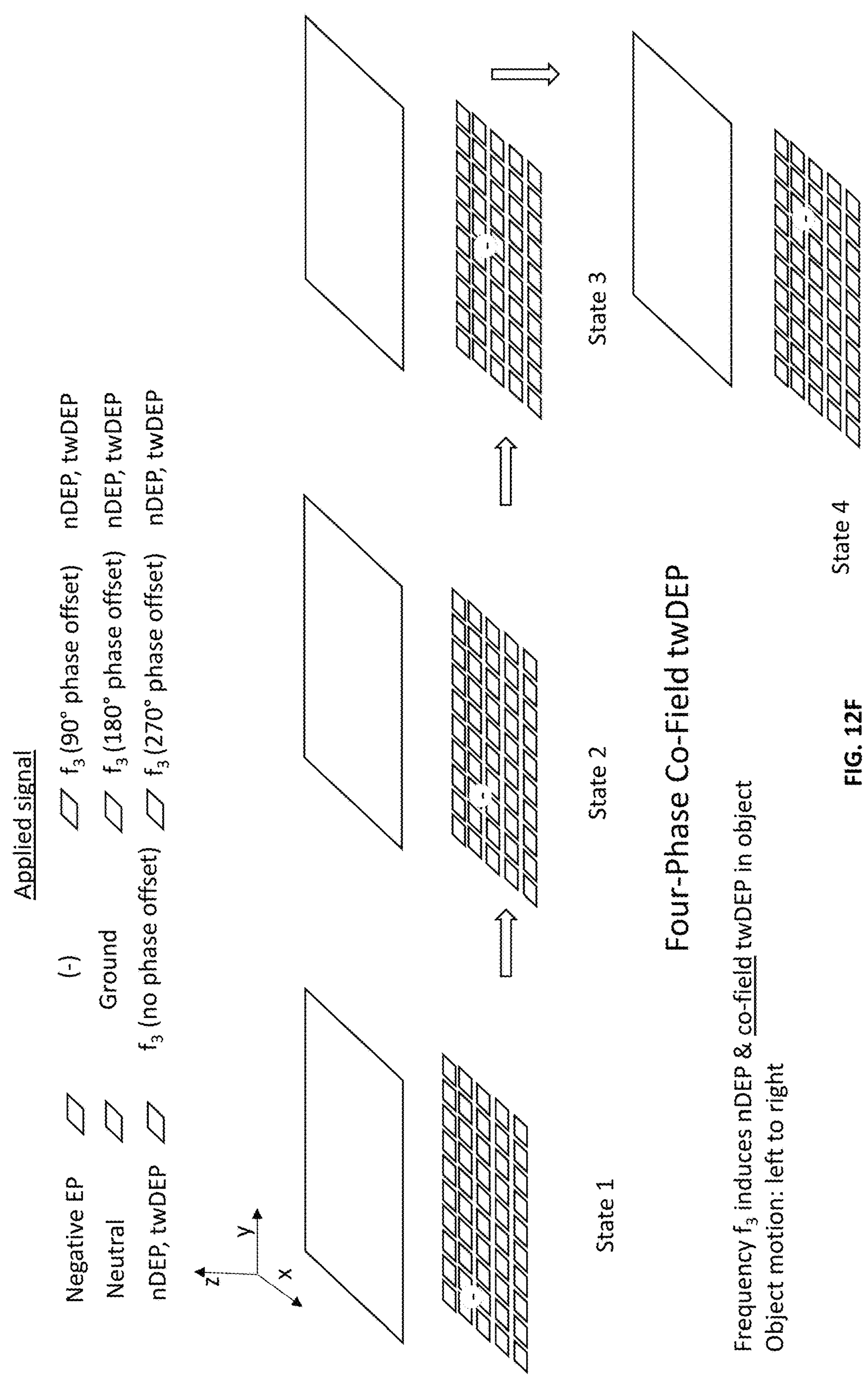
FIG. 12F shows electrically directed motion of a particle using a four-phase travelling electric field and a rooftop electrode for co-field travelling wave dielectrophoresis.

Another embodiment utilizes a static electrically defined zone to induce electrically directed motion. FIG. 12F depicts an electrically defined zone consisting of electrophoretic confinement electrodes (white) surrounding a 1×8 array of electrodes (patterned) and a rooftop electrode. Electrical signals are applied to patterned electrodes at a voltage and frequency that induces nDEP and co-field twDEP, assuming a phase differential. The electrode at the trailing edge along the positive y-direction of the 1×8 array has no phase offset. Each subsequently adjacent patterned electrode has a 90-degree phase offset such that the fifth electrode along the positive y-direction is in-phase with the first electrode. The particle moves in the direction of the phase gradient along the positive y-direction in States 1 through 4. In this embodiment, electrically directed motion of the particle along the positive y-direction is a consequence of twDEP, nDEP, and static EP confinement rather than a dynamic sequence that displaces EP or DEP confinement zones. Electrically directed particle motion may be induced along the negative y-direction using the depicted electrically defined zone by selecting a frequency that induces contra-field twDEP and nDEP. Motion along the negative y-direction may also be induced at the original frequency by inverting the sequence of patterned electrodes in the electrically defined zone, thereby changing the direction of the phase gradient. A related embodiment may include a three-phase twDEP system and/or the use of a DC offset at the rooftop electrode for additional EP confinement. Other related embodiments may include larger electrically defined zones containing columns and/or rows of in-phase electrodes.

Figure 12G:
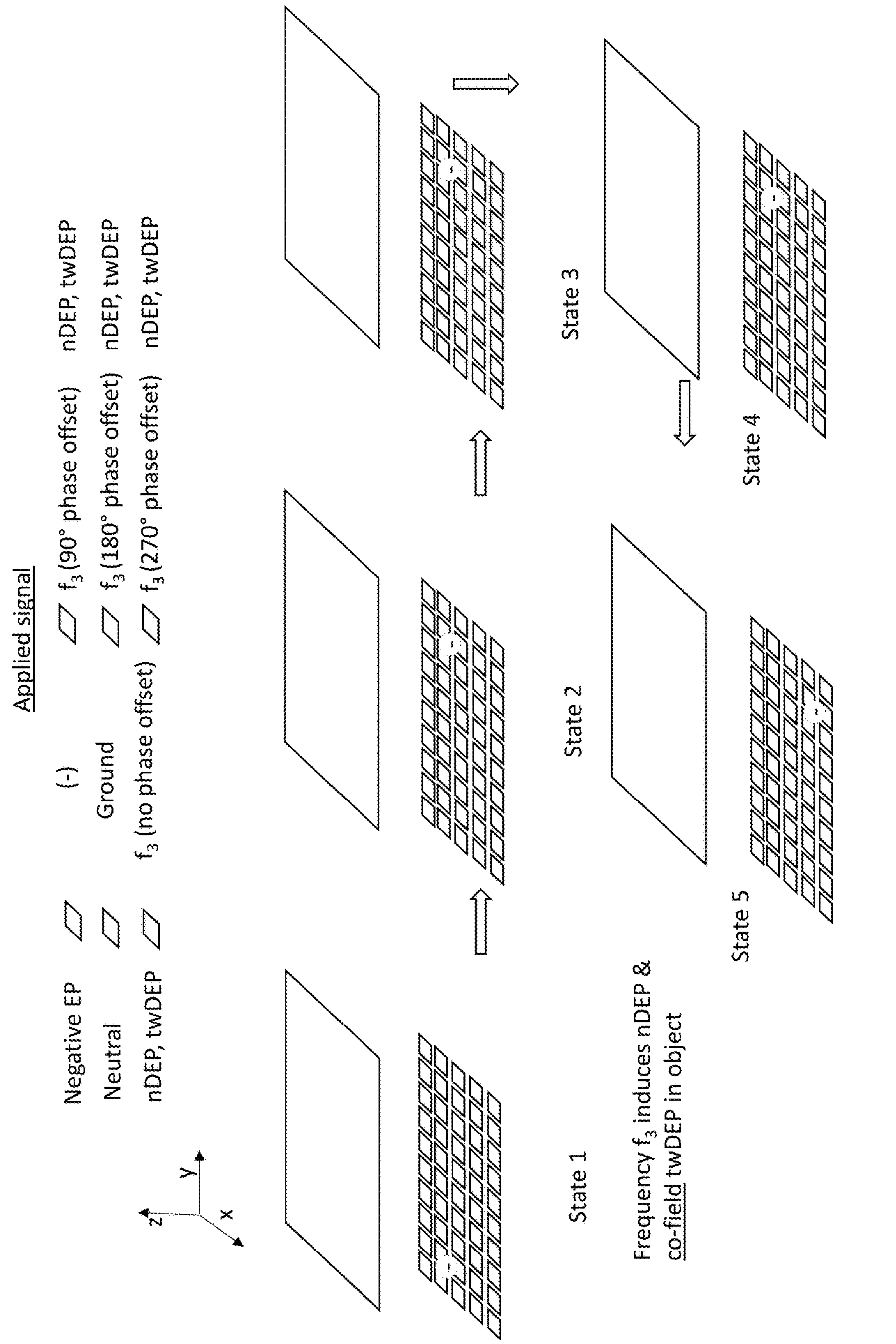
FIG. 12G shows electrically directed motion of a particle using a four-phase travelling electric field and a rooftop electrode for co-field travelling wave dielectrophoresis, which terminates in electrophoretic confinement before motion perpendicular to the initial axis of transport is induced via travelling-wave dielectrophoresis.
Figure 12H:
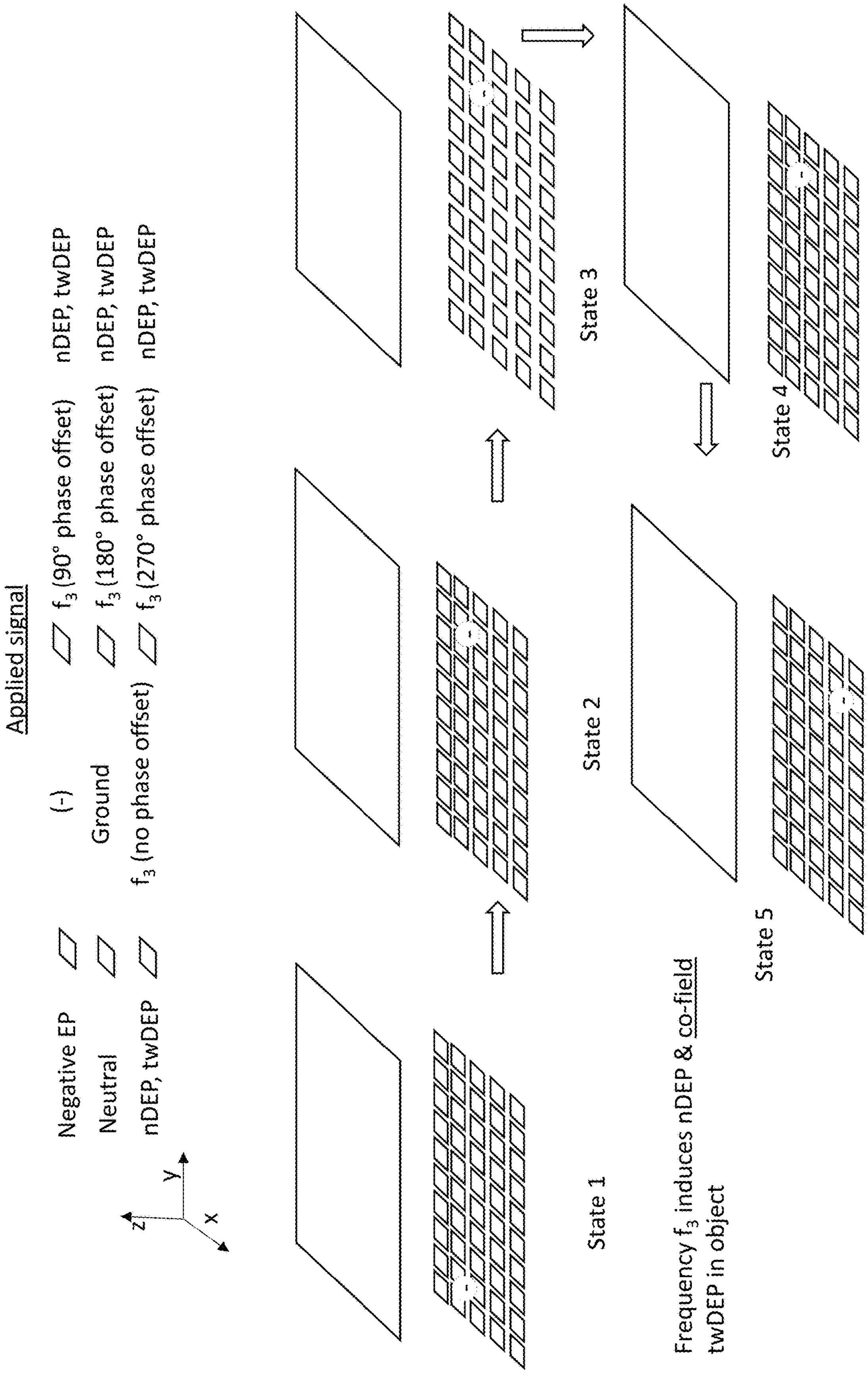
FIG. 12H shows electrically directed motion of a particle using a four-phase travelling electric field and a rooftop electrode for co-field travelling wave dielectrophoresis, which terminates in negative dielectrophoretic confinement before motion perpendicular to the initial axis of transport is induced via travelling-wave dielectrophoresis.
Figure 12I:
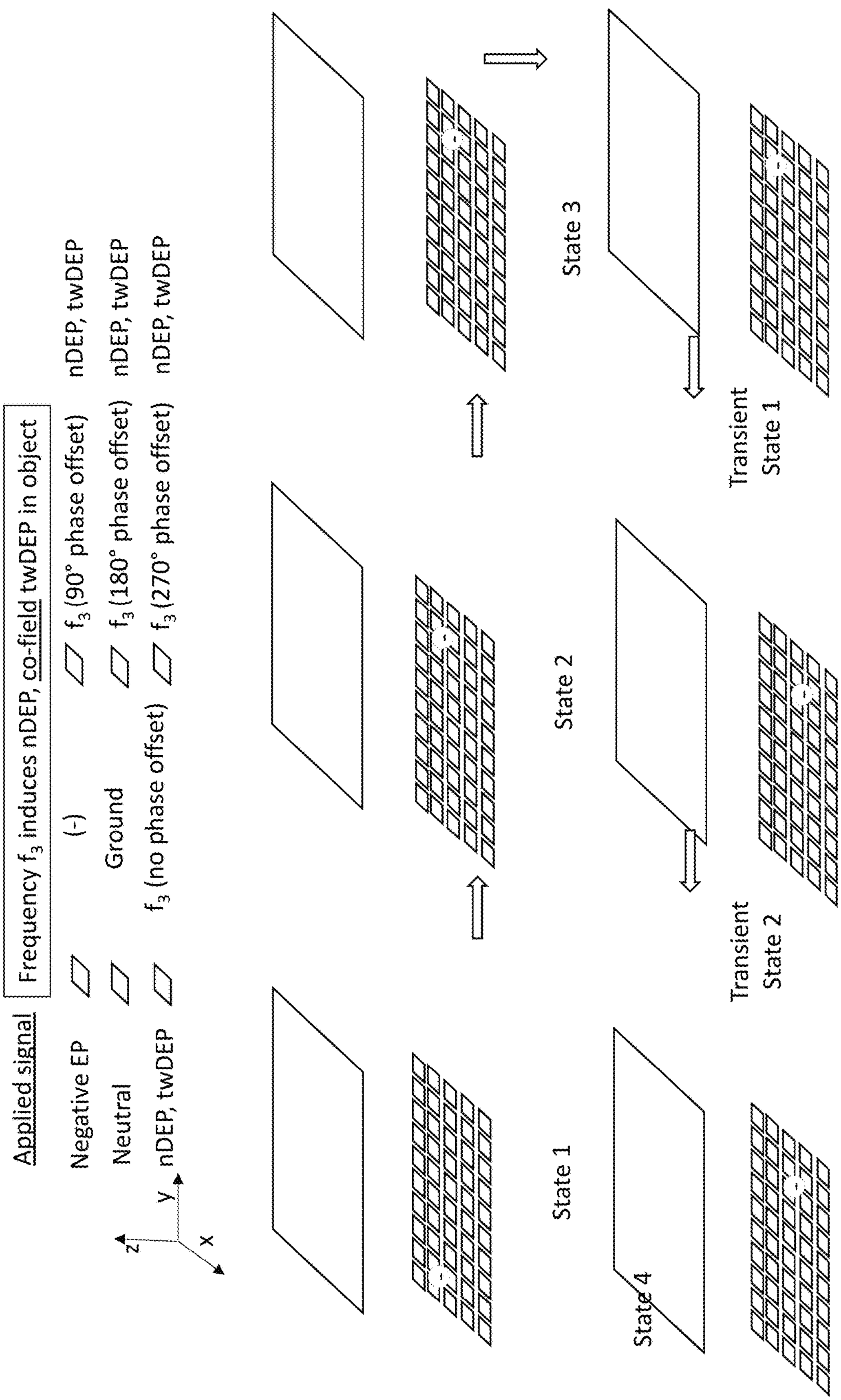
FIG. 12I shows electrically directed motion of a particle using a four-phase travelling electric field and a rooftop electrode for co-field travelling wave dielectrophoresis, which terminates in negative dielectrophoretic confinement before motion perpendicular to the initial axis of transport is induced by displacing the center of confinement.

Electrically directed motion may include particle motion along a static electrically defined zone as part of a dynamic sequence. FIG. 12G illustrates a preferred embodiment in which the static electrically defined zone depicted in FIG. 12F induces particle motion along the positive y-direction via nDEP, co-field twDEP, and EP confinement in States 1 and 2, terminating in a different electrically defined zone operating solely under EP confinement in State 3. A third static electrically defined zone that is similar in structure yet orthogonal to the first zone is generated in State 4, inducing electrically directed motion along the positive x-direction via nDEP, co-field twDEP, and EP confinement in State 5. FIG. 12H shows a similar embodiment in which the electrically defined zone in State 3 halts electrically directed particle motion using nDEP confinement instead of EP confinement, before motion resumes along the positive x-direction. FIG. 12I illustrates another preferred embodiment in which particle motion along the positive y-direction terminates in an nDEP confinement zone prior to displacement of the nDEP confinement zone along the positive x-direction.

Figure 12J:
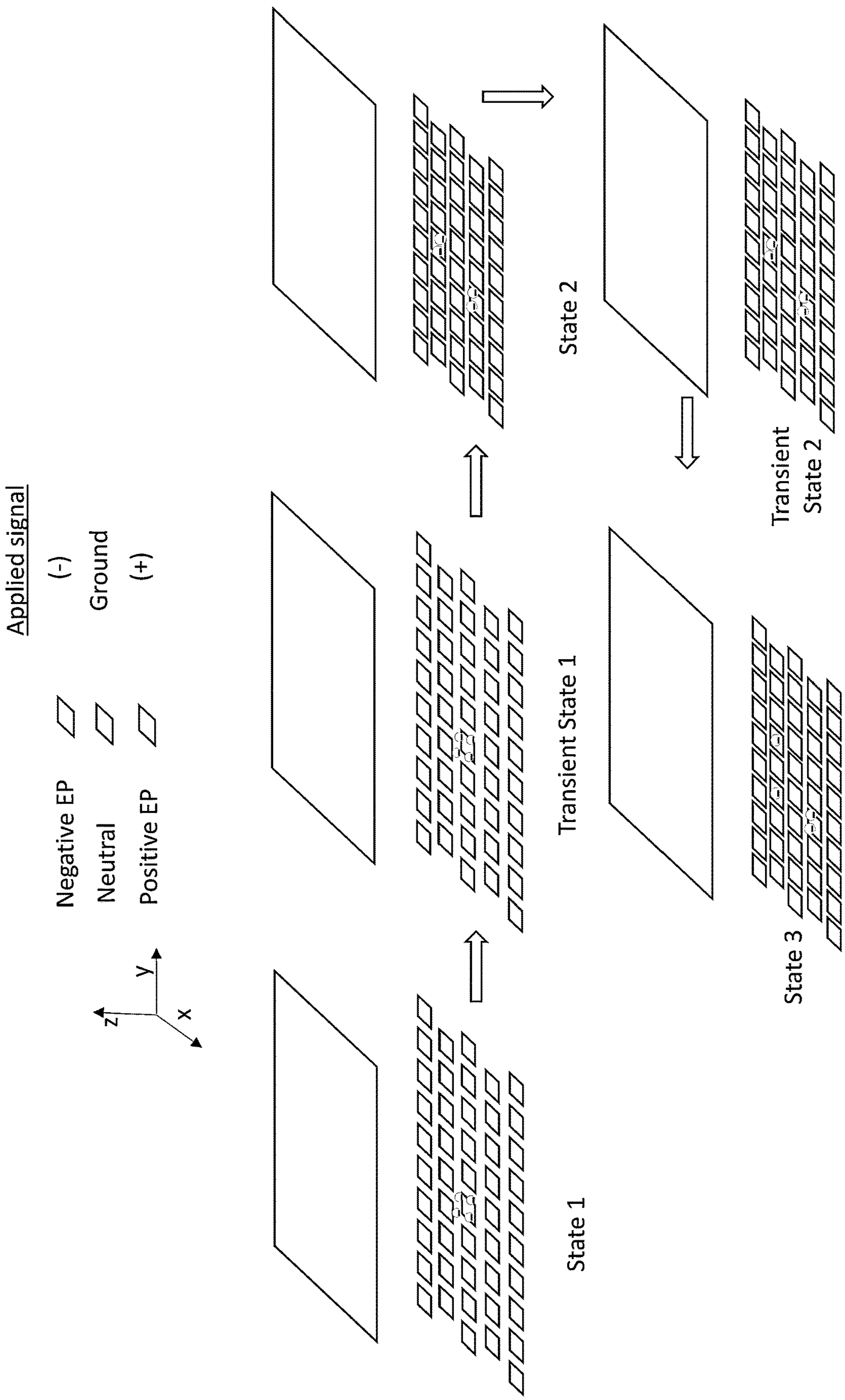
FIG. 12J shows electrically controlled confinement to isolate one population of particles or molecules and electrically directed motion to divide a population of particles or molecules into spatially unique subpopulations using a planar hexagonal array, electrophoretic confinement, a rooftop electrode, and transient states.
Figure 12K:
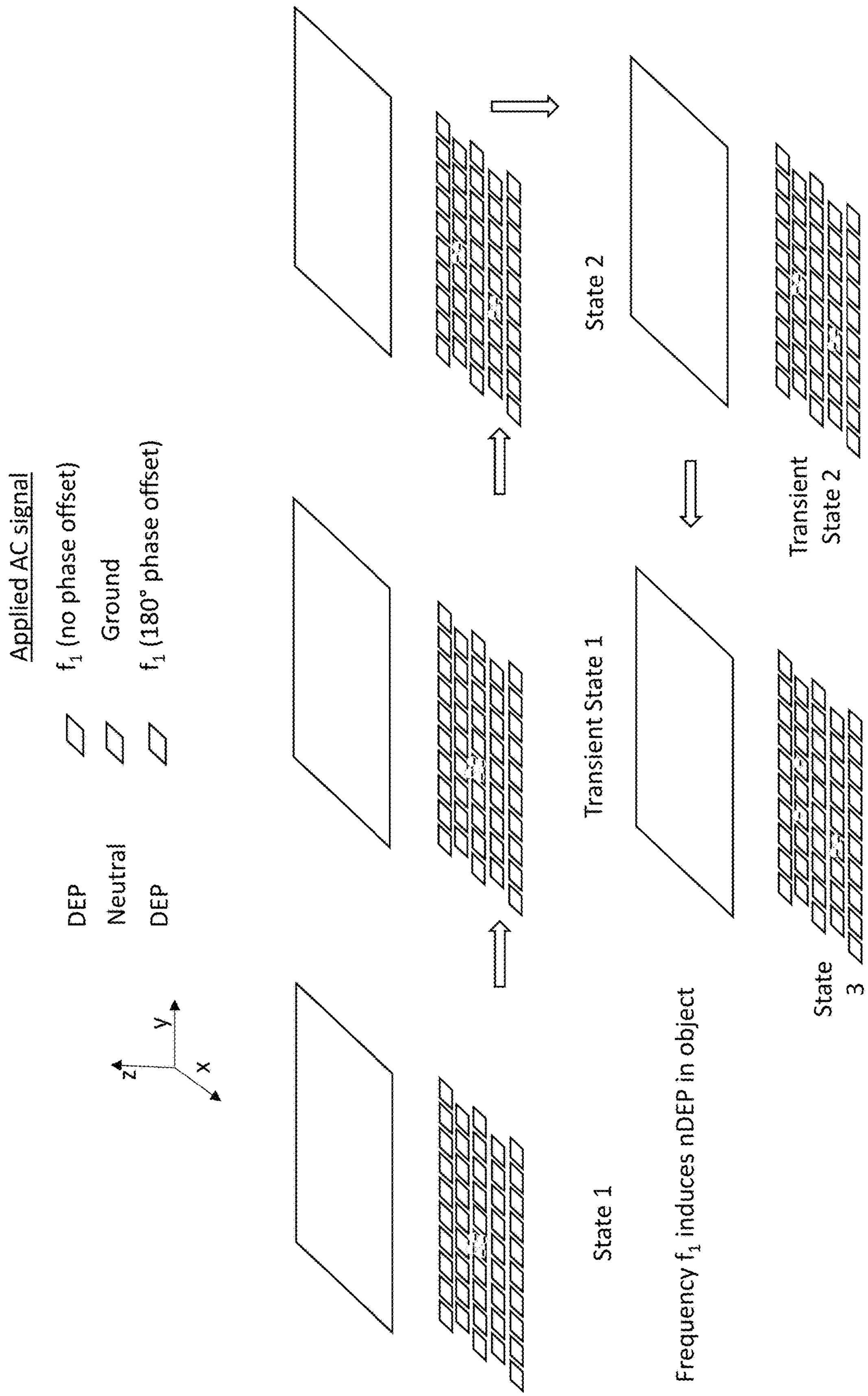
FIG. 12K shows electrically controlled confinement to isolate one population of particles or molecules and electrically directed motion to divide a population of particles or molecules into spatially unique subpopulations using a planar hexagonal array, negative dielectrophoretic confinement, a rooftop electrode, and transient states.

Electrically directed motion can be implemented to divide a population of particles or molecules into two or more subpopulations at distinct locations in the microelectrode array. FIG. 12J illustrates a population of four particles or molecules under EP confinement at an electrically defined zone created by electrodes in a hexagonal array and a rooftop electrode. The electrically defined zone expands in Transient State 1 before splitting into two spatially distinct electrically defined zones in State 2. Due to the symmetry of the transient zone in the hexagonal array, the initial particle population is divided such that two particles or molecules are held under EP confinement at each zone in State 2. Transient State 2 depicts expansion of one of the two electrically defined zones. State 3 shows the splitting of the expanded transient zone into two distinct zones, each of which containing one particle, as well as one zone that contains two particles or molecules. FIG. 12K depicts a similar process of particle population splitting using electrically defined zones operating under nDEP confinement. Other embodiments may reverse States 1 through 3 such that displacement of multiple spatially distinct confinement zones merges multiple particle populations into one. Another embodiment may see the joining of diverse particle populations into one homogenous population through mixing, prior to the dissemination the homogenous population to distinct zones under electrically controlled confinement.

Figure 12L:
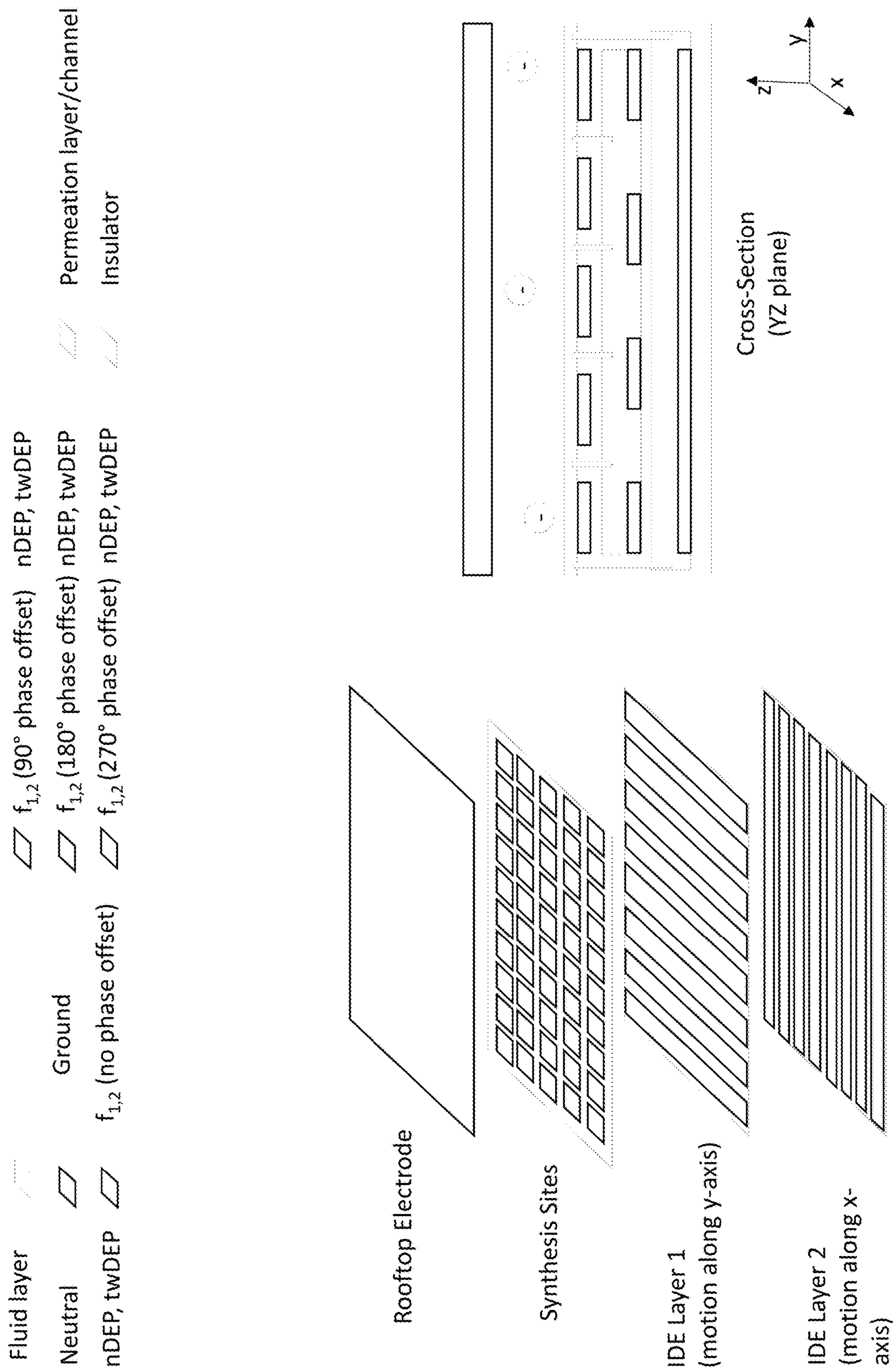
FIG. 12L shows a rooftop electrode as well as two interdigitated electrode arrays embedded in fluid layers beneath an electrode array for travelling-wave dielectrophoresis of particles or molecules suspended in a fluid layer.
Figure 12M:
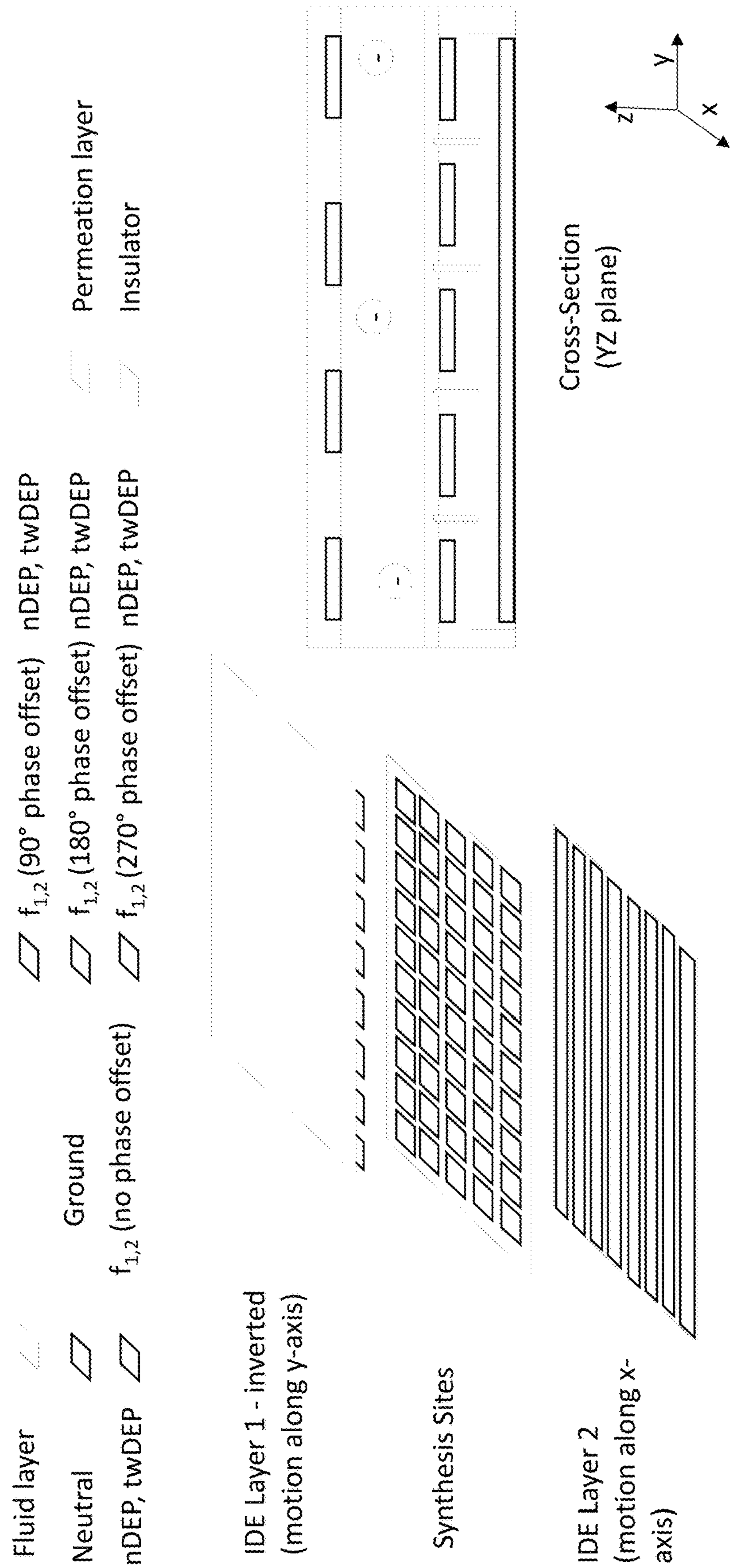
FIG. 12M shows an interdigitated electrode array embedded in a fluid layer beneath an electrode array and an inverted rooftop interdigitated electrode array for planar travelling-wave dielectrophoresis of particles or molecules suspended in a fluid layer.

Multiple electrode layers may be patterned in a single chip architecture to achieve oligonucleotide synthesis and electrically directed motion. FIG. 12L shows a preferred embodiment in which two interdigitated electrode arrays are embedded in separate fluid layers beneath a microelectrode array. The permeation layer on top of the microelectrode array is patterned to form conduction channels between the primary fluid layer and secondary fluid layers at each embedded interdigitated electrode array. In conjunction with the rooftop electrode, the orthogonal embedded interdigitated arrays induce electrically directed motion of particles or molecules in the primary fluid layer after oligonucleotide syntheses at the microelectrode array. FIG. 12M depicts a variation of the previous embodiment in which one of the two interdigitated electrode arrays is inverted and replaces the rooftop electrode. The permeation layer provides conduction channels from the primary fluid layer to the secondary fluid layer for the embedded interdigitated electrode array.

Figure 12N:
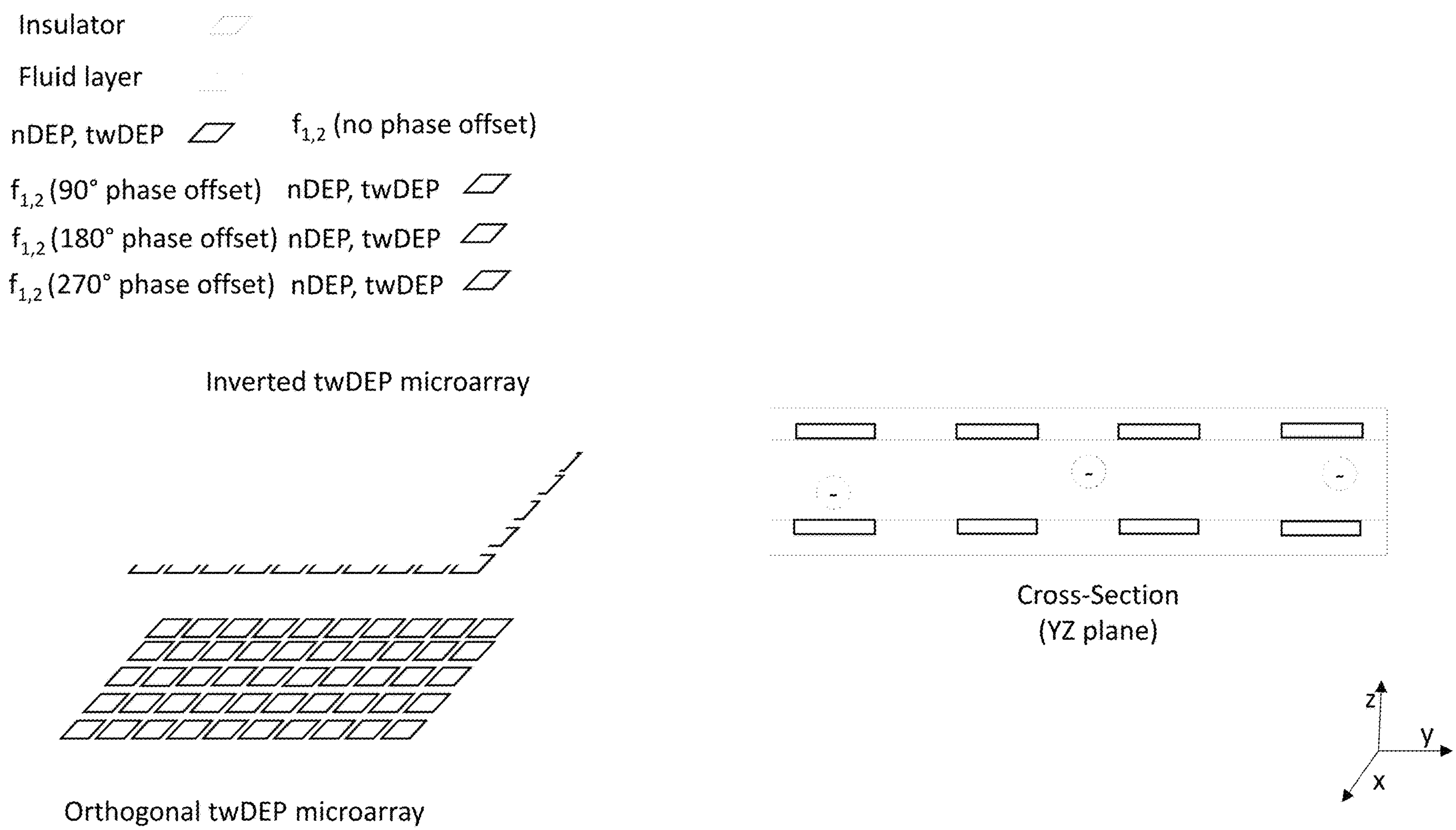
FIG. 12N shows an inverted four-phase travelling-wave dielectrophoresis rooftop microarray and an orthogonal four-phase travelling-wave dielectrophoresis microarray used for planar motion of particles or molecules in a fluid layer.

FIG. 12N illustrates another related embodiment in which the microelectrode array that synthesizes oligonucleotides is used in conjunction with an inverted rooftop electrode array to induce electrically directed motion in a fluid layer. Static patterns or dynamic sequences may be applied to each array either simultaneously or sequentially to generate electrically controlled confinement and/or electrically directed motion. This embodiment shows static four-phase patterns applied to columns in the bottom array and to rows in the top, inverted microarray. Electrically directed particle motion along the positive x-direction can be induced by application of electrical signals at the rooftop electrode. The bottom electrode is responsible for particle motion in the positive y-direction. Particle motion in the x- or y-direction may be reversed by application of a frequency that induces contra-field twDEP to the respective microelectrode array. Particle motion may also be reversed by altering the electrically defined zone(s) in such a way as to change the direction of the phase gradient.

Top Layer Chip Design

Figure 1:
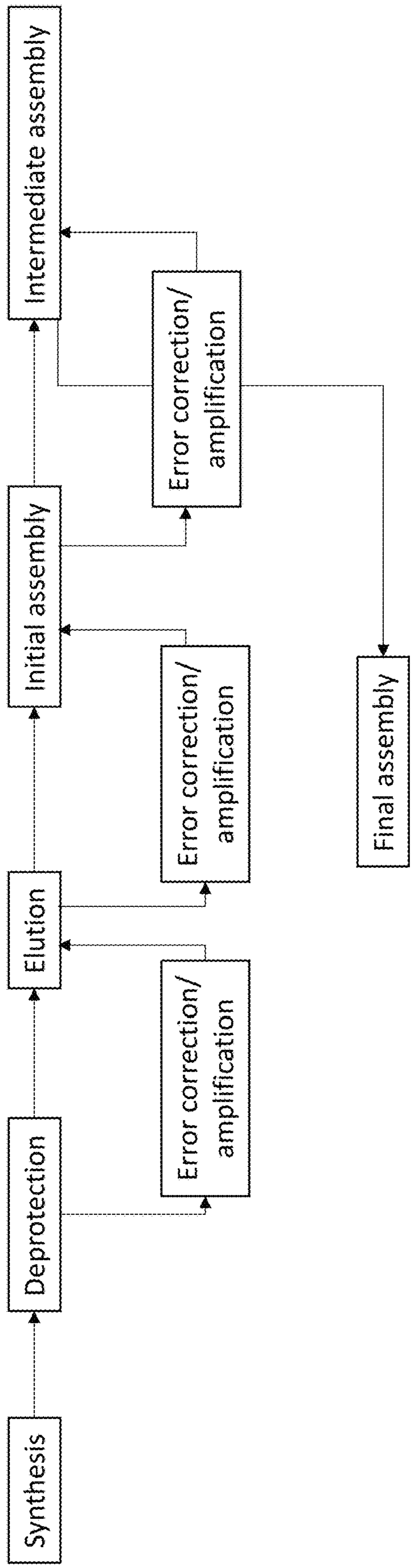
FIG. 1 shows an overview of DNA synthesis and assembly workflow.
Figure 16:
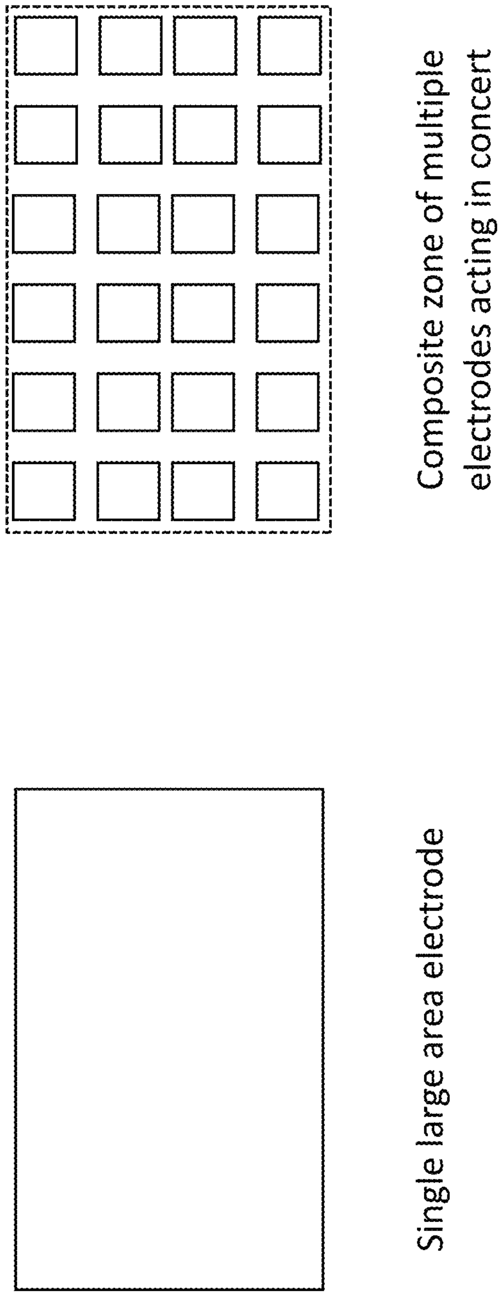
FIG. 16 shows utilizing multiple electrodes in concert.

The chip is organized so that each process of the assembly workflow, as depicted in FIG. 1, is conducted within electrically defined zones on the chip. Some regions of the chip surface area may be designated for oligonucleotide synthesis while others may be designed for the enzymatic assembly of those fragments. Further, some regions of the chip may be designated for steps of error correction and amplification as needed, as well as higher order assemblies. Each of these regions may be comprised of multiple electrically addressable sites, the characteristics of which may vary depending upon the process. A single chip may be comprised of electrodes intended for oligonucleotide synthesis, various assembly reactions, amplification processes, monitoring pixels, sacrificial features, and error correction reactions in various arrangements. Other types of electrodes that serve organization purposes may be included, such as those used to aid in material transit between the aforementioned zones, 'landing pads' which act as temporary collection sites, or zoning which is used as an electrical barrier to molecular transit between different zones. Any of these functionalities may be embodied as 'composites' or sub-arrays of multiple electrodes acting in concert (FIG. 16). It may be understood by those skilled in the art that specific chip design may vary significantly with the final application, and disclosure of particular designs is not intended to be limiting. The construct size, number of constructs, required fidelity, number and precise nature of expected error correction steps, available chip area, and desired scale all may impact the optimal electrode areas, configurations, arrangement, and surface chemistries employed. There are nonetheless several design principles and technical considerations that impose restraints on the chip architecture.

Figure 17:
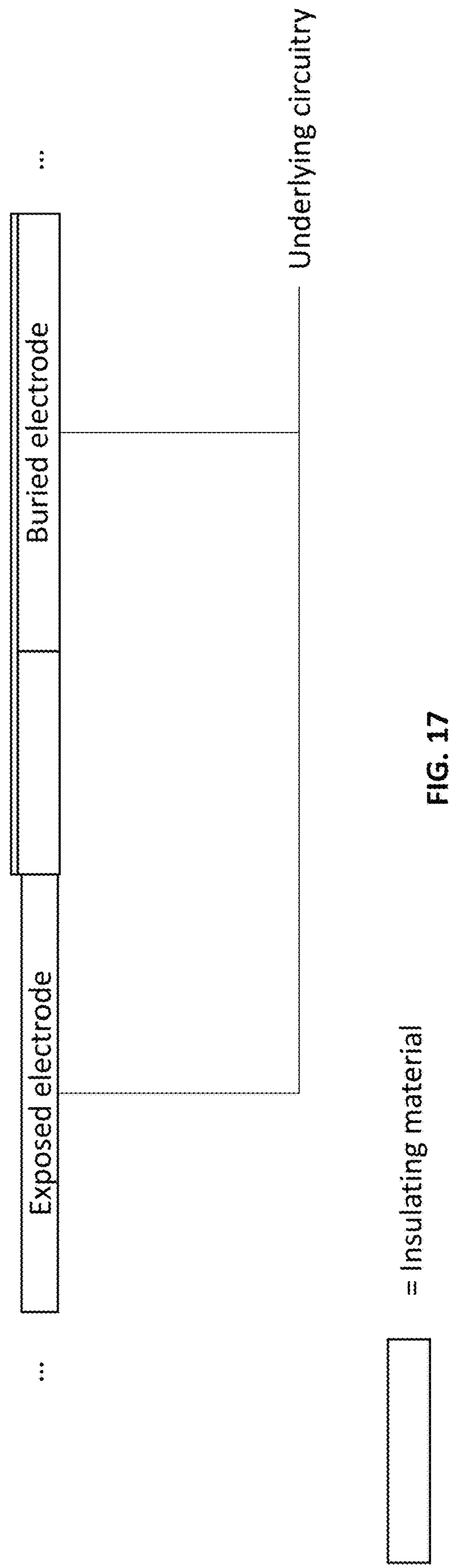
FIG. 17 shows buried and exposed electrodes.
Figure 18:
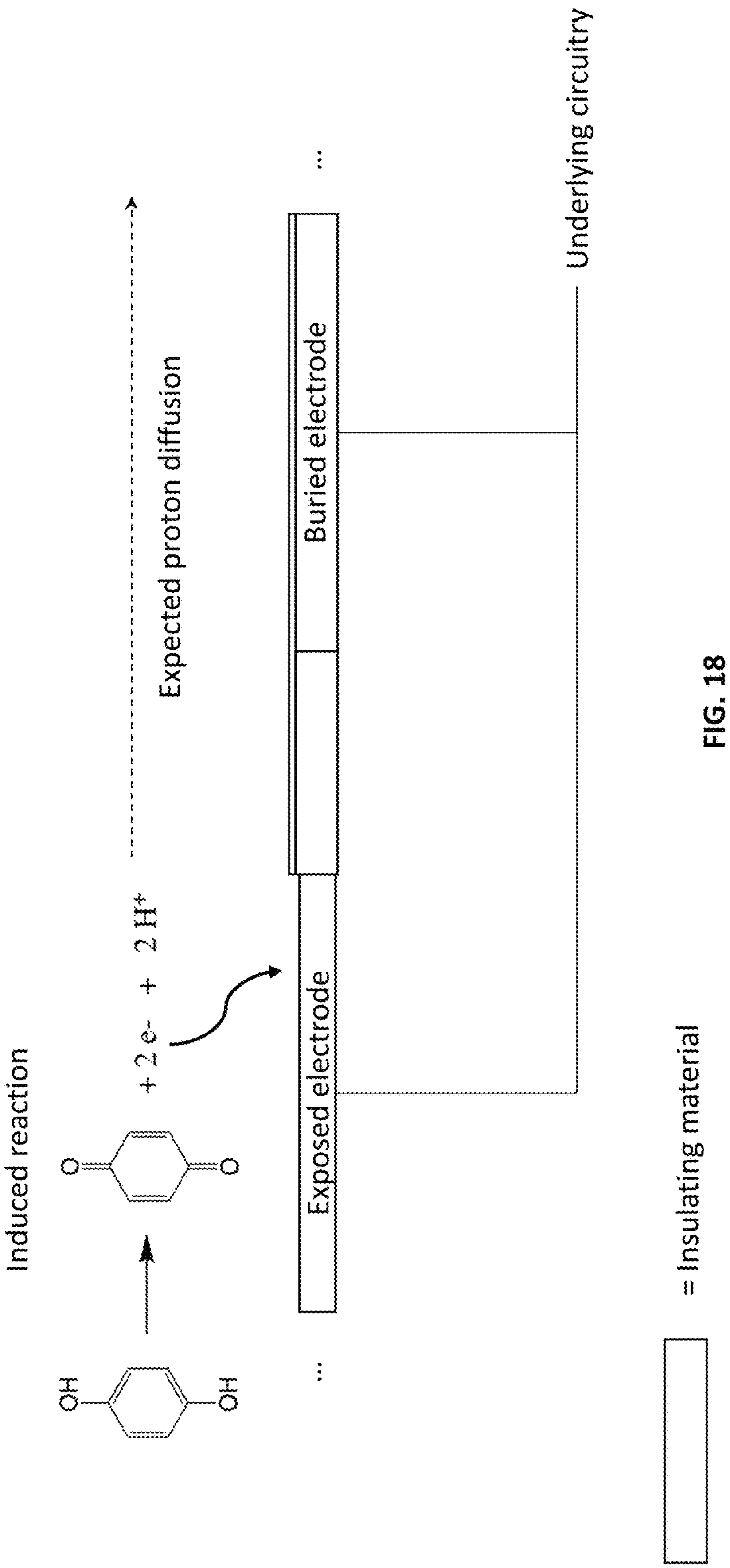
FIG. 18 illustrates where an exposed electrode is a close neighbor of a buried electrode, and products generated at the site of the exposed electrode may diffuse over the region overlaying the buried electrode.

One crucial distinction is whether an electrically addressable feature needs to be exposed to the solution or may instead be buried or encapsulated underneath some other layer. Exposed, or partially exposed, electrodes are needed to induce a specific oxidation or reduction reaction or conduct various monitoring operations, while buried electrodes may be used where only a local electric field is required (FIG. 17). Electrodes may be buried under passivation layers formed from materials including, but not limited to, aluminum oxide, halfnium oxide, and/or silicon oxide. Electrode may also be buried under permeation layers formed from materials including, but not limited to, agarose, poly-HEMA, parylene, polyacrylamide, or other hydrogels. Any site where a specific oligonucleotide is needed for assembly, either as a synthesis product, enrichment probe, or as an anchor strand, requires a local electrode that is at least partially exposed. Buried electrodes by contrast may be used for many of the organizational structures such as for transit, zoning, or landing pads. An advantage of using a buried electrode is that it enables a diverse surface functionalization beyond what can be grafted to the desired electrode materials. In preferred embodiments the buried electrodes are layered beneath a region of $SiO_2$ such that it may be treated with known silanization processes. While many silanization processes are suitable for the derivatization of $SiO_2$ regions, some embodiments may omit silanization if there is a sufficient population of free hydroxyls available within the desired oxide region. The lability of the resultant oligonucleotide-P—O—Si-substrate bond is enabling for workflows where it is desirable to remove the sequences from the chip in suitably alkaline conditions without the use of a dedicated linker. In related embodiments, silanization may be conducted with agents that result in a linkage to the substrate of the form: oligonucleotide-P—[X]—Si—O-substrate, where X denotes a group capable of undergoing coupling to a phosphoramidite and suitably inert spacer chain. Appropriate silanization agents may include N-(2-aminoethyl)-3-aminoisobutyldimethylmethoxysilane and, N-(2-aminoethyl)-2,2,4-trimethyl-1-aza-2-silacyclopentane and may generally be understood to encompass the class of cyclic azasilanes, as well as monoethoxy, and monomethoxy silane derivatives bearing a reactive group capable of undergoing coupling with a phosphoramidite. These categories have the advantage of similar lability to an unsilanized surface at the Si—O-substrate bond, but with an additional layer of spacing, low propensity to form undefined polymer layers over the chip and thus increased specificity, as well as preserving the shelf life of the chips from the initial point of processing. In some instances, there may be a degree of spatial overlap between the region addressed by a buried electrode and the addressable region a neighboring exposed electrode. This concept is depicted in FIG. 18 which illustrates the case where an exposed electrode neighbors a buried electrode, and the exposed electrode induces a reaction whose spatial effect is of a radius greater than the distance between the electrode pair. This enables a level of in situ control over derivatization steps, enabling, for example, the attachment of polyethylene glycol phosphoramidites to aid in passivation of assembly zones or to impart a degree of spacing between a functional group and the surface.

Figure 19:
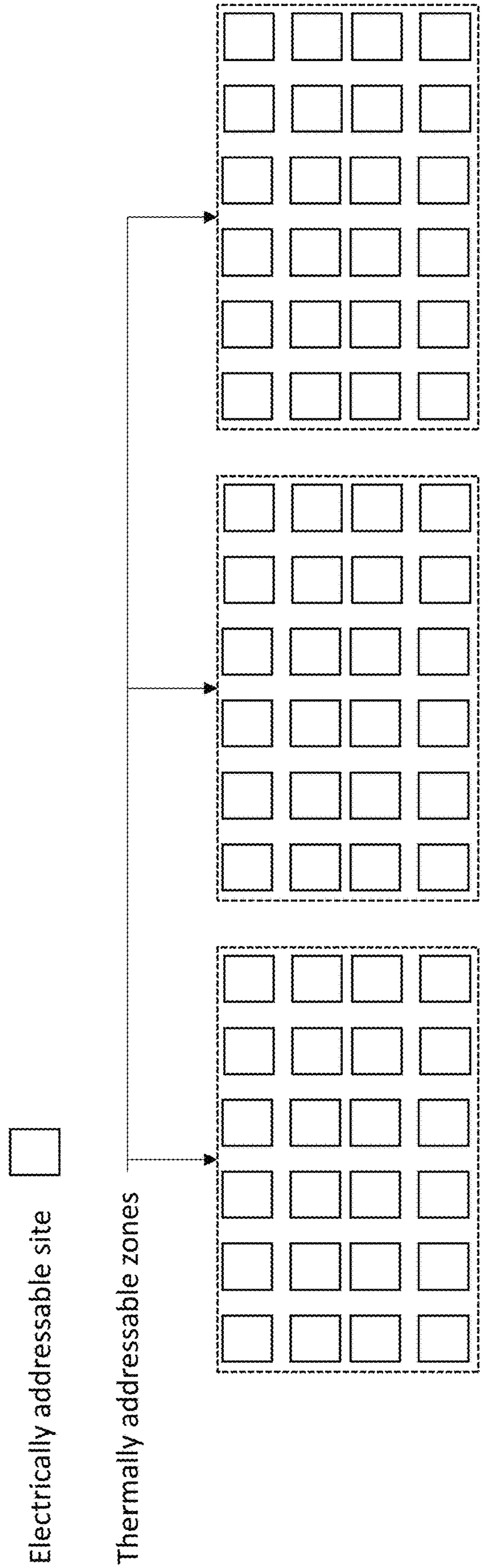
FIG. 19 shows thermally addressable sites of larger size than the electrically addressable sites.

Another architectural consideration is the need for localized temperature control and monitoring circuitry. Global temperature control functions may be sufficient in chip designs where the assembly steps are conducted in different sites in parallel and no degree of custom addressability is needed. The footprint of discrete temperature zones is generally understood to be larger than that of the smallest electronically addressable sites. In embodiments where temperature addressability is desirable, the chip design may be such that sites of certain functionalities are clustered into temperature addressable zones in such a way as they may contain multiple electrically addressable sites, as shown in FIG. 19. Such zones are generally useful at sites where enzymatic reactions occur, though as described below there may be some benefits to exerting temperature control over certain steps of the phosphoramidite synthesis. Some embodiments may also use monitoring circuits, such as those capable of registering pH changes, current, or conducting electronic impedance spectroscopy measurements. As with temperature control, these are preferentially employed for certain steps of the assembly where binding of charged molecules is easily registered but are useful in some embodiments for monitoring steps of chemistry or simply as checks of electrode function and quality control.

Figure 20:
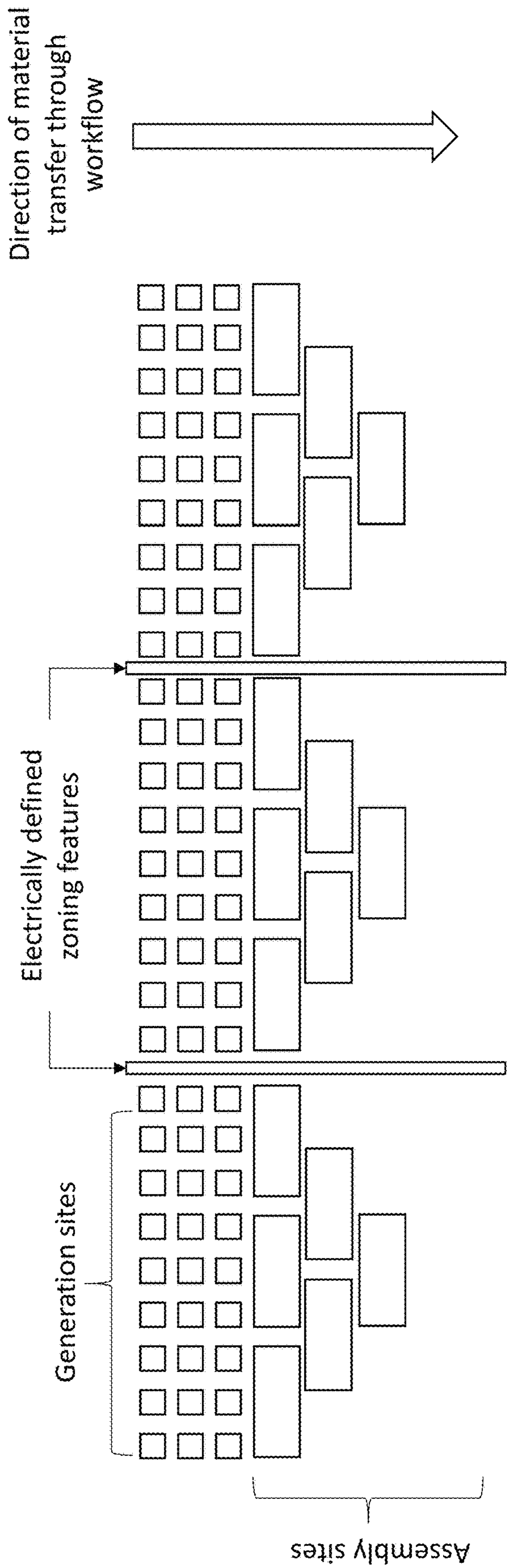
FIG. 20 illustrates a hierarchical organization of sites for on-chip assembly.
Figure 21A:
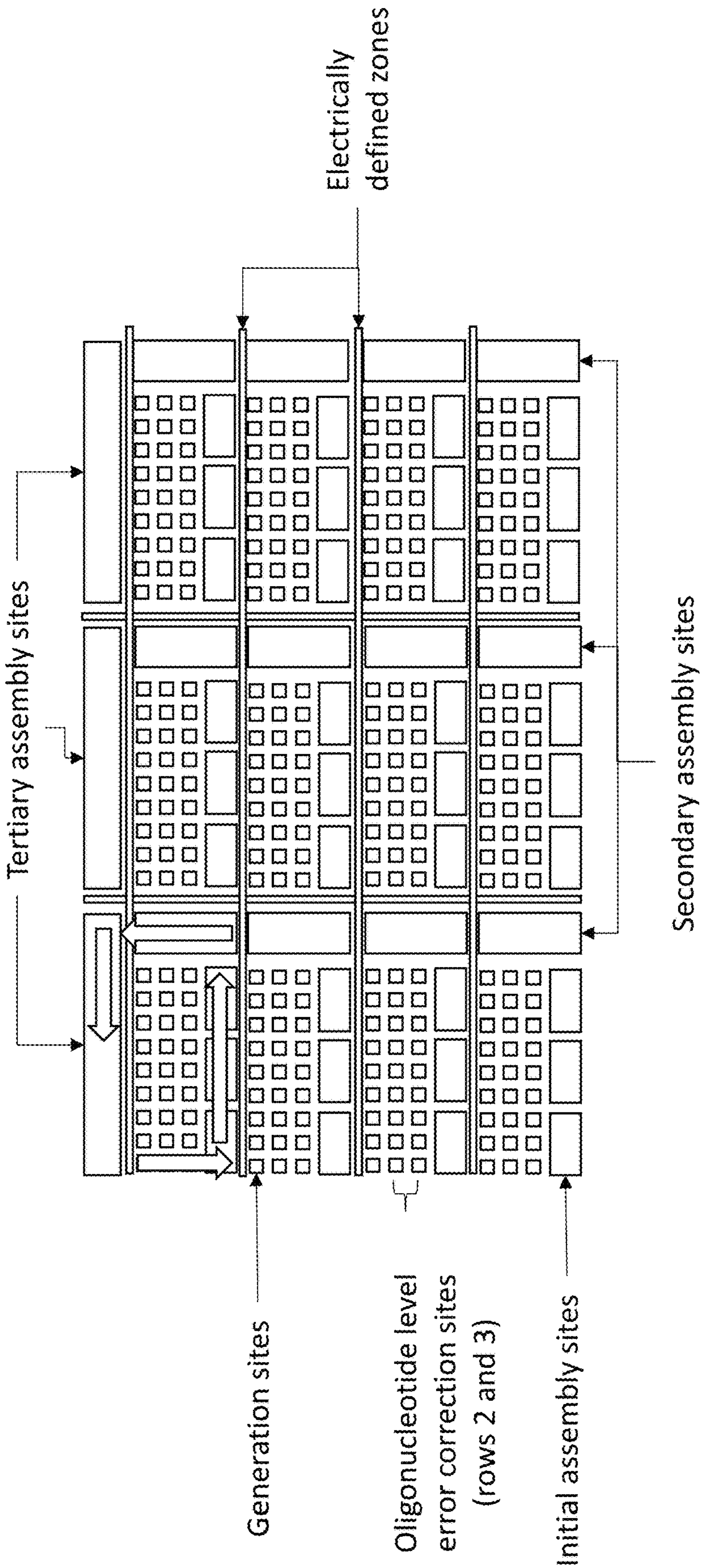
FIG. 21A illustrates a zoned organization of sites of on-chip assembly.

The assembly process is fundamentally convergent in nature, so at the highest level of site organization the chip features are arranged to reflect efficient ways of the joining of many disparate fragments into a larger whole. A consequence is that the preferred areal footprint of each oligonucleotide synthesis site is generally less than that of an assembly site. This reflects the need for a far greater number of synthesis sites, but also that, as the construct size grows, the steric requirements for each molecule increase. The oligonucleotides are of a length where surface-area enhancing features at the generation sites, such as protrusions and pillars, wells, or porous matrices may be used. These constructions may limit the copy number of larger molecules, so the assembly sites must achieve a suitable loading on a planar surface by compensating with a larger footprint. A further consideration is that the distance a strand traverses when it moves between sites should be minimal to avoid incorrect placement or misassembly. This implies that the sites on a surface are preferably organized so that sequence information or material proceeds through a series of sites that are adjacent or nearly adjacent to their target destination throughout each of the required steps. In some embodiments the features are arranged in a hierarchical manner, as shown in FIG. 20, which shows one conceivable arrangement of generation sites, where the majority of the oligonucleotide synthesis is conducted, and downstream assembly sites, where the enzymatic reactions are conducted. FIG. 21A shows an alternative approach where the chip is divided into zones, each one of which exhibits its own internal organization, which may be constant across different zones or varied depending. In this case, the zone consists of oligonucleotide generation sites, sites for oligonucleotide-level error correction, assembly, reamplification, and various landing pads separated by elements of zoning. Arrows denote the intended transit of sequence information from region to region within the zone to form the final assembly, which may optionally be combined with material from other zones at a higher level of chip organization. The molecular processes which may be performed at each site is described in further detail below. It is generally understood that there may be many ways of production of such chips and precise configurations of underlying circuitry that are obvious to those skilled in the art.

Figure 21B:
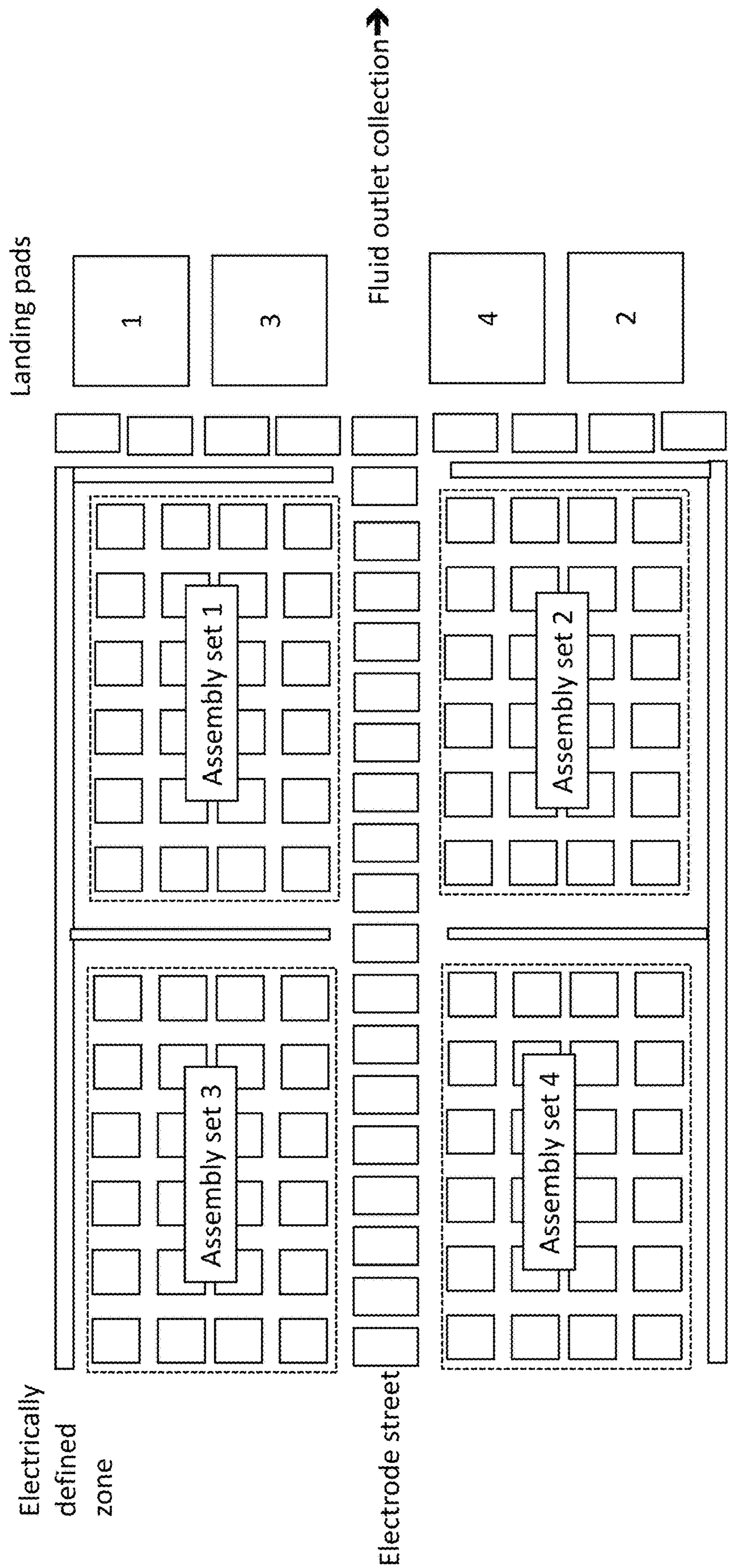
FIG. 21B illustrates a street of individually addressable electrodes which can be used as an egress route from lower-level assembly sites.
Figure 21C:
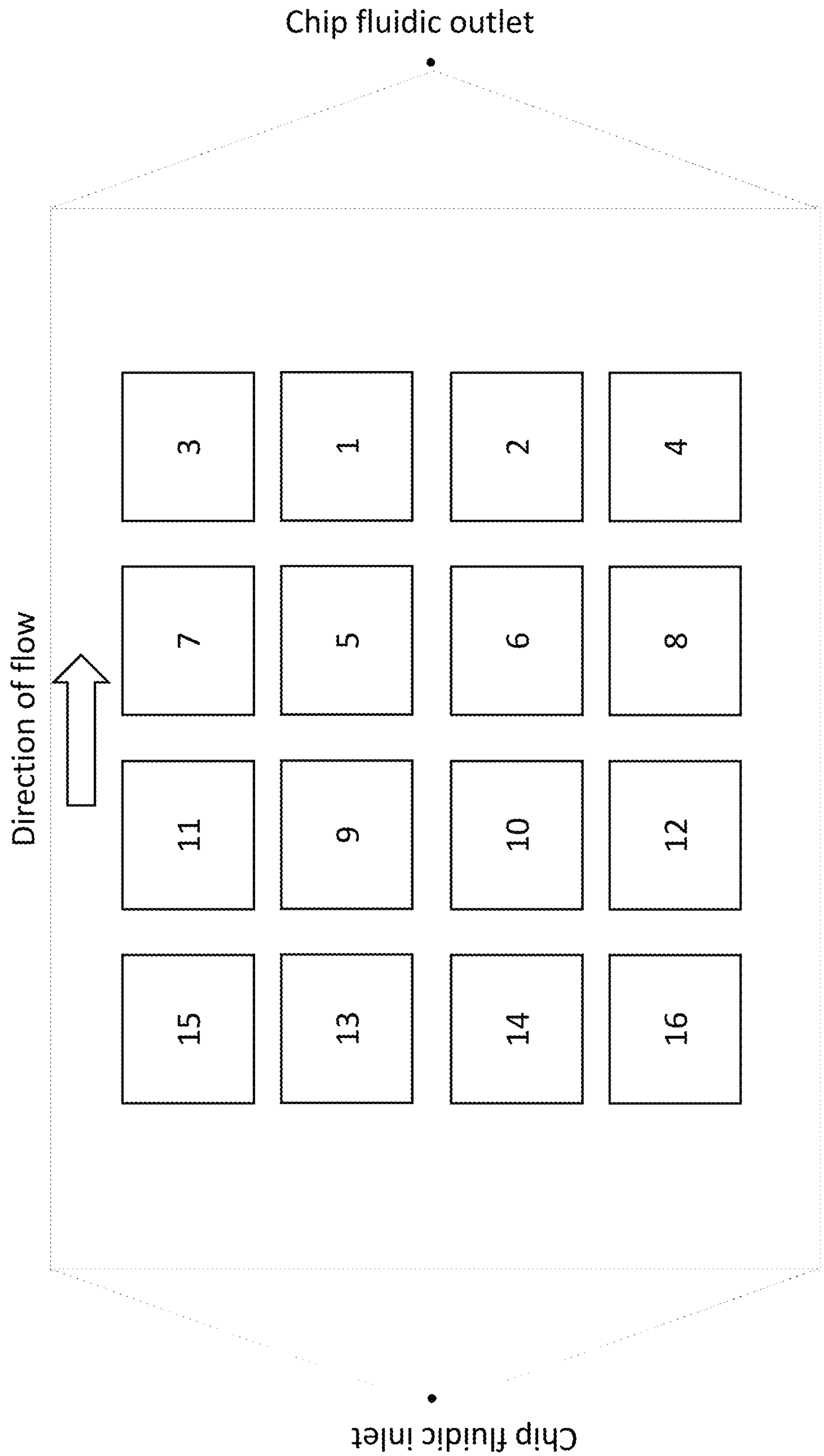
FIG. 21C illustrates an ordered set of sequences for the electrically controlled release of material off chip.

In some embodiments it may be necessary to transport material through electrically directed motion a relatively large distance over the chip, for example in transferring a number of independent constructs to a different chip. FIG. 21B illustrates the concept of a street of individually addressable electrodes which can be used as an egress route from lower-level assembly sites. In one embodiment, material is transported from one end of the road to the other using a rolling wave of activated electrodes, like the concept of guide masks described in FIG. 12A, thus dividing the transportation process into a series of individual steps which occur over short distances. FIG. 21B also illustrates the concept that, for a given geometry of electrodes, there may be preferred order of operations for various transfer processes. Depicted at the ends of the roads are landing pads for each of the constructs from the assembly sites, which are numbered according to the order of their preferred population. The sequence(s) from assembly set 1 are moved onto the road, then transferred to landing pad 1, the sequences from assembly set 2 are then moved onto the road and transported to landing pad 2, and so on until all the assembly sets have been moved to their corresponding landing pads. This order minimizes the transit of material adjacent to any electrodes which may be actively retaining material and reduces risk of mis-localization, while reusing the road electrodes for multiple operations. FIG. 21C further illustrates that there may be preferred sequences for the release of electrically attracted material off the chip. Depicted is a 4×4 grid of landing pads, numbered in the preferred order of elution. The preferred order is determined by the orientation of each site relative to the direction of fluid movement during transfer and is again selected to minimize the transit of released material through other regions where active voltage application is retaining material against the flow. If constructs at site are released prior to those at site 11, there may be substantial risk of capturing and inadvertently pooling the site 15 and 11 products. The general principle is that material closest to the outlet is released first. In this configuration, the release occurs right to left by column, and within each column the inner landing pads (second and third rows from top) precede release from the external landing pads (top and bottom rows), though various configurations may be preferred based upon precise electrode arrangement, the nature of the flow cell, and the downstream processes.

Oligonucleotide Synthesis

In one embodiment of this disclosure, methods and devices where a single chip may perform both primary oligonucleotide synthesis and the secondary assembly of the oligonucleotides into larger DNA constructs are described. In principle, any DNA synthesis method that can be implemented with a semiconductor device may be appropriate and considered within the scope of this disclosure, including phosphoramidite, phosphonate, or enzymatic synthesis approaches. For the sake of simplicity, many of the subsequent concepts are described in terms of phosphoramidite-based DNA synthesis, though this is not intended to be limiting. A more detailed treatment of the electrochemical phosphoramidite synthesis techniques has been disclosed in PCT/US22/18189, which is incorporated in its entirety by reference.

Edge Refinement Strategies

Figure 22:
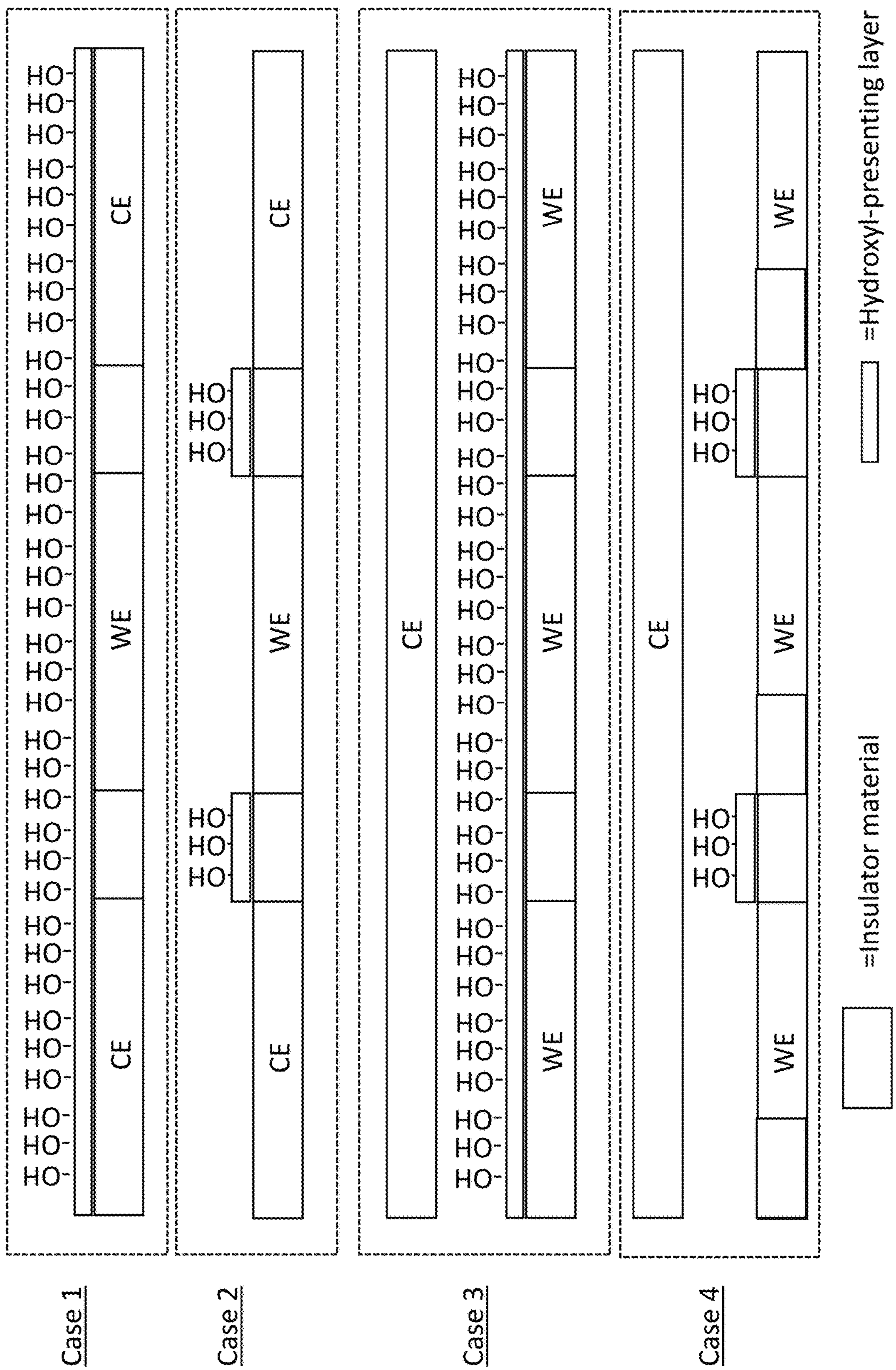
FIG. 22 illustrates several possible arrangements of electrodes and synthesis sites.

In preferred embodiments, the first few cycles of electrochemical synthesis will be initiated with a series of steps to refine the location of the synthesis site. Some combinations of surface derivatization and the aforementioned electrode geometries may give rise to zones of lower sequence quality. These may result from either inadvertent dimethoxytrityl (DMT) removal or inadequate DMT removal, both scenarios not addressable through existing capping chemistries. Though many conceivable electrode geometries may be used, four illustrative configurations are provided in FIG. 22. In Cases 1 and 2, the working and counter electrodes are both present on the same chip surface and are separated by intervening regions of insulating material such as $SiO_2$. In Case 1, the entire surface is rendered reactive towards phosphoramidite synthesis, whereas in Case 2 the intended synthesis sites are present only over the insulating material. In Case 3, only the working electrodes are present on the chip surface, and the counter electrode is instead located on a ceiling which forms the opposing face of a flow cell. As before, the electrodes may be separated at the topmost layer by an insulating material such as $SiO_2$. In Case 3, the desired synthesis sites are located over the entirety of the surface, while in Case 4, the synthesis sites are located only between the working electrodes.

Figure 23:
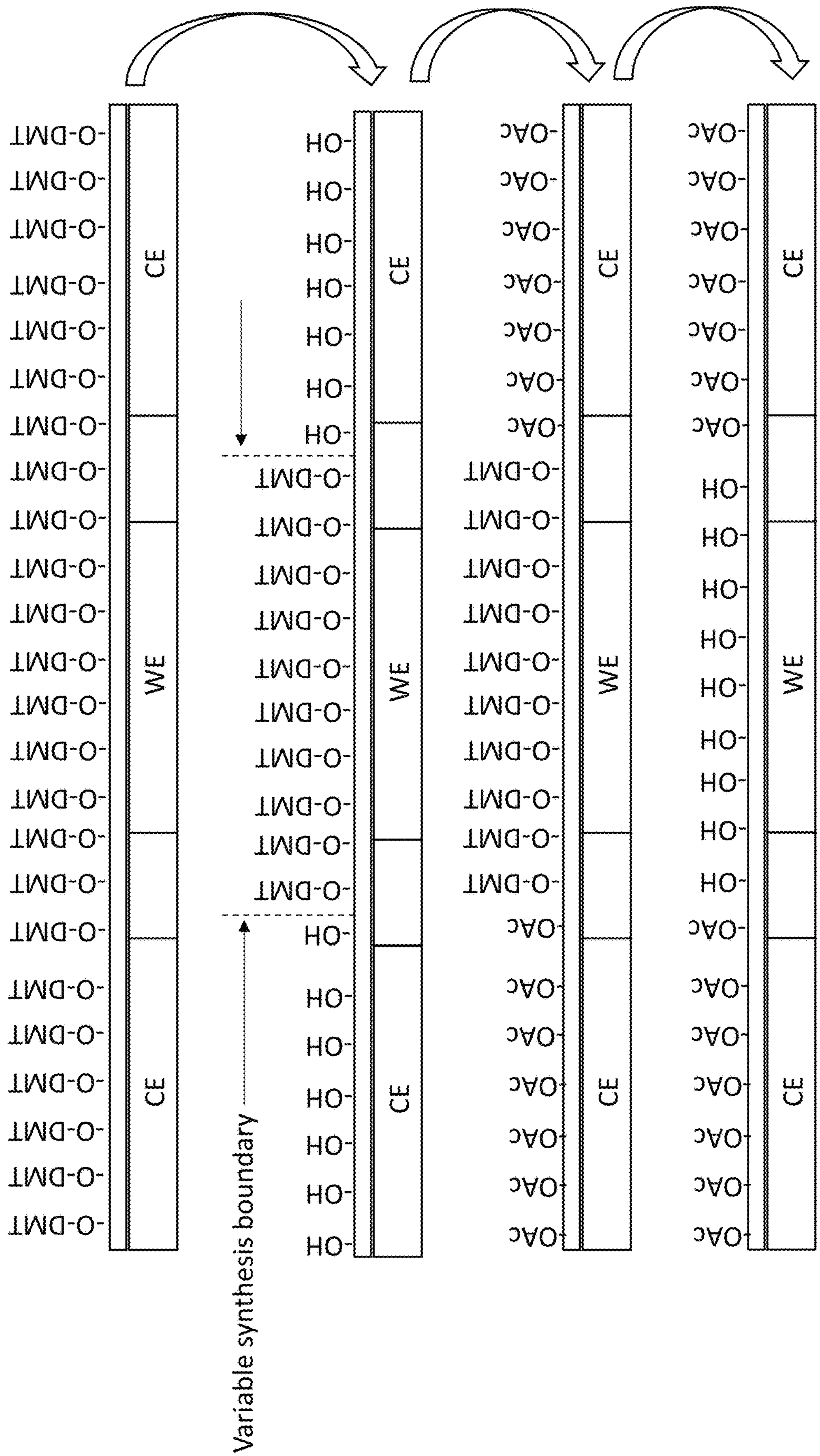
FIG. 23 shows refining the synthesis zone by capping.

In Case 1 and 2, the problematic zone is located immediately adjacent to the counter electrode. DMT removal may be less effective in this area depending upon the relative reaction rates between the working and counter electrode and degree of proton confinement. One strategy for mitigating this is depicted in FIG. 23. Here, the potential is reversed at an early step of the synthesis so that the DMT removal occurs preferentially over the counter electrode. The conditions of this deprotection step define the approximate boundary of DMT removal, which can generally be described as impinging towards that working electrode with increasing time. After the first step of DMT removal, the newly exposed hydroxyls may acetylated so that they are unreactive to further synthesis. Then the DMT group defining the synthesis region is removed so that the synthesis may proceed. While capping of the exposed hydroxyls is one of the most direct ways of rendering them unreactive, many other species may be substituted to a similar effect. In some embodiments a cleavable linker may be installed after the DMT removal over the counter electrode, the only restriction being that the removal conditions are distinct from those used for the sequences in the intended synthesis site, thus allowing the undesired sequences to be discarded after synthesis.

Figure 24A:
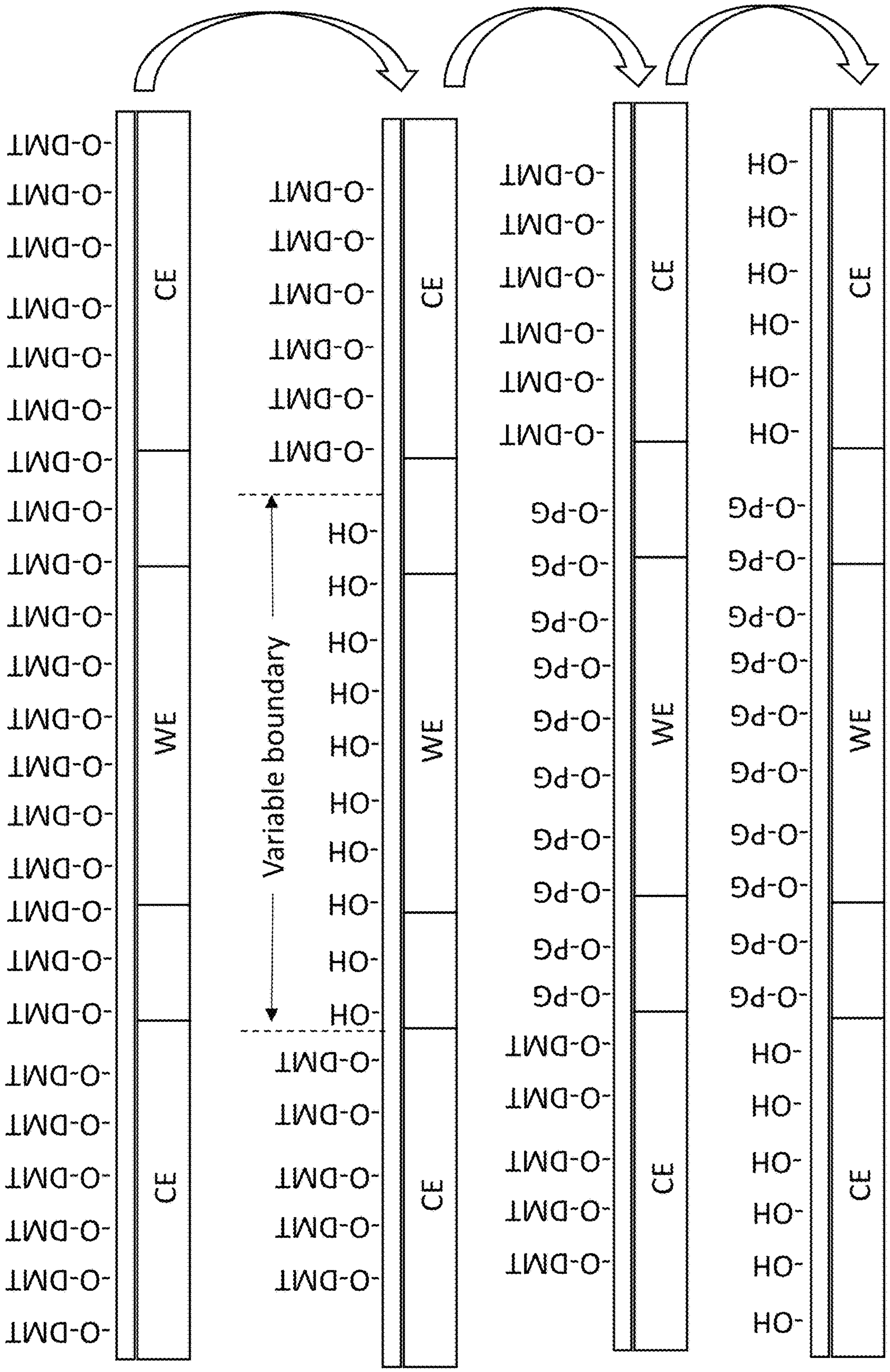
FIGS. 24A and 24B show refining the synthesis zone by using differentially reactive protecting groups.
Figure 24B:
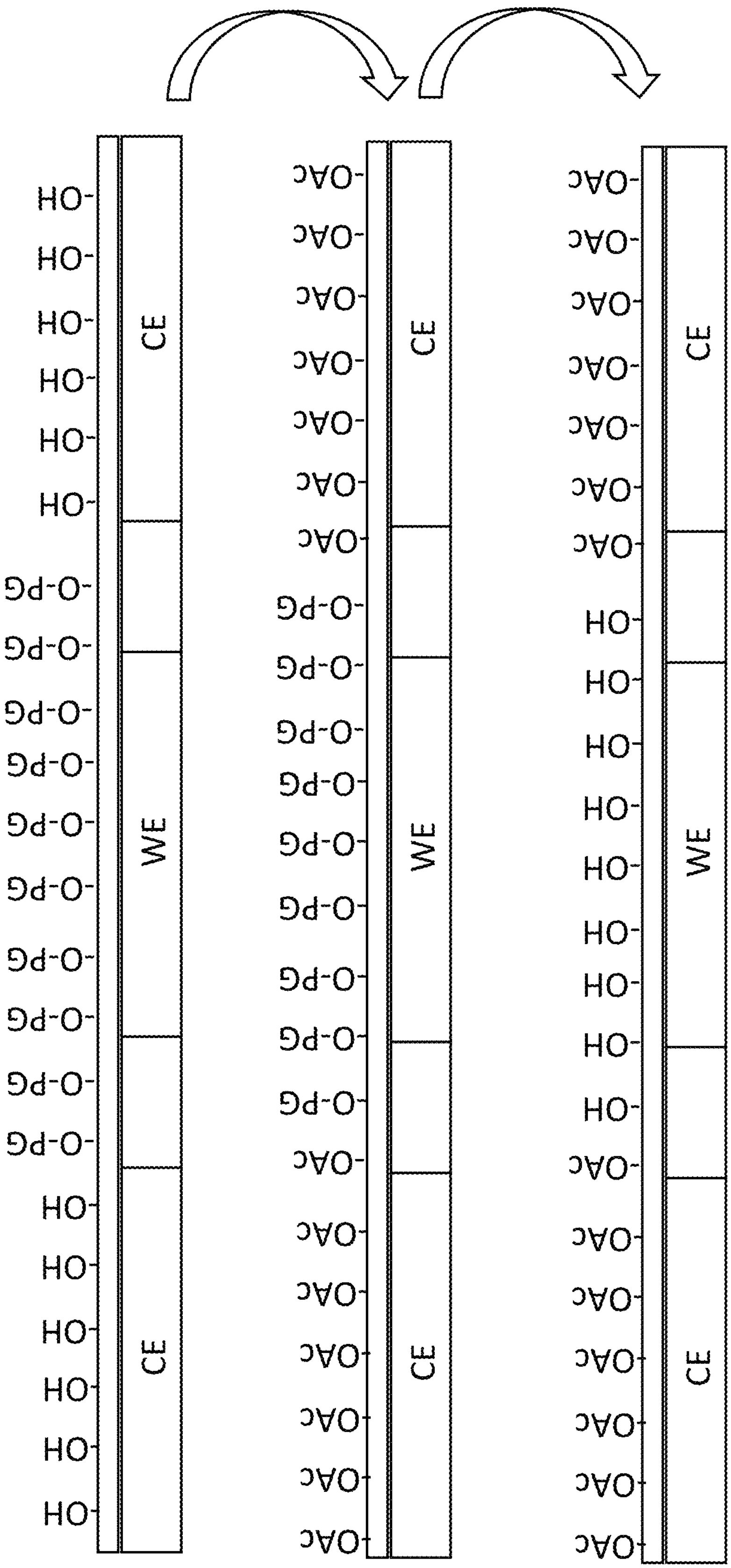

In another process, the definition of the synthesis site is driven by the working electrode. FIGS. 24A-24B illustrate this approach. Here, a deprotection step is performed at the working electrode, with the precise conditions being selected to define the desired boundary of DMT removal. A phosphoramidite or other species containing a distinct protecting group is then coupled to those exposed hydroxyls. The only restriction is that the group is less acid labile than a 5'-DMT, with preference for photolabile or reductively labile species, though some acid labile groups such as MNIT may be used also. After coupling, a global DMT removal step is conducted so that all other locations exhibit exposed hydroxyls which can then be acetylated. As before, a differentially cleavable linker may also be used in place of acetylation. The protecting group defining the synthesis region is then removed so that the process may proceed.

Figure 25:
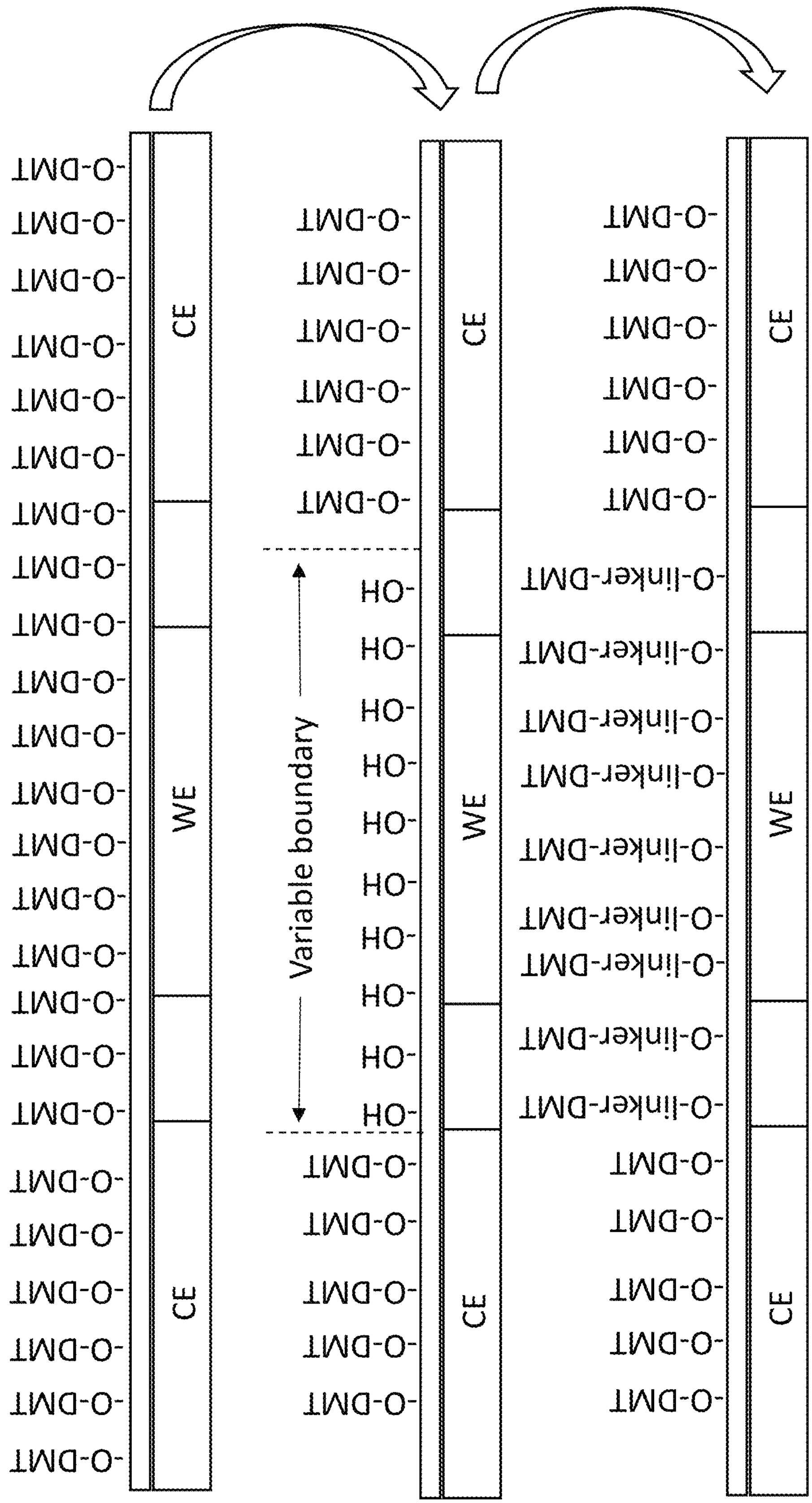
FIG. 25 shows refining the synthesis zone by selective installation of a cleavable linker.

An inverted pattern of selective linker installation can also be similarly effective. FIG. 25 shows an outline of this process, where the definition of synthesis site is driven by the working electrode an early step of DMT removal. A cleavable linker is then coupled to the resultant hydroxyls so that only the sequences built atop that linker may be released from the surface for downstream processing.

Figure 26A:
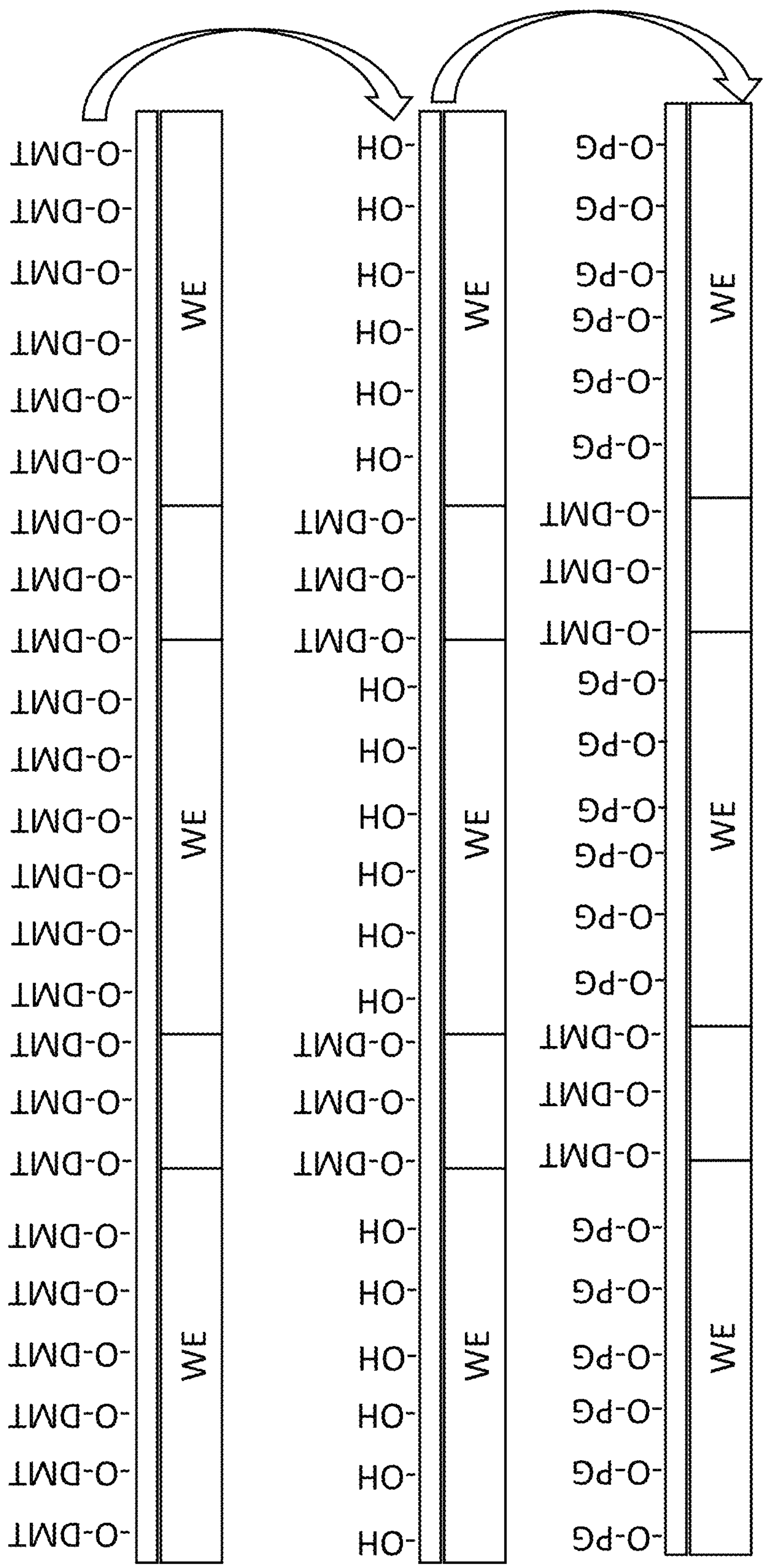
FIGS. 26A and 26B show another case of refining the synthesis zone by using differentially reactive protecting groups.
Figure 26B:
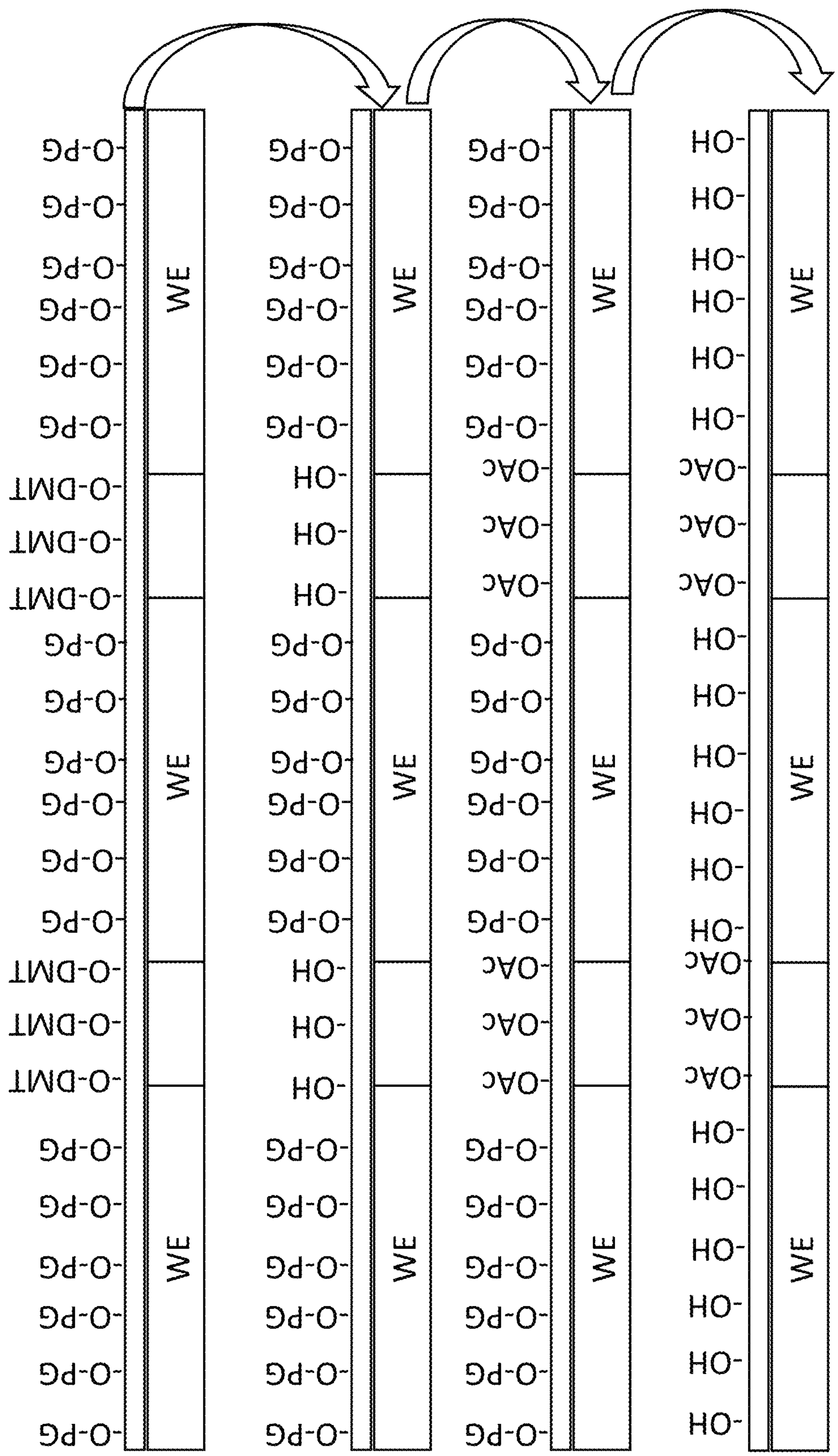
Figure 27:
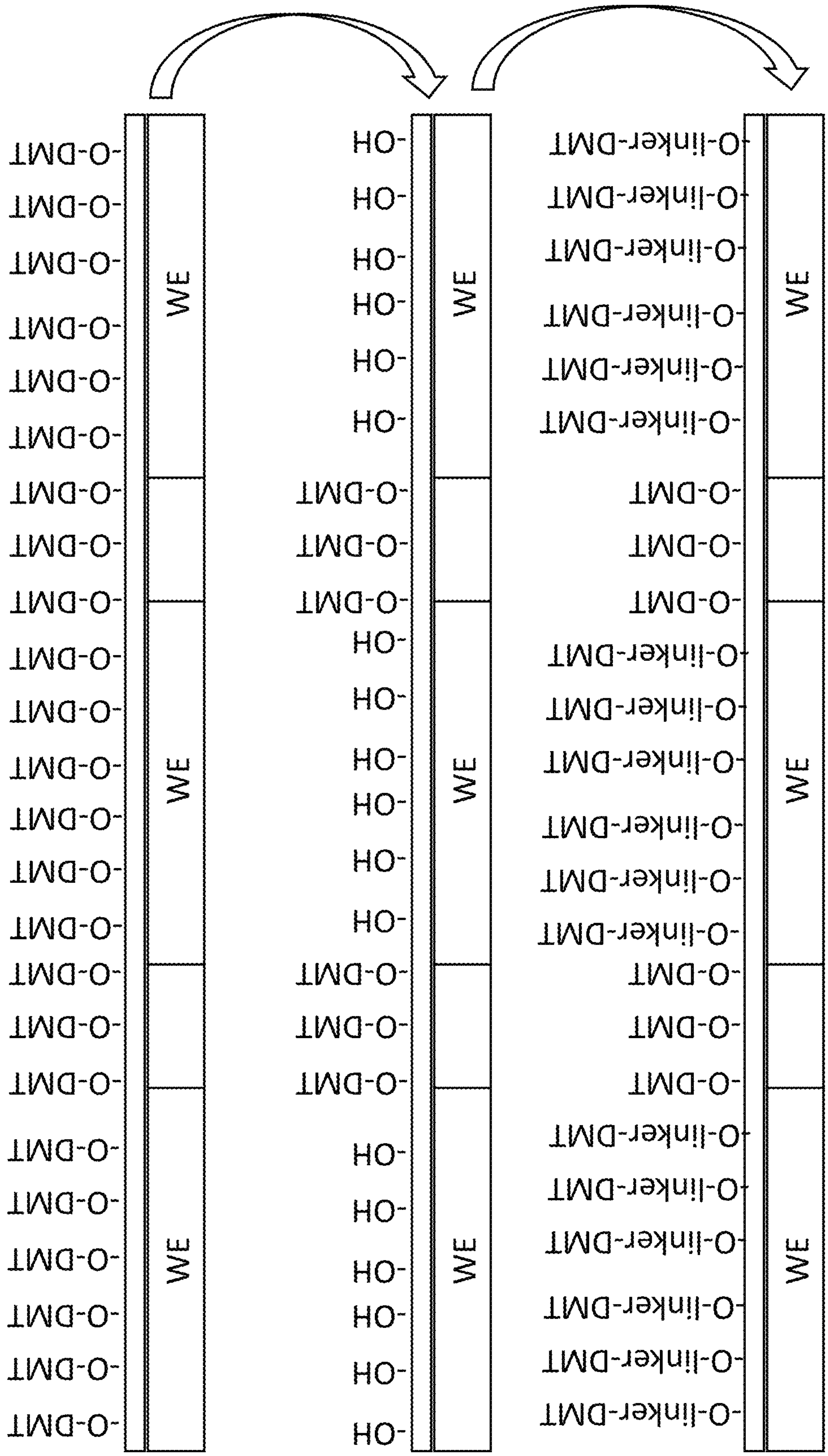
FIG. 27 shows another case of refining the synthesis zone by selective installation of a cleavable linker.

In Case 3, the problematic synthesis zone is the region between the working electrodes, where any potential for inadvertent synthesis may result in the inclusion of undesired truncated products. FIGS. 26-27 shows the differential protection strategy and selective linker strategies respectively employed for the Case 3 electrode configuration (counter electrode omitted for clarity). The chemistry steps here are identical to that used for Case 1 and Case 2, and simply differ in their tolerance for synthesis events over the insulating regions. Similarly, the steps for Case 4 for are omitted, but are otherwise understood to be functionally similar to that of Case 3.

Figure 28:
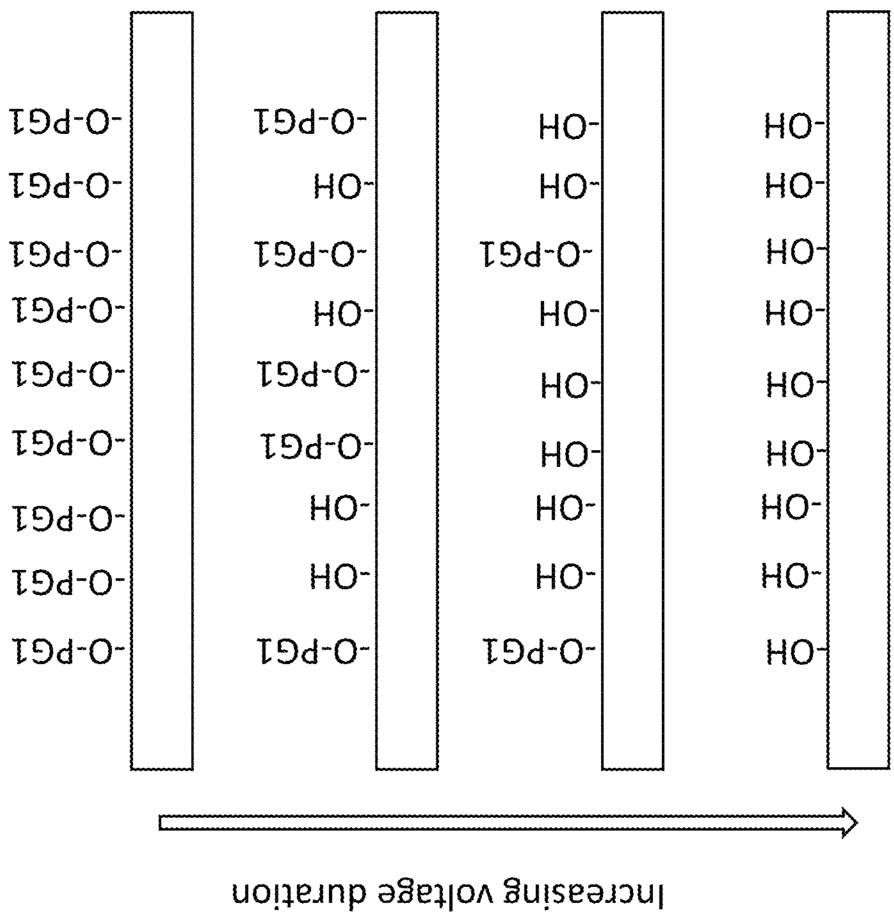
FIG. 28 shows partial protecting group removal.

Many combinations of these edge refinement processes may be employed in concert or with variations to the protecting groups as is suggested by the underlying logic of the invention, and not all strategies are universally compatible with downstream assembly procedures or intended to be limited as such. While the depictions used here illustrate the presence of reactive groups at the surface of a coating layer over the chip surface, this configuration is for illustrative purposes only and all such principles are compatible with embodiments wherein the surface chemistry is a three-dimensional porous matrix atop the chip itself Partial Deprotection Chemistry Electrochemically driven deprotection is fundamentally more precise than the solely chemical approaches used in column-based DNA synthesis. Some embodiments may leverage this advantage to modulate the extent of DMT (or other protecting group) removal during synthesis, enabling more complex sequence configurations within a feature that have not previously been achievable with the standard phosphoramidites and instrumentation. FIG. 28 illustrates how the population of molecules at a site bearing a protecting group may change during a single deprotection step, in principle providing access to any intermediate degree of protection. In the simplest configuration, the degree of protecting group removal can be modulated simply with the duration of applied voltage at a particular site, though more complex embodiments employing pulse-width-modulation or competing reactions to aid this process are also conceivable. In a preferred embodiment, the temperature at the reaction site is reduced while the deprotection event is occurring, which has the effect of slowing the rate of reaction, thereby enabling a greater degree of control and precision over the DMT removal process. In related embodiments, temperature reduction is utilized with other protecting groups so that the degree of precision can be improved for most voltage-driven transformations.

Figure 29:
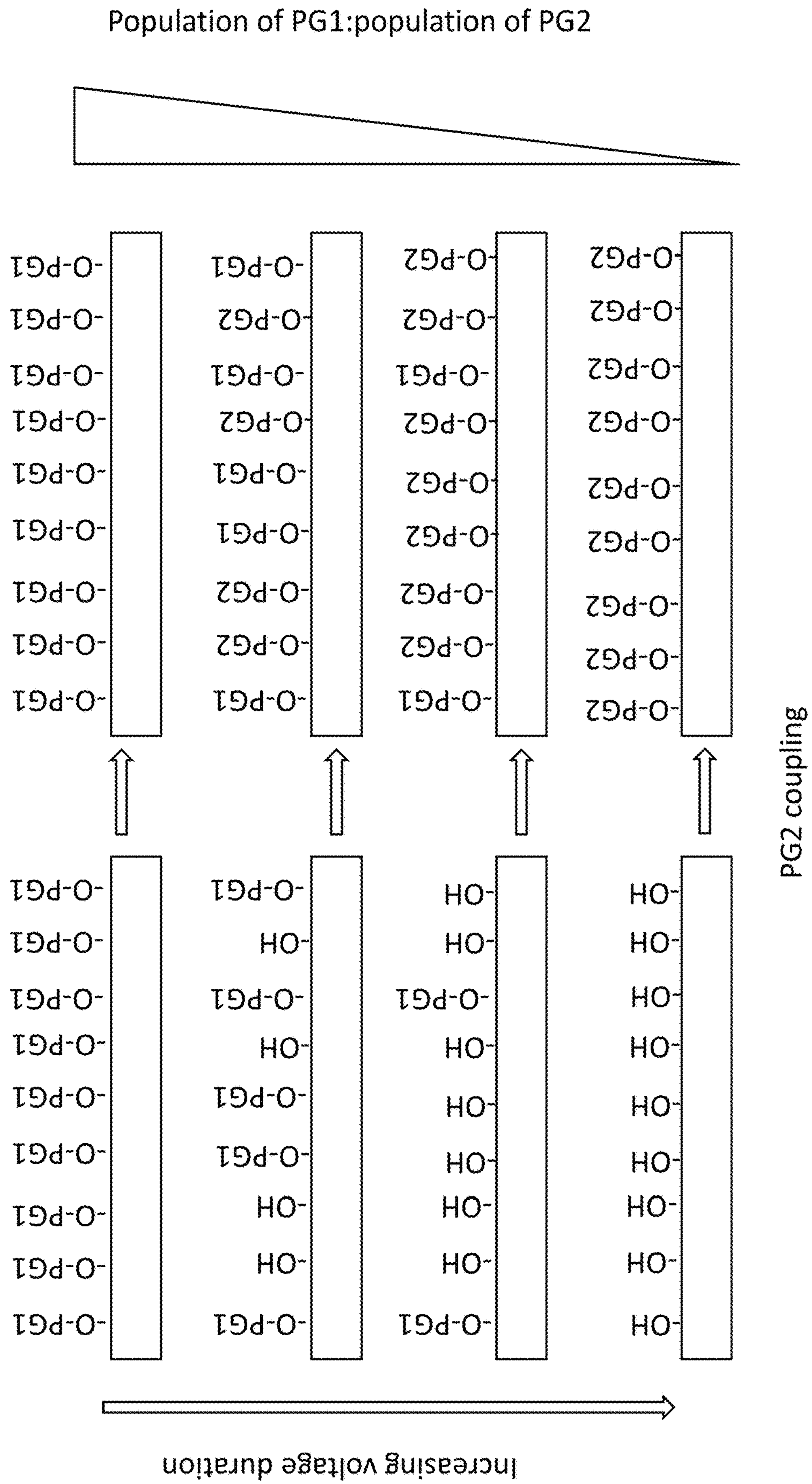
FIG. 29 shows installing multiple functional groups through partial protecting group removal.
Figure 30:
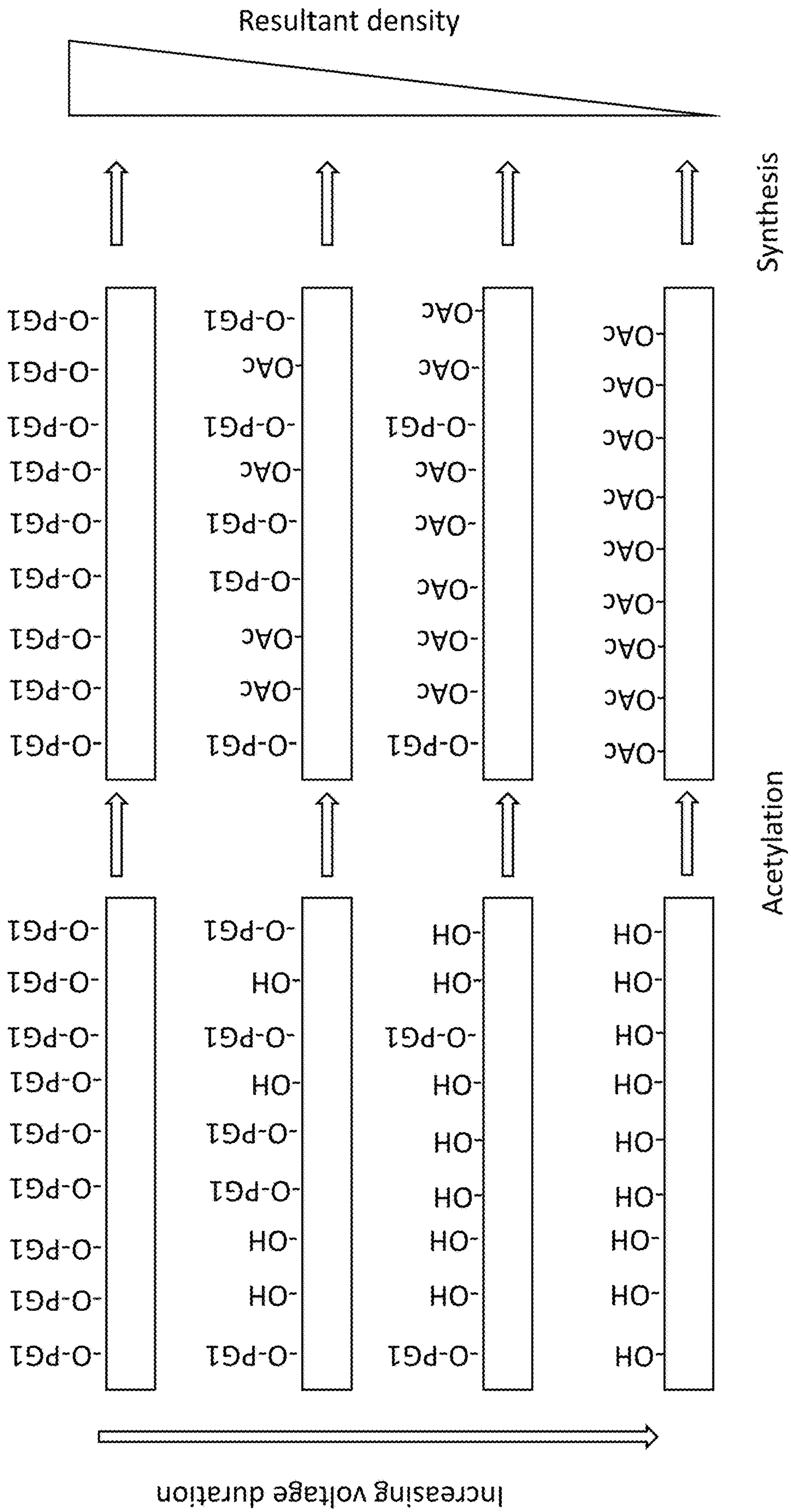
FIG. 30 shows modulating the density by acetylation after partial protecting group removal.

FIG. 29 illustrates how these partial deprotection steps enable installation of multiple functional group subpopulations. After the removal of protecting group 1 (PG1) from some fraction of the bound molecules, a compound bearing a different protecting group, PG2, can then be coupled to the newly reactive sites. The removal conditions used for PG1 can be selected so that the ratio of PG1 to PG2 is tuned to the application. In the case where PG2 is an acetyl group or other common capping agent, the process can be used to modulate the oligonucleotide density at a site as shown in FIG. 30. The specific degree of desired density modulation is dependent upon the initial density of reactive sites and the desired spacing between molecules required for their processing. While capping agents are preferred for this use, any choice of PG2 whose removal conditions are orthogonal to those of PG1 may accomplish the same effect. Selectively cleavable linkers can also be installed on a subpopulation of molecules in the same way, allowing that subpopulation to be addressed separately at a later point.

Figure 31:
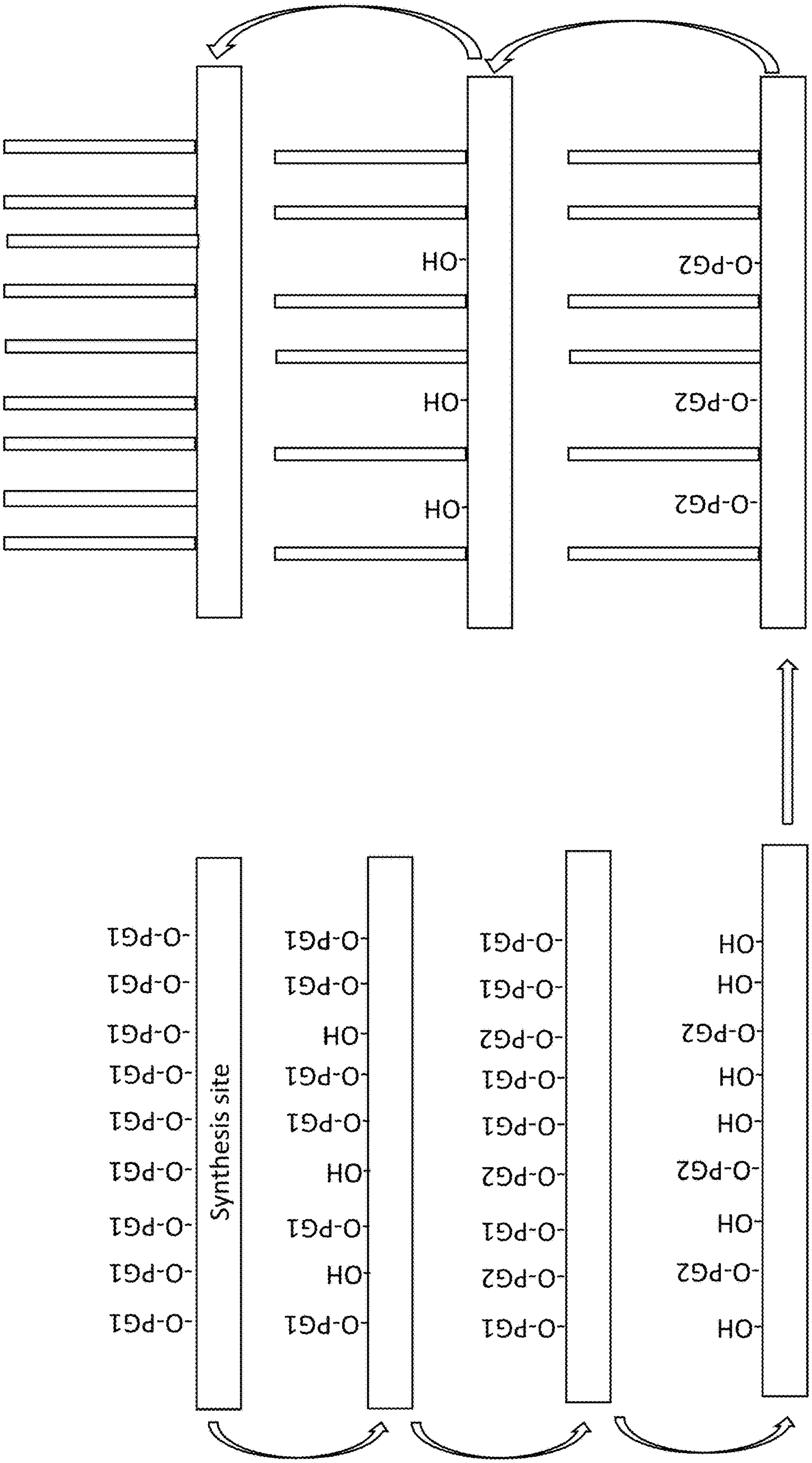
FIG. 31 shows the installation of multiple sequences from a site containing multiple protecting groups.
Figure 32:
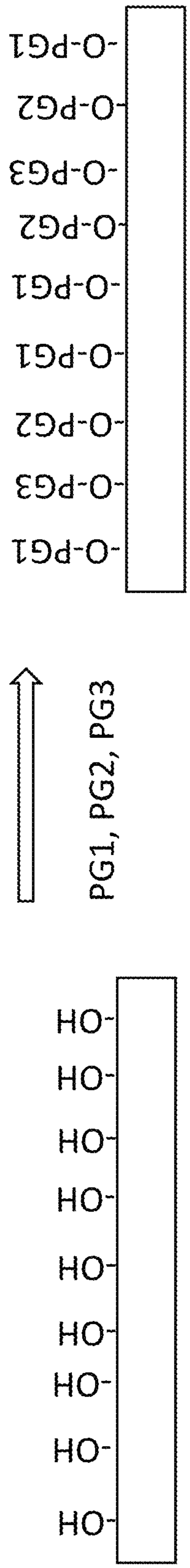
FIG. 32 shows the installation of multiple functional groups onto a surface by mixing of the corresponding phosphoramidites.

When PG1 and PG2 removal conditions are orthogonal, two sequences may be generated at a common location as illustrated in FIG. 31. After both PG1 and PG2 are installed, synthesis proceeds using the removal conditions for one of the protected subpopulations (PG1 depicted here). When the first synthesis is completed and the sequences capped, PG2 is removed and a second sequence can be synthesized using those reactive sites. More complex embodiments are conceivable, and the various embodiments of this approach are limited only by the number of chemically orthogonal protecting groups available and ability to utilize increasingly small subpopulations of the molecules at a given site. As a general principle, access to N orthogonal protecting groups enables at least N different sequences to be produced per addressable site. In preferred embodiments, the capping of the sequences is conducted by acetylation, which is then removed during a global deprotection step after synthesis. This regenerates a free hydroxyl, which is essential in embodiments where the sequences are used as primers for enzymatic extension. Other methods of functional group diversification are possible, such as that depicted in FIG. 32, where a mixture of the desired protecting groups is added in ratios designed to yield the desired relative surface populations.

Enabling Linker Chemistry

Figure 33:
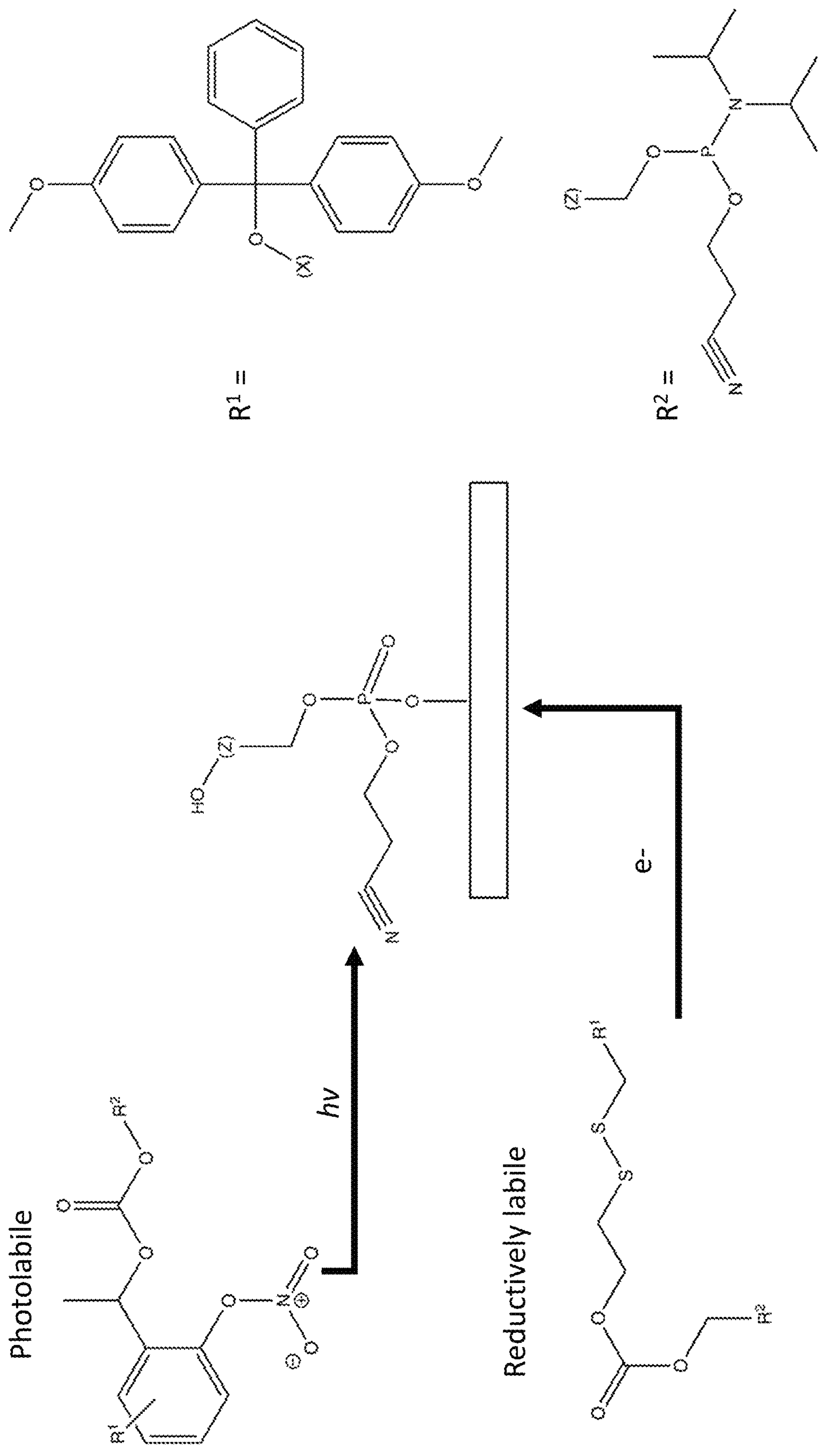
FIG. 33 shows two enabling linker structure responsive to light and reductive potential respectively. Without limiting the foregoing.

FIG. 33 discloses two linker structures which add enabling functional diversity to the features. The uppermost structure in FIG. 33 depicts a photolabile linker, which merges desirable traits of existing photocleavable linkers with phosphoramidites utilizing a 5'-photolabile group. It is comprised of a nitrophenyl core which bears DMT-group on an opposite arm from the amidite, thus allowing conventional DMT synthesis chemistry to proceed after coupling. Photolysis results in a hydroxyl remaining bound to the support, unlike existing commercial linkers which produce a terminal phosphate on that functional arm. The advantage of this approach is that resultant hydroxyl may be used as a site for further synthesis, potentially of an additional distinct sequence, or further replicates of the removed strand.

The lowermost structure in FIG. 33, depicts an analogous linker which instead is activated by application of reducing potential. Reduction cleaves the disulfide, one arm of which undergoes self-elimination to regenerate a hydroxyl when conditions are sufficiently alkaline. In some embodiments, this cleavage reaction is conducted in the presence of a quinone redox pair so that the potential also results in the localized consumption of protons, in turn facilitating the self-elimination. This approach has the advantage of controlling the linker entirely with the applied potential without requiring additional optical apparatus. For both species, (Z) denotes any series of intervening bonds that will not appreciably interfere with the functional arms of the molecules, such as an alkyl or polyethylene glycol chain.

Figure 34:
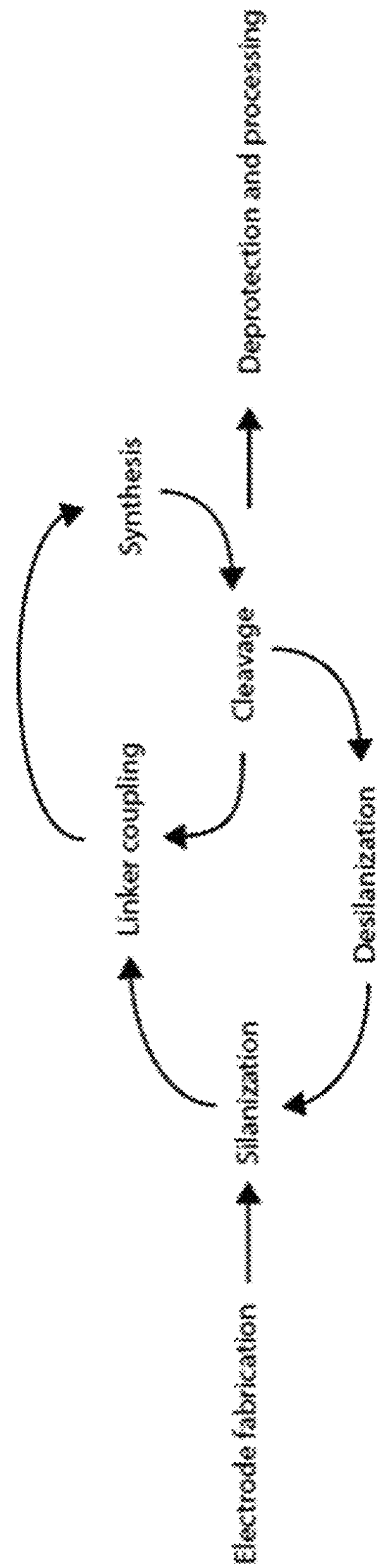
FIG. 34 shows the workflow for a recycling process enabled by some cleavable linkers.

Both such linker approaches leave unnatural scars on the end of the cleaved oligonucleotide and the synthesis substrate. In cases where the linkers are used solely to modulate density or as transient hydroxyl masking, the scars are not problematic. In other cases, the scars may be removed by including yet another additional linker between the sequence of interest and scar, allowing this to be removed in an additional step of processing. In the case of surface scars, the surface may simply be reused as the preceding generations of scars only increase the distance between the surface and the first nucleotide. The process of synthesis and cleavage may be repeated multiple times, limited only by the stability of the connection between the underlying linker to the surface or the tolerance for the buildup of linker scars. Periodically throughout the lifetime of a chip, the reactivity of the surface may be refreshed by a step of hydrolysis and resilanization as indicated in FIG. 34.

Oligonucleotide Error Correction

A series of error correction approaches can be implemented after the synthesis of the source oligonucleotides. It is preferred that these procedures are conducted prior to initial steps of amplification or assembly, thus increasing the fidelity of the source material and preventing error propagation.

Figure 36:
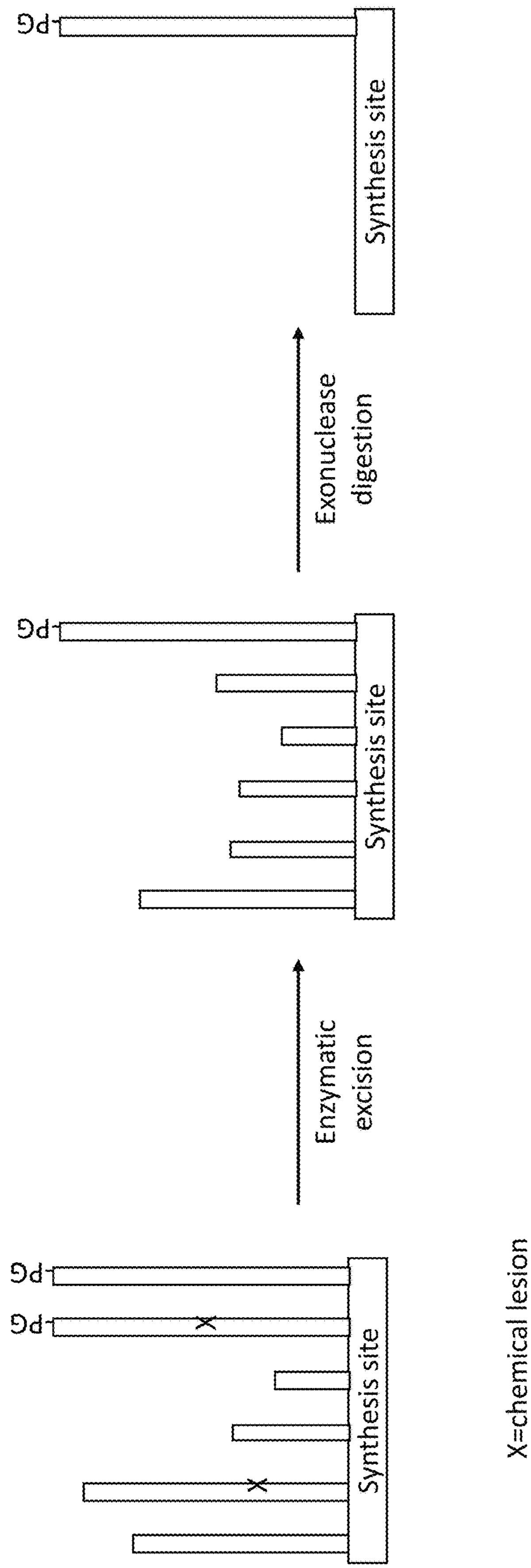
FIG. 36 shows enzymatic error correction of oligonucleotides.

One class of error correction approaches involves treating the sequences with at least one enzyme intended to remove various errors that have accrued during synthesis. In some embodiments the enzymes target excision of chemical damage, such as oxidative lesions, methylations, depurinations, and other such variations which either deviate from the desired sequence or introduce a greater propensity for errors during copying. In embodiments where capping steps have been used during synthesis, sequences which contain failures are not reactive during the last coupling step. This enables selective modification of only the full-length strands by procedures during the last cycle(s) of phosphoramidite chemistry. In preferred embodiments, the final cycle(s) of phosphoramidite chemistry introduces modifications that impart resistance to nucleases. The modifications may include various terminal protecting groups or backbone modifications. In preferred embodiments, the modification is a short stretch of DNA of inverted polarity of the preceding sequence. This allows enrichment for full-length sequences when the chip is treated with a nuclease. In some embodiments, this step may be conducted separately from lesion excision so that it assists with removal of the error-containing strands from the pool. FIG. 36 illustrates this embodiment.

Figure 37:
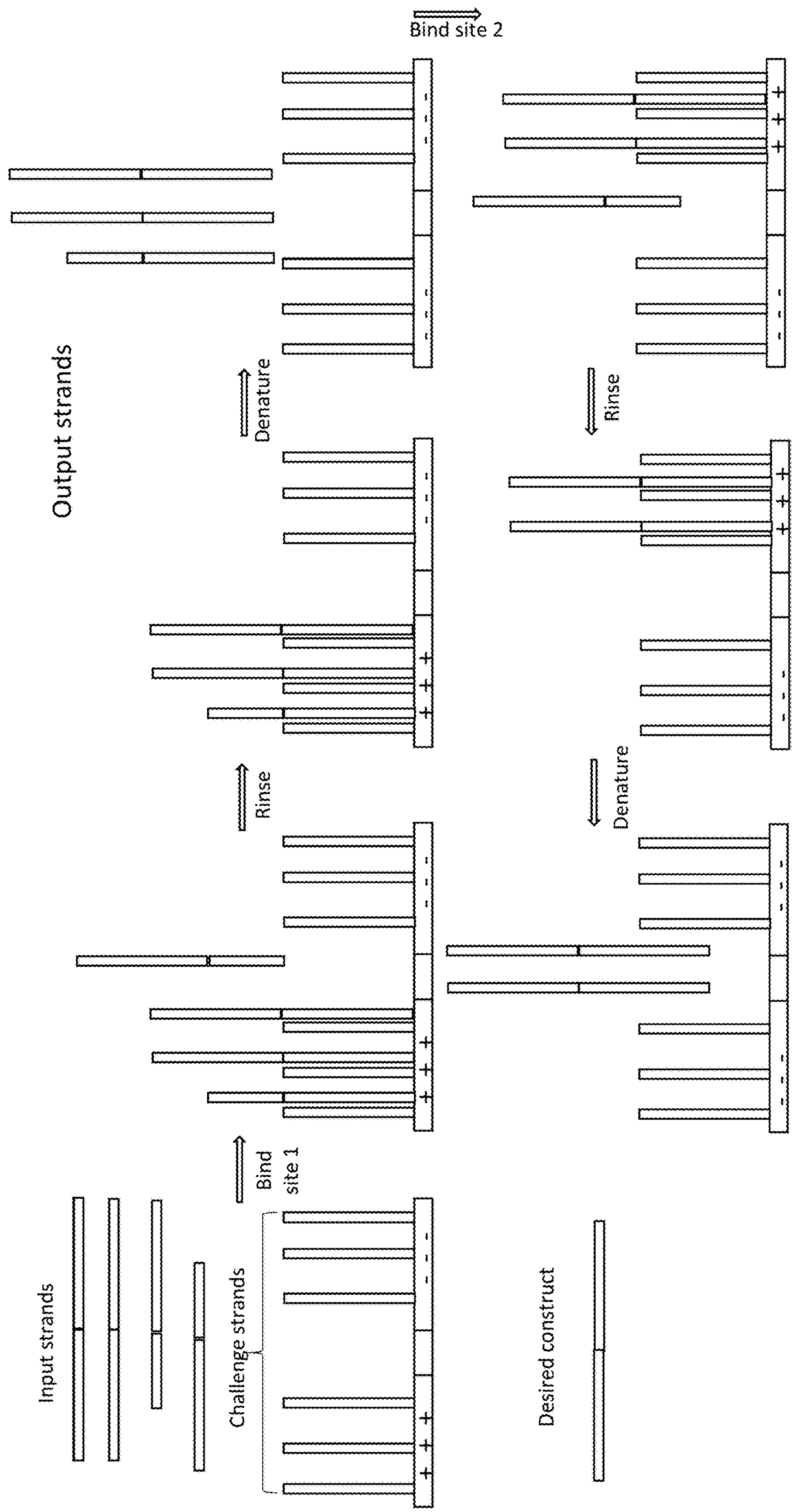
FIG. 37 shows oligonucleotide error correction by selective enrichment.

An additional oligonucleotide-level error correction strategy is described in FIG. 37 which may be implemented upon a population of sequence ('input strands') after they have been separated or copied from the surface of the generation site. The approach is to use some surface area of the chip for the synthesis of a second set of sequences at least partially (and potentially entirely) complementary to the input strands made at the generation site. This second population of 'challenge strands' remains immobilized so that they can perform solid phase enrichments upon the input population. As described previously, voltage settings may be varied during this step to achieve a high degree of stringency for the various sequences during binding. Sequences which have not been synthesized well enough to bind under the stringency requirements are rinsed away and discarded. This process may be repeated several times for a given set of input strands, particularly in cases where the challenge strands are short and correspond to distinct regions of the input strands. This process ensures only strands containing well-formed regions complementary to the challenge strands remain at the end of the process.

Enzymatic Elution

Selective removal of subsets of oligonucleotides from a substrate is crucial for limiting the complexity of the pool and preserving integrity of the assemblies. Spatial selectivity can be achieved through a 'positive' selection, wherein the application of voltage induces the occurrence of a reaction, or a 'negative' selection, wherein the voltage application prevents the occurrence of a reaction at each electronically addressable location.

Figure 38:
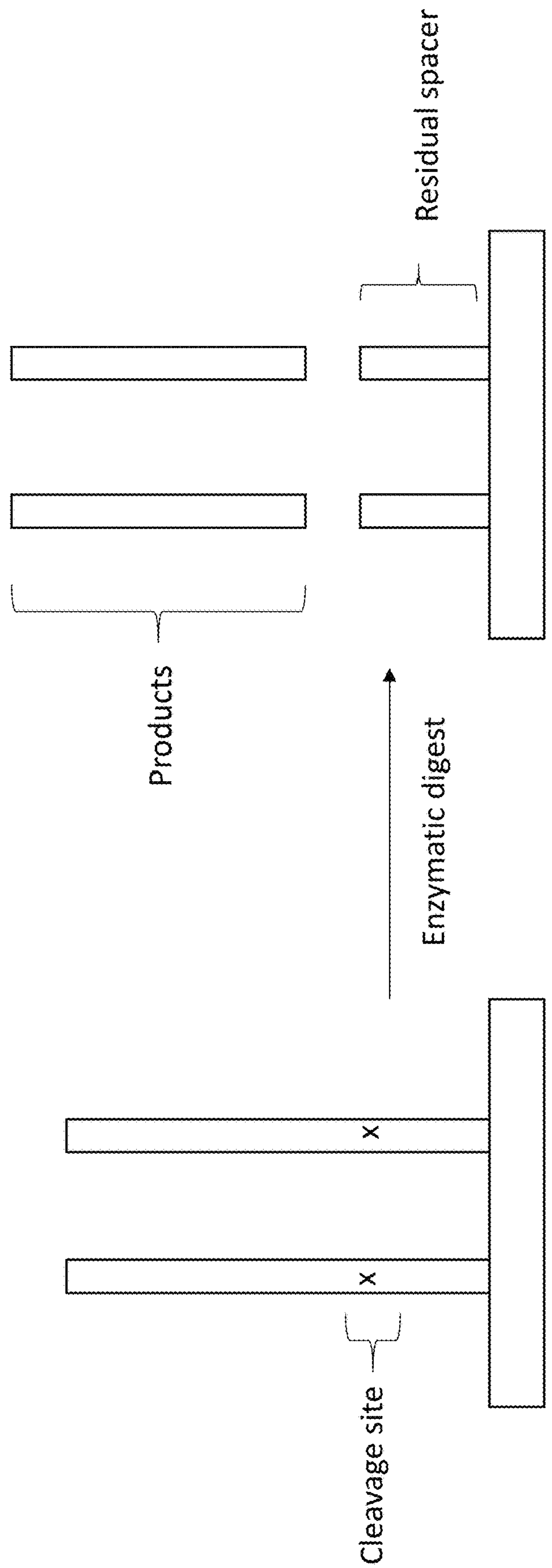
FIG. 38 shows enzymatic cleavage of surface-bound DNA sequences.

In some embodiments, the oligonucleotides are deprotected prior to their removal from the CMOS chip so that they are suitable substrates for enzymatic reactions. These enzymatic reactions may be of any kind that produces a specific and defined break, like those produced by a restriction enzyme or other sequence-dependent endonuclease, in the backbone of the oligonucleotides, thereby liberating at least part of the synthesized sequence from its attachment to the surface (FIG. 38).

In cases where the cleaving enzyme requires, or benefits from, a double-stranded substrate, a hybridization step may be used to help exert a degree of spatial control.

Figure 39:
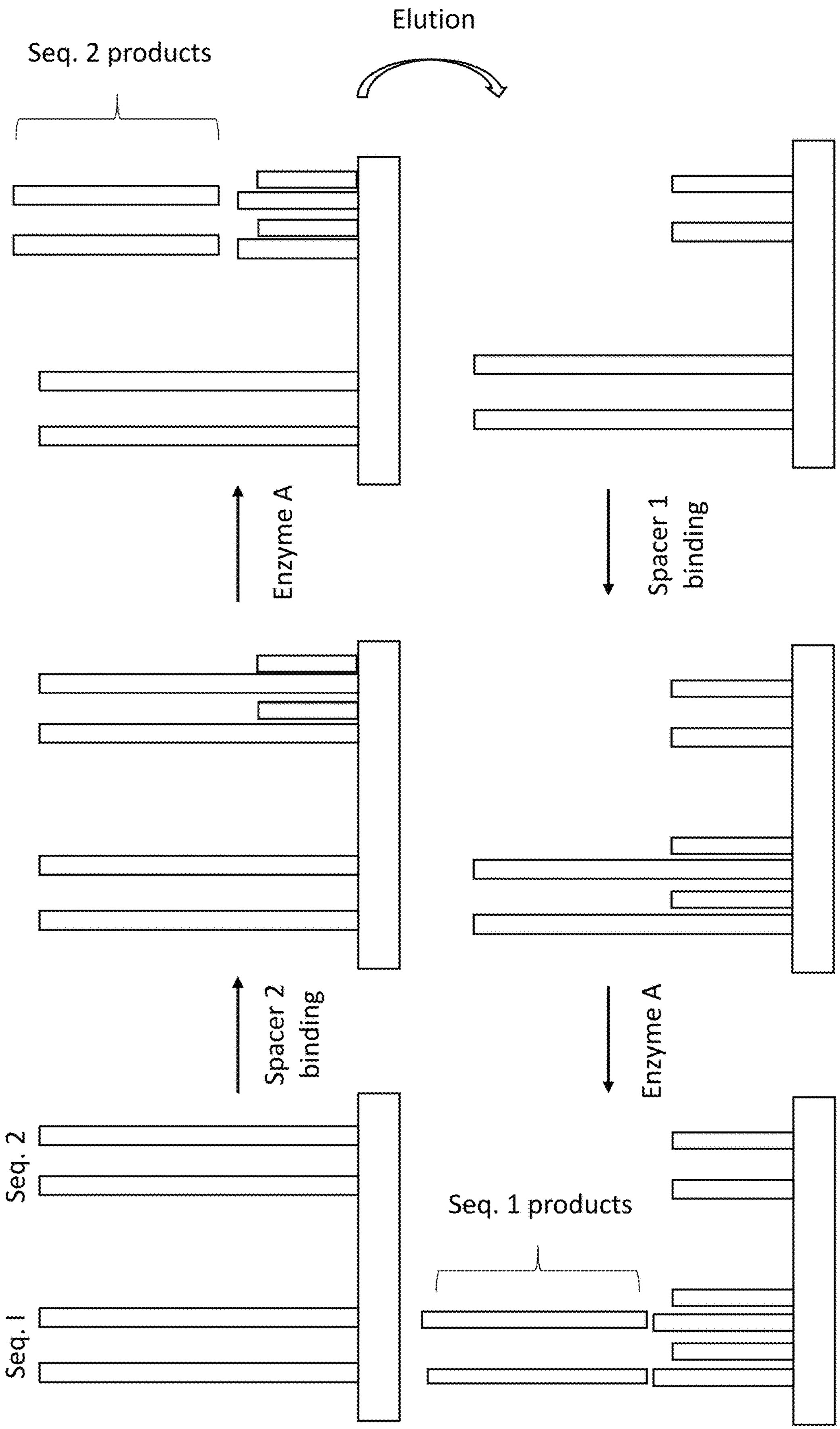
FIG. 39 shows selective release by designed restriction sites.
Figure 40:
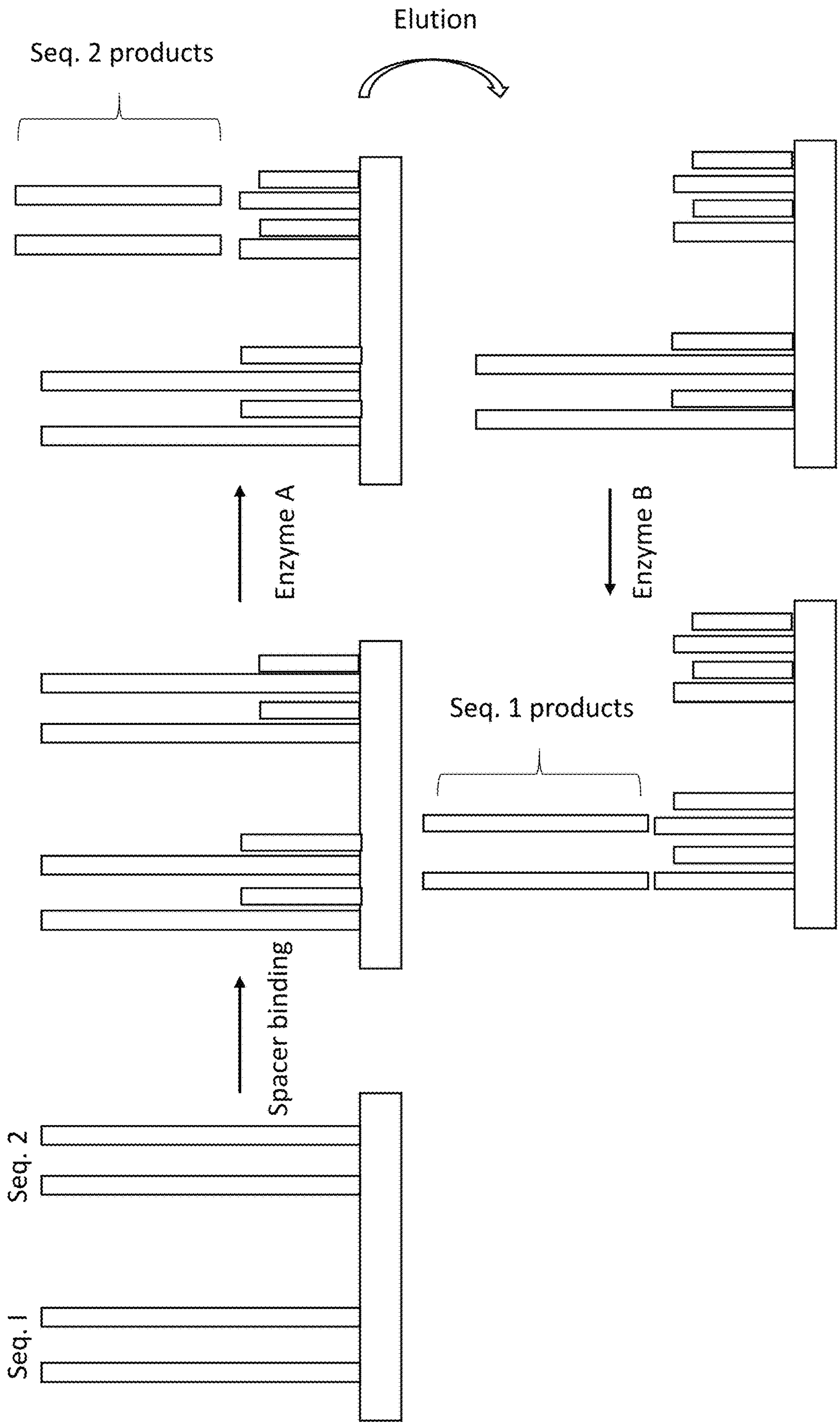
FIG. 40 shows selective release by designed restriction sites and iterative enzyme digestions.

In certain cases, addressable removal may be achieved solely through the careful design of sequential hybridization and cleavage events. The working principles of this approach are depicted in FIGS. 39 and 40. FIG. 39 illustrates the case where spacer sequences between the substrate and desired product contain a common recognition sequence for an enzyme of interest, but utilize sufficiently different flanking sequences to permit addressable binding. FIG. 40 illustrates the case where entirely distinct spacer sequences are bound in parallel, then removed by iterative applications of enzymes targeted to those sequences. Processes of the types depicted in FIGS. 39 and 40 may be chained together or repeated in any number of combinations to remove the intended libraries of sequences. The exact embodiment is dependent on the scale of the array, particular sequences present, and the number of smaller pools required.

Figure 41:
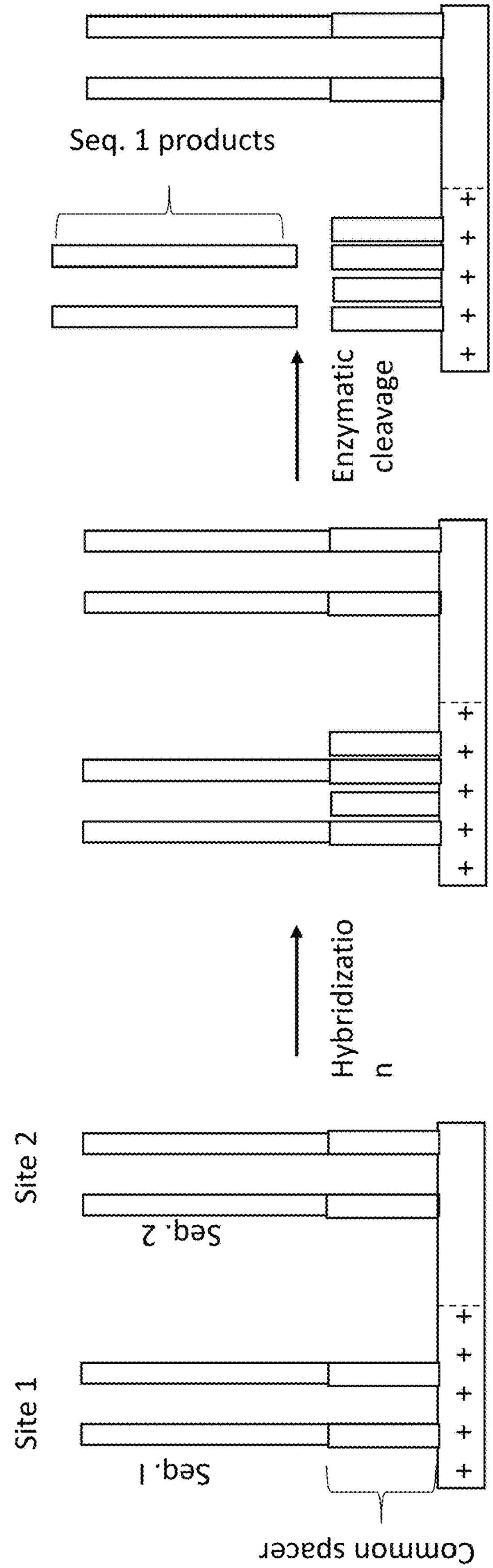
FIG. 41 shows selective release by positive selection for duplex formation.
Figure 42:
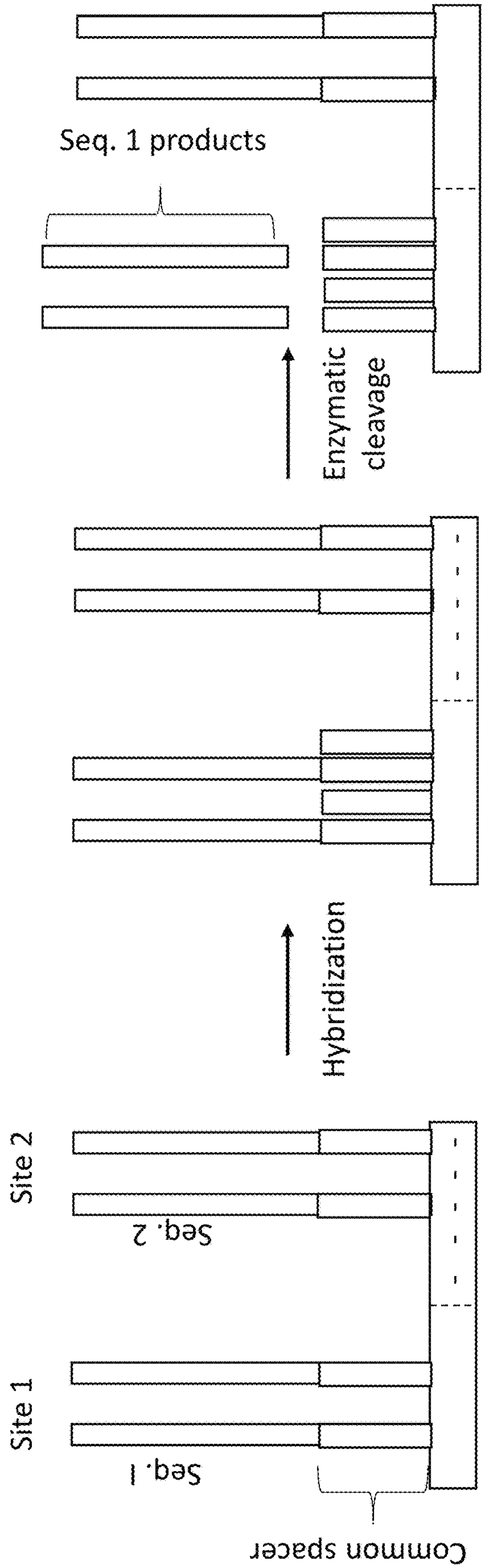
FIG. 42 shows selective release by negative selection against duplex formation.

In some embodiments, selective voltage application can be used to drive or prevent the formation of the necessary duplex at specific sites. In the 'positive' mode, a chip is flooded with copies of at least one partially complementary sequence that would not exhibit appreciable binding to the spacer regions without the concentrating effect of applied potential. Thus, the duplex formation and subsequent cleavage only occurs at the desired sites (FIG. 41). As before, this process may be repeated until all desired libraries are recovered. In the 'negative' mode, a chip is flooded with copies of at least one sequence partially complementary to the spacer region that binds. Then, the appropriate voltage is applied to either prevent the binding of complementary sequences at the undesired sites or remove them prior to the introduction of the cleaving enzyme (FIG. 42). Control of hybridization with voltage reduces the amount of sequence design as a single spacer sequence can in principle affect the removal of any combination of sites on a surface.

Figure 43:
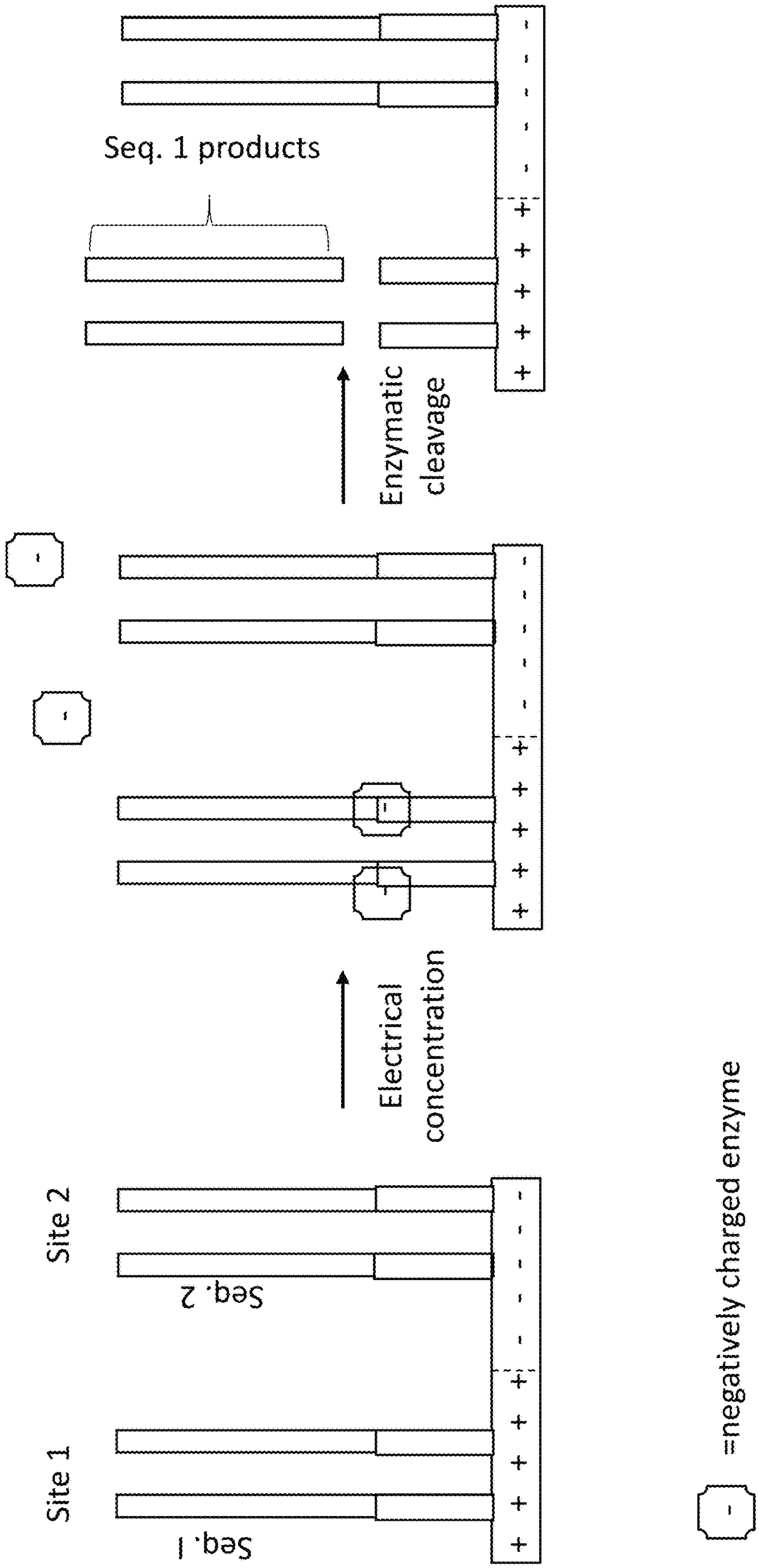
FIG. 43 shows selective release by selective attraction for a cleaving enzyme.

In other embodiments, the spatial selectivity is achieved at the level of the enzymatic reaction itself. When the enzyme(s) possesses an appreciable charge, selective voltage application can be used either to concentrate an enzyme at a particular site or instead repel it from others (FIG. 43). Some embodiments may also utilize various tags or labels to modulate net enzyme charge for this purpose. In other embodiments, the activity of the cleaving enzyme is modulated by alteration of the local pH. Redox active species may be included in the enzymatic cleavage reactions so that the local pH changes can effectively activate or deactivate the cleaving enzyme(s). One advantage of this class of approaches is that it does not necessitate duplex formation and the use of designed spacer sequences and thus may be used with enzymes like endonuclease V, USER, or those bearing other functionally similar activities.

Figure 44:
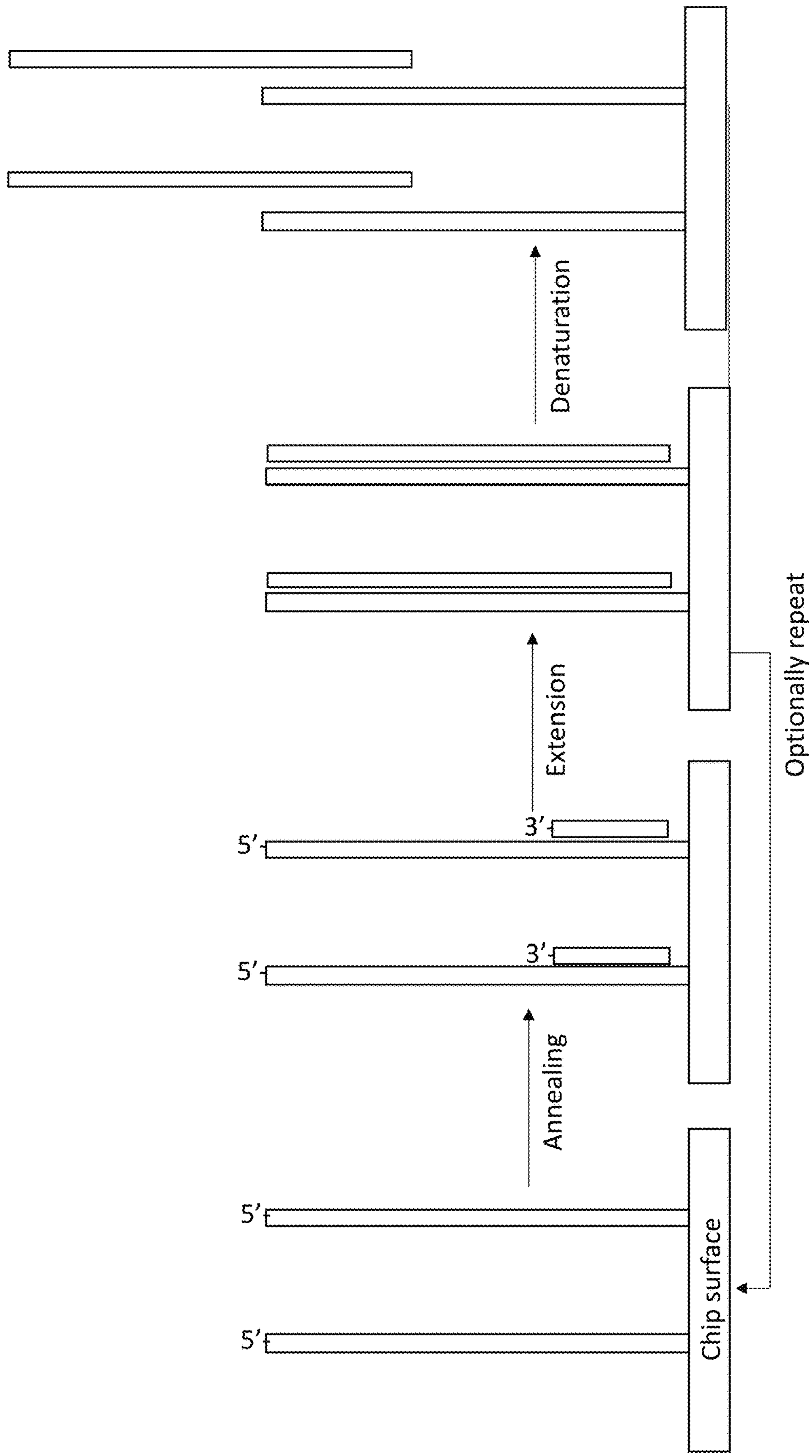
FIG. 44 shows oligonucleotide release by enzymatic copying and denaturation.

The above approaches may be considered destructive in nature in that they remove the synthesized molecules from their surface of origin. In an alternative preferred embodiment, the sequences are copied from their synthesis site in an electrically driven linear amplification. FIG. 44 shows an overview of this approach. A primer is first bound and then extended with a template-dependent polymerase, copying the surface element. The resultant duplex may then be denatured so that the copied sequence is separated from the surface, where the original still resides and may be reused for subsequent copying steps. As with other processes utilizing these steps, the spatial addressability may be controlled at the level of the initial primer binding, the extension reaction itself, or the final denaturation.

Figure 45:
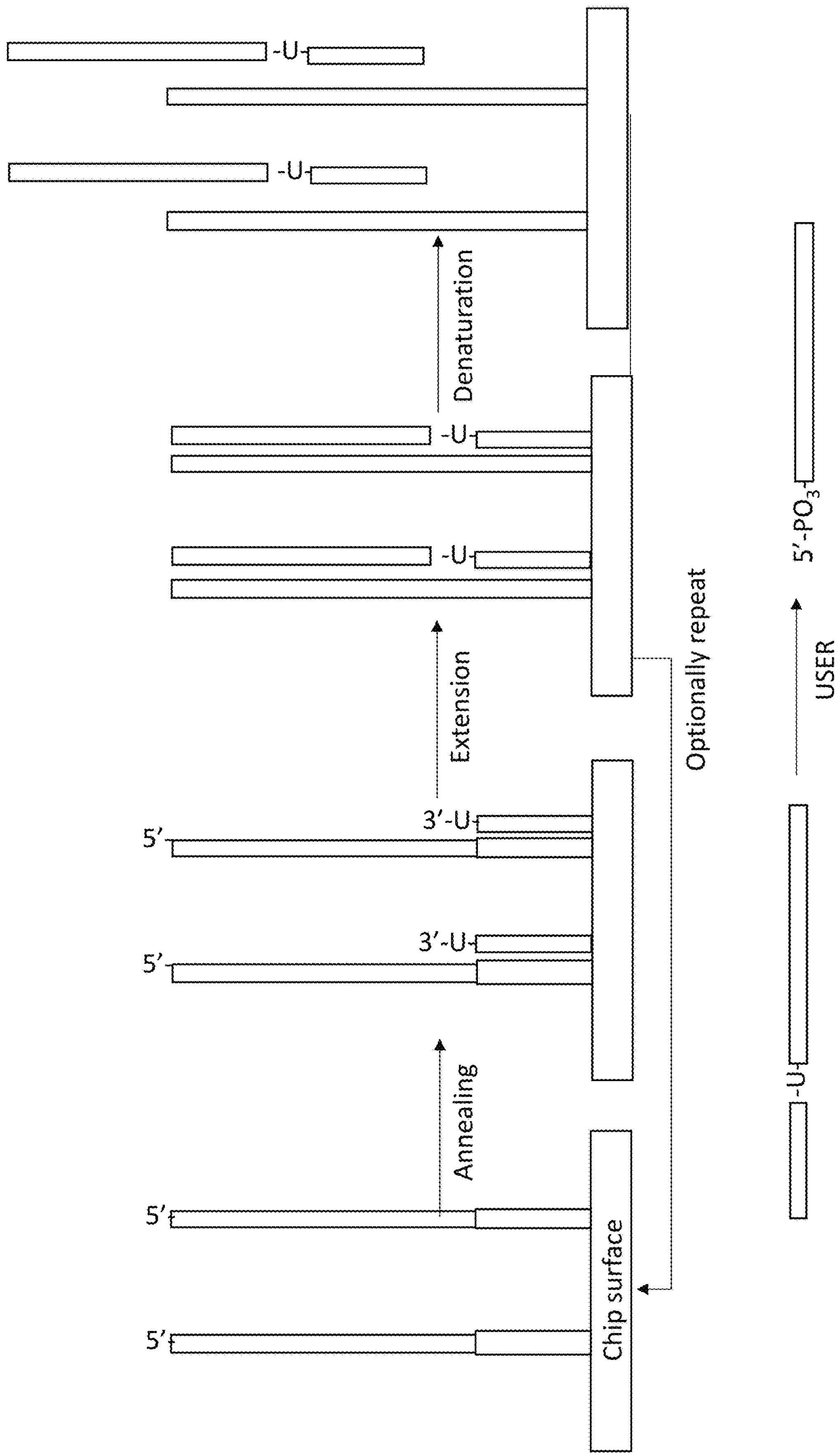
FIG. 45 shows oligonucleotide release by enzymatic copying and denaturation where the priming region can be removed enzymatically.

FIG. 45 illustrates the embodiment where a universal primer contains a uracil, allowing the common sequence region to be separated from the copied region in a step of downstream processing with USER. The uracil DNA glycosylase activity first excises the uracil leaving an abasic region. The DNA glycosylase-lyase endonuclease VIII activity then cleaves the strand at the abasic site, producing a 5'-phosphorylated sequence that is a suitable substrate for ligation. In preferred embodiments, this series of reactions is performed while the sequences are bound to challenge strands at an error correction site.

Enzymatic Assembly

After the oligonucleotides have been removed from the generation sites and undergone suitable forms of error correction (error correction can occur before, after or both before and after removal from generation sites), they are then moved to different locations on the chip for the first level of assembly. There are two fundamental classes of reactions which may be conducted.

Figure 46:
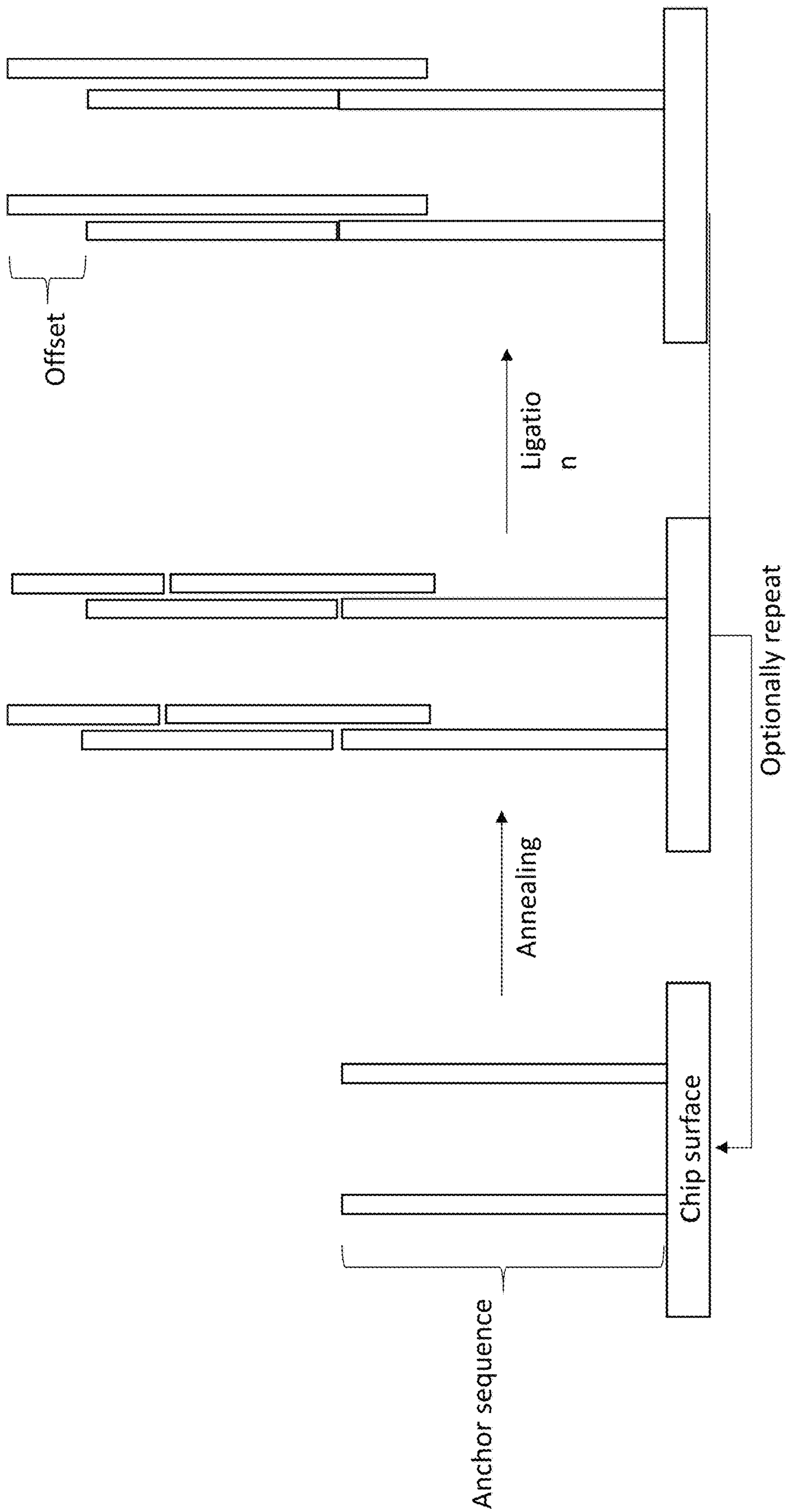
FIG. 46 illustrates templated ligation of molecules to a surface-anchored sequence.

FIG. 46 depicts the concept of assembly by ligation. Multiple sequences are brought to a common site and designed so that they will self-assemble to form at least some contiguous portion of dsDNA. The breaks in the strand are then covalently joined by a ligase to form a single product, which typically requires that each sequence is phosphorylated at the 5'-end. As indicated, this process can be used to append entirely new sections of sequence to an immobilized 'anchor' strand regardless of polarity. In some cases, it may be desirable to leave at least a small portion of single-stranded region at the distal end (relative to the surface) of the strand, termed here the 'offset', allowing this process to be repeated in several rounds until the desired construct size is reached. Many variations on the enzymatic reaction are possible, including versions where single sections are ligated individually, versions where multiple sections are ligated on in a single step, or versions where multiple steps of assembly and ligation are conducted on a common pool of sequences (ligase chain reaction). While FIG. 46 depicts a scenario where the sequences complementary to the anchor strand are contiguous and thus capable of undergoing ligation, some embodiments may instead utilize discontinuous 'splints' so that only one strand of the duplex has undergone complete ligation.

Figure 47:
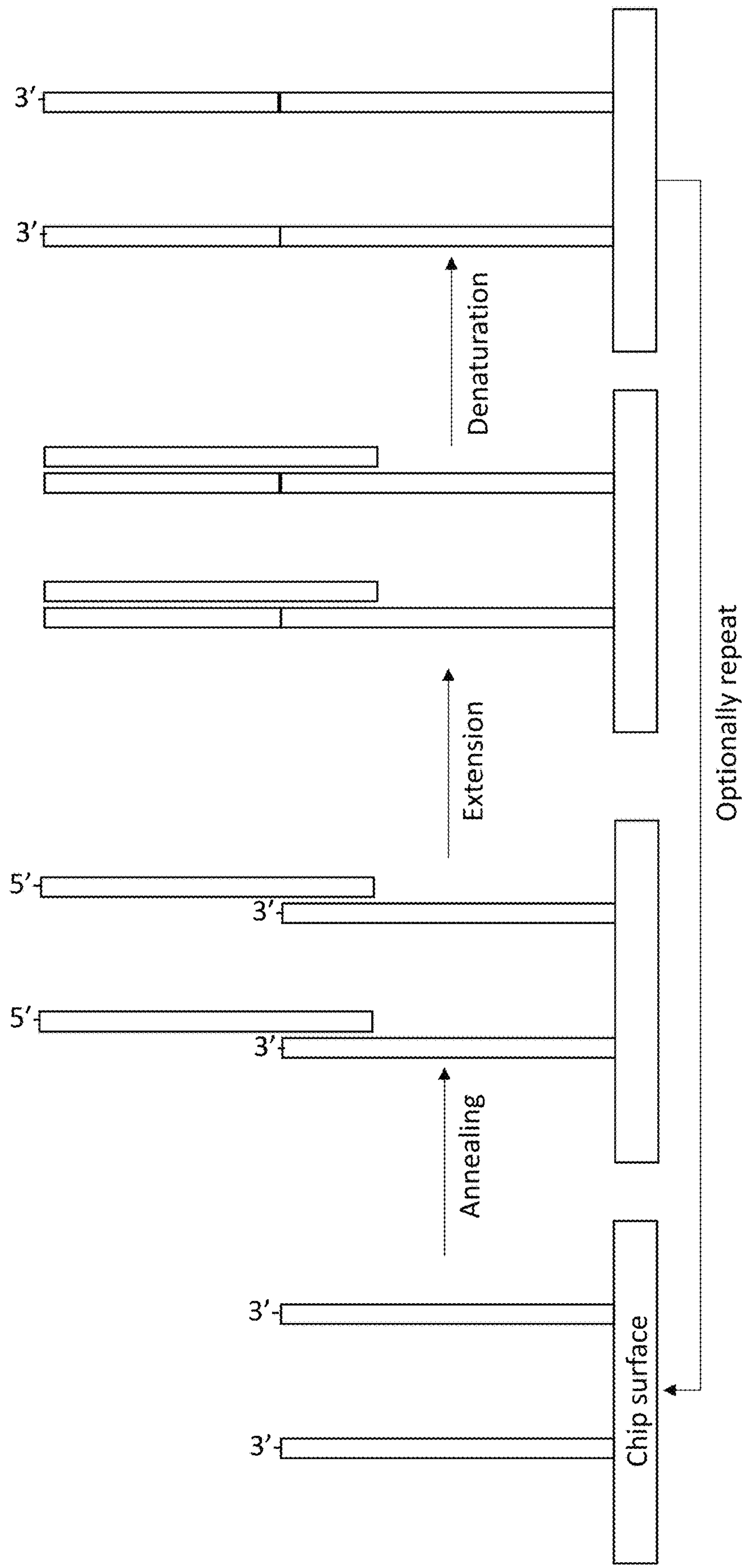
FIG. 47 illustrates templated extension of a surface-anchored sequence.
Figure 48:
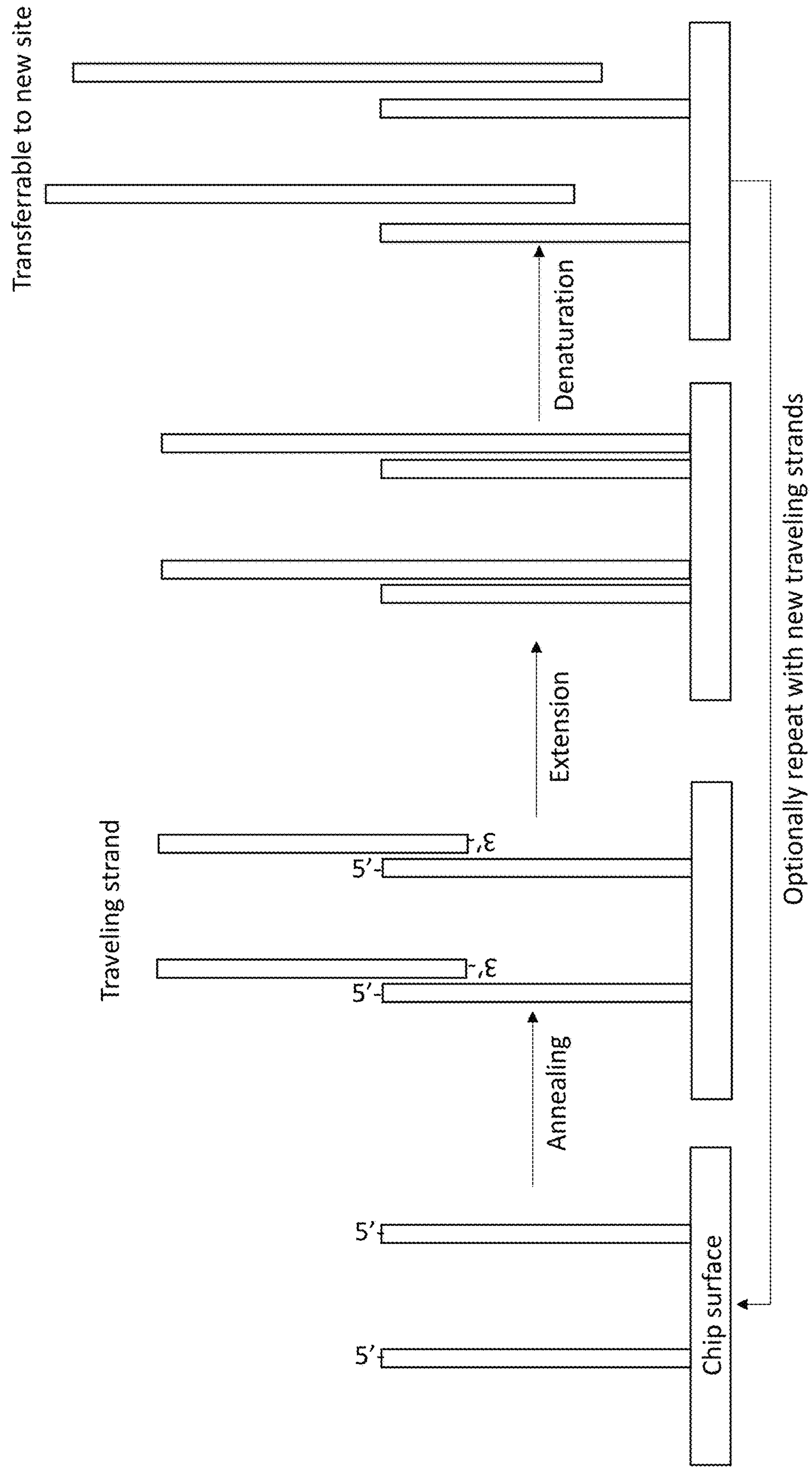
FIG. 48 illustrates templated extension of a traveling sequence that is not covalently immobilized on a surface.

FIG. 47 depicts the concept of assembly by extension. An input strand is captured by an immobilized sequence and used as a template for a polymerase, extending the surface strand so that it is now complementary to the input. The duplex can then be denatured, freeing the end of the anchor sequence for a subsequent cycle of capture and extension. The embodiment depicted in FIG. 47, where the anchor sequence bears an exposed 3'-OH, is generally preferred, though it is also possible to invert the polarity of the anchor so that the input strand is extended instead. In this 'traveling strand' scenario, assembly is conducted by moving the input strands through a series of distinct sites, copying the anchor strand sequence into the that of the traveling sequence, as shown in FIG. 48. This type of approach may be used for synthesis strategies analogous to continuous flow processes. Another usage of this reaction scheme is to repair sequences which are bound to the chip that have undergone some form of enzymatic digestion, as is common in error correction strategies or some forms of the sequence-specific selective release strategies, both of which are described in different sections. As these processes may leave 3'-phosphates, this repair may be preceded by one of 3'-dephosphorylation using T4 polynucleotide kinase, an alkaline phosphatase, or any such enzyme with the desired reactivity.

Though extension or ligation approaches can be used to conduct assembly reactions, preferred embodiments utilize ligation to perform the majority of the concatenation steps. Ligation has several fundamental advantages over polymerase-dependent assembly steps. Ligation based approaches allow multiple components to be assembled into a single step. This self-assembly step provides an intrinsic level of error correction in those sequences which are too long or short become poorly positioned for joining to the neighboring fragment. Further, ligation preserves the fidelity of the input strands and does not risk introduction of new copying errors. This is particularly useful for assembling long sequences which have either undergone extensive error correction or are of a length where the probability of polymerase-induced error is high. By contrast, polymerase-mediated assembly steps generate additional copies of the desired sequence, thus the preferred use-cases generally involve a degree of amplification.

Two aspects of the CMOS-based assembly processes may give rise to the need for specific types of amplification. First, much of the organizational advantage derives from performing reactions in the solid phase, where the need to perform enzymatic reactions on long (i.e. 50 kb) fragments severely limits the loading of sequences at any one site. Second, many error correction approaches are destructive in nature, where mismatches, deletions, and insertions are selected away from the pool of correct sequences, enriching the fraction of perfect material at expense of the total quantity. For these reasons, it may be necessary to 'transfer' the assembly reaction products which have been generated at one site to a fresh location on the surface.

Figure 49:
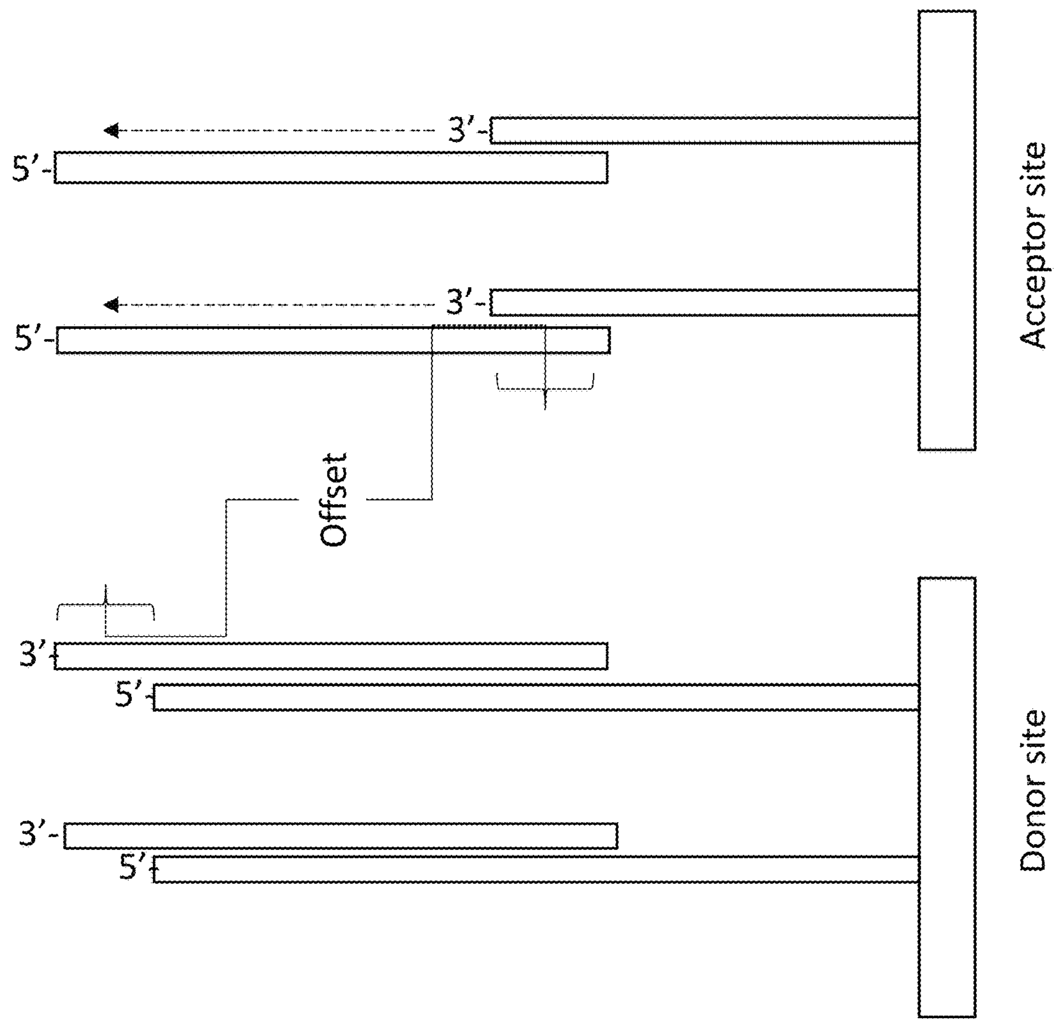
FIG. 49 shows the design concept for transferring an assembled strand to a new site.

FIG. 49 illustrates the design principle for this concept, where an offset region of sequence on a site where assembly steps have been conducted (the 'donor site') is complementary to a region on a second 'acceptor site'. In preferred embodiments offset is left from a ligation reaction, thus ensuring the only strands captured at the acceptor site are those which have undergone the entirety of the assembly process correctly. In other embodiments, such as when the donor site construct is blunt-ended, the offset region may be generated by partial exonuclease digestion of a duplex. Upon transfer to the acceptor site, the captured sequence is then used as a template to extend the anchor strand. The details of the extension depend in part on the method of elution from the donor site. When the traveling strand(s) is double-stranded, as would be produced from an enzymatic digestion or cleavage of a linker, the extending polymerase requires efficient strand displacement. When the traveling strand has instead been denatured from the donor site and is transferred as ssDNA, strand displacement activity is not crucial.

Figure 50:
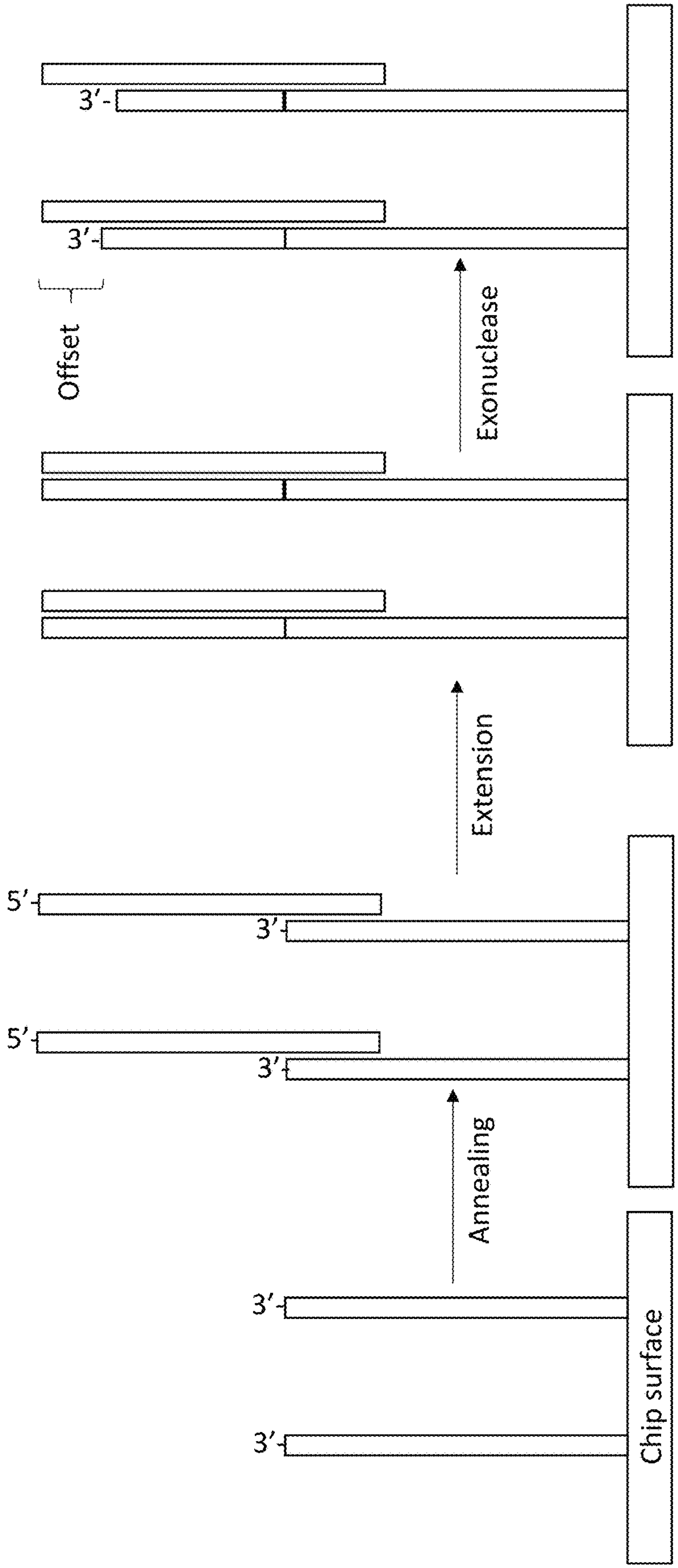
FIG. 50 illustrates formation of a single stranded region on a duplex for subsequent capture steps.

The majority of polymerases will produce a blunt-end product as the final outcome of these copying steps, rendering it difficult to transition back to the use of ligation procedures. In cases where it is not desirable to eject the unbound strand of a duplex, an exonuclease treatment may be used to regenerate a free single-stranded region which can then be used to capture subsequent fragments for assembly (FIG. 50).

Figure 51:
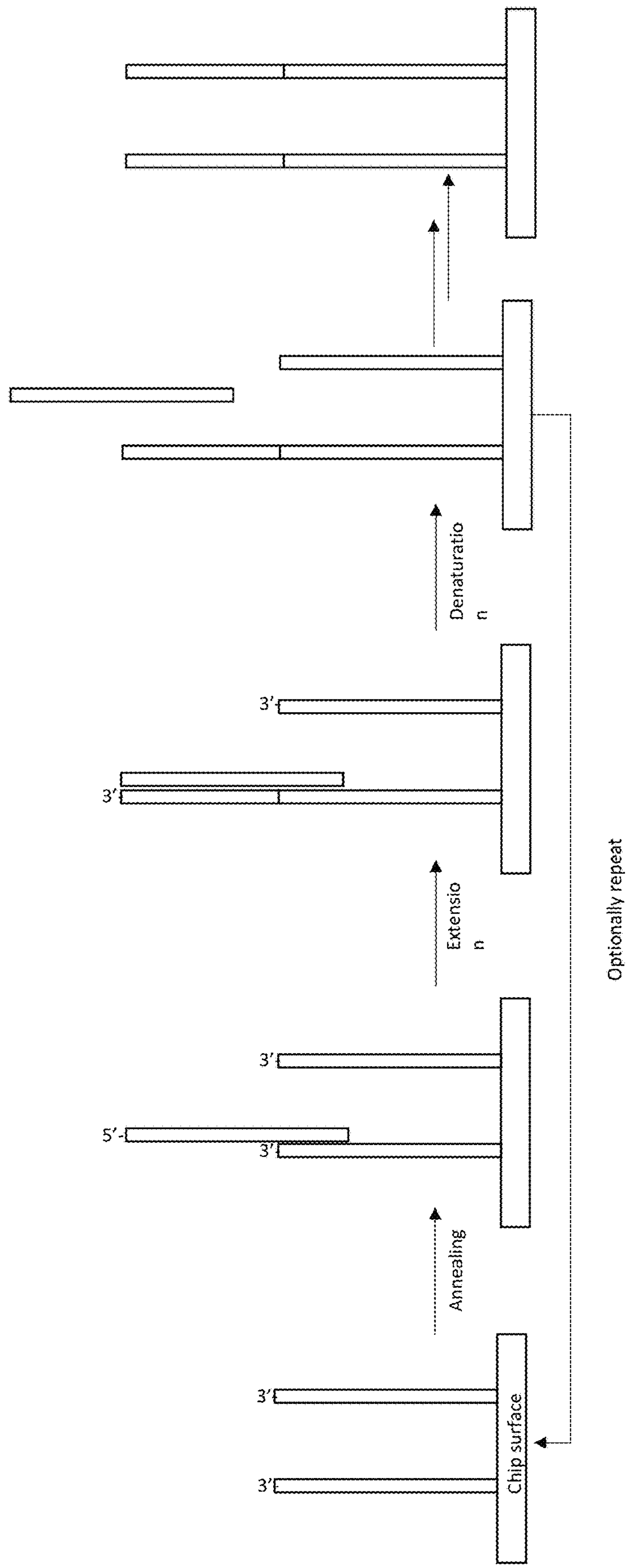
FIG. 51 shows linear amplification of a sequence to a new site on a surface.

Further steps of copying may also be necessary after the initial strand transfer. FIG. 51 shows how denaturation, binding, and extensions steps can be iterated to continually copy the traveling strand to the acceptor site, thus saturating the reactive sites at that location. This is directly analogous to the electrically driven linear amplification described in FIGS. 47 and 48 but the key distinction is that the traveling strand sequence is being copied to the surface, rather than from the surface.

Figure 52:
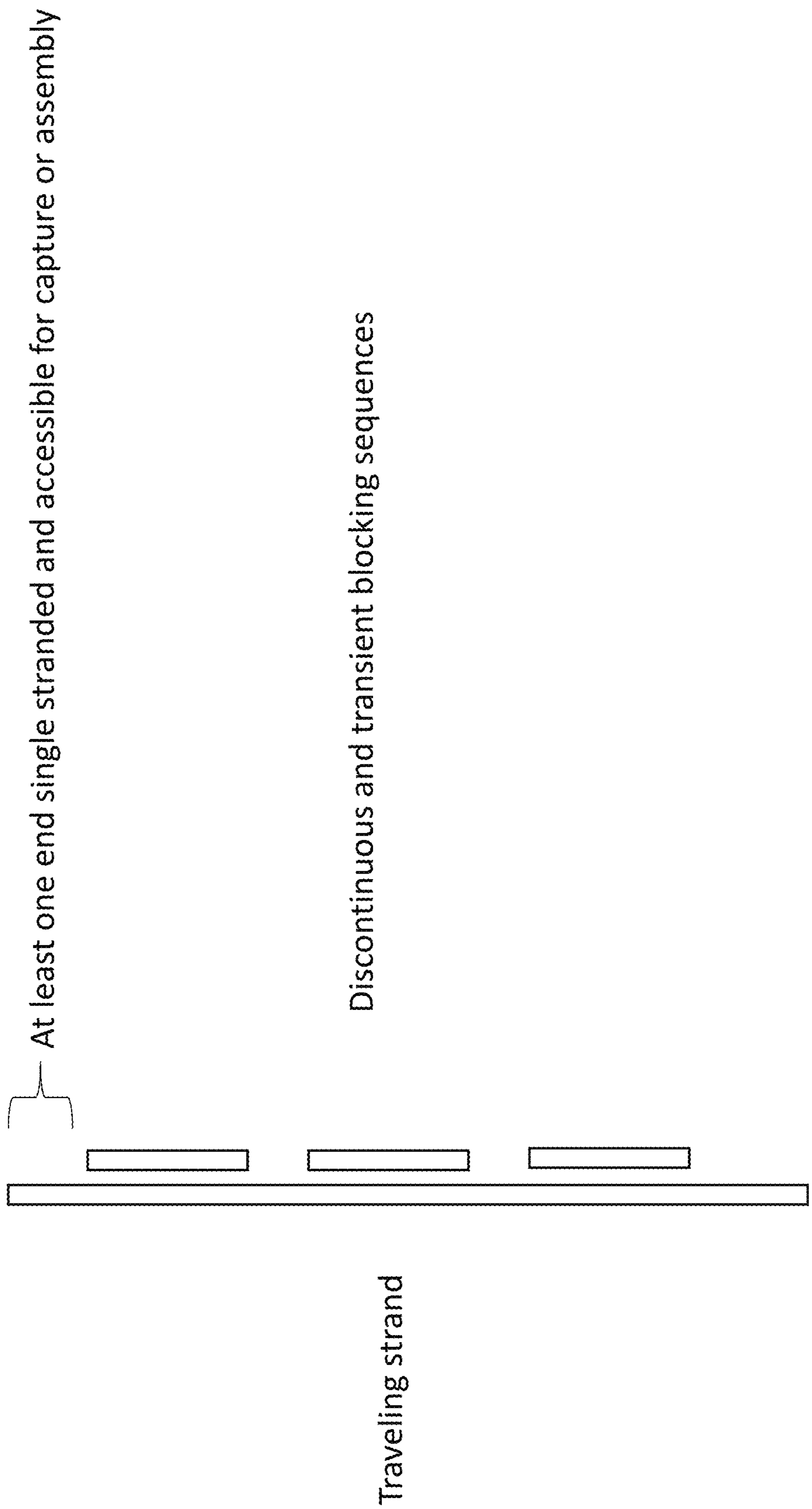
FIG. 52 shows the use of shielding oligonucleotides on a long single-stranded sequence.

The ability to perform local denaturation means that ssDNA may be more readily transferred between sites than dsDNA. At certain construct sizes, the ssDNA products become problematic substrates for many assembly steps, in part because intramolecular secondary structures may impede designed hybridization events. Long strands of ssDNA may be transiently shielded in some embodiments by hybridization to short sequences designed to disrupt unintended intramolecular and intermolecular interactions. Various collections of shielding oligonucleotides may be electrically confined in a zone or landing pad until the production of a long ssDNA. The shielding sequences are designed so that the regions needed for correct assembly remain single-stranded (FIG. 52), and so that the shielding sequences may be ejected or removed at a later step.

Figure 53:
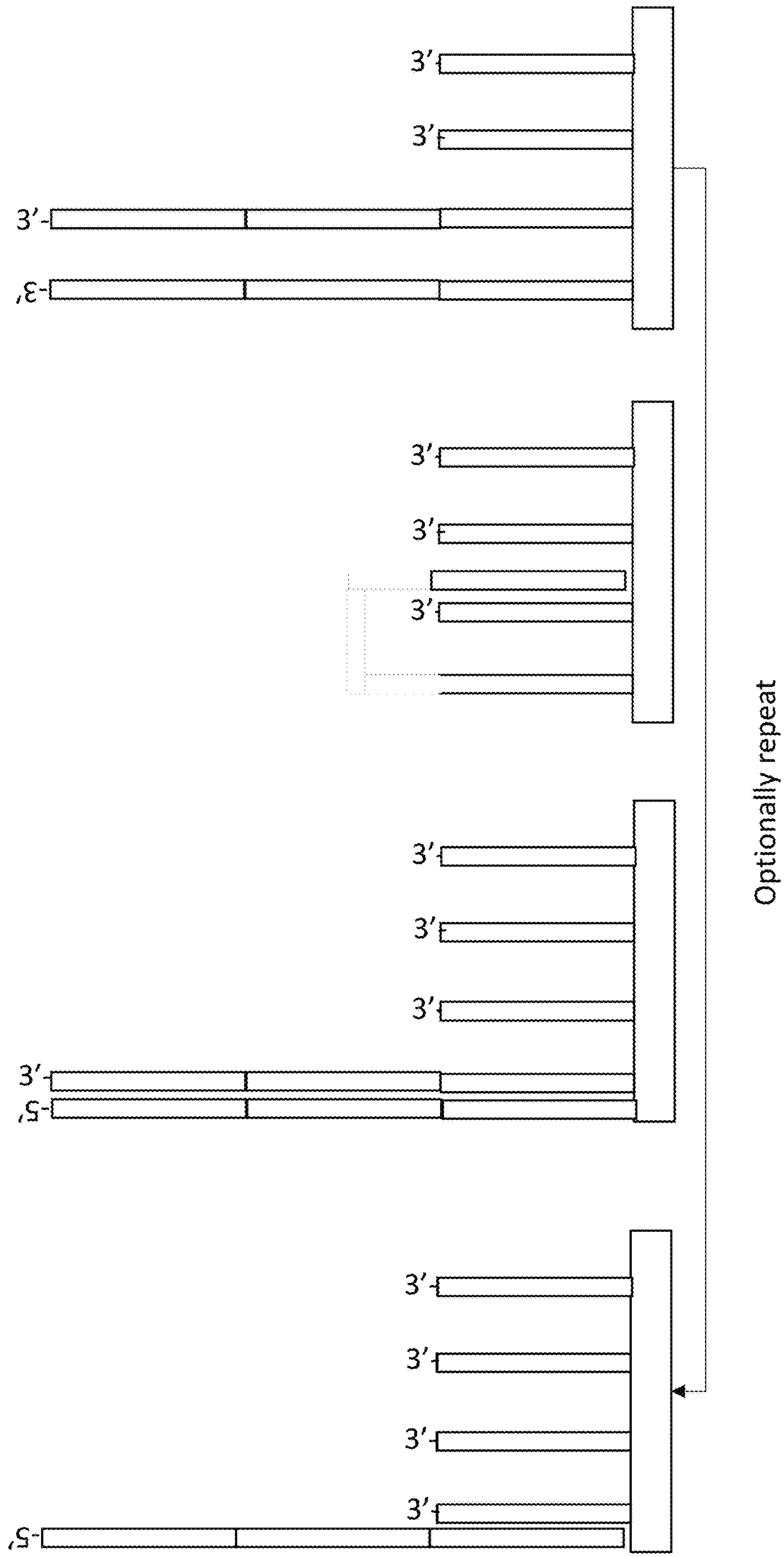
FIG. 53 shows electrically driven bridge amplification.

Linear amplification may be too inefficient in cases where there are few copies of the traveling strand. Some embodiments may therefore use bridge amplification approaches to improve copying of a small number of sequences. FIG. 53 illustrates this concept as a voltage-controlled process, rather than temperature controlled. A key capability is the capacity to generate custom anchor sequences at each amplification site with in situ synthesis as described above. The anchor sequences are designed to match the termini of the traveling strand and present a 3'-OH so that they may be extended upon hybridization. The voltage can then be modulated to induce cycles denaturation, annealing, and copying until the desired density is achieved. In some embodiments, one of the anchor strands is attached to the substrate with a cleavable linker so that it can be removed to either further modulate the density or reduce the interference to the downstream capture reactions caused by the presence of local complementary strands.

Figure 54:
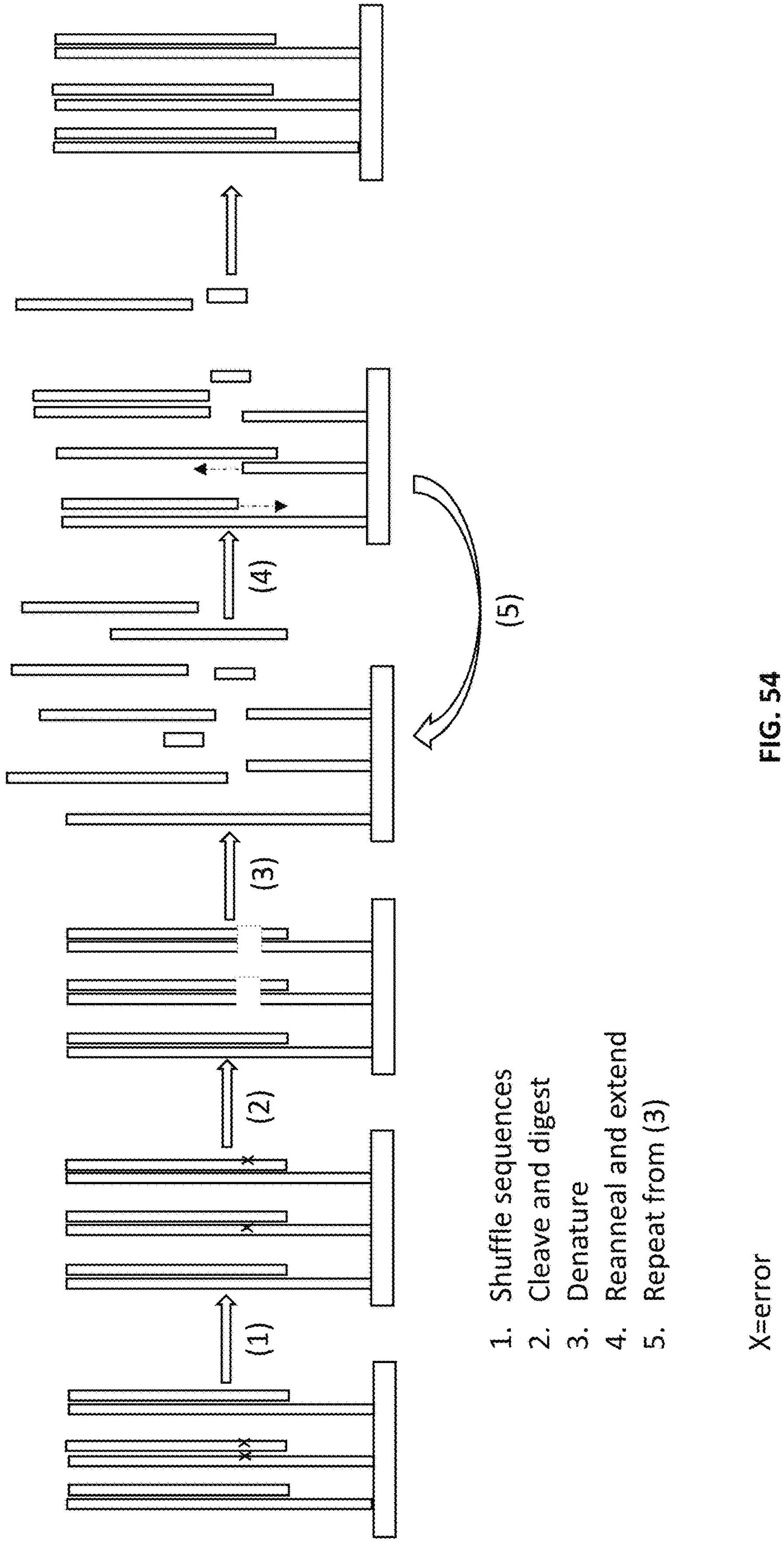
FIG. 54 shows enzymatic error correction.

FIG. 54 illustrates the concept of a preferred type of electrically-driven error correction at the assembly level. Sequences are first denatured and induced to rebind. The probability of an error containing strand rebinding its original complement is low, so it's likely that the erroneous nucleotide is mismatched at its new binding site. Upon exposure to high quantities mismatch removal enzymes, in particular those derived from the CEL endonuclease, the region several nucleotides around the error are excised, and the overhangs digested by a different exonuclease. The strands can then be denatured and rebound so that a polymerase can begin filling in the excised gaps. Several steps of denaturation and extension may be conducted to reassemble the error free sequence from the corrected fragments. In preferred embodiments, the final polymerase cycling steps are performed with the aid of a temperature control element, rather than electrical denaturation. This preserves the local concentration of error-free strands that have been cleaved into solution within the electrically defined zone and allows them to participate in cycles of denaturation and extension with the surface molecules. Depending upon the nature and precise activity of the error correcting enzyme used, the 3'-ends of cleaved strands may bear a phosphate, preventing their participation in subsequent extension steps that would otherwise preserve that synthesis material; the reaction shown in step 4 of FIG. 54. It may be desirable to include an enzyme for 3'-dephosphorylation in the relevant reaction mixture so that this material can continue to undergo template-dependent enzymatic extension for amplifying error free material. Many such cycles of error correction can then be conducted without the progressive loss of tethering to the surface. T4 polynucleotide kinase is one suitable enzyme capable of removing 3'-phosphates without the undesirable activities of alkaline phosphatases.

Figure 55:
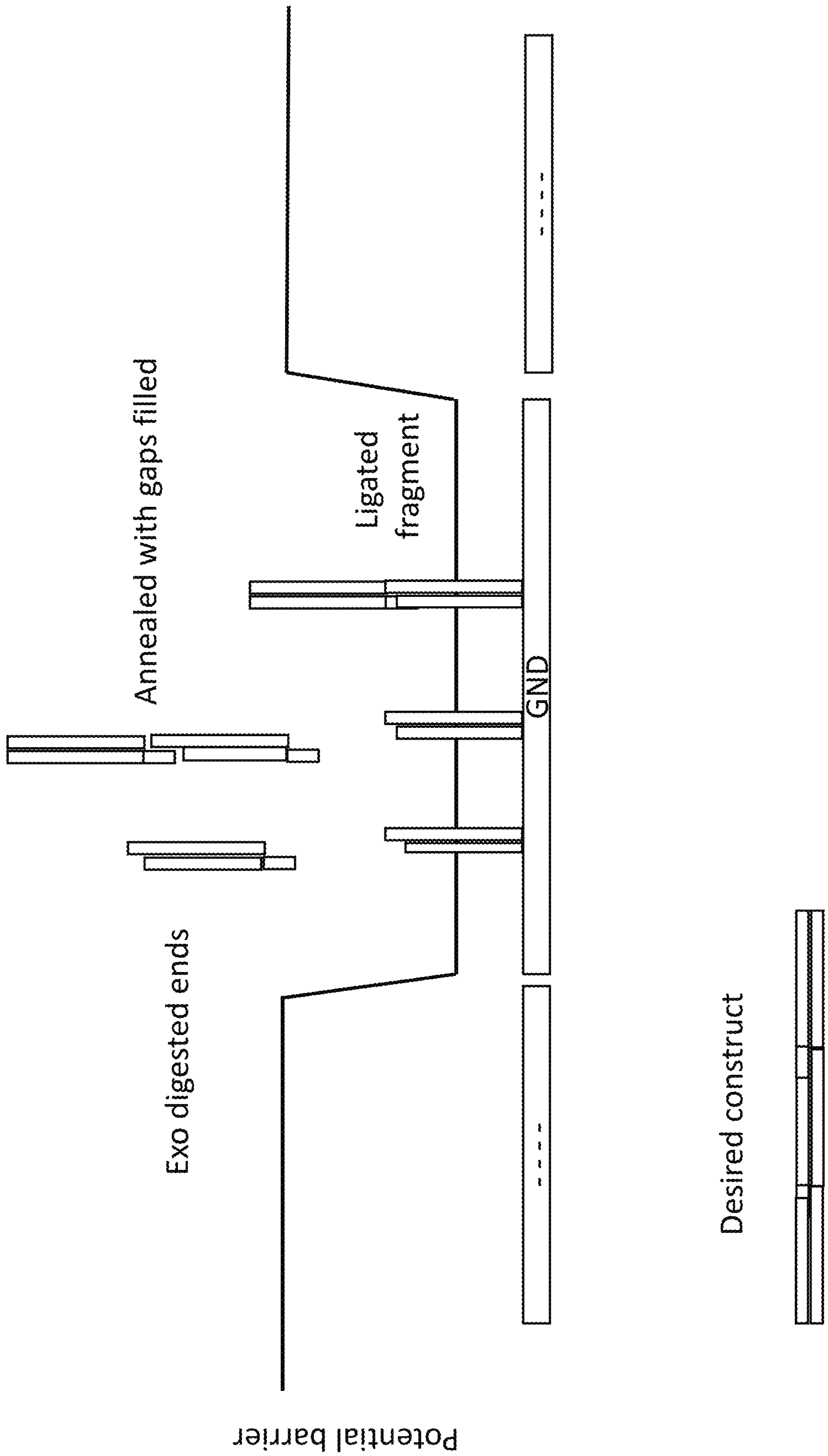
FIG. 55 shows a Gibson Assembly conducted within an electrically-defined zone.

FIG. 55 illustrates the concept where multi-step processes such as a Gibson Assembly may be performed within an electrically defined zone. Appropriately designed constructs, double stranded and with partially overlapping ends, are mixed at the well and retained on a landing pad or temporarily immobilized by hybridization while the enzyme mixtures are applied. The material is then allowed to react in the well, such that an exonuclease partially degrades the 5'-ends of the strand, allowing the overlapping ends of the strands to anneal. The ends are joined when a polymerase seals the gaps such that a ligase can covalently link the products together. As the figure indicates, elements of this reaction scheme may be carried out entirely in an electrically defined zone without participation of surface molecules, or alternatively may involve appending new sequences to anchored strands.

Figure 56:
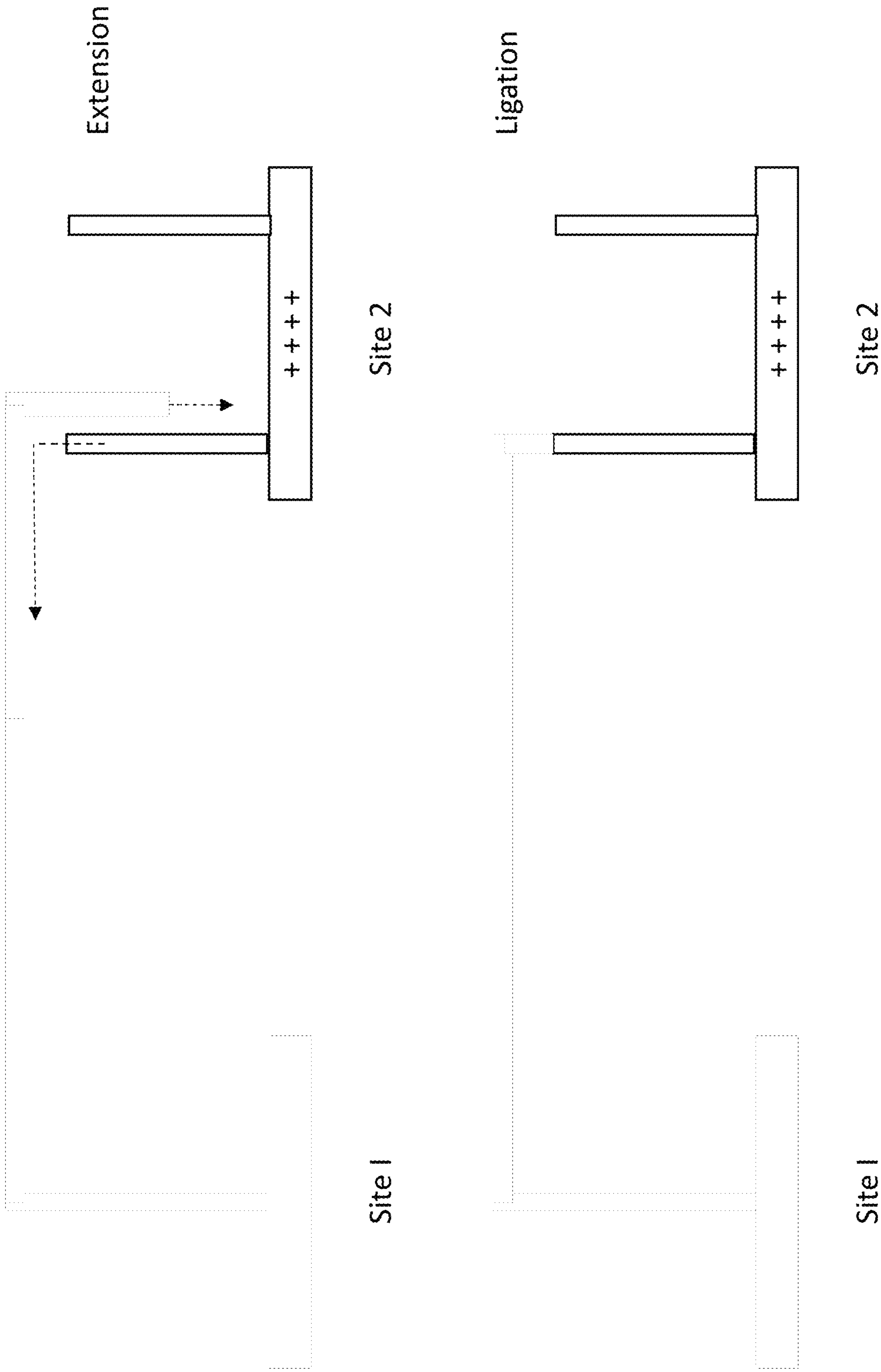
FIG. 56 shows assembly reactions conducted between sequence immobilized at two different sites.
Figure 57:
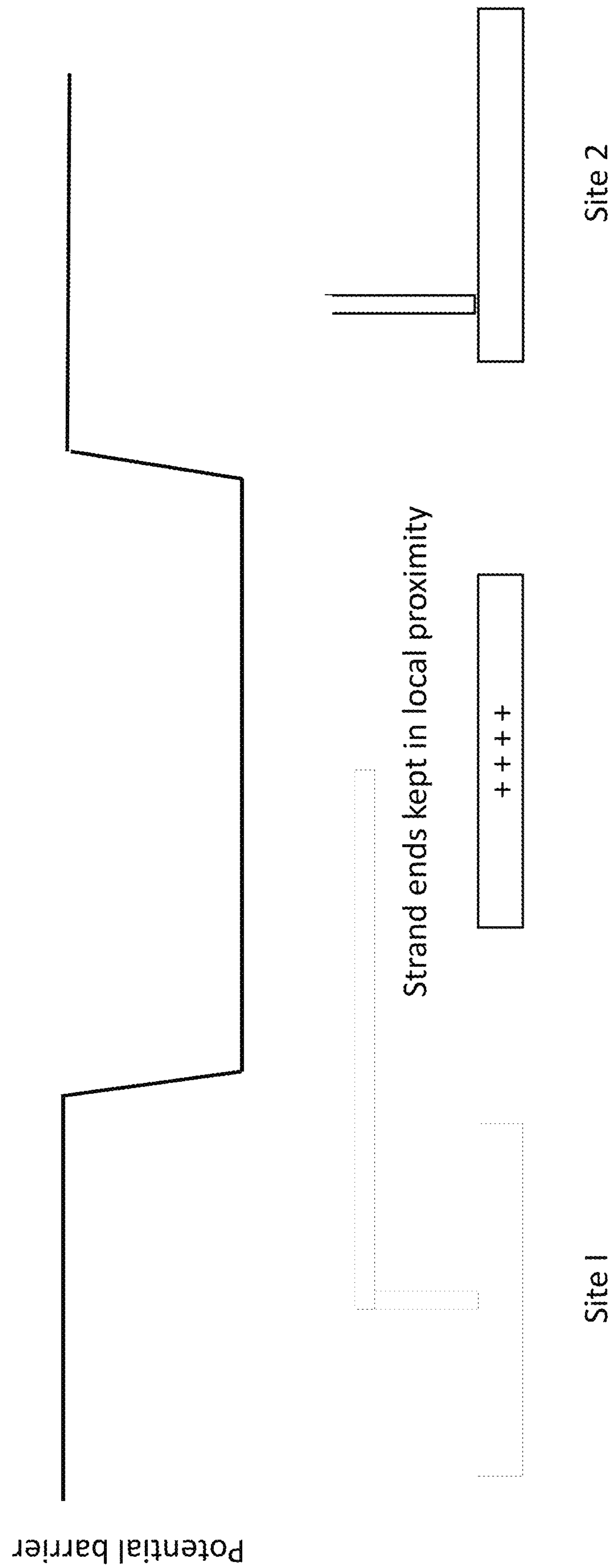
FIG. 57 shows localizing the ends of two immobilized strands at a third intermediate site.
Figure 58:
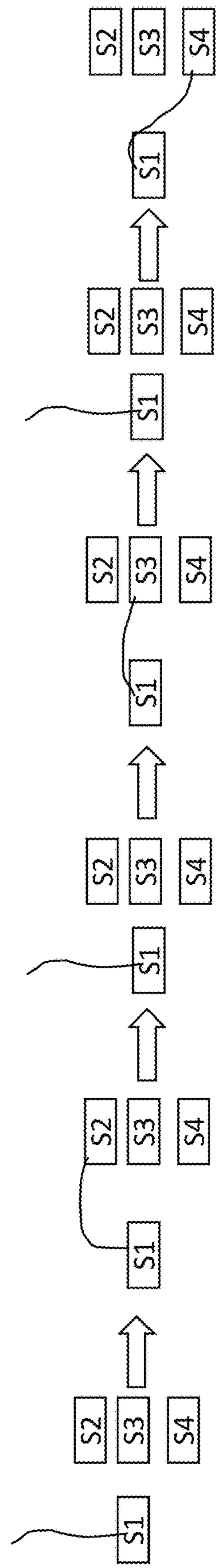
FIG. 58 shows an anchored traveling strand.
Figure 59:
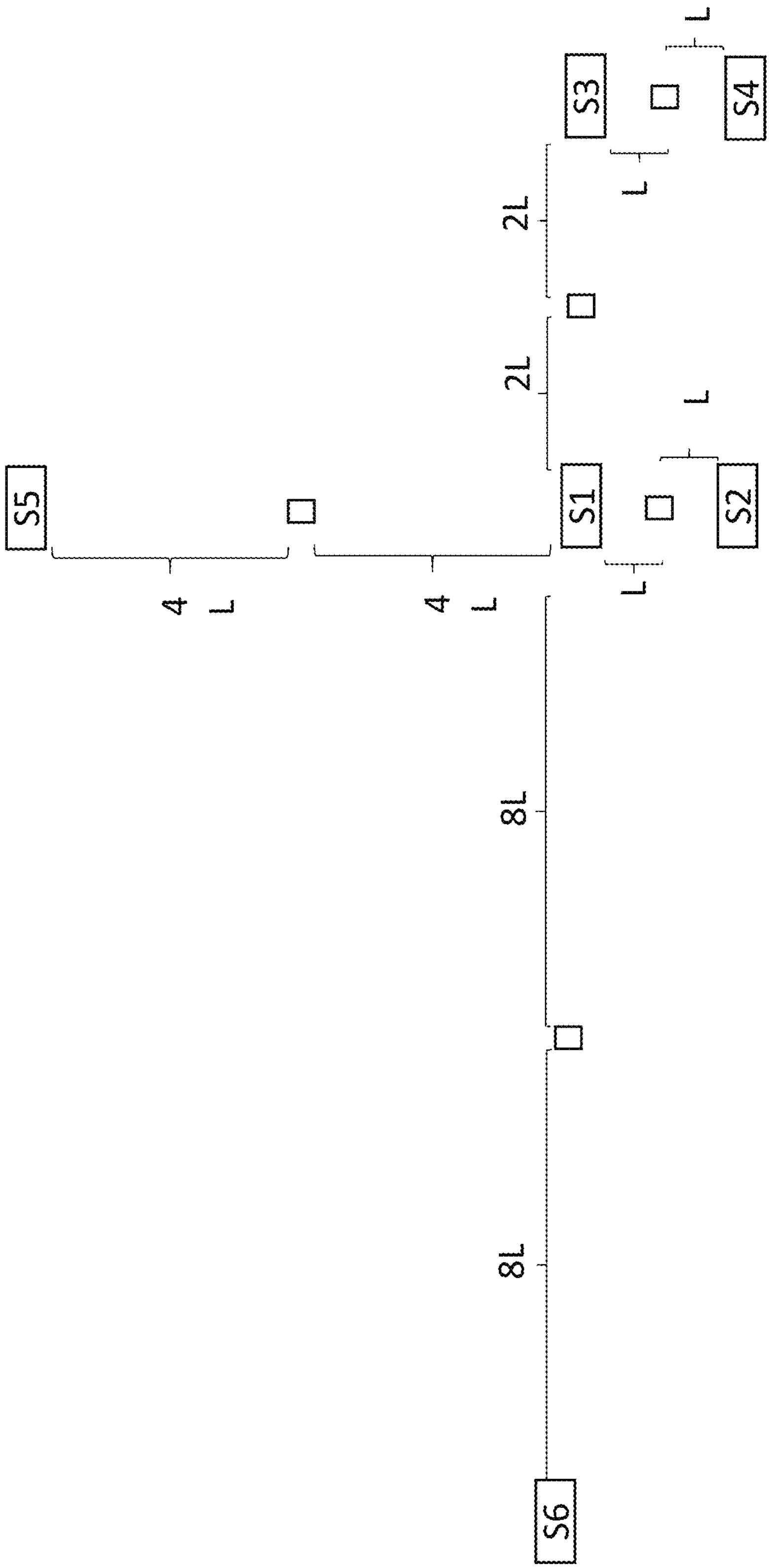
FIG. 59 illustrates the organization of sites for a series of distance-dependent assembly reactions.

FIG. 56 shows the concept of transferring sequence information to sites while the DNA remains bound to the surface. The process is initiated by an initial hybridization to form a bridge between the two sites. Some embodiments may then join the sequences by ligation, while others may copy at least one of the strands using a template dependent polymerase. In preferred embodiments the two sites are spaced so that only DNA of the correct length can undergo the bridging to provide an additional layer of error mitigation. Given the expected length of a strand under physiological conditions, 1 μm gaps may be bridged by 3 kb of DNA, making this approach suitable for the assembly of large, multi-kilobase constructs. The ideal site configuration depends on ratio of sizes between the joined fragments. In cases where the strands at one site are much longer than those at the partner site, the joining operation may effectively occur at the site of the shorter strand as in FIG. 56. FIG. 57 shows the case where both strands are of similar length and the joining operation occurs mid-way between the two sites, assisted by electric control to trap the ends of the strands in close proximity to one another. In other embodiments, the central site may include sequence elements which assist in templating the ligation of the two strands. In some embodiments, a single central assembly site interacts with other neighboring sites sequentially, acquiring new sequence elements with each joining operation in what amounts to an 'anchored traveling strand' assembly process (FIG. 58). Notably, this embodiment may be regarded as compatible with the disclosed bridge amplification techniques to increase the effective density of the desired constructs. In preferred embodiments, these sites are arrayed in such a way that the central site will not interact with the next site in the series unless the preceding joining operation has been conducted successfully. One version of this concept is depicted in FIG. 59. Briefly, a strand at Si (site 1) of length L is joined with another strand from S2, also of length L. The strands are either denatured or cleaved from S2, so strands at Si are now of length 2L. These are then joined with strands at S3, which have been generated by a similar process, at an intermediate site of approximately 2L distance between each. These steps are then repeated, each generation of joining reactions occurring further from Si as the construct size increases. While the example here shows Si doubling in size with each generation, many other similar configurations are possible depending on the desired number of generations and ability to arrange these features efficiently on a given chip design.

Another advantage of the arced assembly reactions is that they provide an opportunity for real time monitoring of the joining operations and allow them to repeat the binding events until a suitable yield has been achieved. The monitoring may be conducted using EIS, or conductance through the molecules bridging the features. In a related concept, some chip designs may contain distinct monitoring pixels which are spaced a distance from the assembly site which matches the expected construct length after a successful assembly, or alternatively include series of monitoring pixels spaced away from an assembly site to act as a surface ruler of the construct anchored at that position.

Chip-Based DNA Synthesis Systems

Figure 60:
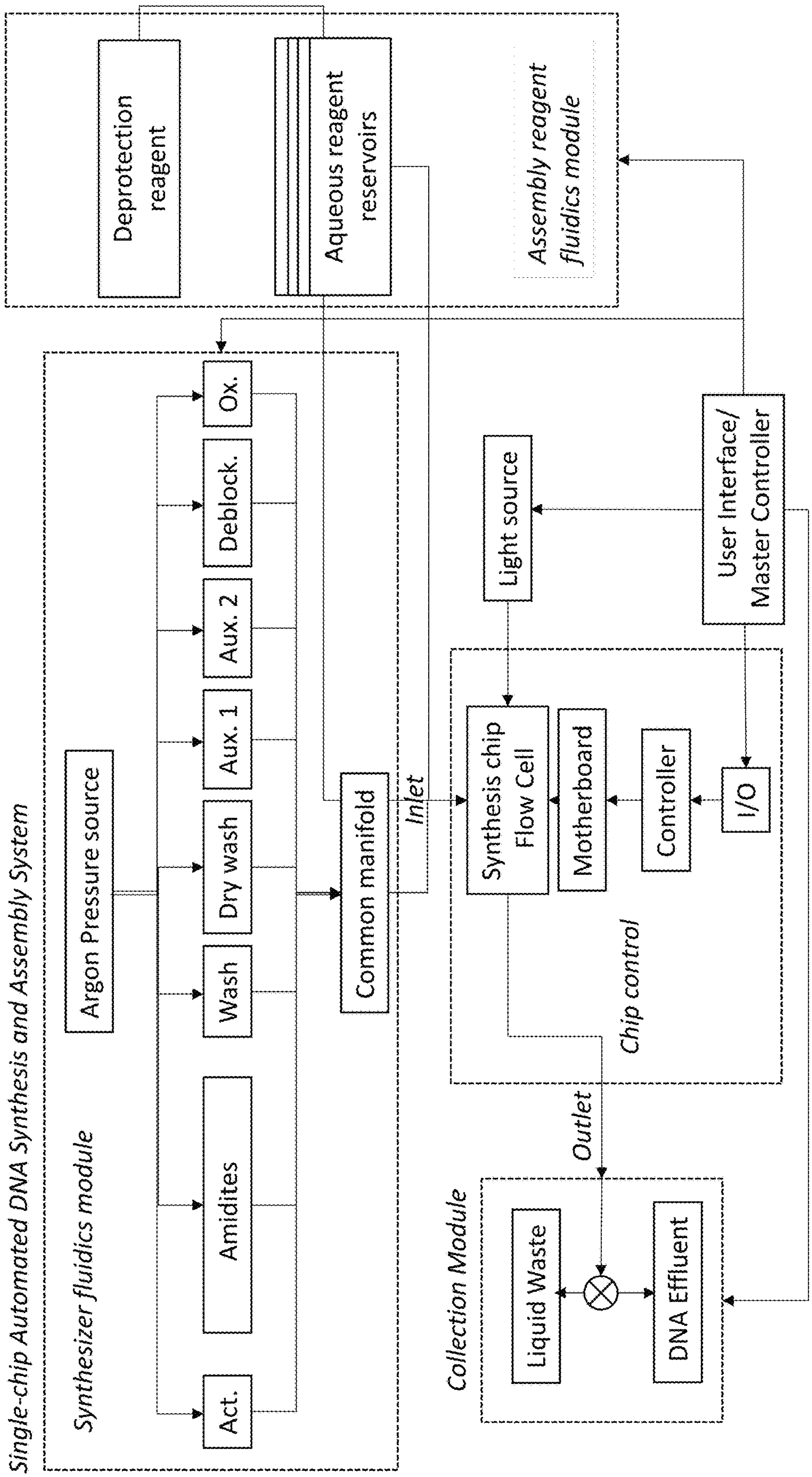
FIG. 60 shows one preferred embodiment of a system diagram for a DNA synthesis instrument that operates a single chip.

In preferred embodiments, the DNA synthesis chip and supporting system hardware disclosed is embedded in complete systems that perform automated DNA synthesis and gene assembly. FIG. 60 illustrates one such preferred embodiment, showing the schematic for a single-chip DNA synthesis system. As shown, the reagent delivery is performed with a fluidics module consisting of reservoirs pressurized with an inert gas source, such as argon, and a manifold to regulate reagent delivery to the chip, including mixed reagents. In the example shown, reagent reservoirs are provided for (from left to right) the activation solution used for acid generation (Act.), the amidites themselves (which may preferably include a set for sequences of inverted polarity and chemical modifications), a wash solution, a dry wash, two auxiliary reagent reservoirs, and the deblock solution and oxidizer (Ox.) solution such as are utilized in the standard embodiments of phosphoramidite synthesis. Also shown is an additional reagent deck which includes solutions for deprotection and enzymatic assembly. It is preferred that the assembly deck includes an element of temperature control to preserve the shelf-life of the enzymatic components and reaction formulations. Preferred embodiments may utilize a greater or lesser number of reagent reservoirs than shown. The synthesis chip, and corresponding flow cell, and chip control system such as that disclosed previously obtains control signals from a user interface or master controller shown, which also serves to synchronizes the fluid delivery to the chip and the voltage applications and other chip functions for the synthesis cycles. In preferred embodiments, this master controller could be in common with the chip controller, or may be a separate controller, or may be an external computer. Some embodiments may include a light source module as shown, to perform photolysis operations as needed. The system has a fluidic collection module for collecting waste reagents, or collecting effluent carrying the released DNA constructs post-synthesis, under the control of the controller.

Large Scale Quality Monitoring

Sacrificial Feature Design

In some preferred embodiments at least some of the pixels on a primary oligonucleotide synthesis chip are utilized for quality control purposes. These quality control features may be comprised of test sequences, the successful synthesis of which may be understood as a proxy for the successful generation of the primary target strands, functional handles, amplification handles, and various identifying barcodes, as disclosed in FIG. 61A. The primary QC section is denoted as the 'Analysis region' and is the target sequence for synthesis. Many sequences may be suitable for this, though it is preferred that, for each coupling step used throughout a cycle of chip synthesis, at least one quality control sequence undergoes coupling. For instance, a deprotection controlled synthesis process producing a library of unmodified 200-nt oligonucleotides in a synchronous mode requires 800 coupling steps (4×sequence length). Thus, it is preferred that each of those 800 coupling steps can be assayed by examination of the QC sequences so that there is complete 'coverage' of each process step. In one form of QC sequences for this purpose, the QC sequences 'tile' through the sequence of coupling steps used for the chip synthesis. For a chip synthesis of Y coupling steps, the QC sequence region would span a region from i to x, where i is the position of the first base of the QC sequence in the string of all coupling steps and x is the length of the QC region. This organization is also depicted in FIG. 61A. The QC library is comprised of all sequences from i=1 to 1=Y−x. It is generally preferred that x have a value between 5 and 20 to balance the 'depth' at which each coupling step is queried and formation of inadvertent secondary structure formation, though some embodiments may utilize value of x as low as 1. An additional index section indicates the value of i for a particular strand, so that sequences with identical analysis regions can be correctly assigned to their occurrence in the synthesis. Further representative QC sequences may include superstrings of all N-mers, where N is selected so the resultant superstring is of a length similar to the primary strands (i.e. the superstring of all possible 2-mers is 18 nt, etc.). Approaches where the analysis region samples discontinuous regions of the synthesis string may also be included in the QC library, in particular when the synthesis string contains atypical sequence elements not representative of any synthesis scenario of interest (extensive homopolymers, inadvertent pairing with index or spacer elements, etc.). Here, more complex indexing approaches, for example deploying a Luby transform code as originally taught by Erlich & Zielinski, *Science* (2007) may be appropriate. The spacer sequences bracketing the analysis region is designed to provide a common synthesis environment regardless of the barcode, index, or selective enrichment handles. In preferred embodiments, this may be a poly-T sequence between 5 and 10 nucleotides in length, though many sequences may be suitable. The functional handles are designed to aid in separation of the QC sequences from the primary strands by either selective capture or amplification. Selective capture may be either covalent or non-covalent, where a functional group may react with a solid-phase capture material or instead undergo hybridization or streptavidin capture. It is preferred that the capture technique is orthogonal to that used by the same strands which may be physically comingled with the library. In some embodiments, the QC sequences may be bound to the chip utilizing a different covalent linker than the primary strands, though this introduces an additional cleavage step in the processing. The barcodes may be used to provide information about the chip of origin or the physical region on the chip. The QC sequences from many synthesis chips can be pooled together to assay them in parallel.

In some embodiments, it may be preferable to include quality control features which do not require sequencing such as those which can give a visual indication of the synthesis processes when the chip has been imaged. In embodiments where the chemical synthesis includes a capping cycle, quality control features may be constructed according to FIG. 61B. The strands are organized such that a region of interest is followed by a common reporter element, where the capping may be optional. The index and barcode regions depicted in FIG. 61A are omitted because the spatial position on the chip may convey the same information. Suitable reporters may include covalently linked fluorophores or a stretch of sequence which may undergo hybridization. The analysis region may be any of the coupling steps required for the chip synthesis. As with the features designed to undergo sequencing, it is preferred that each coupling step of the chip synthesis is interrogated by at least one feature, and some features may interrogate a single step, while others may interrogate multiple steps in aggregate, in direct analogy to the analysis regions used for the disclosed sequencing analysis. Further analysis regions may include specific sequences or strings of interest as previously described. One distinction is that shorter analysis regions are generally preferred relative to the sequencing QC features so that it is easier to measure the efficiency of each coupling step. Tiling schemes, like that disclosed for sequencing QC features, may be preferred when x>1, because each feature has an edit distance of 1 from the others, enabling easy comparisons of single-nucleotide differences. This data may provide additional information on the propensity for depurination or other side reactions which result in strand scission. It is also preferred that at least one feature is used as a control where no capping is utilized throughout the analysis region, and another feature is utilized to measure the efficiency of capping by deliberately capping all reporter sequences for further precision in the measurements. Other embodiments may also seek to hybridize a sequence to the common spacer region, which may help normalize the reporter signal to the relative functional group density at that position. Certain electrode materials and configurations may enable interrogation of analysis regions without the use of capping steps to attenuate the signal of unsuccessful coupling events. The approach is disclosed in FIG. 62A, where the length of the sequence is such that the fluorophore of the reporter region is quenched unless the region has been synthesized successfully. The precise distance at which the quenching occurs may depend on the substrate, fluorophore, surface functionalization, and conditions which impact the average conformation of the surface sequences. It may be difficult to predict a priori which spacer length will provide the optimal sensitivity to errors so some embodiments may use multiple replicates of the QC library, where each replicate bears a spacer of a different length. The lengths may include all spacer lengths between 5 and 50 nucleotides or may select a subset of spacer lengths within this range as may be relevant to a particular group of conditions. Suitable substrates may include gold, platinum, iridium, or various forms of carbon such as amorphous carbon, glassy carbon, or graphene. Suitable fluorophores may include any cyanine derivative (Cy3, Cy5, Cy5.5), AlexaFluor variants, TexasRed, or fluorescein as is known to those skilled in the art.

Other embodiments may use surface QC features which instead report the extent of deprotection under the reaction conditions. The sequence design of these features is disclosed in FIG. 62B. The principle is that, at various points throughout synthesis, a cycle of deprotection and nucleotide addition is conducted in a fashion where the resultant signal at a location is proportional to the degree of protecting group removal at this step. In the simplest embodiment, deprotection conditions are assayed by directly coupling a fluorescent phosphoramidite to the exposed sites, and no further synthesis is carried out at the position. In another embodiment, the deprotection reaction is conducted so that a fraction of PG1, here defined as the primary protecting group used for the synthesis, is removed. A phosphoramidite bearing an orthogonal protecting group PG2, is then coupled to the exposed sites. The synthesis may then proceed until the entirety of the desired primary sequences have been generated, which may include further steps of deprotection and PG2 coupling at other sites as desired. Several routes may then be used. In the first, PG2 may then be removed, and the newly exposed sites undergo coupling with a fluorescent phosphoramidite. This prevents multiple cycles of fluorophore consumption throughout synthesis. In the second, the remaining fraction of PG1 at the PG2 coupled sites is removed and a fluorescent phosphoramidite is then coupled. This inverts the signal pattern of the first approach. In the third, PG2 is removed and a common reporter sequence is generated using PG2 protected monomers. In the fourth, any residual PG1 is removed and then capped. PG2 is then removed, and a common reporter sequence is generated using PG1 protected monomers. Many such deprotection conditions may be assayed throughout the course of the synthesis in this fashion, providing information on electrode performance throughout the synthesis cycle, precise degree of deprotection without any sequencing biases, or the degree of inadvertent protecting group removal at neighboring sites, or crosstalk, which may not be clear or decipherable from sequencing data. As before, the relative signals may be normalized to the fluorescent signal that results from hybridization to a common spacer region.

Some chip embodiments may utilize both surface and sequencing-based QC elements. Replicates of the QC features may be placed at various physical locations throughout a chip so that they sample the performance of the chemistry in regions where there may be sight variations to the flow. While the precise placement of the elements for sequencing QC may not be crucial, it is generally preferred that they are distributed in a reasonably uniform fashion, as depicted in FIG. 63A. By contrast, it is preferred that surface-based QC sequences are clustered into common zones of interest, as depicted in FIG. 63B. The advantage of this configuration is that it may increase the speed of fluorescence analysis using off-chip optics. Fluorescence images of the chip can be acquired at a low resolution and the signal uniformity of each zone can be assessed, as well as the average signal intensity of the different zones. Further imaging may only be necessary if significant heterogeneity is detected. This allows high-throughput QC without the need to image at a resolution needed to obtain single feature data and may be used to rapidly triage chips prior to any pooling of their synthesis products. In embodiments where chips bear optical sensing elements, there is no particular advantage to clustering the features in the arrangements shown in FIG. 63B.

The sacrificial QC feature designs disclosed here may be generalized to cases where the reporter is electrochemical, rather than fluorescent. Methylene blue, methylene blue-II, or ferrocene-dT phosphoramidites may be substituted for the fluorophores in the preceding figures without fundamental restrictions, with the exception of embodiment depicted in FIG. 62A, where the readout is related to the degree of fluorescence quenching over an electrode. The analogous electrochemical strategy is to invert the desired outcome, where the increasing length of a correctly produced strand reduces the electrochemical response as the reporter is located further from the surface. In some embodiments, correct coupling is verified by comparison with a related control feature preserved for this purpose.

The scaling advantages permitted by CMOS chips enable a massive number of sacrificial features to be used without significantly compromising the primary oligonucleotide synthesis capacity. As many synthesis difficulties can be sequence specific, some embodiments may utilize sacrificial features which assay the performance of each step of the chemistry for all N-mers, where N may be 1, 2, 3, 4, 5, or more nucleotides in length. For example, in a chip of primary oligonucleotide target sequences 200 nt in length, ~800 coupling steps may be required. Each of these coupling steps may be measured for efficiency against a panel of all 1024 5-mers. This requires ~800,000 sacrificial features, which has not been practical on previous generations of oligonucleotide synthesizers but occupies a small fraction (<1%) of the synthesis capacity on a full-reticle CMOS chip comprised of up 130 M addressable sites. Thus, there is little restriction to employ only a single type of quality monitoring, or restrict replicates of such sacrificial quality control features Dynamic Synthesis Feedback While it has been implied that the sacrificial quality control sites described are examined after synthesis, there is no fundamental restriction to this mode of operation, and quality control data may be acquired during synthesis. With the appropriate linker, sequencing-based quality control elements may be cleaved and eluted from the chip during synthesis, with deprotection performed off-chip prior to analysis. Though time required for deprotection, sequencing, and analysis generally exceeds the time required for synthesis of the remainder of the chip, this mode of operation may be useful for systems where chips operate in a continuous production mode and having a continuous, if delayed, set of chip performance metrics over time is valuable. In other embodiments, smaller trial syntheses may be conducted using sacrificial features prior to synthesis of the desired constructs and the readout data may be used as criteria for proceeding with further synthesis. Surface based quality control sites may be interrogated during synthesis with greater ease, provided that any fluorophores may function without the need for further deprotection during synthesis and in a solvent appropriate for continued synthesis. Fluorescein is a notable exception, where fluorescence is impaired without removal of the pivaloyl groups present in commercial versions of the amidite. Optical reporters may be interrogated by the use of synthesis sites bearing on-chip photodetectors or with an external imaging equipment.

Monitoring systems may be used to adjust synthesis conditions in real time in response to the measured data. These adjustments may pertain to reaction times, applied voltages, pulse-width modulation parameters, reagent concentrations, temperatures, mixing processes, source reservoirs, or the like. Such adjustments may be conducted to compensate for process variations in surface chemistry, including the surface area or porosity of chip surfaces, thicknesses of covalently bound or adsorbed polymeric layers, particularly those coating electrodes, surface defects arising from minute variations in fabrication processes or materials, sequence-specific variations in yield, variations in ambient conditions such as temperature or humidity, change of chip performance due to fouling, other sources of increased impedance, or chemistry performance over time.

Depending on the nature of the measurement, adjustments to the synthesis conditions may be performed in real time within a particular step of the synthesis cycle, between steps of a synthesis cycle, or between synthesis cycles themselves. In one preferred embodiment, current measurements are acquired periodically during the application of the voltage during detritylation step and used to adjust the duty cycle conditions in response to the measurements. An example of duty cycle based current modulation is provided below (See Example 8).

Other embodiments may implement such monitoring processes upon the standard, non-sacrificial, features by use of electronic impedance spectroscopy to monitor the incorporation events directly. As with other measurements, it may be conducted during a synthesis step, between steps of a synthesis cycle, or between cycles themselves. In preferred embodiments, the measurement is conducted without exchanging the reagent mixture used for the detritylation step. Some embodiments will sample each pixel, while others may sample a representative fraction of pixels. In some embodiments, each pixel is sampled individually, while in other embodiments, pixels are sampled in groups or sectors, which may decrease the scan time, amount of data to process, or increase the magnitude of the current response.

All such fluorescence and real time monitoring systems may be deployed at the levels of enzymatic oligonucleotide assembly or any level of error-correction. In one preferred usage, the activity of mismatch enzyme binding during error correction may be used to determine whether further cycles of enzymatic excision are required.

Additional Aspects and Embodiments

In an aspect, an electrochemical gene synthesis chip is disclosed, comprising a semiconductor integrated circuit device; individually addressable pixels that are electrochemical DNA synthesis devices where each said pixel drives an independent synthesis process in a distinct DNA synthesis region proximate to each said pixel; individually addressable pixels that act as DNA assembly devices where each drives an independent assembly process; and control circuitry capable of applying different voltages to the electrical sites.

In certain embodiments, the individually addressable pixels shape the electronic potential over the surface of the chip to guide the localization of ions. In certain embodiments, the chip contains zones of addressable temperature regulation. In certain embodiments, the synthesis pixels of the chip contain underlying circuitry to monitor the success of monomer addition. In certain embodiments, the chip includes addressable sites containing multiple primer sequences immobilized by their 5'-termini and produced by in situ synthesis. In certain embodiments, the chip contains pairs of electrodes, each pair comprising an addressable buried electrode neighbored by an addressable exposed electrode, and wherein the distance between the pair is less than that of the distance to the next closest neighboring pair. In certain embodiments, the chip includes electrically addressable sites without covalently attached oligonucleotides that act as transient holding zones for solution-phase ions. In certain embodiments, the chip includes electrically addressable sites with covalently attached oligonucleotides that act as transient holding sites for material during assembly. In certain embodiments, the surface sites corresponding to the origin and destination of the gene fragments are placed in close physical proximity to minimize the distance ions travel in solution. In certain embodiments, the chip is divided into zones surrounded by electrodes applying a potential barrier to prevent unintended exchange of ions between such zones.

In another aspect, a method of confining ions or molecules or particles in a virtual well in solution above an electrode by pulse-width modulation is disclosed.

In another aspect, a method of gene synthesis is disclosed wherein gene fragments are guided into common sites for assembly by application of guiding potentials to the chip.

In another aspect, a method of DNA assembly is disclosed wherein the hybridization is accelerated by high concentrations of fragments drawn into a virtual well.

In another aspect, a method of DNA assembly is disclosed. The method involves, electrical attraction of disparate DNA sequences to a common location on a CMOS chip; spontaneous self-assembly by hybridization of the fragments into at least a partially double-stranded construct;

ligation of the fragments to form at least one strand wherein the fragments are covalently bound together; and optionally repeating the process of attraction, assembly, and ligation until the desired sequence is produced. In certain embodiments, the synthesis process is conducted in parallel at different zones across a chip for producing multiple different sequences. In certain embodiments, at least one of the sequences participating in the ligation reaction is covalently immobilized to the surface of the chip.

In another aspect, a method of slowing the rate of dimethoxy trityl removal during DNA synthesis by reduction of the temperature at the reaction site is disclosed.

In another aspect, a method of refining the location of an oligonucleotide synthesis site by installing a distinct chemical functionality at the periphery of the site during an early step of synthesis is disclosed.

In another aspect, a method of production of a CMOS chip containing features bearing multiple primer sequences immobilized by their 5'-termini is disclosed. The method involves: installation of N orthogonal protecting groups PG1 through PGN; removal of PG1; synthesis of the first primer in the 5'→3' direction; acetylation of the first strand; removal of PG2; synthesis of the second primer in the 5'→3' direction; and optionally repeating the steps of acetylation, deprotection, and synthesis until the N desired primer sequences have been generated. In embodiments, the orthogonal protecting groups are installed by using a preceding step of partial DMT removal. In embodiments, the orthogonal protecting groups are installed by coupling a mixture of phosphoramidites bearing the desired protecting groups.

In another aspect, a linker is disclosed which produces a surface-bound hydroxyl group upon photolysis.

In another aspect, a linker is disclosed which produces a surface-bound hydroxyl group upon application of reductive potential and alkaline pH.

In another aspect, a method of on-chip, electrically driven, oligonucleotide amplification is disclosed. The method involves annealing of a solution-phase primer to an immobilized template strand; extending the primer with a template dependent polymerase; applying localized voltage to electrically denature the duplex; and optionally repeating the above-described method steps until the desired quantity has been produced. In embodiments, the priming sequence is common to multiple sites of amplification and is removed enzymatically in a later process. In embodiments, the extended primer segment from one site is transferred to a new site for further extension reactions.

In another aspect, a method of assembling nucleic acid sequences is disclosed. The method involves electrically driven annealing of at least two sequences where each is covalently bound at a distinct electrically addressable location; and performing an enzymatic reaction to join the sequences. In embodiments, the enzymatic reaction is a ligation. In embodiments, the enzymatic reaction is copying with a template dependent polymerase. In embodiments, at least one of the sites contains circuitry capable of monitoring the success of the reaction. In embodiments, distinct electrically addressable sites are spaced to be less than or approximately equal to the length of the desired construct size. In certain embodiments, many distinct sites are placed radially around a common central site.

In another aspect, a method of gene synthesis is disclosed. The method synthesis of primary oligonucleotides on designated synthesis pixels; annealing a primer sequence to the template strands on the synthesis pixels; polymerase-directed extension of the primer sequence; electrical denaturation of the extended primer from the template; electrical attraction of the extended primers to a different location containing both sequences complementary to the 3'-end of the primers and additional template for the extension of the 3'-end; and optionally repeating the process of extension, denaturation, and transfer until the desired sequence is produced. In embodiments, the synthesis process is conducted in parallel at different zones across a chip for producing multiple different sequences.

In another aspect, a method of error correction is disclosed. The method involves synthesis of sequences at least partially complementary to those released from sites of primary sequence generation at distinct sites; electrical attraction of the released sequences to these sites for hybridization; optionally changing the local voltage or temperature to alter the stringency of hybridization; rinsing of the unbound sequences; and optionally repeating this process using additional sites.

In another aspect, a method of error correction is disclosed. The method involves electrically assisted denaturation of duplexed DNA strands; re-annealing of the denatured strands to an immobilized complementary sequence; treatment with mismatch binding enzymes and an exonuclease; thermally assisted denaturation, annealing, and extension; and optionally repeating until the desired sequence quality is achieved.

In another aspect, a gene synthesis system is disclosed. The system includes an electrochemical gene synthesis chip; a fluidic system capable of programmed delivery of reagents for oligonucleotide synthesis, deprotection, and enzymatic assembly reagents; and control circuitry capable of applying to different voltages to the electrical sites. In embodiments, the chip is contained in a flow cell bearing at least one rooftop electrode to assist in ion confinement near the proximity of the DNA synthesis and assembly chip. In embodiments, the rooftop contains multiple independently addressable electrodes. In embodiments, the rooftop electrode is itself a CMOS chip designed to mirror the layout of the synthesis chip.

In another non-limiting aspect of the present disclosure, an electrically controlled DNA synthesis and assembly chip is disclosed. The chip includes a semiconductor integrated circuit device; individually addressable pixels that are DNA synthesis devices where each said pixel drives an independent synthesis process; individually addressable pixels that act as DNA assembly devices where each drives an independent assembly process; and control circuitry capable of applying different voltages to the electrical sites. In certain embodiments, the individually addressable pixels shape the electronic potential over the surface of the chip to guide the localization of particles or molecules. In certain embodiments, the chip contains zones of addressable temperature regulation. In certain embodiments, the synthesis pixels of the chip contain underlying circuitry to monitor the success of monomer addition. In certain embodiments, the chip includes addressable sites containing multiple primer sequences immobilized by their 5'-termini and produced by in situ synthesis. In certain embodiments, the chip contains addressable buried electrodes neighbored by addressable exposed electrodes and where the distance between the pair is less than that of the distance to the next closest neighboring pair. In certain embodiments, the chip includes electrically addressable sites without covalently attached oligonucleotides that act as transient holding zones for solution-phase particles or molecules. In certain embodiments, the chip includes electrically addressable sites with covalently attached oligonucleotides that act as transient holding sites for material during assembly. In certain embodiments, surface sites corresponding to the origin and destination of the gene fragments are placed in close physical proximity to minimize the distance particles or molecules travel in solution. In certain embodiments, the chip includes a series of electrodes used to move molecules over a large distance in a series of smaller discrete steps. In certain embodiments, the chip is divided into zones surrounded by electrodes applying a potential barrier to prevent unintended exchange of particles or molecules between such zones.

In another non-limiting aspect of the present disclosure, a method of confining particles or molecules close to the surface of a CMOS chip is disclosed by application of a potential to a parallel surface opposing the CMOS chip. In certain embodiments, the method of guiding particle or molecule transfer over a distance greater than the Debye length by a series of discrete steps, each individually less than the Debye length. In certain embodiments, the method of confining particles or molecules in an electrically defined zone in solution above an electrode by pulse-width modulation.

In another non-limiting aspect of the present disclosure, a system of electrically charged or polarizable molecular or particle scaffolds on which oligonucleotides may be synthesized is disclosed. The system may be optimized for electrically directed motion and/or electrically controlled confinement/concentration in synthesis and assembly processes. The system may also include the use of one or more orthogonally cleavable linkers for selective detachment of the scaffold from the synthesis site, and for selective detachment of the scaffold from the oligonucleotide before, during, or after one or more assembly processes.

In another non-limiting aspect of the present disclosure, formulation of a porous permeation layer is disclosed. In embodiments, the layer is formed by dissolution of block copolymer in a solvent compatible with each block, possible co-dissolution or suspension of plasmonic nanoparticles or other electric field-enhancing additives into the block copolymer solution, deposition of a block copolymer solution onto the surface of the CMOS chip, annealing and microdomain alignment of block copolymers through application of heat, shear stress, and/or electric fields, and selective etching of one or more, but not all, microdomains.

EXAMPLES

Example 1. Oligonucleotide Electrophoresis on Passive Chip

FIG. 64 depicts an example of electrophoretic ejection of a hybridized sequence. A custom fabricated electrode array was first coated in a global layer of silane across the chip surface. After fabrication, the chip was treated with UV/ozone with a Helios-500 (UVOTECH) for 30 minutes, immersed for 2 minutes in water, dried, then immersed in a solution of 95% ethanol, 5% water, 0.01% acetic acid, with an additional 2% v/v of N-(3-triethoxysilylpropyl)-4-hydroxybutyramide (Gelest) added. After 3 hours and 45 minutes of incubation at room temperature, the chip was rinsed in a solution of 95% ethanol, 5% water, and 0.01% acetic acid for 10 minutes, and then transferred to a vacuum oven to bake at 120 C under vacuum overnight. A single oligonucleotide sequence was then chemically synthesized across the entirety of the chip using a K&A S-4 (Sierra Biosystems). The chip was then deprotected in a 50:50 (v/v) mixture of ethylenediamine:ethanol for 40 minutes at room temperature. Hybridization was conducted with a 1 μM solution of oligonucleotide (5'-Cy5-AAAAAAAAAAAAAAA, Integrated DNA Technologies) in 20×SSC and 0.1% tween-20 (Sigma Aldrich), before rinsing with 1×SSPE buffer (Sigma Aldrich). An initial step of imaging was performed using a Nikon Eclipse 50i with a Cy5 filter, and a Teledyne Lumenara CCD camera. A potential of −2 V was applied to the indicated electrodes via a PalmSens. The ejection of the oligonucleotides occurs almost instantaneously, and manifests as a transient increase in signal between the repelling electrodes. This arises from a combination of a brief concentrating effect of the ejected oligonucleotides between the regions of high negative potential formed over the electrodes, as well as the alleviation of surface-fluorophore quenching over the platinum as the oligonucleotides travel away from the surface of the chip. After ~10 seconds, the ejection appears essentially complete while the labelled sequences on the sites held at 0V have been retained. An additional round of hybridization with the original sequence was performed, demonstrating that the sites of applied potential had not been destroyed during the process and are capable of repeated cycles of oligonucleotide capture and ejection. When implemented in conjunction with known reactions for solid-phase, template-dependent enzymatic extensions, this capability forms the basis for the disclosed electrically driven linear amplification process.

Example 2. Oligonucleotide Electrophoresis on Device Chip

FIG. 65 depicts an example of electrophoretic attraction of a solution phase oligonucleotide. A 3 uM solution of fluorescently labelled oligonucleotide (Sequence: 5'-CGTTAAAATTCGACT-Cy3, Integrated DNA Technologies) in 0.5×SSC buffer (Sigma Aldrich) was placed atop a custom-fabricated CMOS electrode array. In this example, the chip had previously been coated with a layer of silane in a similar process to that used in Example 1. +2 V was applied using a Keithley SMU, after the pixels spelling 'Hello World' were activated by control via a custom MATLAB script. The image depicts a moment prior to voltage application, while the second panel depicts the chip ~1 sec later, illustrating the pattern of active pixels. The fluorescence intensity here appears 'inverted' because of a combination of quenching and presence of electrolytic byproducts at the surface of the Pt electrode, both of which have the net effect of depleting the local fluorescent signal around active pixels. The combined abilities imply many complex workflows and molecular processes that may be enabled by these fundamental operations of attraction and repulsion and illustrates implementation of electrophoretic action on a chip capable of supporting oligonucleotide synthesis.

Example 3. Synthesis without Silanization-Passive Chip

FIG. 66 depicts the synthesis upon the native population of —OH groups in $SiO_2$. A custom fabricated passive electrode was used as a synthesis substrate for oligonucleotide synthesis using standard chemical deprotection. The chip was deprotected in a 50:50 mixture of ethylenediamine: ethanol for 40 minutes before undergoing hybridization and imaging with a fluorescently labelled complementary sequence (5'-Cy5-AAAAAAAAAAAA, Integrated DNA Technologies), indicating that the surface is sufficiently reactive to support synthesis and that an appreciable fraction of the P—O—Si linkage survives alkaline deprotection. Also depicted is a chip treated in an otherwise identical manner that had been derivatized with a global layer of (3-aminopropyl)triethoxysilane (APTES, Sigma Aldrich) prior to synthesis. The APTES has been installed by first treating the chip in UV/ozone for 10 minutes, then immediately immersing the chip in a 2% v/v solution of APTES in toluene (Sigma Aldrich) and stored in a sealed chamber at C for 21 hours. After incubation, the chip was rinsed was rinsed twice with toluene (Sigma Aldrich), ethanol, and water prior to drying with an air stream and baking at 110 C for ~15 minutes. The graph compares the resultant fluorescence intensities of hybridization to the silanized and unsilanized chips, indicating that the APTES treated chip exhibits only a marginal improvement in signal intensity under these conditions.

Example 4. Chemical Synthesis without Silanization-Device Chip

FIG. 67A depicts the synthesis upon the native population of —OH groups in $SiO_2$ on a CMOS device chip. Following synthesis using a standard chemical deprotection process, the chip was then deprotected for 75 minutes in a 50:50 (v/v) mixture of ethylenediamine:ethanol before undergoing hybridization with a fluorescently labelled oligonucleotide and imaging as described in prior examples. The localization of the fluorescent signal over the oxide region indicates the intended localization of the synthesis sites without use of a dedicated derivatization or linker installation strategy. FIG. 67B depicts the results of synthesis and hybridization on <um width oxide trenches on a CMOS chip. The platinum electrode placement here was defined by electron beam lithography. Prior to synthesis, the chip was cleaned with UV/ozone as described in prior examples. The hybridization was conducted with the indicated sequences as described in prior examples. The presence of fluorescence signal demonstrates the intended electrode and oxide patterning, and the intended surface reactivity on unsilanized features of dimensions that scale to a density of ~16,000,000/$cm^2$.

Example 5. Electrochemical Impact of Non-Specific Silanization Processes

FIG. 68 illustrates the change in magnitude of the induced current on a CMOS chip after a global silanization process. Currents were measured on a custom fabricated CMOS synthesis chip by delivering a solution of 20 mM hydroquionine (Sigma Aldrich), 20 mM 1.4,-tetracholorobenzoquinone (Sigma Aldrich), and 100 mM tetrabutyl ammonium hexafluorophosphate (Sigma Aldrich) in acetonitrile (Glen Research) with a K&A S-4 synthesizer. Voltage was applied using a Keithley SMU ($V_{WE}-V_{CE}$=1.2 V) to various regions of the chip activated using a custom MATLAB script, which serially activated sectors of pixels as shown in the right-hand panel of FIG. 68. After the currents were measured, the chip was silanized by a 10 minute cleaning with UV/ozone then briefly immersed in water (3 minutes). The chip was then assembled into a custom-built flow cell, and a solution of 95% EtOH, 5% water, with an additional 2% v/v solution of APTES was then delivered and allowed to incubate for 30 minutes. The chip was then rinsed in ethanol for 3 minutes, then dried with air flow, before baking the chip at 120 C for 30 minutes, followed by a 120 C bake under vacuum overnight. After cooling, the chip was then reconnected to the synthesizer for repeating the electrochemical measurements. This example illustrates the modulation of electrochemical behavior with a surface coating, and the substantially increased currents exhibited by chips without a surface coating over the electrodes.

Example 6. Oligonucleotide Damage with Unmodulated Currents

FIG. 69 depicts the results of an experiment to observe oligonucleotide damage during detritylation. DNA synthesis of the indicated sequence was conducted using chemical detritylation on an unsilanized CMOS chip. Following synthesis, various regions of the chip were subjected to cycles of ‘mock’ electrochemical deprotection, wherein a deprotection step is conducted without subsequent coupling. The deprotection cycles were each performed by application of 1.2 V=$V_{WE}-V_{CE}$ in a quinone-based deprotection solution for 60 seconds. After each step, the deprotection mixture was replaced for repeating the process at subsequent cycles. The chip was then deprotected and hybridized as described with the indicated sequences. The fluorescence micrograph shows that the deprotection cycles reduce hybridization of the mixed-base sequence (Cy3 channel), while hybridization to the poly-T element is slightly improved (Cy5 channel). The signal reduction on the mixed base fluorescence channel is indicative of depurination events arising from excessive acid generation, while the signal increase on the poly-T fluorescence channel is likely a secondary effect of reduced crowding and electrostatic repulsion. This illustrates one potential consequence of excessive current generation during detritylation.

Example 7. Pulse Width Modulation of Currents

FIG. 70 depicts the ability to modulate the currents by a pulse-width modulation (PWM) strategy. The approach was implemented on a CMOS synthesis chip where the voltage between the active WE's and common CE was cycled between 1.2 V and 0 V at 10 Hz. The duty cycle was varied between 0 and 100% and the induced currents in a model quinone-based deprotection solution were recorded as shown. Notably, there are two regimes of current with a steep transition occurring at duty cycles between 55-60%, and within both such regimes a fine control of the magnitude of the current is possible. The transition point itself may be influenced by particular electrochemical parameters such as the frequency, reagent concentration, and electrode sizes.

Example 8. DNA Damage with Pulse-Width Modulation

FIG. 71 depicts the impact of different duty cycles on the oligonucleotide integrity. The experimental setup is analogous to that of Example 7, here differing in the use of PWM of various duty cycles across the surface of the chip after chemical synthesis. A step of Cy5 coupling after final DMT removal was performed, though not described in detail here. As the hybridization data indicates, impairment to the hybridization of mixed base sequences is observed at even low duty cycles (20%, 10 Hz).

Example 9. Confinement of Detritylation with PWM and Partial Detritylation

FIG. 72A depicts the impact of PWM on acid confinement on an unsilanized CMOS chip. A 15-nucleotide poly-T sequence was first synthesized across the surface of the chip as a spacer, followed by two steps of coupling and oxidation with a dT phosphoramidite, where deprotection is omitted so that the oligonucleotides remain terminated with a 5'-DMT group. The chip was then subjected to various deprotection conditions at different surface array locations before coupling a Cy5-phosphoramidite to report the degree of detritylation. After chemical deprotection, the chip underwent hybridization with the indicated sequence and imaging as has been described. Panel I depicts the intended checkerboard pattern of deprotection while panel II depicts the measured signal after 3 min of detritylation at a 5% duty cycle (10 Hz). Panel III contrasts this with a similar experiment performed without PWM, where only 6 seconds of voltage application results in comparatively poor acid confinement. This indicates the advantage of PWM programs for confinement in particular circumstances and highlights the manner in which synthesis feedback can be obtained from sacrificial features. FIG. 72B depicts one timecourse of detritylation using a 5% duty cycle. This illustrates one ability to fine tune the detritylation by methods which slow the reaction, which can be applied to density or functional group modulation on the array surface.

Example 10. Oligonucleotide Synthesis with PWM and Density Modulation by Acetylation FIG. 73A illustrates array-based oligonucleotide synthesis on an unsilanized chip using PWM. Deprotection, hybridization and imaging were conducted as described in preceding examples. FIG. 73B demonstrates the use of acetylation to modulate oligonucleotide density. Panel A depicts hybridization to a sequence synthesized on a custom chip, while Panel B depicts synthesis of the same sequence on a different chip, where here a step of acetylation was conducted following a step of chemical detritylation. The hybridization data suggests that ~71% of the oligonucleotide density has been attenuated in this example. This capability may be combined with the demonstrated abilities described in Example 12 for more precise control.

Example 11. Cleavage and Amplification of Chemically Synthesized DNA

FIG. 74 illustrates the example of deploying a cleavable linker to remove sequences from the surface of a chip and their subsequent amplification. The indicated sequences were synthesized using traditional chemical detritylation. A commercially available phosphoramidite (ChemGenes part #CLP-2244) was incorporated after a short spacer from the surface (here a silanized glass slide prepared in a manner analogous to previously described silanizations. A simultaneous cleavage and deprotection reaction was conducted by incubating the chip in a closed chamber above a reservoir of ethylenediamine for 3 hours. The oligonucleotides are collected by rinsing the chip with water, then desalted with a 10 kDa molecular weight cutoff filter (Amicon) prior to amplification. Zymo cleaned amplicons (DCC-5, Zymo Research) were pooled and submitted through a commercial sequencing pipeline (Azenta). The size distribution of products in is based on the read lengths observed in the next generation sequencing data after adapter trimming, and indicates successful synthesis, amplification, and recovery of the intended products.

Example 12. Cleavage and Amplification of Chemically Synthesized DNA from a Device Chip FIG. 75 indicates the synthesis and amplification of the same sequence and chemistry as FIG. 74 instead using a CMOS chip as a substrate. The cleavage/deprotection, desalting, and amplification were conducted as before. Depicted is the product amplicon as run on a 15% TBE-urea denaturing gel (Thermo Fisher), visualized with Sybr Gold (Thermo Fisher) indicating the successful recovery of synthetic material from the CMOS chip surface.

Example 13. Linker Free Cleavage on Unsilanized Chips

FIG. 76 shows the example of performing oligonucleotide cleavage on an unsilanized chip without the use of a linker. Panel A compares the results of hybridization to a surface prepared in otherwise identical fashion, where Chip I was deprotected using ethylenediamine in ethanol, while Chip II was deprotected using ethylenediamine vapor in a sealed chamber. The relative hybridization intensities indicate that there is little to no detectable oligonucleotides present on the chip deprotected with ethylenediamine vapor. Panel B compares the results of amplification of two synthesis products generated from unsilanized chips, termed Chip III and Chip IV. Their preparation differs only by the inclusion of a cleavable linker (ChemGenes CLP-2244) in chip III. The denaturing gel shows the presence of the intended product band in both cases, which is a positive indicator that the oligonucleotide has been cleaved from the substrate.

Example 14. Enzymatic Error Depletion

FIG. 77 shows the concept of depleting errors from a duplex of synthetic oligonucleotides. An 8 nM solution 196 bp duplex strand (Integrated DNA Technologies) was digested in a 1 U/uL solution of Endo V in 1×NEbuffer4 (New England Biolabs) for 60 minutes at 37 C. Endo V is known to cleave at mismatches which are formed here as a result of independently occurring errors in each strand of the duplex. When duplexes are the result of an enzymatic extension, practitioners can induce mismatches by 'shuffling' the duplexes with a cycle(s) of denaturation and annealing. The sequencing results at right confirm that such an enzymatic treatment (conducted in a separate reaction from that shown on the gel) improves the sequence quality. Both the starting material and Endo V treated material (after Zymo cleanup) were sequenced using an iSeq100 (Illumina). The first 10,000 reads of each resultant library were analyzed using a custom script to detect and tabulate mismatches in the stretch of sequence denoted as the 'Analysis region'. In principle, additional treatments with the same enzyme or related enzymes may be used to drive further improvements in quality as needed.

Example 15. Assembly of Oligonucleotide Pools by Ligation

FIG. 78 shows the in vitro assembly oligonucleotide pools by enzymatic ligation. The first gel illustrates the assembly of a pool of 4 oligonucleotides, illustrating that the ligation reaction is essentially quantitative at this complexity under the given conditions. The second gel depicts the results of a similar assembly reaction using a pool of 20 oligonucleotides. While some slight banding is evident, suggestive of the correct product, there is evidence of significant erroneous assemblies. The third gel depicts the results of amplification of a 20 oligonucleotide ligation product, indicating the presence of the desired species. The gels indicate the concepts of enriching for correct assemblies via amplification, as well as the complexities and inefficiencies of scaling assemblies of relatively modest difficulty. Oligonucleotides from the PhiX174 genome were combined into 'top' and 'bottom' pools (8 uM total oligonucleotide for the small assembly, 40 uM total oligonucleotide for the large assembly) and then first phosphorylated with T4 PNK (0.4 U/uL, 1×PNK buffer, 1 mM ATP) at 37 C for 60 minutes (Smith et al. (2003) *Proc. Natl. Acad. Sci. U.S.A.* 100(26): 15440-15445). The reaction was heat killed at 65 C for 20 minutes. The top and bottom pools were then combined without cleanup (8 uM total oligo for the small pool, 16 μM for the large pool), subjected to a slow annealing from 94 C to 37, then allowed to return to room temperature. The reaction was then supplemented with additional ATP (to ~1 mM), and 800 U of Hi-T4 DNA ligase (New England Biolabs, ~40 U/uL final) and then incubated at 45 C for minutes, followed by a 10 minute heat killing step at 65 C. The products were analyzed on either 4-12% native TBE gel (large pool) or 15% TBE-urea gel (small pool), visualized by Sybr Gold staining. Prior to amplification of the large pool, the reaction was then Zymo cleaned and diluted 1000× into a solution of 1 uM primers and 1×Q5 PCR master mix (New England Biolabs). Amplification was conducted according to the manufacturer's protocol for 15 cycles with an annealing temperature of 69 C. The small pool was comprised of the oligonucleotides labelled 1, 2, 11, and 12, while the large pool was composed of all oligonucleotides 1-20. The primers for the amplification were oligonucleotides labelled 1 and 20.

Example 16. Electrically Directed Motion Between Electrically Defined Zones Using a Dynamic Sequence of Electrical Signals FIG. 79 demonstrates the electrically directed motion of particles or molecules from an electrically defined zone (Zone 1; red box) to a second electrically defined zone (Zone 2; blue box) through a dynamic sequence of applied electrical signals. At the initial state in the top left image panel (a), an AC signal (1 kHz, 10 Vpp) is applied to Zone 1 with Zones 2 and 3 set to ground, concentrating particles or molecules at the center of Zone 1. As depicted from left to right along the top row of image panels (b through e), when the frequency at Zone 1 increases to 15 kHz, particles or molecules move from the center to the edges of Zone 1. The second row of image panels (f through j) illustrates particle motion from the edges of Zone 1 to the corners of Zone 1 when the frequency increases from 15 kHz to 50 kHz. The rightmost image in the second row (j) depicts particle behavior that is consistent with a phenomenon called pearl-chaining, in which particles or molecules bridge electrically defined zones in response to an applied electrical signal that typically induces pDEP. In the bottom row of image panels (k through o), particles or molecules forming the pearl chain are directed toward the center of Zone 2 when Zone 1 is set to ground and an electrical signal (1 kHz, 10 Vpp) is applied at Zone 2. Electrically directed particle motion as depicted in each row of image panels occurs over a span of approximately two seconds under the selected experimental parameters.

Example 17. Electrically Directed Motion Along Distinct Regions of an Electrically Defined Zone Using a Dynamic Sequence of Electrical Signals FIG. 80 demonstrates the electrically directed motion of particles or molecules along two distinct regions of an electrically defined zone (Zone 2) through a dynamic sequence of applied electrical signals. At the initial state in the top left image panel (a), an AC signal (15 kHz, 10 Vpp) is applied to Zone 2 with Zones 1 and 3 set to ground. This static pattern induces electrically directed motion along the edges of Zone 2, as observed through particle displacements from the bottom left corner to the top right corner of panel a. Select particle displacements along the top row of image panels are depicted through use of blue and red arrows (panels b through f). The bottom row of image panels (g through 1) illustrates a shift in the path of electrically directed motion from the edges of Zone 2 to the center of Zone 2 upon decreasing the frequency of the AC signal at Zone 2 from 15 kHz to 1 kHz. Select particle displacements along the bottom row of image panels are depicted through use of red and green arrows. Particles or molecules traveling along the edges of Zone 2 in the first static pattern (image panels a through f) are displaced to the center of Zone 2 after application of the second static pattern, which also induced electrically directed motion of particles or molecules from the bottom left corner to the top right corner of the image panels. Particles or molecules appear to move faster under application of the second static pattern (panels g through 1) compared to the first static pattern (panels a through f). Each row of image panels depicts electrically directed particle motion over a duration of approximately thirty seconds.

Example 18. Electrically Directed Motion Between Distinct Regions of Electrically Defined Zones Using a Dynamic Sequence of Electrical Signals FIG. 81 demonstrates the electrically directed motion of nanoparticles between distinct regions of electrically defined zones (Zones 1 through 3) through a dynamic sequence of applied electrical signals. Nanoparticles suspended in solution aggregate at the center of each zone upon application of an AC signal (1 kHz, 10 Vpp) to Zone 3 with Zones 1 and 2 set to ground, as shown in panel a. An increase in frequency from 1 kHz to 10 kHz prompts nanoparticles to shift from one central region at each zone to four distinct regions, as indicated panels b and c. Increasing the frequency from 10 kHz to 50 kHz induces nanoparticle motion to the corners of each zone, where pearl-chaining is evident between Zones 1 and 3 in panels d and e. Pearl-chaining ceases when the frequency increases to 75 kHz, as shown in panel f. At 100 kHz, nanoparticles at the corner regions begin to spread around the perimeters of each zone in panel g. Spreading around the perimeter increases with frequency until 750 kHz (panels h, i, and j), after which nanoparticles remain at the perimeter while moving away from the corner regions, as evident at a frequency of 1 MHz (panel k). As shown in panel 1, increasing the frequency from 1 MHz to 2 MHz pushes the particles or molecules away from the edges of each zone in a manner consistent with nDEP.

Example 19. Electrically Directed Motion Away from an Electrically Defined Zone Using a Dynamic Sequence of Electrical Signals FIG. 82 depicts the electrically directed motion of particles or molecules away from an electrophoretic confinement zone (Zone 1) using a dynamic sequence of electrical signals. Image panel a shows the initial confinement of particles or molecules at Zone 1 resulting from application of a DC signal (3 V). A reverse DC pulse (−3V for less than one second) ejects particles or molecules from the confinement zone into solution (panel b). The ejected particles or molecules diffuse vertically and radially outward from the collection center at Zone 1 upon removal of applied DC signal (panels c through f). Selected image panels depict diffusion over the span of approximately twenty seconds following the ejection pulse.

What is claimed is:

1. A system comprising:

a polymer synthesis and assembly chip comprising:

a complementary metal-oxide semiconductor (CMOS) integrated circuit device comprising:

a plurality of pixels, wherein each pixel of the plurality of pixels includes an electrode;

wherein a first set of one or more pixels of the plurality of pixels is configured to electrochemically synthesize a first oligonucleotide as a de novo construction through electrically controlled localized reactions within a fluid medium; and wherein a second set of one or more pixels of the plurality of pixels is configured to assemble the first oligonucleotide with a second oligonucleotide into a larger oligonucleotide construct by electrically controlling motion of the first oligonucleotide, selectively, within the fluid medium, either independently or in concert with one or more pixels of the plurality of pixels;

control circuitry capable of applying voltages to the electrode;

a fluidic system capable of programmed delivery of the fluid medium; and a gasket to confine the fluid medium in proximity to the plurality of pixels.

2. The system of claim 1, wherein the plurality of pixels includes a pixel having specific functional geometries.

3. The system of claim 1, wherein the chip contains zones of electrically addressable and controllable temperature regulation.

4. The system of claim 1, wherein at least one of the plurality of pixels includes underlying circuitry to monitor synthesis or assembly or both.

5. The system of claim 1, wherein the chip includes addressable sites containing multiple sequences immobilized by their 5'-termini and produced by in situ synthesis.

6. The system of claim 1, wherein the chip includes addressable buried electrodes.

7. The system of claim 1, wherein the chip includes electrically addressable sites that act as temporary holding sites for oligonucleotides as solution-phase particles or molecules.

8. The system of claim 7, wherein the electrically addressable sites comprise pixels of the plurality of pixels.

9. The system of claim 1, wherein the chip includes electrically addressable sites with covalently attached oligonucleotides that act as temporary holding sites for oligonucleotides.

10. The system of claim 1, wherein a series of pixels of the plurality of pixels is operably configured to move an oligonucleotide over a defined distance within the continuous fluid medium.

11. The system of claim 10, wherein the movement over a defined distance comprises a series of smaller discrete movement steps.

12. The system of claim 1, wherein the chip is divided into electrically defined zones by pixels of the plurality of pixels that apply a potential barrier to prevent unintended exchange of molecules into or out of said zones.

13. The system of claim 1, wherein the chip contains at least 100 pixels.

14. The system of claim 1, wherein the chip is contained in a flow cell bearing at least one rooftop electrode.

15. The system of claim 1 where synthesis occurs on nucleotides.

16. The system of claim 1, where electrically controlled motion occurs on the at least one synthesized oligonucleotide.

17. The system of claim 1, where assembly occurs on the at least one synthesized oligonucleotide.

* * * * *